US 7,677,445 B2

(12) United States Patent
Silverbrook et al.

(10) Patent No.: US 7,677,445 B2
(45) Date of Patent: Mar. 16, 2010

(54) METHOD OF COUNTING CURRENCY

(75) Inventors: Kia Silverbrook, Balmain (AU); Paul Lapstun, Balmain (AU)

(73) Assignee: Silverbrook Research Pty Ltd, Balmain, New South Wales (AU)

( * ) Notice: Subject to any disclaimer, the term of this patent is extended or adjusted under 35 U.S.C. 154(b) by 498 days.

(21) Appl. No.: 11/041,651

(22) Filed: Jan. 25, 2005

(65) Prior Publication Data
US 2005/0258235 A1    Nov. 24, 2005

(30) Foreign Application Priority Data
May 18, 2004   (AU)   .............................. 2004902623

(51) Int. Cl.
*G06K 5/00*   (2006.01)
(52) U.S. Cl. ........................ 235/380; 382/135; 382/137
(58) Field of Classification Search ................. 235/379, 235/380, 493, 494; 382/115, 135, 137
See application file for complete search history.

(56) References Cited

U.S. PATENT DOCUMENTS

| | | | |
|---|---|---|---|
| 4,864,618 A | | 9/1989 | Wright et al. |
| 5,051,736 A | | 9/1991 | Bennett et al. |
| 5,477,012 A | | 12/1995 | Sekendur |
| 5,606,609 A | | 2/1997 | Houser et al. |
| 5,652,412 A | | 7/1997 | Lazzouni et al. |
| 5,661,506 A | | 8/1997 | Lazzouni et al. |
| 5,692,073 A | | 11/1997 | Cass |
| 5,852,434 A | | 12/1998 | Sekendur |
| 5,899,978 A | | 5/1999 | Irwin |
| 5,912,974 A | | 6/1999 | Holloway et al. |
| 6,003,010 A | | 12/1999 | Scolly et al. |
| 6,076,734 A | | 6/2000 | Dougherty et al. |
| 6,115,508 A | * | 9/2000 | Lopresti et al. ............. 382/306 |
| 6,155,604 A | * | 12/2000 | Greene et al. ................. 283/70 |
| 6,182,901 B1 | * | 2/2001 | Hecht et al. ................. 235/494 |
| 6,212,285 B1 | | 4/2001 | Bender et al. |
| 6,259,790 B1 | * | 7/2001 | Takagi et al. ................. 380/30 |
| 6,343,138 B1 | | 1/2002 | Rhoads et al. |
| 6,405,929 B1 | | 6/2002 | Ehrhart et al. |
| 6,457,651 B2 | | 10/2002 | Paul et al. |
| 6,600,823 B1 | | 7/2003 | Hayosh |

(Continued)

FOREIGN PATENT DOCUMENTS

EP    1359530 A2    11/2003

(Continued)

OTHER PUBLICATIONS

Dymetman, M., and Copperman, M., "Intelligent Paper in Electronic Publishing, Artist Imaging, and Digital Typography, Proceedings of EP '98", Mar./Apr. 1998, Springer Verlag LNCS 1375, pp. 392-406.

*Primary Examiner*—Kumiko C Koyama

(57) ABSTRACT

A method of counting currency documents including a plurality of coded data portions thereon. Each coded data portion is indicative of an identity of the currency document and the method includes, sensing at least one coded data portion for each currency document using a sensing device. This is used to generate indicating data, which is transferred to a computer system, to allow the computer system to determine the identity for each currency document. The identity is then used to determine a value for each currency document, allowing the documents to be counted.

19 Claims, 29 Drawing Sheets

U.S. PATENT DOCUMENTS

| | | |
|---|---|---|
| 6,718,047 B2 | 4/2004 | Rhoads |
| 6,724,374 B1 | 4/2004 | Lapstun et al. |
| 6,785,815 B1 * | 8/2004 | Serret-Avila et al. ........ 713/176 |
| 6,964,374 B1 | 11/2005 | Djuknic et al. |
| 7,216,232 B1 * | 5/2007 | Cox et al. ................... 713/176 |
| 2002/0080995 A1 | 6/2002 | Rhoads |
| 2002/0152389 A1 * | 10/2002 | Horita et al. ................ 713/180 |
| 2003/0012374 A1 | 1/2003 | Wu et al. |
| 2003/0059098 A1 * | 3/2003 | Jones et al. ................. 382/135 |
| 2003/0128866 A1 * | 7/2003 | McNeal ...................... 382/115 |
| 2003/0182246 A1 | 9/2003 | Johnson et al. |
| 2006/0028689 A1 * | 2/2006 | Perry et al. ................ 358/3.28 |

FOREIGN PATENT DOCUMENTS

| | | |
|---|---|---|
| EP | 1380982 A1 | 1/2004 |
| GB | 2306669 | 5/1997 |
| JP | 2000-233808 | 8/2000 |
| JP | 2002-150105 | 5/2002 |
| JP | 2003-343133 | 12/2003 |
| RU | 2195021 | 12/2002 |
| WO | WO 99/18487 A2 | 4/1999 |
| WO | WO 99/50781 A1 | 10/1999 |
| WO | WO-00/26749 | 5/2000 |
| WO | WO-03/081489 A2 | 10/2003 |

* cited by examiner

| 00 | 10 | 00 | 10 | 00 | 10 |
|----|----|----|----|----|----|
| 01 | 11 | 01 | 11 | 01 | 11 |
| 00 | 10 | 00 | 10 | 00 | 10 |
| 01 | 11 | 01 | 11 | 01 | 11 |

| 00 | 10 |
|----|----|
| 01 | 11 |

METHOD OF COUNTING CURRENCY

FIELD OF THE INVENTION

The present invention broadly relates to a method and apparatus for the protection of products and security documents using machine readable tags disposed on or in a surface of the product or security document.

CO-PENDING APPLICATIONS

The following applications have been filed by the Applicant simultaneously with the present application:

| HYS001US | HYS002US | HYS003US | HYS004US | HYS005US |
|---|---|---|---|---|
| HYP001US | HYP002US | HYP003US | HYP004US | HYP005US |
| HYN001US | HYN003US | HYN004US | HYN005US | |

The disclosures of these co-pending applications are incorporated herein by reference.

CROSS-REFERENCES

Various methods, systems and apparatus relating to the present invention are disclosed in the following co-pending applications and granted patents filed by the applicant or assignee of the present invention. The disclosures of all of these co-pending applications and granted patents are incorporated herein by cross-reference.

| | | | | | | |
|---|---|---|---|---|---|---|
| 6,795,215 | 10/884,881 | PEC01NP | 09/575,109 | 10/296,535 | 09/575,110 | 6,805,419 |
| 09/607,985 | 6,398,332 | 6,394,573 | 6,622,923 | 6,747,760 | 10/189,459 | 10/943,941 |
| 10/949,294 | 10/727,181 | 10/727,162 | 10/727,163 | 10/727,245 | 10/727,204 | 10/727,233 |
| 10/727,280 | 10/727,157 | 10/727,178 | 10/727,210 | 10/727,257 | 10/727,238 | 10/727,251 |
| 10/727,159 | 10/727,180 | 10/727,179 | 10/727,192 | 10/727,274 | 10/727,164 | 10/727,161 |
| 10/727,198 | 10/727,158 | 10/754,536 | 10/754,938 | 10/727,227 | 10/727,160 | 10/934,720 |
| 10/854,521 | 10/854,522 | 10/854,488 | 10/854,487 | 10/854,503 | 10/854,504 | 10/854,509 |
| 10/854,510 | 10/854,496 | 10/854,497 | 10/854,495 | 10/854,498 | 10/854,511 | 10/854,512 |
| 10/854,525 | 10/854,526 | 10/854,516 | 10/854,508 | 10/854,507 | 10/854,515 | 10/854,506 |
| 10/854,505 | 10/854,493 | 10/854,494 | 10/854,489 | 10/854,490 | 10/854,492 | 10/854,491 |
| 10/854,528 | 10/854,523 | 10/854,527 | 10/854,524 | 10/854,520 | 10/854,514 | 10/854,519 |
| PLT036US | 10/854,499 | 10/854,501 | 10/854,500 | 10/854,502 | 10/854,518 | 10/854,517 |
| 10/934,628 | 10/728,804 | 10/728,952 | 10/728,806 | 10/728,834 | 10/729,790 | 10/728,884 |
| 10/728,970 | 10/728,784 | 10/728,783 | 10/728,925 | 10/728,842 | 10/728,803 | 10/728,780 |
| 10/728,779 | 10/773,189 | 10/773,204 | 10/773,198 | 10/773,199 | 10/773,190 | 10/773,201 |
| 10/773,191 | 10/773,183 | 10/773,195 | 10/773,196 | 10/773,186 | 10/773,200 | 10/773,185 |
| 10/773,192 | 10/773,197 | 10/773,203 | 10/773,187 | 10/773,202 | 10/773,188 | 10/773,194 |
| 10/773,193 | 10/773,184 | 6,746,105 | 6,623,101 | 6,406,129 | 6,505,916 | 6,457,809 |
| 6,550,895 | 6,457,812 | 6,428,133 | 09/575,141 | 10/407,212 | 10/815,625 | 10/815,624 |
| 10/815628 | 09/517539 | 6566858 | 09/112762 | 6331946 | 6246970 | 6442525 |
| 09/517384 | 09/505951 | 6374354 | 09/517608 | 09/505147 | 6757832 | 6334190 |
| 6745331 | 09/517541 | 10/203559 | 10/203540 | 10/203564 | 10/636263 | 10/636283 |
| 10/866608 | 10/902889 | 10/902883 | 10/940653 | 10/942858 | 10/409876 | 10/409848 |
| 10/409845 | 09/575197 | 09/575195 | 09/575159 | 09/575132 | 09/575123 | 6825945 |
| 09/575130 | 09/575165 | 6813039 | 09/693415 | 09/575118 | 6824044 | 09/608970 |
| 09/575131 | 09/575116 | 6816274 | NPA019NUS | 09/575139 | 09/575186 | 6681045 |
| 6678499 | 6679420 | 09/663599 | 09/607852 | 6728000 | 09/693219 | 09/575145 |
| 09/607656 | 6813558 | 6766942 | 09/693515 | 09/663701 | 09/575192 | 6720985 |
| 09/609303 | 09/610095 | 09/609596 | 09/693705 | 09/693647 | 09/721895 | 09/721894 |
| 09/607843 | 09/693690 | 09/607605 | 09/608178 | 09/609553 | 09/609233 | 09/609149 |
| 09/608022 | 09/575181 | 09/722174 | 09/721896 | 10/291527 | 6718061 | 10/291523 |
| 10/291471 | 10/291470 | 6825956 | 10/291481 | 10/291509 | 10/291825 | 10/291519 |
| 10/291575 | 10/291557 | 10/291661 | 10/291558 | 10/291587 | 10/291818 | 10/291576 |
| 6829387 | 6714678 | 6644545 | 6609653 | 6651879 | 10/291555 | 10/291510 |
| 10/291592 | 10/291542 | 10/291820 | 10/291516 | 10/291,363 | 10/291487 | 10/291520 |
| 10/291521 | 10/291556 | 10/291821 | 10/291525 | 10/291586 | 10/291822 | 10/291524 |
| 10/291553 | 10/291511 | 10/291585 | 10/291374 | 10/685523 | 10/685583 | 10/685455 |
| 10/685584 | 10/757600 | 10/804034 | 10/793933 | 10/853356 | 10/831232 | 10/884882 |
| 10/943875 | 10/943938 | 10/943874 | 10/943872 | 10/944044 | 10/943942 | 10/944043 |
| 10/949293 | 10/943877 | 10/965913 | 10/954170 | NPA174US | NPA175US | NPA176US |
| NPA177US | NPA178US | NPA179US | NPA181US | NPA182US | NPA183US | NPA184US |
| NPA185US | NPA186US | NPA187US | NPA188US | 09/575193 | 09/575156 | 09/609232 |
| 09/607844 | 6457883 | 09/693593 | 10/743671 | NPB010US | 09/928055 | 09/927684 |
| 09/928108 | 09/927685 | 09/927809 | 09/575183 | 6789194 | 09/575150 | 6789191 |
| 10/900129 | 10/900127 | 10/913328 | 10/913350 | NPK010US | NPK011US | 6644642 |
| 6502614 | 6622999 | 6669385 | 6827116 | 10/933285 | NPM016US | 6549935 |
| NPN004US | 09/575187 | 6727996 | 6591884 | 6439706 | 6760119 | 09/575198 |
| 09/722148 | 09/722146 | 6826547 | 6290349 | 6428155 | 6785016 | 6831682 |
| 6741871 | 09/722171 | 09/721858 | 09/722142 | 10/171987 | 10/202021 | 10/291724 |
| 10/291512 | 10/291554 | 10/659027 | 10/659026 | 10/831242 | 10/884885 | 10/884883 |
| 10/901154 | 10/932044 | NPP051US | NPP052US | NPP053US | 10/965733 | 10/965933 |
| NPP058US | NPP060US | NPP061US | NPP062US | 10/659027 | 09/693301 | 09/575174 |
| 6822639 | 6474888 | 6627870 | 6724374 | 6788982 | 09/722141 | 6788293 |
| 09/722147 | 6737591 | 09/722172 | 09/693514 | 6792165 | 09/722088 | 6795593 |
| 10/291823 | 6768821 | 10/291366 | 10/291503 | 6797895 | 10/274817 | 10/782894 |
| 10/782895 | 10/778056 | 10/778058 | 10/778060 | 10/778059 | 10/778063 | 10/778062 |
| 10/778061 | 10/778057 | 10/846895 | 10/917,468 | 10/917467 | 10/917466 | 10/917465 |

-continued

| | | | | | | |
|---|---|---|---|---|---|---|
| 10/917356 | 10/948169 | 10/948253 | 10/948157 | 10/917436 | 10/943856 | 10/919379 |
| 10/943843 | 10/943878 | 10/943849 | NPS086US | 09/575154 | 09/575129 | 6830196 |
| 09/575188 | 09/721862 | 10/473747 | 10/120441 | 10/291577 | 10/291718 | 6,789,731 |
| 10/291543 | 6766944 | 6766945 | 10/291715 | 10/291559 | 10/291660 | 10/409864 |
| 10/309358 | 10/410484 | 10/884884 | 10/853379 | 10/786631 | 10/853782 | 10/893372 |
| 10/893381 | 10/893382 | 10/893383 | 10/893384 | NPT046US | NPT047US | NPT048US |
| NPT049US | NPT050US | NPW001US | 10/492,152 | NPW003US | NPW004US | 10/492154 |
| NPW007US | 10/683151 | 10/683040 | NPW012US | 10/919260 | NPW013US | 10/919261 |
| 10/778090 | 09/575189 | 09/575162 | 09/575172 | 09/575170 | 09/575171 | 09/575161 |
| 10/291716 | 10/291547 | 10/291538 | 6786397 | 10/291827 | 10/291548 | 10/291714 |
| 10/291544 | 10/291541 | 10/291584 | 10/291579 | 10/291824 | 10/291713 | 10/291545 |
| 10/291546 | 10/917355 | 10/913340 | 10/940668 | NPX041US | 6593166 | 10/428823 |
| 10/849931 | 10/815621 | 10/815612 | 10/815630 | 10/815637 | 10/815638 | 10/815640 |
| 10/815642 | 10/815643 | 10/815644 | 10/815618 | 10/815639 | 10/815635 | 10/815647 |
| 10/815634 | 10/815632 | 10/815631 | 10/815648 | 10/815614 | 10/815645 | 10/815646 |
| 10/815617 | 10/815620 | 10/815615 | 10/815613 | 10/815633 | 10/815619 | 10/815616 |
| 10/815614 | 10/815636 | 10/815649 | 10/815609 | 10/815627 | 10/815626 | 10/815610 |
| 10/815611 | 10/815623 | 10/815622 | 10/815629 | | | |

Some application has been listed by docket numbers, these will be replace when application number are known.

BACKGROUND

Security Document Counterfeiting

Counterfeiting of security documents, such as money, is an increasing problem that now poses a real threat to the strength of global monetary systems. Software and high quality photographic and printing technology are making it easier for criminals to produce and pass counterfeit notes into the monetary system. Counterfeit currency can be used to support the underground, untaxed economy, and it is a global threat that could erode financial systems.

The main reason that counterfeiting remains a major concern is the ease and speed with which large quantities of counterfeit currency can be produced using counterfeit software combined with high quality photographic and printing equipment. The occurrence of counterfeiting is likely to increase because these technologies are more readily available, and the techniques are more easily understood by an increasingly larger segment of the criminal population.

Whilst, these technologies do not reproduce the watermarks, color shifting, embedded security threads, microprinting, and the general feel of the note, or the slightly raised print produced by engraved plates, in day-to-day transactions these features are often overlooked so that counterfeit notes are often accepted as legal tender. Counterfeit money can move through banks, money exchanges, casinos, and is even carried overseas, and there are growing opportunities for counterfeit currency to be passed into the monetary system. Most of the large economies around the world are therefore now committed to introducing new technologies, as well as additional regulations and processes to make identification of counterfeit notes easier, to thereby reduce the incidence of counterfeit notes entering the monetary system.

Another concern is that there are governments who knowingly support counterfeiters, and some are complicit in producing counterfeit currency. A related problem is that all of the major U.S. and European banks have established multiple correspondent relationships throughout the world so they may engage in international financial transactions for themselves and their clients in places where they do not have a physical presence. Many of these do not meet current regulatory or reporting requirements, and therefore make it difficult to gain sufficient information to actively combat counterfeiting.

In addition to the growing problem of currency counterfeiting, the risks associated with money laundering are also a major concern for many governments for two reasons:

1. Deregulation of global financial systems means that it is now harder to combat money laundering; and
2. The funds involved in money laundering are increasing rapidly.

There are two stages involved in money laundering: placement and layering, and integration.

Placement is the movement of cash from its source and placing it into circulation through financial institutions, casinos, shops, bureau de change and other businesses, both local and abroad. Placement can be carried out through many processes including currency smuggling, bank complicity, deregulated currency exchanges, blending to enable funds from illicit activities to be obscured in legal transactions, and using the proceeds to purchase less conspicuous assets.

The purpose of layering is to make it more difficult for law enforcement agencies to detect the trail of illegal proceeds. Layering methods can include converting cash to other monetary instruments such as banker's drafts and money orders, or selling assets bought with illicit funds.

The final stage of integration is the movement of previously laundered money into the economy, mainly through the banking system, to make transactions appear to be normal business earnings.

The first thing to note about money laundering is that criminals prefer to deal in cash because of its anonymity. In most financial transactions, there is a financial paper trail to link the person involved. Physical cash, however, has disadvantages. It is bulky and difficult to move. For example, 44 pounds of cocaine worth $1 million is equivalent to 256 pounds of street cash. The street cash is more than six times the weight of the drugs. The existing payment systems and cash are both problems for criminals, even more so for large transnational crime groups. This is where criminals and terrorists are often most vulnerable.

By limiting the opportunity for counterfeit notes, and funds from illicit activities to enter the economy at the money placement and layering phases, it becomes possible to restrict a wide range of money laundering activities.

To do this requires a detailed knowledge of cash flow movements that can only be gained by introducing the ability to track and trace the flow of individual notes within the monetary system, and the ability to link large reportable cash transactions to an individual's identity.

As a consequence, governments have endeavored to:

Improve international co-operation through governments to address money laundering and counterfeiting concerns; and, Establish additional national controls for the distribution and supply of currency within a country.

Concerted efforts by governments to fight money laundering have been going on for the past fifteen years. The main international agreements addressing counterfeit and money laundering include: the United Nations Vienna Convention against Illicit Traffic in Narcotics Drugs and Psychotropic Substances (the Vienna Convention) and the 1990 Council of Europe Convention on Laundering (Adopted in November 1990, the Council of Europe Convention establishes a common criminal policy on money laundering. The convention lays down the principles for international co-operation among the contracting parties.).

The role of financial institutions in preventing and detecting money laundering has been the subject of pronouncements by the Basic Committee on Banking Supervision, the European Union, and the International Organization of Securities Commissions.

In December 1988, the G-10's Basle Committee on Banking Supervision issued a "statement of principles" with which the international banks of member states are expected to comply. These principles cover identifying customers, avoiding suspicious transactions, and co-operating with law enforcement agencies. In issuing these principles, the committee noted the risk to public confidence in banks, and thus to their stability, that can arise if they inadvertently become associated with money laundering.

The "United Nations Convention against Transnational Organized Crime" was tabled for signing in December 2000. The Convention urges governments to cooperate with one another in the detection, investigation and prosecution of money laundering. Signatories are obliged to reinforce requirements for customer identification, record-keeping and the reporting of suspicious transactions. Signatories are also recommended to set up financial intelligence units to collect, analyze and disseminate information.

Since the events of Sep. 11, 2001, UN Member States have emphasized the links between terrorism, transnational organized crime, the international drug trade and money laundering. The UN Security Council adopted resolution 1373 (2001) and it established the Counter-Terrorism Committee (CTC), which is mandated to monitor the implementation of the resolution urging States to prevent and suppress the financing of terrorist acts.

Other potential macroeconomic consequences of unchecked money laundering that have been noted by the International Monetary Fund (IMF) are inexplicable changes in money demand, contamination effects on legal financial transactions, and increased volatility of international capital flow and exchange rates as a consequence of unanticipated cross-border asset transfers. The latter point is especially important and poses a significant risk to the EU financial system as money laundering has a direct effect on the Foreign Exchange Market (FOREX) of an economy, which is vulnerable to the volume of cash involved in the trade.

Banks are susceptible to risks from money launderers on several fronts. There is a thin line between a financial institution suspecting that it is being used to launder money and the institution becoming criminally involved with the activity. Banks that are exposed as laundering money are likely to face costs associated with the subsequent loss of business on top of vast legal costs. At the very least, the discovery of a bank laundering money for an organised crime syndicate is likely to generate adverse publicity for the bank. Banks passing counterfeit notes to customers will also result in declining business as clients take business elsewhere. However, a much graver risk that banks face is that of criminal prosecution for laundering money. EU laws and directives state that if a financial institution in the EU is found to be assisting a money launderer and failed to follow the appropriate procedures as laid out by EU directives, the individual employee and respective supervisors, including company directors, are personally liable to imprisonment or fines. This is the reason why the EU directives on money laundering include the "know your customer" initiative.

As a result due diligence measures have been implemented by financial service providers under regulatory supervision to ensure the integrity of those conducting business with the institution. These consist of four sub-categories:

1) identification;
2) know your customer;
3) record keeping; and
4) suspicious activity reporting.

These are all time consuming and difficult to manage.

In addition to international efforts to combat counterfeiting and money laundering, most OECD governments have introduced a wide range of domestic statutes governing the distribution, and management of currency. Some of these are needed to support international approaches, and others have been introduced to reduce local opportunities for terrorists or criminals to derive benefit from counterfeiting or money laundering activities. While it is not possible to consider all of these, a few U.S statutory requirements are considered here to highlight the emerging requirements that any new currency validation and tracking system might be required to meet to support national and international objectives.

Within the U.S., national distribution and supply of U.S. currency is regulated by the U.S Monetary Policy, and implemented by the Federal Reserve and the Department of Treasury, and monitored by the Secret Service. The Bureau of Engraving and Printing (BEP), which is a division of the U.S. Department of Treasury, serves as the United States' security printer. It produces the Nation's currency, most of its postage stamps, and other security documents (The first important distinction is that while the Federal Reserve issues Federal Reserve notes, the Treasury issues coins. Consequently, the Federal Reserve determines the amount of new currency of each denomination to be printed annually by the US Bureau of Engraving and Printing (BEP)).

In the case of currency, the Federal Reserve Banks verify all notes deposited with them by the banking industry on a note-by-note basis. During this verification, deposited currency is counted for accuracy, counterfeit notes are identified, and unfit notes are destroyed. The BEP, in conjunction with the Department of Treasury, Federal Reserve and Secret Service, are continuously working on changes that are required to protect the integrity of the monetary system.

Additionally, the Internal Revenue Code (IRC) requires anyone involved in a trade or business, except financial institutions, to report currency received for goods or services in excess of $10,000. The Bank Secrecy Act (BSA) mandates the reporting of certain currency transactions conducted by financial institutions, the disclosure of foreign bank accounts, and the reporting of the transportation of currency exceeding $10,000 across United States borders.

The Internal Revenue Service (IRS) is one of the key agencies involved in money laundering investigations. Tax evasion, public corruption, health care fraud, money laundering and drug trafficking are all examples of the types of crimes that revolve around cash. A financial investigation often becomes the key to a conviction.

In addition to providing physical protection to the leaders of the United States of America, the Secret Service has set as its highest investigative priority the identification and suppression of counterfeit currency production and distribution networks. With 60% of genuine U.S. currency circulating outside of the U.S, the dollar continues to be a target for transnational counterfeiting activity.

The main objective of the U.S. Patriot Act 2001 is to amend certain laws within the constitution of the United States of America to assist with the national and global fight against terrorism. These laws relate to reporting requirements for currency received in non-financial trade or business. These include the name, address, and identification information of the person from whom the currency was received, the amount of currency received, the date and nature of the transaction, and the identification of the person filing the report.

In their effort to avoid using traditional financial institutions, many criminals are forced to move large quantities of currency in bulk form through airports, border crossings, and other ports of entry where the currency can be smuggled out of the United States and placed in a foreign financial institution or sold on the black market. The transportation and smuggling of cash in bulk form may now be one of the most common forms of money laundering, and the movement of large sums of cash is one of the most reliable warning signs of drug trafficking, terrorism, money laundering, racketeering, tax evasion and similar crimes.

To support the above international and national initiatives, the technology industry has also initiated a number of programs. For example, IBM and Searchspace have joined forces to launch the IBM Anti-Money Laundering Service, a hosted computer service to help meet new U.S. Patriot Act requirements, which requires firms to implement new technologies to detect and prevent money laundering schemes by terrorists and other criminals. Unisys also provides anti-money laundering and fraud detection services. These services have been provided to police forces and leading financial institutions.

Given the wide range of approaches adopted to support international co-operative efforts to limit terrorist and criminal activity, there is a growing recognition that organized crime is increasingly operating through more fluid network structures rather than more formal hierarchies.

This therefore requires the use of new methods and technologies in order to comply with the wide range of regulations and recommendations needed to combat laundering and counterfeiting.

These new methods and technologies should make it easy to validate notes, automate many of the statutory cash transaction reporting requirements, and provide the capability for security agencies to detect crime patterns through cash flow tracking.

An existing solution to the problem involves the use of note tracking using RFID chips.

Due to the Euro's broad cross-border reach, the European Central Bank (ECB) and criminal investigators in Europe are concerned about increases in counterfeiting, as well as a possible increase in money laundering. There are now over 10 billion bank notes in circulation, with 4.5 billion being held in reserve to accommodate potential leaps in demand. Last year, Greek authorities were confronted with 2,411 counterfeiting cases while authorities in Poland arrested a gang suspected of making and putting over a million fake euros into circulation.

Because of these concerns, the application of RFID (Radio Frequency Identification) technology to paper currency is currently being investigated by the European Central Bank and Hitachi.

Hitachi Ltd. announced plans in July 2003 for a chip designed for high denomination currency notes that would pack RF circuitry and ROM in a 0.4-mm square circuit that is only 60 microns thick. The Hitachi "mu-chip" will be capable of wirelessly transmitting a 128-bit number when radio signals are beamed at it. Besides acting as a digital watermark, such RFID chips could speed up routine bank processes such as counting. A stack of notes can be passed through a reader with the sum determined automatically, similar to the way that inventory is tracked in an RFID-based system.

However there are a number of difficulties that associated with such a solution.

First, there are concerns about the high costs associated with producing and integrating each chip into a note. Manufacturing processes are also considered a major hurdle to embedding a low-cost antenna and chip in bank notes.

There are also concerns about the robustness of a chip solution. Bank notes have a thickness of only about 80 microns. Once a 60 micron thick RFID chip is connected to its antenna, it is likely to be well over 100 microns thick. They will therefore be at risk of snagging on an object or surface, and being torn out of the note paper. Notes rubbing against each other in a wallet may cause the RFID chips to tear out of the notes. Another major concern is the robustness of the chip itself. Bank notes undergo repeated folding, they are accidentally put through washing machines, and they may receive large electrostatic shocks.

All of these will make it difficult for the issuers to guarantee that chips will continue to function properly for the expected life of the note. People are unlikely to accept that their notes are invalid simply because the RFID chips have been torn out or damaged, so there will not be an expectation that all notes must have RFID chips. So, a forger can pass off notes which never had chips simply by tearing small holes where the chips have purportedly 'snagged on something and been torn out'.

There are also concerns about privacy. With the potential to track and trace cash, individuals may become concerned that cash will lose its anonymity when buying goods. There are also concerns by privacy advocates that a scanner in the hands of criminals could be used to remotely determine the amount of cash being carried by an individual without their knowledge. This could place them at risk of attack.

Thus, there are many factors that suggest that an RFID solution may not be feasible for validating and tracking currency.

Surface Coding Background

The Netpage surface coding consists of a dense planar tiling of tags. Each tag encodes its own location in the plane. Each tag also encodes, in conjunction with adjacent tags, an identifier of the region containing the tag. This region ID is unique among all regions. In the Netpage system the region typically corresponds to the entire extent of the tagged surface, such as one side of a sheet of paper.

The surface coding is designed so that an acquisition field of view large enough to guarantee acquisition of an entire tag is large enough to guarantee acquisition of the ID of the region containing the tag. Acquisition of the tag itself guarantees acquisition of the tag's two-dimensional position within the region, as well as other tag-specific data. The surface coding therefore allows a sensing device to acquire a region ID and a tag position during a purely local interaction with a coded surface, e.g. during a "click" or tap on a coded surface with a pen.

The use of netpage surface coding is described in more detail in the following copending patent applications, U.S. Ser. No. 10/815,647, entitled "Obtaining Product Assistance" filed on $2^{nd}$ Apr. 2004; and U.S. Ser. No. 10/815,609, entitled "Laser Scanner Device for Printed Product Identification Cod" filed on $2^{nd}$ Apr. 2004.

Cryptography Background

Cryptography is used to protect sensitive information, both in storage and in transit, and to authenticate parties to a transaction. There are two classes of cryptography in widespread use: secret-key cryptography and public-key cryptography.

Secret-key cryptography, also referred to as symmetric cryptography, uses the same key to encrypt and decrypt a message. Two parties wishing to exchange messages must first arrange to securely exchange the secret key.

Public-key cryptography, also referred to as asymmetric cryptography, uses two encryption keys. The two keys are mathematically related in such a way that any message encrypted using one key can only be decrypted using the other key. One of these keys is then published, while the other is kept private. They are referred to as the public and private key respectively. The public key is used to encrypt any message intended for the holder of the private key. Once encrypted using the public key, a message can only be decrypted using the private key. Thus two parties can securely exchange messages without first having to exchange a secret key. To ensure that the private key is secure, it is normal for the holder of the private key to generate the public-private key pair.

Public-key cryptography can be used to create a digital signature. If the holder of the private key creates a known hash of a message and then encrypts the hash using the private key, then anyone can verify that the encrypted hash constitutes the "signature" of the holder of the private key with respect to that particular message, simply by decrypting the encrypted hash using the public key and verifying the hash against the message. If the signature is appended to the message, then the recipient of the message can verify both that the message is genuine and that it has not been altered in transit.

Secret-key can also be used to create a digital signature, but has the disadvantage that signature verification can also be performed by a party privy to the secret key.

To make public-key cryptography work, there has to be a way to distribute public keys which prevents impersonation. This is normally done using certificates and certificate authorities. A certificate authority is a trusted third party which authenticates the association between a public key and a person's or other entity's identity. The certificate authority verifies the identity by examining identity documents etc., and then creates and signs a digital certificate containing the identity details and public key. Anyone who trusts the certificate authority can use the public key in the certificate with a high degree of certainty that it is genuine. They just have to verify that the certificate has indeed been signed by the certificate authority, whose public key is well-known.

To achieve comparable security to secret-key cryptography, public-key cryptography utilises key lengths an order of magnitude larger, i.e. a few thousand bits compared with a few hundred bits.

Schneier B. (*Applied Cryptography*, Second Edition, John Wiley & Sons 1996) provides a detailed discussion of cryptographic techniques.

SUMMARY OF THE INVENTION

In a first broad form the invention provides a method of tracking a security document, the security document having disposed thereon or therein coded data including a number of coded data portions, each coded data portion being indicative of an identity of the security document, the method including, in a computer system: receiving indicating data from a sensing device, the sensing device being responsive to sensing of the coded data to generate indicating data indicative of the identity of the product item; and, updating, using the received indicating data, tracking data stored in a data store, tracking data being indicative of: the identity of the security document; and, tracking information.

Optionally, the tracking information is indicative of at least one of: the current owner of the security document; one or more transactions performed using the security document; a location of the security document; and, a location of the sensing device.

Optionally, the method includes determining the tracking information using at least one of: the indicating data; and, user inputs.

Optionally, the sensing device stores data indicative of at least one of an identity of the sensing device and an identity of a user, and wherein the sensing device generates the indicating data using the stored data.

Optionally, each coded data portion is further indicative of at least part of a signature, the signature being a digital signature of at least part of the identity, and wherein the method includes, in the computer system: determining, from the indicating data, a determined identity and at least one determined signature part; and, authenticating the security document using the determined identity and the at least one determined signature part.

Optionally, the signature is a digital signature of at least part of the identity and at least part of predetermined padding, the padding being at least one of: a predetermined number; and, a random number.

Optionally, the entire signature is encoded within a plurality of coded data portions and wherein the method includes, in the sensing device, sensing a number of coded data portions to thereby determine the entire signature.

Optionally, the coded data includes a plurality of layouts, each layout defining the position of a plurality of first symbols encoding the identity, and a plurality of second symbols defining at least part of the signature.

Optionally, the coded data is substantially invisible to an unaided human.

Optionally, the coded data is printed on the surface using at least one of: an invisible ink; and, an infrared-absorptive ink.

Optionally, the coded data is provided substantially coincident with visible human-readable information.

Optionally at least one coded data portion encodes the entire signature.

Optionally the entire signature is formed from a plurality of signature parts, and wherein each coded data portion encodes a respective signature part.

Optionally, at least some of the coded data portions encode at least one of: a location of the respective coded data portion; a position of the respective coded data portion on the surface; a size of the coded data portions; a size of a signature; an identity of a signature part; and, units of indicated locations.

Optionally, the coded data includes at least one of: redundant data; data allowing error correction; Reed-Solomon data; and, Cyclic Redundancy Check (CRC) data.

Optionally, the digital signature includes at least one of: a random number associated with the identity; a keyed hash of at least the identity; a keyed hash of at least the identity produced using a private key, and verifiable using a corresponding public key; cipher-text produced by encrypting at least the identity; cipher-text produced by encrypting at least the identity and a random number; and, cipher-text produced using a private key, and verifiable using a corresponding public key; and, cipher-text produced using RSA encryption.

Optionally, the security document is at least one of: a currency note; a check; a credit or debit card; a redeemable ticket, voucher, or coupon; a lottery ticket or instant win ticket; and, an identity card or document, such as a driver's license or passport.

Optionally, the identity is indicative of at least one of: a currency note attribute including at least one of: currency; issue country; denomination; note side; printing works; and serial number; a check attribute including at least one of: currency; issuing institution; account number; serial number; expiry date; check value; and limit; a card attribute including at least one of: card type; issuing institution; account number; issue date; expiry date; and limit.

Optionally, the coded data is arranged in accordance with at least one layout having n-fold rotational symmetry, where n is at least two, the layout including n identical sub-layouts rotated 1/n revolutions apart about a centre of rotation, at least one sub-layout including rotation-indicating data that distinguishes that sub-layout from each other sub-layout.

Optionally, the coded data is arranged in accordance with at least one layout having n-fold rotational symmetry, where n is at least two, the layout encoding orientation-indicating data comprising a sequence of an integer multiple m of n symbols, where m is one or more, each encoded symbol being distributed at n locations about a centre of rotational symmetry of the layout such that decoding the symbols at each of the n orientations of the layout produces n representations of the orientation-indicating data, each representation comprising a different cyclic shift of the orientation-indicating data and being indicative of the degree of rotation of the layout.

Optionally, the sensing device stores data indicative of at least one of an identity of the sensing device and an identity of a user, and wherein the sensing device generates the indicating data using the stored data.

Optionally, the sensing device includes: a housing adapted to be held by a user in use; a radiation source for exposing at least one coded data portion; a sensor for sensing the at least one exposed coded data portion; and, a processor for determining, using the at least one sensed coded data portion, a sensed identity.

Optionally, the method is further used for determining a counterfeit security document, each coded data portion being further indicative of at least part of a signature, the signature being a digital signature of at least part of the identity, wherein the method further includes: in a sensing device: generating, using the sensed coded data portion, indicating data indicative of: the identity; and, at least one signature part; and, in a processor: determining, from the indicating data: a determined identity; and, at least one determined signature part; and, determining if the security document is a counterfeit document using the determined identity and the at least one determined signature part.

Optionally, the method is further used for determining a possible duplicated security document, wherein the method includes, in a computer system: receiving indicating data from a sensing device, the sensing device being responsive to sensing of the coded data to generate indicating data indicative of the identity of the security document; determining, from the indicating data, a determined identity; accessing, using the determined identity, tracking data indicative of: the identity of the security document; and, tracking information indicative of the location of the security document; and, determining, using the tracking information, if the security document is a possible duplicate.

Optionally, the method is used in a currency counter for counting currency documents, each currency document having disposed thereon or therein coded data including a number of coded data portions, each coded data portion being indicative of an identity of the currency document, the counter including: an input for receiving a number of currency documents to be counted; an output for providing counted currency documents; a feed mechanism for transporting currency documents from the input to the output along a feed path; a sensor for sensing at least one coded data portion for each currency document transported along the feed path; and, a processor for: determining, from the at least one sensed coded data portion, a sensed identity for each currency document; determining, from the sensed identity, a determined value for each currency document; and, counting the currency documents using the determined values.

Optionally, the security document having a security feature, wherein the method of providing the security document includes: creating the security document; determining an identity associated with the security document; generating a signature using the identity, the signature being a digital signature of at least part of the identity; generating coded data, the coded data including a number of coded data portions, each coded data portion being indicative of: the identity of the security document; and, at least part of the signature; and, printing the coded data on the security document.

Optionally, the security document being printed with a security feature, wherein the method of printing the security document includes: receiving the security document; receiving identity data, the identity data being at least partially indicative of an identity of the security document, the identity data being encrypted using a public key; determining the identity by decrypting the received identity data using a secret key associated with the public key; generating a signature using the determined identity, the signature being a digital signature of at least part of the identity; generating coded data at least partially indicative of: the identity of the security document; and, at least part of the signature; and, printing the coded data on the security document.

Optionally, the method is used in a system for recording a transaction relating to a security document, the system including a computer system for: receiving indicating data from a sensing device, the sensing device being responsive to sensing of the coded data to generate indicating data at least partially indicative of: the identity of the security document; and, the transaction; and, updating, using the received indicating data, transaction data stored in a data store, the transaction data being indicative of: the identity of the security document; and, the transaction.

Optionally, the method is further used for monitoring transactions involving security documents, the method including, in a computer system and following a transaction involving a security document: receiving indicating data from a sensing device, the sensing device being responsive to sensing of coded data to generate indicating data at least partially indicative of: the identity of the security document; and, the transaction; updating, using the received indicating data, transaction data stored in a data store, the transaction data being indicative of, for each of a number of security documents, performed transactions; comparing the transaction data to one or more predetermined patterns to thereby determine the presence or absence of a cash flow anomaly.

Optionally, the method includes using a security document database, the database storing security document data including, for each of a number of security documents: identity data, the identity data being at least partially indicative of an identity of the security document; attribute data, the attribute data being at least partially indicative of one or more attributes of the security document; wherein, in use, the security document database allows a computer system to: receive, from a sensing device, indicating data at least partially indicative of at least one of: the identity; and one or more attributes; use the received indicating data and the security document data to perform an action associated with the security document.

Optionally, the method is further used for causing a computer system to monitor transactions involving security documents, the method being performed using a set of instructions, each security document having disposed thereon or therein coded data including a number of coded data portions, each coded data portion being indicative of at least an identity of the security document, the set of instructions, when executed by the computer system, causing the computer system to: receive indicating data from a sensing device, the sensing device being responsive to sensing of coded data to generate indicating data at least partially indicative of: the identity of the security document; and, the transaction; updating, using the received indicating data, transaction data stored in a data store, the transaction data being indicative of: the identity of the security document; and, the transaction.

Optionally, the method is further used for counting currency documents, the method being performed using a set of instructions, each currency document having disposed therein or thereon at least one coded data portion being indicative of at least an identity of the currency document, the currency counter having: an input for receiving a number of currency documents to be counted; an output for providing counted currency documents; a feed mechanism for transporting currency documents from the input to the output along a feed path; a sensor for sensing at least one coded data portion for each currency document transported along the feed path; and, a processor, the set of instructions, when executed by the processor, causing the processor to: determine, from the at least one sensed coded data portion, a sensed identity for each currency document; determine, from the sensed identity, a determined value for each currency document; and, count the currency documents using the determined values.

Optionally, the method is used in a processor for use in a device for authenticating security documents, the coded data further being at least partially indicative of a signature, the signature being a digital signature of at least part of the identity, the processor being adapted to: receive indicating data from a sensor in the device, the sensor being responsive to sensing of the coded data to generate indicating data at least partially indicative of: the identity; and, at least part of the signature; determine, from the indicating data, a determined identity and at least one determined signature part; and, authenticate the security document using the determined identity and the at least one determined signature part.

Optionally, the method is further used for counting currency documents, each currency document having disposed thereon or therein coded data including a plurality of coded data portions, each coded data portion being at least partially indicative of an identity of the currency document, the method including, in a sensing device: sensing at least one coded data portion for each currency document; generating, using the sensed coded data portion, indicating data at least partially indicative of the identity of each currency document; and, transferring the indicating data to a computer system, the computer system being responsive to the indicating data to: determine, using the indicating data, a determined identity for each currency document; determine, using each determined identity, a value for each currency document; and, count the currency documents using the determined values.

Optionally, the method further being used for authenticating and evaluating a currency document, the currency document having disposed thereon or therein coded data including a plurality of coded data portions, the method including, in a sensing device: sensing at least one coded data portion; generating, using the sensed coded data portion, indicating data at least partially indicative of: an identity of the currency document; and at least part of a signature, the signature being a digital signature of at least part of the identity; and, transferring the indicating data to a computer system, the computer system being responsive to the indicating data to: determine, from the indicating data, a received identity, and a received signature part; authenticate the currency document using the received identity and the received signature part; and, in response to a successful authentication, determine, using the received identity, a value associated with the currency document.

Optionally, the security document includes anti-copy protection, the identity being uniquely indicative of the respective security document and being stored in a data store to allow for duplication of the security document to be determined.

Optionally, the security document includes anti-forgery protection, each coded data portion being further indicative of at least part of a signature, the signature being formed by encrypting at least part of the identity using a private key of public/private key pair, such that: valid security documents can only be created using the private key; and, validity of the security document can be confirmed using the corresponding public key.

Optionally, the method is further used for recovering a stolen security document, the method including in a computer system: receiving indicating data from a sensing device, the sensing device being responsive to sensing of the coded data to generate indicating data at least partially indicative of the identity; determining, using the indicating data, a determined identity; accessing, using the determined identity, transaction data stored in a data store, the transaction data being indicative of a security document status; determining, using the security document status, if the security document is stolen; and, in response to a positive determination, causing the security document to be recovered.

In another broad form the invention provides a method of tracking a security document, the security document having disposed thereon or therein coded data including a number of coded data portions, each coded data portion being indicative of an identity of the security document, the method including, in a sensing device: sensing at least one coded data portion; determining, using the at least one sensed coded data portion, indicating data indicative of the identity of the product item; and, transferring the indicating data to a computer system, the computer system being responsive to the indicating data to update tracking data stored in a data store, tracking data being indicative of: the identity of the product item; and, tracking information.

In a second broad form the invention provides a sensing device for use with a security document, the security document having disposed thereon or therein coded data including a number of coded data portions, each coded data portion being indicative of an identity of the security document, the sensing device including: a housing adapted to be held by a user in use; a radiation source for exposing at least one coded data portion; a sensor for sensing the at least one exposed coded data portion; and, a processor for determining, using the at least one sensed coded data portion, a sensed identity.

Optionally, the sensing device further includes an indicator for indicating the sensed identity of the security document.

Optionally, the each coded data portion is indicative of at least part of a signature, the signature being a digital signature of at least part of the identity, and wherein the processor: determines, from the at least one sensed coded data portion, at least one sensed signature part; and, determines if the security document is a counterfeit document using the sensed identity and the at least one sensed signature part.

Optionally, the processor: accesses a data store, using the sensed identity, to determine a stored signature part; compares the stored signature part to the at least one sensed signature part; and, authenticates the security document using the results of the comparison to thereby determine if the document is a counterfeit.

Optionally, the processor: generates, using the sensed identity and a key, at least a generated signature part; compares the generated signature part to the at least one sensed signature part; and, authenticates the security document using the results of the comparison to thereby determine if the document is a counterfeit.

Optionally, the entire signature is encoded within a plurality of coded data portions, and wherein the processor: determines, from a plurality of sensed coded data portions, a plurality of sensed signature parts representing the entire signature; generates, using the plurality of sensed signature parts and a key, a generated identity; compares the generated identity to the sensed identity; and, authenticates the security document using the results of the comparison to thereby determine if the document is a counterfeit.

Optionally, the signature is a digital signature of at least part of the identity and at least part of predetermined padding, the padding being at least one of: a predetermined number; and, a random number.

Optionally, the coded data includes a plurality of layouts, each layout defining the position of a plurality of first symbols encoding the identity, and a plurality of second symbols defining at least part of the signature.

Optionally, the processor: accesses, using the sensed identity, tracking data indicative of, for each of a number of existing security documents: the identity of the security document; and, tracking information indicative of the location of the security document; and, at least one of: determines, using the tracking information, if the security document is a duplicate of one of the existing security documents; and, updates the tracking information.

Optionally, the sensing device includes a communications system, and wherein the processor includes a first processor part provided in the sensing device and a second remote processor part coupled to the fist processor part via the communications system, and wherein the first processor part: generates indicating data indicative of at least one of: the sensed identity; and, at least one sensed signature part; transfers the indicating data to a second processor part via the communications system, and wherein the second processor part is responsive to the indicating data to perform at least one of: determination of a value associated with the security document; and, determination of whether the security document is a counterfeit document.

Optionally, the sensing device stores data indicative of at least one of an identity of the sensing device and an identity of a user, and wherein the sensing device generates the indicating data using the stored data.

Optionally, the coded data is substantially invisible to an unaided human.

Optionally, the coded data is printed on the surface using at least one of: an invisible ink; and, an infrared-absorptive ink.

Optionally, the coded data is provided substantially coincident with visible human-readable information.

Optionally at least one coded data portion encodes the entire signature.

Optionally the entire signature is formed from a plurality of signature parts, and wherein each coded data portion encodes a respective signature part.

Optionally, at least some of the coded data portions encode at least one of: a location of the respective coded data portion; a position of the respective coded data portion on the surface; a size of the coded data portions; a size of a signature; an identity of a signature part; and, units of indicated locations.

Optionally, the coded data includes at least one of: redundant data; data allowing error correction; Reed-Solomon data; and, Cyclic Redundancy Check (CRC) data.

Optionally, the digital signature includes at least one of: a random number associated with the identity; a keyed hash of at least the identity; a keyed hash of at least the identity produced using a private key, and verifiable using a corresponding public key; cipher-text produced by encrypting at least the identity; cipher-text produced by encrypting at least the identity and a random number; and, cipher-text produced using a private key, and verifiable using a corresponding public key; and, cipher-text produced using RSA encryption.

Optionally, the security document is at least one of: a currency note; a check; a credit or debit card; a redeemable ticket, voucher, or coupon; a lottery ticket or instant win ticket; and, an identity card or document, such as a driver's license or passport.

Optionally, the identity is indicative of at least one of: a currency note attribute including at least one of: currency; issue country; denomination; note side; printing works; and serial number; a check attribute including at least one of: currency; issuing institution; account number; serial number; expiry date; check value; and limit; a card attribute including at least one of: card type; issuing institution; account number; issue date; expiry date; and limit.

Optionally, the coded data is arranged in accordance with at least one layout having n-fold rotational symmetry, where n is at least two, the layout including n identical sub-layouts rotated 1/n revolutions apart about a centre of rotation, at least one sub-layout including rotation-indicating data that distinguishes that sub-layout from each other sub-layout.

Optionally, the coded data is arranged in accordance with at least one layout having n-fold rotational symmetry, where n is at least two, the layout encoding orientation-indicating data comprising a sequence of an integer multiple m of n symbols, where m is one or more, each encoded symbol being distributed at n locations about a centre of rotational symmetry of the layout such that decoding the symbols at each of the n orientations of the layout produces n representations of the orientation-indicating data, each representation comprising a different cyclic shift of the orientation-indicating data and being indicative of the degree of rotation of the layout.

Optionally, the sensing device is used in a method of tracking a security document, the security document having disposed thereon or therein coded data including a number of coded data portions, each coded data portion being indicative of an identity of the security document, the method including, in a computer system: receiving indicating data from the sensing device, the sensing device being responsive to sensing of the coded data to generate indicating data indicative of the identity of the product item; and, updating, using the received indicating data, tracking data stored in a data store, tracking data being indicative of: the identity of the product item; and, tracking information.

Optionally, the sensing device is used in a method of determining a counterfeit security document, the security document having disposed thereon or therein coded data including a number of coded data portions, each coded data portion being indicative of: an identity of the security document; and, at least part of a signature, the signature being a digital signature of at least part of the identity; wherein the method includes: in the sensing device: sensing at least one coded data portion; and, generating, using the sensed coded data portion, indicating data indicative of: the identity; and, at least one signature part; in a processor: determining, from the indicating data: a determined identity; and, at least one determined signature part; determining if the security document is a counterfeit document using the determined identity and the at least one determined signature part.

Optionally, the sensing device is used in a method of determining a possible duplicated security document, the security document having disposed thereon or therein coded data including a number of coded data portions, each coded data portion being indicative of at least an identity of the security document, and wherein the method includes, in a computer system: receiving indicating data from the sensing device, the sensing device being responsive to sensing of the coded data to generate indicating data indicative of the identity of the security document; determining, from the indicating data, a determined identity; accessing, using the determined identity, tracking data indicative of: the identity of the security document; and, tracking information indicative of the location of the security document; and, determining, using the tracking information, if the security document is a possible duplicate.

Optionally, the sensing device is used in a currency counter for counting currency documents, each currency document having disposed thereon or therein coded data including a number of coded data portions, each coded data portion being indicative of an identity of the currency document, the counter including: an input for receiving a number of currency documents to be counted; an output for providing counted currency documents; a feed mechanism for transporting currency documents from the input to the output along a feed path; a sensor for sensing at least one coded data portion for each currency document transported along the feed path; and, a processor for: determining, from the at least one sensed coded data portion, a sensed identity for each currency document; determining, from the sensed identity, a determined value for each currency document; and, counting the currency documents using the determined values.

Optionally, the sensing device is used in a method of providing a security document having a security feature, the method including: creating the security document; determining an identity associated with the security document; generating a signature using the identity, the signature being a digital signature of at least part of the identity; generating coded data, the coded data including a number of coded data portions, each coded data portion being indicative of: the identity of the security document; and, at least part of the signature; and, printing the coded data on the security document.

Optionally, the sensing device is used in a method of printing a security document having a security feature, the method including: receiving the security document; receiving identity data, the identity data being at least partially indicative of an identity of the security document, the identity data being encrypted using a public key; determining the identity by decrypting the received identity data using a secret key associated with the public key; generating a signature using the determined identity, the signature being a digital signature of at least part of the identity; generating coded data at least partially indicative of: the identity of the security document; and, at least part of the signature; and, printing the coded data on the security document.

Optionally, the sensing device is used in a system for recording a transaction relating to a security document, the security document having disposed thereon or therein coded data including a number of coded data portions, each coded data portion being indicative of at least an identity of the security document, the system including a computer system for: receiving indicating data from the sensing device, the sensing device being responsive to sensing of the coded data to generate indicating data at least partially indicative of: the identity of the security document; and, the transaction; and, updating, using the received indicating data, transaction data stored in a data store, the transaction data being indicative of: the identity of the security document; and, the transaction.

Optionally, the sensing device is used in a method for monitoring transactions involving security documents, each security document having disposed thereon or therein coded data including a number of coded data portions, each coded data portion being indicative of at least an identity of the security document, the method including, in a computer system and following a transaction involving a security document: receiving indicating data from the sensing device, the sensing device being responsive to sensing of coded data to generate indicating data at least partially indicative of: the identity of the security document; and, the transaction; updating, using the received indicating data, transaction data stored in a data store, the transaction data being indicative of, for each of a number of security documents, performed transactions; comparing the transaction data to one or more predetermined patterns to thereby determine the presence or absence of a cash flow anomaly.

Optionally, the sensing device is uses a security document database, the database storing security document data including, for each of a number of security documents: identity data, the identity data being at least partially indicative of an identity of the security document; attribute data, the attribute data being at least partially indicative of one or more attributes of the security document; wherein, in use, the security document database allows a computer system to: receive, from a sensing device, indicating data at least partially indicative of at least one of: the identity; and one or more attributes; use the received indicating data and the security document data to perform an action associated with the security document.

Optionally, the sensing device is used in a computer system including a set of instructions for causing the computer system to monitor transactions involving security documents, each security document having disposed thereon or therein coded data including a number of coded data portions, each coded data portion being indicative of at least an identity of the security document, the set of instructions, when executed by the computer system, causing the computer system to: receive indicating data from a sensing device, the sensing device being responsive to sensing of coded data to generate indicating data at least partially indicative of: the identity of the security document; and, the transaction; updating, using the received indicating data, transaction data stored in a data store, the transaction data being indicative of: the identity of the security document; and, the transaction.

Optionally, the sensing device is used in a currency counter including a set of instructions for counting currency documents where each currency document having disposed therein or thereon at least one coded data portion being indicative of at least an identity of the currency document, the currency counter having: an input for receiving a number of currency documents to be counted; an output for providing counted currency documents; a feed mechanism for transporting currency documents from the input to the output along a feed path; a sensor for sensing at least one coded data portion for each currency document transported along the feed path; and, a processor, the set of instructions, when executed by the processor, causing the processor to: determine, from the at least one sensed coded data portion, a sensed identity for each currency document; determine, from the sensed identity, a determined value for each currency document; and, count the currency documents using the determined values.

Optionally, the sensing device further includes a processor for use in a device for authenticating security documents, the security document having disposed thereon or therein coded data at least partially indicative of an identity of the security document and a signature, the signature being a digital signature of at least part of the identity, the processor being adapted to: receive indicating data from a sensor in the device, the sensor being responsive to sensing of the coded data to generate indicating data at least partially indicative of: the identity; and, at least part of the signature; determine, from the indicating data, a determined identity and at least one determined signature part; and, authenticate the security document using the determined identity and the at least one determined signature part.

Optionally, the sensing device is used in a method of counting currency documents, each currency document having disposed thereon or therein coded data including a plurality of coded data portions, each coded data portion being at least partially indicative of an identity of the currency document, the method including, in the sensing device: sensing at least one coded data portion for each currency document; generating, using the sensed coded data portion, indicating data at least partially indicative of the identity of each currency document; and, transferring the indicating data to a computer system, the computer system being responsive to the indicating data to: determine, using the indicating data, a determined identity for each currency document; determine, using each determined identity, a value for each currency document; and, count the currency documents using the determined values.

Optionally, the sensing device is used in a method for authenticating and evaluating a currency document, the currency document having disposed thereon or therein coded data including a plurality of coded data portions, the method including, in the sensing device: sensing at least one coded data portion; generating, using the sensed coded data portion, indicating data at least partially indicative of: an identity of the currency document; and at least part of a signature, the signature being a digital signature of at least part of the identity; and, transferring the indicating data to a computer system, the computer system being responsive to the indicating data to: determine, from the indicating data, a received identity, and a received signature part; authenticate the currency document using the received identity and the received signature part; and, in response to a successful authentication, determine, using the received identity, a value associated with the currency document.

Optionally, the sensing device is used with a security document including anti-copy protection, the security document having disposed thereon or therein coded data including a number of coded data portions, each coded data portion being indicative of an identity, the identity being uniquely indicative of the respective security document and being stored in a data store to allow for duplication of the security document to be determined.

Optionally, the sensing device is used with a security document including anti-forgery protection, the security document having disposed thereon or therein coded data including a plurality of coded data portions, each coded data portion being indicative of: an identity of the currency document; and at least part of a signature, the signature being formed by encrypting at least part of the identity using a private key of public/private key pair, such that: valid security documents can only be created using the private key; and, validity of the security document can be confirmed using the corresponding public key.

Optionally, the sensing device is used in a method of recovering a stolen security document, the security document having disposed thereon or therein coded data including a number of coded data portions, each coded data portion being indicative of at least an identity of the security document, the method including in a computer system: receiving indicating data from a sensing device, the sensing device being responsive to sensing of the coded data to generate indicating data at least partially indicative of the identity; determining, using the indicating data, a determined identity; accessing, using the determined identity, transaction data stored in a data store, the transaction data being indicative of a security document status; determining, using the security document status, if the security document is stolen; and, in response to a positive determination, causing the security document to be recovered.

In a third broad form the invention provides a method of determining a counterfeit security document, the security document having disposed thereon or therein coded data including a number of coded data portions, each coded data portion being indicative of: an identity of the security document; and, at least part of a signature, the signature being a digital signature of at least part of the identity; wherein the method includes: in a sensing device: sensing at least one coded data portion; and, generating, using the sensed coded data portion, indicating data indicative of: the identity; and, at least one signature part; in a processor: determining, from the indicating data: a determined identity; and, at least one determined signature part; determining if the security document is a counterfeit document using the determined identity and the at least one determined signature part.

Optionally, the method includes, in the processor: accessing a data store, using the determined identity, to determine a stored signature part; comparing the stored signature part to the at least one determined signature part; and, authenticating the security document using the results of the comparison to thereby determine if the document is a counterfeit.

Optionally, the method includes, in the processor: generating, using the determined identity and a key, at least a generated signature part; comparing the generated signature part to the at least one determined signature part; and, authenticating the security document using the results of the comparison to thereby determine if the document is a counterfeit.

Optionally, the entire signature is encoded within a plurality of coded data portions, and wherein the method includes: in the sensing device: sensing a number of coded data portions to thereby determine the entire signature; and, generating the indicating data using the sensed coded data portions; and, in the processor: determining, from the indicating data, a plurality of determined signature parts representing the entire signature; generating, using the plurality of determined signature parts and a key, a generated identity; comparing the generated identity to the determined identity; and, authenticating the security document using the results of the comparison to thereby determine if the document is a counterfeit.

Optionally, the signature is a digital signature of at least part of the identity and at least part of predetermined padding, the padding being at least one of: a predetermined number; and, a random number.

Optionally, the processor forms part of the sensing device.

Optionally, the processor forms part of a computer system, and wherein the method includes, transferring the indicating data to the computer system via a communications system.

Optionally, the method includes, in the processor: accessing, using the determined identity, tracking data indicative of, for each of a number of existing security documents: the identity of the security document; and, tracking information indicative of the location of the security document; determining, using the tracking information, if the security document is a duplicate of one of the existing security documents.

Optionally, the coded data includes a plurality of layouts, each layout defining the position of a plurality of first symbols encoding the identity, and a plurality of second symbols defining at least part of the signature.

Optionally, the sensing device stores data indicative of at least one of an identity of the sensing device and an identity of a user, and wherein the method includes, in the sensing device, generating the indicating data using the stored data.

Optionally, the coded data is substantially invisible to an unaided human.

Optionally, the coded data is printed on the surface using at least one of: an invisible ink; and, an infrared-absorptive ink.

Optionally, the coded data is provided substantially coincident with visible human-readable information.

Optionally at least one coded data portion encodes the entire signature.

Optionally the entire signature is formed from a plurality of signature parts, and wherein each coded data portion encodes a respective signature part.

Optionally, at least some of the coded data portions encode at least one of: a location of the respective coded data portion; a position of the respective coded data portion on the surface; a size of the coded data portions; a size of a signature; an identity of a signature part; and, units of indicated locations.

Optionally, the coded data includes at least one of: redundant data; data allowing error correction; Reed-Solomon data; and, Cyclic Redundancy Check (CRC) data.

Optionally, the digital signature includes at least one of: a random number associated with the identity; a keyed hash of at least the identity; a keyed hash of at least the identity produced using a private key, and verifiable using a corresponding public key; cipher-text produced by encrypting at least the identity; cipher-text produced by encrypting at least the identity and a random number; and, cipher-text produced using a private key, and verifiable using a corresponding public key; and, cipher-text produced using RSA encryption.

Optionally, the security document is at least one of: a currency note; a check; a credit or debit card; a redeemable ticket, voucher, or coupon; a lottery ticket or instant win ticket; and, an identity card or document, such as a driver's license or passport.

Optionally, the identity is indicative of at least one of: a currency note attribute including at least one of: currency; issue country; denomination; note side; printing works; and serial number; a check attribute including at least one of: currency; issuing institution; account number; serial number; expiry date; check value; and limit; a card attribute including at least one of: card type; issuing institution; account number; issue date; expiry date; and limit.

Optionally, the coded data is arranged in accordance with at least one layout having n-fold rotational symmetry, where n is at least two, the layout including n identical sub-layouts rotated 1/n revolutions apart about a centre of rotation, at least one sub-layout including rotation-indicating data that distinguishes that sub-layout from each other sub-layout.

Optionally, the coded data is arranged in accordance with at least one layout having n-fold rotational symmetry, where n is at least two, the layout encoding orientation-indicating data comprising a sequence of an integer multiple m of n symbols, where m is one or more, each encoded symbol being distributed at n locations about a centre of rotational symmetry of the layout such that decoding the symbols at each of the n orientations of the layout produces n representations of the orientation-indicating data, each representation comprising a different cyclic shift of the orientation-indicating data and being indicative of the degree of rotation of the layout.

Optionally, the method is further used for tracking a security document, the method including, in a computer system: receiving indicating data from a sensing device, the sensing device being responsive to sensing of the coded data to generate indicating data indicative of the identity of the product item; and, updating, using the received indicating data, tracking data stored in a data store, tracking data being indicative of: the identity of the product item; and, tracking information.

Optionally, the sensing device includes: a housing adapted to be held by a user in use; a radiation source for exposing at least one coded data portion; a sensor for sensing the at least one exposed coded data portion; and, a processor for determining, using the at least one sensed coded data portion, a sensed identity.

Optionally, the method is further used for determining a possible duplicated security document, wherein the method includes, in a computer system: receiving indicating data from a sensing device, the sensing device being responsive to sensing of the coded data to generate indicating data indicative of the identity of the security document; determining, from the indicating data, a determined identity; accessing, using the determined identity, tracking data indicative of: the identity of the security document; and, tracking information indicative of the location of the security document; and, determining, using the tracking information, if the security document is a possible duplicate.

Optionally, the method is used in a currency counter for counting currency documents, each currency document having disposed thereon or therein coded data including a number of coded data portions, each coded data portion being indicative of an identity of the currency document, the counter including: an input for receiving a number of currency documents to be counted; an output for providing counted currency documents; a feed mechanism for transporting currency documents from the input to the output along a feed path; a sensor for sensing at least one coded data portion for each currency document transported along the feed path; and, a processor for: determining, from the at least one sensed coded data portion, a sensed identity for each currency document; determining, from the sensed identity, a determined value for each currency document; and, counting the currency documents using the determined values.

Optionally, the security document having a security feature, wherein the method of providing the security document includes: creating the security document; determining an identity associated with the security document; generating a signature using the identity, the signature being a digital signature of at least part of the identity; generating coded data, the coded data including a number of coded data portions, each coded data portion being indicative of: the identity of the security document; and, at least part of the signature; and, printing the coded data on the security document.

Optionally, the security document being printed with a security feature, wherein the method of printing the security document includes: receiving the security document; receiving identity data, the identity data being at least partially indicative of an identity of the security document, the identity data being encrypted using a public key; determining the identity by decrypting the received identity data using a secret key associated with the public key; generating a signature using the determined identity, the signature being a digital signature of at least part of the identity; generating coded data at least partially indicative of: the identity of the security document; and, at least part of the signature; and, printing the coded data on the security document.

Optionally, the method is used in a system for recording a transaction relating to a security document, the system including a computer system for: receiving indicating data from a sensing device, the sensing device being responsive to sensing of the coded data to generate indicating data at least partially indicative of: the identity of the security document; and, the transaction; and, updating, using the received indicating data, transaction data stored in a data store, the transaction data being indicative of: the identity of the security document; and, the transaction.

Optionally, the method is further used for monitoring transactions involving security documents, the method including, in a computer system and following a transaction involving a security document: receiving indicating data from a sensing device, the sensing device being responsive to sensing of coded data to generate indicating data at least partially indicative of: the identity of the security document; and, the transaction; updating, using the received indicating data, transaction data stored in a data store, the transaction data being indicative of, for each of a number of security documents, performed transactions; comparing the transaction data to one or more predetermined patterns to thereby determine the presence or absence of a cash flow anomaly.

Optionally, the method includes using a security document database, the database storing security document data including, for each of a number of security documents: identity data, the identity data being at least partially indicative of an identity of the security document; attribute data, the attribute data being at least partially indicative of one or more attributes of the security document; wherein, in use, the security document database allows a computer system to: receive, from a sensing device, indicating data at least partially indicative of at least one of: the identity; and one or more attributes; use the received indicating data and the security document data to perform an action associated with the security document.

Optionally, the method is further used for causing a computer system to monitor transactions involving security documents, the method being performed using a set of instructions, each security document having disposed thereon or therein coded data including a number of coded data portions, each coded data portion being indicative of at least an identity of the security document, the set of instructions, when executed by the computer system, causing the computer system to: receive indicating data from a sensing device, the sensing device being responsive to sensing of coded data to generate indicating data at least partially indicative of: the identity of the security document; and, the transaction; updating, using the received indicating data, transaction data stored in a data store, the transaction data being indicative of: the identity of the security document; and, the transaction.

Optionally, the method is further used for counting currency documents, the method being performed using a set of instructions, each currency document having disposed therein or thereon at least one coded data portion being indicative of at least an identity of the currency document, the currency counter having: an input for receiving a number of currency documents to be counted; an output for providing counted currency documents; a feed mechanism for transporting currency documents from the input to the output along a feed path; a sensor for sensing at least one coded data portion for each currency document transported along the feed path; and, a processor, the set of instructions, when executed by the processor, causing the processor to: determine, from the at least one sensed coded data portion, a sensed identity for each currency document; determine, from the sensed identity, a determined value for each currency document; and, count the currency documents using the determined values.

Optionally, the method is used in a processor for use in a device for authenticating security documents, the coded data further being at least partially indicative of a signature, the signature being a digital signature of at least part of the identity, the processor being adapted to: receive indicating data from a sensor in the device, the sensor being responsive to sensing of the coded data to generate indicating data at least partially indicative of: the identity; and, at least part of the signature; determine, from the indicating data, a determined identity and at least one determined signature part; and, authenticate the security document using the determined identity and the at least one determined signature part.

Optionally, the method is further used for counting currency documents, each currency document having disposed thereon or therein coded data including a plurality of coded data portions, each coded data portion being at least partially indicative of an identity of the currency document, the method including, in a sensing device: sensing at least one coded data portion for each currency document; generating, using the sensed coded data portion, indicating data at least partially indicative of the identity of each currency document; and, transferring the indicating data to a computer system, the computer system being responsive to the indicating data to: determine, using the indicating data, a determined identity for each currency document; determine, using each determined identity, a value for each currency document; and, count the currency documents using the determined values.

Optionally, the method further being used for authenticating and evaluating a currency document, the currency document having disposed thereon or therein coded data including a plurality of coded data portions, the method including, in a sensing device: sensing at least one coded data portion; generating, using the sensed coded data portion, indicating data at least partially indicative of: an identity of the currency document; and at least part of a signature, the signature being a digital signature of at least part of the identity; and, transferring the indicating data to a computer system, the computer system being responsive to the indicating data to: determine, from the indicating data, a received identity, and a received signature part; authenticate the currency document using the received identity and the received signature part; and, in response to a successful authentication, determine, using the received identity, a value associated with the currency document.

Optionally, the security document includes anti-copy protection, the identity being uniquely indicative of the respective security document and being stored in a data store to allow for duplication of the security document to be determined.

Optionally, the security document includes anti-forgery protection, each coded data portion being further indicative of at least part of a signature, the signature being formed by encrypting at least part of the identity using a private key of public/private key pair, such that: valid security documents can only be created using the private key; and, validity of the security document can be confirmed using the corresponding public key.

Optionally, the method is further used for recovering a stolen security document, the method including in a computer system: receiving indicating data from a sensing device, the sensing device being responsive to sensing of the coded data to generate indicating data at least partially indicative of the identity; determining, using the indicating data, a determined identity; accessing, using the determined identity, transaction data stored in a data store, the transaction data being indicative of a security document status; determining, using the security document status, if the security document is stolen; and, in response to a positive determination, causing the security document to be recovered.

In a fourth broad form the invention provides a method of determining a possible duplicated security document, the security document having disposed thereon or therein coded data including a number of coded data portions, each coded data portion being indicative of at least an identity of the security document, and wherein the method includes, in a computer system: receiving indicating data from a sensing device, the sensing device being responsive to sensing of the coded data to generate indicating data indicative of the identity of the security document; determining, from the indicating data, a determined identity; accessing, using the determined identity, tracking data indicative of: the identity of the security document; and, tracking information indicative of the location of the security document; and, determining, using the tracking information, if the security document is a possible duplicate.

Optionally, the tracking data is indicative of tracking information for each of a number of existing security documents, and wherein the method includes, in the computer system, determining if the security document is a duplicate of one of the existing security documents.

Optionally, the method includes, in the computer system: determining, using the indicating data, a current location of the security document; comparing the current location to the tacking information; and, determining the security document to be a possible duplicate if the current location is inconsistent with the tracking information.

Optionally, the method includes, in the computer system, determining if the current location is inconsistent with the tracking information using predetermined rules.

Optionally, each coded data portion is indicative of at least part of a signature, the signature being a digital signature of at least part of the identity, and wherein the method includes, in the computer system: receiving indicating data indicative of the identity of the security document and at least one signature part; determining, from the indicating data: the determined identity; and, at least one determined signature part; determining if the security document is a counterfeit document using the determined identity and the at least one determined signature part.

Optionally, the method includes, in the computer system: accessing a data store, using the determined identity, to determine a stored signature part; comparing the stored signature part to the at least one determined signature part; and, authenticating the security document using the results of the comparison to thereby determine if the document is a counterfeit.

Optionally, the method includes, in the computer system: generating, using the determined identity and a key, at least a generated signature part; comparing the generated signature part to the at least one determined signature part; and, authenticating the security document using the results of the comparison to thereby determine if the document is a counterfeit.

Optionally, the entire signature is encoded within a plurality of coded data portions, and wherein the method includes, in the computer system: determining, from the indicating data, a plurality of determined signature parts representing the entire signature; generating, using the plurality of determined signature parts and a key, a generated identity; comparing the generated identity to the determined identity; and, authenticating the security document using the results of the comparison to thereby determine if the document is a counterfeit.

Optionally, the coded data is substantially invisible to an unaided human.

Optionally, the coded data is printed on the surface using at least one of: an invisible ink; and, an infrared-absorptive ink.

Optionally, the coded data is provided substantially coincident with visible human-readable information.

Optionally at least one coded data portion encodes the entire signature.

Optionally the entire signature is formed from a plurality of signature parts, and wherein each coded data portion encodes a respective signature part.

Optionally, at least some of the coded data portions encode at least one of: a location of the respective coded data portion; a position of the respective coded data portion on the surface; a size of the coded data portions; a size of a signature; an identity of a signature part; and, units of indicated locations.

Optionally, the coded data includes at least one of: redundant data; data allowing error correction; Reed-Solomon data; and, Cyclic Redundancy Check (CRC) data.

Optionally, the digital signature includes at least one of: a random number associated with the identity; a keyed hash of at least the identity; a keyed hash of at least the identity produced using a private key, and verifiable using a corresponding public key; cipher-text produced by encrypting at least the identity; cipher-text produced by encrypting at least the identity and a random number; and, cipher-text produced using a private key, and verifiable using a corresponding public key; and, cipher-text produced using RSA encryption.

Optionally, the security document is at least one of: a currency note; a check; a credit or debit card; a redeemable ticket, voucher, or coupon; a lottery ticket or instant win ticket; and, an identity card or document, such as a driver's license or passport.

Optionally, the identity is indicative of at least one of: a currency note attribute including at least one of: currency; issue country; denomination; note side; printing works; and serial number; a check attribute including at least one of: currency; issuing institution; account number; serial number; expiry date; check value; and limit; a card attribute including at least one of: card type; issuing institution; account number; issue date; expiry date; and limit.

Optionally, the coded data is arranged in accordance with at least one layout having n-fold rotational symmetry, where n is at least two, the layout including n identical sub-layouts rotated 1/n revolutions apart about a centre of rotation, at least one sub-layout including rotation-indicating data that distinguishes that sub-layout from each other sub-layout.

Optionally, the coded data is arranged in accordance with at least one layout having n-fold rotational symmetry, where n is at least two, the layout encoding orientation-indicating data comprising a sequence of an integer multiple m of n symbols, where m is one or more, each encoded symbol being distributed at n locations about a centre of rotational symmetry of the layout such that decoding the symbols at each of the n orientations of the layout produces n representations of the orientation-indicating data, each representation comprising a different cyclic shift of the orientation-indicating data and being indicative of the degree of rotation of the layout.

Optionally, the method is further used for tracking a security document, the method including, in a computer system: receiving indicating data from a sensing device, the sensing device being responsive to sensing of the coded data to generate indicating data indicative of the identity of the product item; and, updating, using the received indicating data, tracking data stored in a data store, tracking data being indicative of: the identity of the product item; and, tracking information.

Optionally, the sensing device includes: a housing adapted to be held by a user in use; a radiation source for exposing at least one coded data portion; a sensor for sensing the at least one exposed coded data portion; and, a processor for determining, using the at least one sensed coded data portion, a sensed identity.

Optionally, the method is further used for determining a counterfeit security document, each coded data portion being further indicative of at least part of a signature, the signature being a digital signature of at least part of the identity, wherein the method further includes: in a sensing device: generating, using the sensed coded data portion, indicating data indicative of: the identity; and, at least one signature part; and, in a processor: determining, from the indicating data: a determined identity; and, at least one determined signature part; and, determining if the security document is a counterfeit document using the determined identity and the at least one determined signature part.

Optionally, the method is used in a currency counter for counting currency documents, each currency document having disposed thereon or therein coded data including a number of coded data portions, each coded data portion being indicative of an identity of the currency document, the counter including: an input for receiving a number of currency documents to be counted; an output for providing counted currency documents; a feed mechanism for transporting currency documents from the input to the output along a feed path; a sensor for sensing at least one coded data portion for each currency document transported along the feed path; and, a processor for: determining, from the at least one sensed coded data portion, a sensed identity for each currency document; determining, from the sensed identity, a determined value for each currency document; and, counting the currency documents using the determined values.

Optionally, the security document having a security feature, wherein the method of providing the security document includes: creating the security document; determining an identity associated with the security document; generating a signature using the identity, the signature being a digital signature of at least part of the identity; generating coded data, the coded data including a number of coded data portions, each coded data portion being indicative of: the identity of the security document; and, at least part of the signature; and, printing the coded data on the security document.

Optionally, the security document being printed with a security feature, wherein the method of printing the security document includes: receiving the security document; receiving identity data, the identity data being at least partially indicative of an identity of the security document, the identity data being encrypted using a public key; determining the identity by decrypting the received identity data using a secret key associated with the public key; generating a signature using the determined identity, the signature being a digital signature of at least part of the identity; generating coded data at least partially indicative of: the identity of the security document; and, at least part of the signature; and, printing the coded data on the security document.

Optionally, the method is used in a system for recording a transaction relating to a security document, the system including a computer system for: receiving indicating data from a sensing device, the sensing device being responsive to sensing of the coded data to generate indicating data at least partially indicative of: the identity of the security document; and, the transaction; and, updating, using the received indicating data, transaction data stored in a data store, the transaction data being indicative of: the identity of the security document; and, the transaction.

Optionally, the method is further used for monitoring transactions involving security documents, the method including, in a computer system and following a transaction involving a security document: receiving indicating data from a sensing device, the sensing device being responsive to sensing of coded data to generate indicating data at least partially indicative of: the identity of the security document; and, the transaction; updating, using the received indicating data, transaction data stored in a data store, the transaction data being indicative of, for each of a number of security documents, performed transactions; comparing the transaction data to one or more predetermined patterns to thereby determine the presence or absence of a cash flow anomaly.

Optionally, the method includes using a security document database, the database storing security document data including, for each of a number of security documents: identity data, the identity data being at least partially indicative of an identity of the security document; attribute data, the attribute data being at least partially indicative of one or more attributes of the security document; wherein, in use, the security document database allows a computer system to: receive, from a sensing device, indicating data at least partially indicative of at least one of: the identity; and one or more attributes; use the received indicating data and the security document data to perform an action associated with the security document.

Optionally, the method is further used for causing a computer system to monitor transactions involving security documents, the method being performed using a set of instructions, each security document having disposed thereon or therein coded data including a number of coded data portions, each coded data portion being indicative of at least an identity of the security document, the set of instructions, when executed by the computer system, causing the computer system to: receive indicating data from a sensing device, the sensing device being responsive to sensing of coded data to generate indicating data at least partially indicative of: the identity of the security document; and, the transaction; updating, using the received indicating data, transaction data stored in a data store, the transaction data being indicative of: the identity of the security document; and, the transaction.

Optionally, the method is further used for counting currency documents, the method being performed using a set of instructions, each currency document having disposed therein or thereon at least one coded data portion being indicative of at least an identity of the currency document, the currency counter having: an input for receiving a number of currency documents to be counted; an output for providing counted currency documents; a feed mechanism for transporting currency documents from the input to the output along a feed path; a sensor for sensing at least one coded data portion for each currency document transported along the feed path; and, a processor, the set of instructions, when executed by the processor, causing the processor to: determine, from the at least one sensed coded data portion, a sensed identity for each currency document; determine, from the sensed identity, a determined value for each currency document; and, count the currency documents using the determined values.

Optionally, the method is used in a processor for use in a device for authenticating security documents, the coded data further being at least partially indicative of a signature, the signature being a digital signature of at least part of the identity, the processor being adapted to: receive indicating data from a sensor in the device, the sensor being responsive to sensing of the coded data to generate indicating data at least partially indicative of: the identity; and, at least part of the signature; determine, from the indicating data, a determined identity and at least one determined signature part; and, authenticate the security document using the determined identity and the at least one determined signature part.

Optionally, the method is further used for counting currency documents, each currency document having disposed thereon or therein coded data including a plurality of coded data portions, each coded data portion being at least partially indicative of an identity of the currency document, the method including, in a sensing device: sensing at least one coded data portion for each currency document; generating, using the sensed coded data portion, indicating data at least partially indicative of the identity of each currency document; and, transferring the indicating data to a computer system, the computer system being responsive to the indicating data to: determine, using the indicating data, a determined identity for each currency document; determine, using each determined identity, a value for each currency document; and, count the currency documents using the determined values.

Optionally, the method further being used for authenticating and evaluating a currency document, the currency document having disposed thereon or therein coded data including a plurality of coded data portions, the method including, in a sensing device: sensing at least one coded data portion; generating, using the sensed coded data portion, indicating data at least partially indicative of: an identity of the currency document; and at least part of a signature, the signature being a digital signature of at least part of the identity; and, transferring the indicating data to a computer system, the computer system being responsive to the indicating data to: determine, from the indicating data, a received identity, and a received signature part; authenticate the currency document using the received identity and the received signature part; and, in response to a successful authentication, determine, using the received identity, a value associated with the currency document.

Optionally, the security document includes anti-copy protection, the identity being uniquely indicative of the respective security document and being stored in a data store to allow for duplication of the security document to be determined.

Optionally, the security document includes anti-forgery protection, each coded data portion being further indicative of at least part of a signature, the signature being formed by encrypting at least part of the identity using a private key of public/private key pair, such that: valid security documents can only be created using the private key; and, validity of the security document can be confirmed using the corresponding public key.

Optionally, the method is further used for recovering a stolen security document, the method including in a computer system: receiving indicating data from a sensing device, the sensing device being responsive to sensing of the coded data to generate indicating data at least partially indicative of the identity; determining, using the indicating data, a determined identity; accessing, using the determined identity, transaction data stored in a data store, the transaction data being indicative of a security document status; determining, using the security document status, if the security document is stolen; and, in response to a positive determination, causing the security document to be recovered.

In another broad form the invention provides a method of determining a duplicated security document, the security document having disposed thereon or therein coded data including a number of coded data portions, each coded data portion being indicative of at least an identity of the security document, and wherein the method includes, in a sensing device: sensing at least one coded data portion; generating, using the sensed coded data portion, indicating data indicative of the identity of the security document; transferring the indicating data to a computer system, the computer system being responsive to the indicating data to: determine, from the indicating data, a determined identity; access, using the determined identity, tracking data indicative of: the identity of the security document; and, tracking information indicative of the location of the security document; and, determine, using the tracking information, if the security document is a possible duplicate.

Optionally, each coded data portion is indicative of at least part of a signature, the signature being a digital signature of at least part of the identity, and the entire signature is encoded within a plurality of coded data portions, and wherein the method includes, in the sensing device: sensing a plurality of coded data portions to thereby determine: a determined identity; and, a determined entire signature; generating, using the determined entire and a key, a generated identity; comparing the generated identity to the determined identity; and, authenticating the security document using the results of the comparison to thereby determine if the document is a counterfeit.

In a fifth broad form the invention provides a currency counter for counting currency documents, each currency document having disposed thereon or therein coded data including a number of coded data portions, each coded data portion being indicative of an identity of the currency document, the counter including: an input for receiving a number of currency documents to be counted; an output for providing counted currency documents; a feed mechanism for transporting currency documents from the input to the output along a feed path; a sensor for sensing at least one coded data portion for each currency document transported along the feed path; and, a processor for: determining, from the at least one sensed coded data portion, a sensed identity for each currency document; determining, from the sensed identity, a determined value for each currency document; and, counting the currency documents using the determined values.

Optionally, the counter further includes a number of outputs, and wherein the processor controls the feed mechanism to thereby transport currency documents to the outputs using the determined value for the currency document.

Optionally, the each coded data portion is indicative of at least part of a signature, the signature being a digital signature of at least part of the identity, and wherein the processor: determines, from the at least one sensed coded data portion, at least one sensed signature part; and, determines if the currency document is a counterfeit document using the sensed identity and the at least one sensed signature part.

Optionally, the currency counter includes a second output, and wherein the processor controls the feed mechanism to thereby transport counterfeit currency documents to the second output.

Optionally, the processor: accesses a data store, using the sensed identity, to determine a stored signature part; compares the stored signature part to the at least one sensed signature part; and, authenticates the currency document using the results of the comparison to thereby determine if the document is a counterfeit.

Optionally, the processor: generates, using the sensed identity and a key, at least a generated signature part; compares the generated signature part to the at least one sensed signature part; and, authenticates the currency document using the results of the comparison to thereby determine if the document is a counterfeit.

Optionally, the entire signature is encoded within a plurality of coded data portions, and wherein the processor: determines, from a plurality of sensed coded data portions, a plurality of sensed signature parts representing the entire signature; generates, using the plurality of sensed signature parts and a key, a generated identity; compares the generated identity to the sensed identity; and, authenticates the currency document using the results of the comparison to thereby determine if the document is a counterfeit. 8. A currency counter according to claim 3, wherein the signature is a digital signature of at least part of the identity and at least part of predetermined padding, the padding being at least one of: a predetermined number; and, a random number.

Optionally, the coded data includes a plurality of layouts, each layout defining the position of a plurality of first symbols encoding the identity, and a plurality of second symbols defining at least part of the signature.

Optionally, the processor: accesses, using the sensed identity, tracking data indicative of, for each of a number of existing currency documents: the identity of the currency document; and, tracking information indicative of the location of the currency document; at least one of: determines, using the tracking information, if the currency document is a duplicate of one of the existing currency documents; and, updates the tracking information.

Optionally, the counter includes a communications system, and wherein the processor includes a first processor part provided in a counter housing and a second remote processor part coupled to the fist processor part via the communications system, and wherein the first processor part: generates indicating data indicative of at least one of: the sensed identity; and, at least one sensed signature part; transfers the indicating data to a second processor part via the communications system, and wherein the second processor part is responsive to the indicating data to perform at least one of: determination of a value associated with the currency document; and, determination of whether the currency document is a counterfeit document.

Optionally, the coded data is substantially invisible to an unaided human.

Optionally, the coded data is printed on the surface using at least one of: an invisible ink; and, an infrared-absorptive ink.

Optionally, the coded data is provided substantially coincident with visible human-readable information.

Optionally at least one coded data portion encodes the entire signature.

Optionally the entire signature is formed from a plurality of signature parts, and wherein each coded data portion encodes a respective signature part.

Optionally, at least some of the coded data portions encode at least one of: a location of the respective coded data portion; a position of the respective coded data portion on the surface; a size of the coded data portions; a size of a signature; an identity of a signature part; and, units of indicated locations.

Optionally, the coded data includes at least one of: redundant data; data allowing error correction; Reed-Solomon data; and, Cyclic Redundancy Check (CRC) data.

Optionally, the digital signature includes at least one of: a random number associated with the identity; a keyed hash of at least the identity; a keyed hash of at least the identity produced using a private key, and verifiable using a corresponding public key; cipher-text produced by encrypting at least the identity; cipher-text produced by encrypting at least the identity and a random number; and, cipher-text produced using a private key, and verifiable using a corresponding public key; and, cipher-text produced using RSA encryption.

Optionally, the currency document is at least one of: a currency note; and, a check, and wherein the identity is indicative of at least one of: a currency note attribute including at least one of: currency; issue country; denomination; note side; printing works; and serial number; and, a check attribute including at least one of: currency; issuing institution; account number; serial number; expiry date; check value; and limit.

Optionally, the coded data is arranged in accordance with at least one layout having n-fold rotational symmetry, where n is at least two, the layout including n identical sub-layouts rotated 1/n revolutions apart about a centre of rotation, at least one sub-layout including rotation-indicating data that distinguishes that sub-layout from each other sub-layout.

Optionally, the coded data is arranged in accordance with at least one layout having n-fold rotational symmetry, where n is at least two, the layout encoding orientation-indicating data comprising a sequence of an integer multiple m of n symbols, where m is one or more, each encoded symbol being distributed at n locations about a centre of rotational symmetry of the layout such that decoding the symbols at each of the n orientations of the layout produces n representations of the orientation-indicating data, each representation comprising a different cyclic shift of the orientation-indicating data and being indicative of the degree of rotation of the layout.

Optionally, the currency counter further performs a method of tracking a security document, the security document having disposed thereon or therein coded data including a number of coded data portions, each coded data portion being indicative of an identity of the security document, the method including, in a computer system: receiving indicating data from a sensing device, the sensing device being responsive to sensing of the coded data to generate indicating data indicative of the identity of the product item; and, updating, using the received indicating data, tracking data stored in a data store, tracking data being indicative of: the identity of the product item; and, tracking information.

Optionally, the currency counter further includes a sensing device for use with a security document, the security document having disposed thereon or therein coded data including a number of coded data portions, each coded data portion being indicative of an identity of the security document, the sensing device including: a housing adapted to be held by a user in use; a radiation source for exposing at least one coded data portion; a sensor for sensing the at least one exposed coded data portion; and, a processor for determining, using the at least one sensed coded data portion, a sensed identity.

Optionally, the currency counter further performs a method of determining a counterfeit security document, the security document having disposed thereon or therein coded data including a number of coded data portions, each coded data portion being indicative of: an identity of the security document; and, at least part of a signature, the signature being a digital signature of at least part of the identity; wherein the method includes: in a sensing device: sensing at least one coded data portion; and, generating, using the sensed coded data portion, indicating data indicative of: the identity; and, at least one signature part; in a processor: determining, from the indicating data: a determined identity; and, at least one determined signature part; determining if the security document is a counterfeit document using the determined identity and the at least one determined signature part.

Optionally, the currency counter further performs a method of determining a possible duplicated security document, the security document having disposed thereon or therein coded data including a number of coded data portions, each coded data portion being indicative of at least an identity of the security document, and wherein the method includes, in a computer system: receiving indicating data from a sensing device, the sensing device being responsive to sensing of the coded data to generate indicating data indicative of the identity of the security document; determining, from the indicating data, a determined identity; accessing, using the determined identity, tracking data indicative of: the identity of the security document; and, tracking information indicative of the location of the security document; and, determining, using the tracking information, if the security document is a possible duplicate.

Optionally, the currency counter further performs a method of providing a security document having a security feature, the method including: creating the security document; determining an identity associated with the security document; generating a signature using the identity, the signature being a digital signature of at least part of the identity; generating coded data, the coded data including a number of coded data portions, each coded data portion being indicative of: the identity of the security document; and, at least part of the signature; and, printing the coded data on the security document.

Optionally, the currency counter further performs a method of printing a security document having a security feature, the method including: receiving the security document; receiving identity data, the identity data being at least partially indicative of an identity of the security document, the identity data being encrypted using a public key; determining the identity by decrypting the received identity data using a secret key associated with the public key; generating a signature using the determined identity, the signature being a digital signature of at least part of the identity; generating coded data at least partially indicative of: the identity of the security document; and, at least part of the signature; and, printing the coded data on the security document.

Optionally, the currency counter further includes a system for recording a transaction relating to a security document, the security document having disposed thereon or therein coded data including a number of coded data portions, each coded data portion being indicative of at least an identity of the security document, the system including a computer system for: receiving indicating data from a sensing device, the sensing device being responsive to sensing of the coded data to generate indicating data at least partially indicative of: the identity of the security document; and, the transaction; and, updating, using the received indicating data, transaction data stored in a data store, the transaction data being indicative of: the identity of the security document; and, the transaction.

Optionally, the currency counter further performs a method for monitoring transactions involving security documents, each security document having disposed thereon or therein coded data including a number of coded data portions, each coded data portion being indicative of at least an identity of the security document, the method including, in a computer system and following a transaction involving a security document: receiving indicating data from a sensing device, the sensing device being responsive to sensing of coded data to generate indicating data at least partially indicative of: the identity of the security document; and, the transaction; updating, using the received indicating data, transaction data stored in a data store, the transaction data being indicative of, for each of a number of security documents, performed transactions; comparing the transaction data to one or more predetermined patterns to thereby determine the presence or absence of a cash flow anomaly.

Optionally, the currency counter further uses a security document database, the database storing security document data including, for each of a number of security documents: identity data, the identity data being at least partially indicative of an identity of the security document; attribute data, the attribute data being at least partially indicative of one or more attributes of the security document; wherein, in use, the security document database allows a computer system to: receive, from a sensing device, indicating data at least partially indicative of at least one of: the identity; and one or more attributes; use the received indicating data and the security document data to perform an action associated with the security document.

Optionally, the currency counter further includes A set of instructions for causing a computer system to monitor transactions involving security documents, each security document having disposed thereon or therein coded data including a number of coded data portions, each coded data portion being indicative of at least an identity of the security document, the set of instructions, when executed by the computer system, causing the computer system to: receive indicating data from a sensing device, the sensing device being responsive to sensing of coded data to generate indicating data at least partially indicative of: the identity of the security document; and, the transaction; updating, using the received indicating data, transaction data stored in a data store, the transaction data being indicative of: the identity of the security document; and, the transaction.

Optionally, the currency counter further includes a set of instructions for a currency counter, the currency counter being used for counting currency documents where each currency document having disposed therein or thereon at least one coded data portion being indicative of at least an identity of the currency document, the currency counter having: an input for receiving a number of currency documents to be counted; an output for providing counted currency documents; a feed mechanism for transporting currency documents from the input to the output along a feed path; a sensor for sensing at least one coded data portion for each currency document transported along the feed path; and, a processor, the set of instructions, when executed by the processor, causing the processor to: determine, from the at least one sensed coded data portion, a sensed identity for each currency document; determine, from the sensed identity, a determined value for each currency document; and, count the currency documents using the determined values.

Optionally, the currency counter further includes a processor for use in a device for authenticating security documents, the security document having disposed thereon or therein coded data at least partially indicative of an identity of the security document and a signature, the signature being a digital signature of at least part of the identity, the processor being adapted to: receive indicating data from a sensor in the device, the sensor being responsive to sensing of the coded data to generate indicating data at least partially indicative of: the identity; and, at least part of the signature; determine, from the indicating data, a determined identity and at least one determined signature part; and, authenticate the security document using the determined identity and the at least one determined signature part.

Optionally, the currency counter further performs a method of counting currency documents, each currency document having disposed thereon or therein coded data including a plurality of coded data portions, each coded data portion being at least partially indicative of an identity of the currency document, the method including, in a sensing device: sensing at least one coded data portion for each currency document; generating, using the sensed coded data portion, indicating data at least partially indicative of the identity of each currency document; and, transferring the indicating data to a computer system, the computer system being responsive to the indicating data to: determine, using the indicating data, a determined identity for each currency document; determine, using each determined identity, a value for each currency document; and, count the currency documents using the determined values.

Optionally, the currency counter further performs a method for authenticating and evaluating a currency document, the currency document having disposed thereon or therein coded data including a plurality of coded data portions, the method including, in a sensing device: sensing at least one coded data portion; generating, using the sensed coded data portion, indicating data at least partially indicative of: an identity of the currency document; and at least part of a signature, the signature being a digital signature of at least part of the identity; and, transferring the indicating data to a computer system, the computer system being responsive to the indicating data to: determine, from the indicating data, a received identity, and a received signature part; authenticate the currency document using the received identity and the received signature part; and, in response to a successful authentication, determine, using the received identity, a value associated with the currency document.

Optionally, at least one currency document includes anti-copy protection, the security document having disposed thereon or therein coded data including a number of coded data portions, each coded data portion being indicative of an identity, the identity being uniquely indicative of the respective security document and being stored in a data store to allow for duplication of the security document to be determined.

Optionally, at least one currency document includes anti-forgery protection, the security document having disposed thereon or therein coded data including a plurality of coded data portions, each coded data portion being indicative of: an identity of the currency document; and at least part of a signature, the signature being formed by encrypting at least part of the identity using a private key of public/private key pair, such that: valid security documents can only be created using the private key; and, validity of the security document can be confirmed using the corresponding public key.

Optionally, the currency counter further performs a method of recovering a stolen security document, the security document having disposed thereon or therein coded data including a number of coded data portions, each coded data portion being indicative of at least an identity of the security document, the method including in a computer system: receiving indicating data from a sensing device, the sensing device being responsive to sensing of the coded data to generate indicating data at least partially indicative of the identity; determining, using the indicating data, a determined identity; accessing, using the determined identity, transaction data stored in a data store, the transaction data being indicative of a security document status; determining, using the security document status, if the security document is stolen; and, in response to a positive determination, causing the security document to be recovered.

In a sixth broad form the invention provides a method of providing a security document having a security feature, the method including: creating the security document; determining an identity associated with the security document; generating a signature using the identity, the signature being a digital signature of at least part of the identity; generating coded data, the coded data including a number of coded data portions, each coded data portion being indicative of: the identity of the security document; and, at least part of the signature; and, printing the coded data on the security document.

Optionally, the method includes generating the signature using a secret key, the secret key being known only to authorised document producers.

Optionally, the method includes printing the coded data using a printer, the printer including a processor and a secure data store, and wherein the method includes causing the processor to generate the signature using a secret key stored in the data store.

Optionally, the security document includes visible information, and wherein the method includes: determining a layout; and, printing the coded data using the layout, at least some of the coded data being substantially coincident with at least some of the visible information.

Optionally, the security document includes visible information, and wherein the method includes: determining a layout; and, printing the coded data and the visible information using the layout.

Optionally, the method includes updating tracking data stored in a data store, the tracking data being indicative of: the identity of the product item; and, tracking information indicative of at least one of: a date of creation of the security document; a creator of the security document; a current location of the security document; an intended destination for the security document; and, a date of expiry for the security document.

Optionally, the method includes: receiving the security document; scanning the security document to determine information indicative of at least one of: a source of the security document; a security document type; and, a value associated with the security document; and, determining the identity using the determined information.

Optionally, the signature is a digital signature of at least part of the identity and at least part of predetermined padding, the padding being at least one of: a predetermined number; and, a random number.

Optionally, the method includes encoding the entire signature within a plurality of coded data portions.

Optionally, the coded data includes a plurality of layouts, each layout defining the position of a plurality of first symbols encoding the identity, and a plurality of second symbols defining at least part of the signature.

Optionally, the coded data is substantially invisible to an unaided human.

Optionally, the coded data is printed on the surface using at least one of: an invisible ink; and, an infrared-absorptive ink.

Optionally, the coded data is provided substantially coincident with visible human-readable information.

Optionally at least one coded data portion encodes the entire signature.

Optionally the entire signature is formed from a plurality of signature parts, and wherein each coded data portion encodes a respective signature part.

Optionally, at least some of the coded data portions encode at least one of: a location of the respective coded data portion; a position of the respective coded data portion on the surface;

a size of the coded data portions; a size of a signature; an identity of a signature part; and, units of indicated locations.

Optionally, the coded data includes at least one of: redundant data; data allowing error correction; Reed-Solomon data; and, Cyclic Redundancy Check (CRC) data.

Optionally, the digital signature includes at least one of: a random number associated with the identity; a keyed hash of at least the identity; a keyed hash of at least the identity produced using a private key, and verifiable using a corresponding public key; cipher-text produced by encrypting at least the identity; cipher-text produced by encrypting at least the identity and a random number; and, cipher-text produced using a private key, and verifiable using a corresponding public key; and, cipher-text produced using RSA encryption.

Optionally, the security document is at least one of: a currency note; a check; a credit or debit card; a redeemable ticket, voucher, or coupon; a lottery ticket or instant win ticket; and, an identity card or document, such as a driver's license or passport.

Optionally, the identity is indicative of at least one of: a currency note attribute including at least one of: currency; issue country; denomination; note side; printing works; and serial number; a check attribute including at least one of: currency; issuing institution; account number; serial number; expiry date; check value; and limit; a card attribute including at least one of: card type; issuing institution; account number; issue date; expiry date; and limit.

Optionally, the coded data is arranged in accordance with at least one layout having n-fold rotational symmetry, where n is at least two, the layout including n identical sub-layouts rotated 1/n revolutions apart about a centre of rotation, at least one sub-layout including rotation-indicating data that distinguishes that sub-layout from each other sub-layout.

Optionally, the coded data is arranged in accordance with at least one layout having n-fold rotational symmetry, where n is at least two, the layout encoding orientation-indicating data comprising a sequence of an integer multiple m of n symbols, where m is one or more, each encoded symbol being distributed at n locations about a centre of rotational symmetry of the layout such that decoding the symbols at each of the n orientations of the layout produces n representations of the orientation-indicating data, each representation comprising a different cyclic shift of the orientation-indicating data and being indicative of the degree of rotation of the layout.

Optionally, the method is further used for tracking a security document, the method including, in a computer system: receiving indicating data from a sensing device, the sensing device being responsive to sensing of the coded data to generate indicating data indicative of the identity of the product item; and, updating, using the received indicating data, tracking data stored in a data store, tracking data being indicative of: the identity of the product item; and, tracking information.

Optionally, the sensing device includes: a housing adapted to be held by a user in use; a radiation source for exposing at least one coded data portion; a sensor for sensing the at least one exposed coded data portion; and, a processor for determining, using the at least one sensed coded data portion, a sensed identity.

Optionally, the method is further used for determining a counterfeit security document, each coded data portion being further indicative of at least part of a signature, the signature being a digital signature of at least part of the identity, wherein the method further includes: in a sensing device: generating, using the sensed coded data portion, indicating data indicative of: the identity; and, at least one signature part; and, in a processor: determining, from the indicating data: a determined identity; and, at least one determined signature part; and, determining if the security document is a counterfeit document using the determined identity and the at least one determined signature part.

Optionally, the method is further used for determining a possible duplicated security document, wherein the method includes, in a computer system: receiving indicating data from a sensing device, the sensing device being responsive to sensing of the coded data to generate indicating data indicative of the identity of the security document; determining, from the indicating data, a determined identity; accessing, using the determined identity, tracking data indicative of: the identity of the security document; and, tracking information indicative of the location of the security document; and, determining, using the tracking information, if the security document is a possible duplicate.

Optionally, the method is used in a currency counter for counting currency documents, each currency document having disposed thereon or therein coded data including a number of coded data portions, each coded data portion being indicative of an identity of the currency document, the counter including: an input for receiving a number of currency documents to be counted; an output for providing counted currency documents; a feed mechanism for transporting currency documents from the input to the output along a feed path; a sensor for sensing at least one coded data portion for each currency document transported along the feed path; and, a processor for: determining, from the at least one sensed coded data portion, a sensed identity for each currency document; determining, from the sensed identity, a determined value for each currency document; and, counting the currency documents using the determined values.

Optionally, the security document being printed with a security feature, wherein the method of printing the security document includes: receiving the security document; receiving identity data, the identity data being at least partially indicative of an identity of the security document, the identity data being encrypted using a public key; determining the identity by decrypting the received identity data using a secret key associated with the public key; generating a signature using the determined identity, the signature being a digital signature of at least part of the identity; generating coded data at least partially indicative of: the identity of the security document; and, at least part of the signature; and, printing the coded data on the security document.

Optionally, the method is used in a system for recording a transaction relating to a security document, the system including a computer system for: receiving indicating data from a sensing device, the sensing device being responsive to sensing of the coded data to generate indicating data at least partially indicative of: the identity of the security document; and, the transaction; and, updating, using the received indicating data, transaction data stored in a data store, the transaction data being indicative of: the identity of the security document; and, the transaction.

Optionally, the method is further used for monitoring transactions involving security documents, the method including, in a computer system and following a transaction involving a security document: receiving indicating data from a sensing device, the sensing device being responsive to sensing of coded data to generate indicating data at least partially indicative of: the identity of the security document; and, the transaction; updating, using the received indicating data, transaction data stored in a data store, the transaction data being indicative of, for each of a number of security documents, performed transactions; comparing the transaction data to one or more predetermined patterns to thereby determine the presence or absence of a cash flow anomaly.

Optionally, the method includes using a security document database, the database storing security document data including, for each of a number of security documents: identity data, the identity data being at least partially indicative of an identity of the security document; attribute data, the attribute data being at least partially indicative of one or more attributes of the security document; wherein, in use, the security document database allows a computer system to: receive, from a sensing device, indicating data at least partially indicative of at least one of: the identity; and one or more attributes; use the received indicating data and the security document data to perform an action associated with the security document.

Optionally, the method is further used for causing a computer system to monitor transactions involving security documents, the method being performed using a set of instructions, each security document having disposed thereon or therein coded data including a number of coded data portions, each coded data portion being indicative of at least an identity of the security document, the set of instructions, when executed by the computer system, causing the computer system to: receive indicating data from a sensing device, the sensing device being responsive to sensing of coded data to generate indicating data at least partially indicative of: the identity of the security document; and, the transaction; updating, using the received indicating data, transaction data stored in a data store, the transaction data being indicative of: the identity of the security document; and, the transaction.

Optionally, the method is further used for counting currency documents, the method being performed using a set of instructions, each currency document having disposed therein or thereon at least one coded data portion being indicative of at least an identity of the currency document, the currency counter having: an input for receiving a number of currency documents to be counted; an output for providing counted currency documents; a feed mechanism for transporting currency documents from the input to the output along a feed path; a sensor for sensing at least one coded data portion for each currency document transported along the feed path; and, a processor, the set of instructions, when executed by the processor, causing the processor to: determine, from the at least one sensed coded data portion, a sensed identity for each currency document; determine, from the sensed identity, a determined value for each currency document; and, count the currency documents using the determined values.

Optionally, the method is used in a processor for use in a device for authenticating security documents, the coded data further being at least partially indicative of a signature, the signature being a digital signature of at least part of the identity, the processor being adapted to: receive indicating data from a sensor in the device, the sensor being responsive to sensing of the coded data to generate indicating data at least partially indicative of: the identity; and, at least part of the signature; determine, from the indicating data, a determined identity and at least one determined signature part; and, authenticate the security document using the determined identity and the at least one determined signature part.

Optionally, the method is further used for counting currency documents, each currency document having disposed thereon or therein coded data including a plurality of coded data portions, each coded data portion being at least partially indicative of an identity of the currency document, the method including, in a sensing device: sensing at least one coded data portion for each currency document; generating, using the sensed coded data portion, indicating data at least partially indicative of the identity of each currency document; and, transferring the indicating data to a computer system, the computer system being responsive to the indicating data to: determine, using the indicating data, a determined identity for each currency document; determine, using each determined identity, a value for each currency document; and, count the currency documents using the determined values.

Optionally, the method further being used for authenticating and evaluating a currency document, the currency document having disposed thereon or therein coded data including a plurality of coded data portions, the method including, in a sensing device: sensing at least one coded data portion; generating, using the sensed coded data portion, indicating data at least partially indicative of: an identity of the currency document; and at least part of a signature, the signature being a digital signature of at least part of the identity; and, transferring the indicating data to a computer system, the computer system being responsive to the indicating data to: determine, from the indicating data, a received identity, and a received signature part; authenticate the currency document using the received identity and the received signature part; and, in response to a successful authentication, determine, using the received identity, a value associated with the currency document.

Optionally, the security document includes anti-copy protection, the identity being uniquely indicative of the respective security document and being stored in a data store to allow for duplication of the security document to be determined.

Optionally, the security document includes anti-forgery protection, each coded data portion being further indicative of at least part of a signature, the signature being formed by encrypting at least part of the identity using a private key of public/private key pair, such that: valid security documents can only be created using the private key; and, validity of the security document can be confirmed using the corresponding public key.

Optionally, the method is further used for recovering a stolen security document, the method including in a computer system: receiving indicating data from a sensing device, the sensing device being responsive to sensing of the coded data to generate indicating data at least partially indicative of the identity; determining, using the indicating data, a determined identity; accessing, using the determined identity, transaction data stored in a data store, the transaction data being indicative of a security document status; determining, using the security document status, if the security document is stolen; and, in response to a positive determination, causing the security document to be recovered. In a seventh broad form the invention provides a method of printing a security document having a security feature, the method including: receiving the security document; receiving identity data, the identity data being at least partially indicative of an identity of the security document, the identity data being encrypted using a public key; determining the identity by decrypting the received identity data using a secret key associated with the public key; generating a signature using the determined identity, the signature being a digital signature of at least part of the identity; generating coded data at least partially indicative of: the identity of the security document; and, at least part of the signature; and, printing the coded data on the security document.

Optionally, the security document includes visible information, and wherein the method includes overprinting the coded data on the visible information.

Optionally, a secure data store is used for storing document data and where the method includes generating the signature using the data stored in the data store.

Optionally, the method includes encoding the entire signature within a plurality of coded data portions.

Optionally, the method includes: determining a layout, the layout being at least one of: a coded data layout, the layout being indicative of the position of each coded data portion on the security document; and, a document description, the document description being indicative of the position of the visible information on the packaging; and, prints, using the layout, at least one of the coded data and the visible information.

Optionally, a communication system is used for communicating with a database, the database storing data relating the security, including at least one of: a currency note attribute including at least one of: currency; issue country; denomination; note side; printing works; and serial number; a check attribute including at least one of: currency; issuing institution; account number; serial number; expiry date; check value; and limit; a card attribute including at least one of: card type; issuing institution; account number; issue date; expiry date; and limit.

Optionally, the method includes, at least one of: updating at least some of the data relating to the security document; and, generating the coded data using at least some of the data relating to the security.

Optionally, the signature is a digital signature of at least part of the identity and at least part of predetermined padding, the padding being at least one of: a predetermined number; and, a random number.

Optionally, the coded data includes a plurality of layouts, each layout defining the position of a plurality of first symbols encoding the identity, and a plurality of second symbols defining at least part of the signature.

Optionally, the coded data is substantially invisible to an unaided human.

Optionally, the coded data is printed on the surface using at least one of: an invisible ink; and, an infrared-absorptive ink.

Optionally, the coded data is provided substantially coincident with visible human-readable information.

Optionally at least one coded data portion encodes the entire signature.

Optionally the entire signature is formed from a plurality of signature parts, and wherein each coded data portion encodes a respective signature part.

Optionally, at least some of the coded data portions encode at least one of: a location of the respective coded data portion; a position of the respective coded data portion on the surface; a size of the coded data portions; a size of a signature; an identity of a signature part; and, units of indicated locations.

Optionally, the coded data includes at least one of: redundant data; data allowing error correction; Reed-Solomon data; and, Cyclic Redundancy Check (CRC) data.

Optionally, the digital signature includes at least one of: a random number associated with the identity; a keyed hash of at least the identity; a keyed hash of at least the identity produced using a private key, and verifiable using a corresponding public key; cipher-text produced by encrypting at least the identity; cipher-text produced by encrypting at least the identity and a random number; and, cipher-text produced using a private key, and verifiable using a corresponding public key; and, cipher-text produced using RSA encryption.

Optionally, the security document is at least one of: a currency note; a check; a credit or debit card; a redeemable ticket, voucher, or coupon; a lottery ticket or instant win ticket; and, an identity card or document, such as a driver's license or passport.

Optionally, the coded data is arranged in accordance with at least one layout having n-fold rotational symmetry, where n is at least two, the layout including n identical sub-layouts rotated 1/n revolutions apart about a centre of rotation, at least one sub-layout including rotation-indicating data that distinguishes that sub-layout from each other sub-layout.

Optionally, the coded data is arranged in accordance with at least one layout having n-fold rotational symmetry, where n is at least two, the layout encoding orientation-indicating data comprising a sequence of an integer multiple m of n symbols, where m is one or more, each encoded symbol being distributed at n locations about a centre of rotational symmetry of the layout such that decoding the symbols at each of the n orientations of the layout produces n representations of the orientation-indicating data, each representation comprising a different cyclic shift of the orientation-indicating data and being indicative of the degree of rotation of the layout.

Optionally, the method is further used for tracking a security document, the method including, in a computer system: receiving indicating data from a sensing device, the sensing device being responsive to sensing of the coded data to generate indicating data indicative of the identity of the product item; and, updating, using the received indicating data, tracking data stored in a data store, tracking data being indicative of: the identity of the product item; and, tracking information.

Optionally, the sensing device includes: a housing adapted to be held by a user in use; a radiation source for exposing at least one coded data portion; a sensor for sensing the at least one exposed coded data portion; and, a processor for determining, using the at least one sensed coded data portion, a sensed identity.

Optionally, the method is further used for determining a counterfeit security document, each coded data portion being further indicative of at least part of a signature, the signature being a digital signature of at least part of the identity, wherein the method further includes: in a sensing device: generating, using the sensed coded data portion, indicating data indicative of: the identity; and, at least one signature part; and, in a processor: determining, from the indicating data: a determined identity; and, at least one determined signature part; and, determining if the security document is a counterfeit document using the determined identity and the at least one determined signature part.

Optionally, the method is further used for determining a possible duplicated security document, wherein the method includes, in a computer system: receiving indicating data from a sensing device, the sensing device being responsive to sensing of the coded data to generate indicating data indicative of the identity of the security document; determining, from the indicating data, a determined identity; accessing, using the determined identity, tracking data indicative of: the identity of the security document; and, tracking information indicative of the location of the security document; and, determining, using the tracking information, if the security document is a possible duplicate.

Optionally, the method is used in a currency counter for counting currency documents, each currency document having disposed thereon or therein coded data including a number of coded data portions, each coded data portion being indicative of an identity of the currency document, the counter including: an input for receiving a number of currency documents to be counted; an output for providing counted currency documents; a feed mechanism for transporting currency documents from the input to the output along a feed path; a sensor for sensing at least one coded data portion for each currency document transported along the feed path; and, a processor for: determining, from the at least one sensed coded data portion, a sensed identity for each currency document; determining, from the sensed identity, a determined value for each currency document; and, counting the currency documents using the determined values.

Optionally, the security document having a security feature, wherein the method of providing the security document includes: creating the security document; determining an identity associated with the security document; generating a signature using the identity, the signature being a digital signature of at least part of the identity; generating coded data, the coded data including a number of coded data portions, each coded data portion being indicative of: the identity of the security document; and, at least part of the signature; and, printing the coded data on the security document.

Optionally, the method is used in a system for recording a transaction relating to a security document, the system including a computer system for: receiving indicating data from a sensing device, the sensing device being responsive to sensing of the coded data to generate indicating data at least partially indicative of: the identity of the security document; and, the transaction; and, updating, using the received indicating data, transaction data stored in a data store, the transaction data being indicative of: the identity of the security document; and, the transaction.

Optionally, the method is further used for monitoring transactions involving security documents, the method including, in a computer system and following a transaction involving a security document: receiving indicating data from a sensing device, the sensing device being responsive to sensing of coded data to generate indicating data at least partially indicative of: the identity of the security document; and, the transaction; updating, using the received indicating data, transaction data stored in a data store, the transaction data being indicative of, for each of a number of security documents, performed transactions; comparing the transaction data to one or more predetermined patterns to thereby determine the presence or absence of a cash flow anomaly.

Optionally, the method includes using a security document database, the database storing security document data including, for each of a number of security documents: identity data, the identity data being at least partially indicative of an identity of the security document; attribute data, the attribute data being at least partially indicative of one or more attributes of the security document; wherein, in use, the security document database allows a computer system to: receive, from a sensing device, indicating data at least partially indicative of at least one of: the identity; and one or more attributes; use the received indicating data and the security document data to perform an action associated with the security document.

Optionally, the method is further used for causing a computer system to monitor transactions involving security documents, the method being performed using a set of instructions, each security document having disposed thereon or therein coded data including a number of coded data portions, each coded data portion being indicative of at least an identity of the security document, the set of instructions, when executed by the computer system, causing the computer system to: receive indicating data from a sensing device, the sensing device being responsive to sensing of coded data to generate indicating data at least partially indicative of: the identity of the security document; and, the transaction; updating, using the received indicating data, transaction data stored in a data store, the transaction data being indicative of: the identity of the security document; and, the transaction.

Optionally, the method is further used for counting currency documents, the method being performed using a set of instructions, each currency document having disposed therein or thereon at least one coded data portion being indicative of at least an identity of the currency document, the currency counter having: an input for receiving a number of currency documents to be counted; an output for providing counted currency documents; a feed mechanism for transporting currency documents from the input to the output along a feed path; a sensor for sensing at least one coded data portion for each currency document transported along the feed path; and, a processor, the set of instructions, when executed by the processor, causing the processor to: determine, from the at least one sensed coded data portion, a sensed identity for each currency document; determine, from the sensed identity, a determined value for each currency document; and, count the currency documents using the determined values.

Optionally, the method is used in a processor for use in a device for authenticating security documents, the coded data further being at least partially indicative of a signature, the signature being a digital signature of at least part of the identity, the processor being adapted to: receive indicating data from a sensor in the device, the sensor being responsive to sensing of the coded data to generate indicating data at least partially indicative of: the identity; and, at least part of the signature; determine, from the indicating data, a determined identity and at least one determined signature part; and, authenticate the security document using the determined identity and the at least one determined signature part.

Optionally, the method is further used for counting currency documents, each currency document having disposed thereon or therein coded data including a plurality of coded data portions, each coded data portion being at least partially indicative of an identity of the currency document, the method including, in a sensing device: sensing at least one coded data portion for each currency document; generating, using the sensed coded data portion, indicating data at least partially indicative of the identity of each currency document; and, transferring the indicating data to a computer system, the computer system being responsive to the indicating data to: determine, using the indicating data, a determined identity for each currency document; determine, using each determined identity, a value for each currency document; and, count the currency documents using the determined values.

Optionally, the method further being used for authenticating and evaluating a currency document, the currency document having disposed thereon or therein coded data including a plurality of coded data portions, the method including, in a sensing device: sensing at least one coded data portion; generating, using the sensed coded data portion, indicating data at least partially indicative of: an identity of the currency document; and at least part of a signature, the signature being a digital signature of at least part of the identity; and, transferring the indicating data to a computer system, the computer system being responsive to the indicating data to: determine, from the indicating data, a received identity, and a received signature part; authenticate the currency document using the received identity and the received signature part; and, in response to a successful authentication, determine, using the received identity, a value associated with the currency document.

Optionally, the security document includes anti-copy protection, the identity being uniquely indicative of the respective security document and being stored in a data store to allow for duplication of the security document to be determined.

Optionally, the security document includes anti-forgery protection, each coded data portion being further indicative of at least part of a signature, the signature being formed by encrypting at least part of the identity using a private key of public/private key pair, such that: valid security documents can only be created using the private key; and, validity of the security document can be confirmed using the corresponding public key.

Optionally, the method is further used for recovering a stolen security document, the method including in a computer system: receiving indicating data from a sensing device, the sensing device being responsive to sensing of the coded data to generate indicating data at least partially indicative of the identity; determining, using the indicating data, a determined identity; accessing, using the determined identity, transaction data stored in a data store, the transaction data being indicative of a security document status; determining, using the security document status, if the security document is stolen; and, in response to a positive determination, causing the security document to be recovered.

In another broad form the invention provides a printer for printing a security document having a security feature, the printer being for: receiving the security document; receiving identity data, the identity data being at least partially indicative of an identity of the security document, the identity data being encrypted using a public key; determining the identity by decrypting the received identity data using a secret key associated with the public key; generating a signature using the determined identity, the signature being a digital signature of at least part of the identity; generating coded data at least partially indicative of: the identity of the security document; and, at least part of the signature; and, printing the coded data on the security document.

In an eighth broad form the invention provides a system for recording a transaction relating to a security document, the security document having disposed thereon or therein coded data including a number of coded data portions, each coded data portion being indicative of at least an identity of the security document, the system including a computer system for: receiving indicating data from a sensing device, the sensing device being responsive to sensing of the coded data to generate indicating data at least partially indicative of: the identity of the security document; and, the transaction; and, updating, using the received indicating data, transaction data stored in a data store, the transaction data being indicative of: the identity of the security document; and, the transaction.

Optionally, the transaction data is indicative of at least one of: a transaction type including at least one of: point of sale transaction; deposit transaction; and, withdrawal transaction; transaction details; identities of parties involved in the transaction; a transaction amount; a location of the transaction; and, a location of the sensing device.

Optionally, the computer system is configured to: approve the transaction; and, in response to a successful approval: cause the transaction to be performed; and, update the transaction data.

Optionally, the computer system is configured to approve the transaction by at least one of: authenticating the security document using the indicating data; and, comparing the transaction to at least one predetermined criterion.

Optionally, the computer system includes a display for displaying at least one of: an indication of approval of the transaction; results of authentication of the security document; results of a comparison of the transaction to at least one predetermined criterion; and, transaction data.

Optionally, each coded data portion is further indicative of at least part of a signature, the signature being a digital signature of at least part of the identity, and wherein the system is configured to: determine, from the indicating data, a determined identity and at least one determined signature part; and, authenticate the security document using the determined identity and the at least one determined signature part.

Optionally, the signature is a digital signature of at least part of the identity and at least part of predetermined padding, the padding being at least one of: a predetermined number; and, a random number.

Optionally, the entire signature is encoded within a plurality of coded data portions and wherein the system includes the sensing device configured to sense a number of coded data portions to thereby determine the entire signature.

Optionally, the coded data includes a plurality of layouts, each layout defining the position of a plurality of first symbols encoding the identity, and a plurality of second symbols defining at least part of the signature.

Optionally, the coded data is substantially invisible to an unaided human.

Optionally, the coded data is printed on the surface using at least one of: an invisible ink; and, an infrared-absorptive ink.

Optionally, the coded data is provided substantially coincident with visible human-readable information.

Optionally at least one coded data portion encodes the entire signature.

Optionally the entire signature is formed from a plurality of signature parts, and wherein each coded data portion encodes a respective signature part.

Optionally, at least some of the coded data portions encode at least one of: a location of the respective coded data portion; a position of the respective coded data portion on the surface; a size of the coded data portions; a size of a signature; an identity of a signature part; and, units of indicated locations.

Optionally, the coded data includes at least one of: redundant data; data allowing error correction; Reed-Solomon data; and, Cyclic Redundancy Check (CRC) data.

Optionally, the digital signature includes at least one of: a random number associated with the identity; a keyed hash of at least the identity; a keyed hash of at least the identity produced using a private key, and verifiable using a corresponding public key; cipher-text produced by encrypting at least the identity; cipher-text produced by encrypting at least the identity and a random number; and, cipher-text produced using a private key, and verifiable using a corresponding public key; and, cipher-text produced using RSA encryption.

Optionally, the security document is at least one of: a currency note; a check; a credit or debit card; a redeemable ticket, voucher, or coupon; a lottery ticket or instant win ticket; and, an identity card or document, such as a driver's license or passport.

Optionally, the identity is indicative of at least one of: a currency note attribute including at least one of: currency; issue country; denomination; note side; printing works; and serial number; a check attribute including at least one of: currency; issuing institution; account number; serial number; expiry date; check value; and limit; a card attribute including at least one of: card type; issuing institution; account number; issue date; expiry date; and limit.

Optionally, the coded data is arranged in accordance with at least one layout having n-fold rotational symmetry, where n is at least two, the layout including n identical sub-layouts rotated 1/n revolutions apart about a centre of rotation, at least one sub-layout including rotation-indicating data that distinguishes that sub-layout from each other sub-layout.

Optionally, the coded data is arranged in accordance with at least one layout having n-fold rotational symmetry, where n is at least two, the layout encoding orientation-indicating data comprising a sequence of an integer multiple m of n symbols, where m is one or more, each encoded symbol being distributed at n locations about a centre of rotational symmetry of the layout such that decoding the symbols at each of the n orientations of the layout produces n representations of the orientation-indicating data, each representation comprising a different cyclic shift of the orientation-indicating data and being indicative of the degree of rotation of the layout.

Optionally, the system is further used for a method of tracking a security document, the security document having disposed thereon or therein coded data including a number of coded data portions, each coded data portion being indicative of an identity of the security document, the method including, in a computer system: receiving indicating data from a sensing device, the sensing device being responsive to sensing of the coded data to generate indicating data indicative of the identity of the product item; and, updating, using the received indicating data, tracking data stored in a data store, tracking data being indicative of: the identity of the product item; and, tracking information.

Optionally, the system is further includes a sensing device for use with a security document, the security document having disposed thereon or therein coded data including a number of coded data portions, each coded data portion being indicative of an identity of the security document, the sensing device including: a housing adapted to be held by a user in use; a radiation source for exposing at least one coded data portion; a sensor for sensing the at least one exposed coded data portion; and, a processor for determining, using the at least one sensed coded data portion, a sensed identity.

Optionally, the system is further used for a method of determining a counterfeit security document, the security document having disposed thereon or therein coded data including a number of coded data portions, each coded data portion being indicative of: an identity of the security document; and, at least part of a signature, the signature being a digital signature of at least part of the identity; wherein the method includes: in a sensing device: sensing at least one coded data portion; and, generating, using the sensed coded data portion, indicating data indicative of: the identity; and, at least one signature part; in a processor: determining, from the indicating data: a determined identity; and, at least one determined signature part; determining if the security document is a counterfeit document using the determined identity and the at least one determined signature part.

Optionally, the system is further used for a method of determining a possible duplicated security document, the security document having disposed thereon or therein coded data including a number of coded data portions, each coded data portion being indicative of at least an identity of the security document, and wherein the method includes, in a computer system: receiving indicating data from a sensing device, the sensing device being responsive to sensing of the coded data to generate indicating data indicative of the identity of the security document; determining, from the indicating data, a determined identity; accessing, using the determined identity, tracking data indicative of: the identity of the security document; and, tracking information indicative of the location of the security document; and, determining, using the tracking information, if the security document is a possible duplicate.

Optionally, the system is further includes a currency counter for counting currency documents, each currency document having disposed thereon or therein coded data including a number of coded data portions, each coded data portion being indicative of an identity of the currency document, the counter including: an input for receiving a number of currency documents to be counted; an output for providing counted currency documents; a feed mechanism for transporting currency documents from the input to the output along a feed path; a sensor for sensing at least one coded data portion for each currency document transported along the feed path; and, a processor for: determining, from the at least one sensed coded data portion, a sensed identity for each currency document; determining, from the sensed identity, a determined value for each currency document; and, counting the currency documents using the determined values.

Optionally, the system is further used for a method of providing a security document having a security feature, the method including: creating the security document; determining an identity associated with the security document; generating a signature using the identity, the signature being a digital signature of at least part of the identity; generating coded data, the coded data including a number of coded data portions, each coded data portion being indicative of: the identity of the security document; and, at least part of the signature; and, printing the coded data on the security document.

Optionally, the system is further used for a method of printing a security document having a security feature, the method including: receiving the security document; receiving identity data, the identity data being at least partially indicative of an identity of the security document, the identity data being encrypted using a public key; determining the identity by decrypting the received identity data using a secret key associated with the public key; generating a signature using the determined identity, the signature being a digital signature of at least part of the identity; generating coded data at least partially indicative of: the identity of the security document; and, at least part of the signature; and, printing the coded data on the security document.

Optionally, the system is further used for a method for monitoring transactions involving security documents, each security document having disposed thereon or therein coded data including a number of coded data portions, each coded data portion being indicative of at least an identity of the security document, the method including, in a computer system and following a transaction involving a security document: receiving indicating data from a sensing device, the sensing device being responsive to sensing of coded data to generate indicating data at least partially indicative of: the identity of the security document; and, the transaction; updating, using the received indicating data, transaction data stored in a data store, the transaction data being indicative of, for each of a number of security documents, performed transactions; comparing the transaction data to one or more predetermined patterns to thereby determine the presence or absence of a cash flow anomaly.

Optionally, the system uses a security document database, the database storing security document data including, for each of a number of security documents: identity data, the identity data being at least partially indicative of an identity of the security document; attribute data, the attribute data being at least partially indicative of one or more attributes of the security document; wherein, in use, the security document database allows a computer system to: receive, from a sensing device, indicating data at least partially indicative of at least one of: the identity; and one or more attributes; use the received indicating data and the security document data to perform an action associated with the security document.

Optionally, the system is further includes a set of instructions for causing a computer system to monitor transactions involving security documents, each security document having disposed thereon or therein coded data including a number of coded data portions, each coded data portion being indicative of at least an identity of the security document, the set of instructions, when executed by the computer system, causing the computer system to: receive indicating data from a sensing device, the sensing device being responsive to sensing of coded data to generate indicating data at least partially indicative of: the identity of the security document; and, the transaction; updating, using the received indicating data, transaction data stored in a data store, the transaction data being indicative of: the identity of the security document; and, the transaction.

Optionally, the system is further includes a set of instructions for a currency counter, the currency counter being used for counting currency documents where each currency document having disposed therein or thereon at least one coded data portion being indicative of at least an identity of the currency document, the currency counter having: an input for receiving a number of currency documents to be counted; an output for providing counted currency documents; a feed mechanism for transporting currency documents from the input to the output along a feed path; a sensor for sensing at least one coded data portion for each currency document transported along the feed path; and, a processor, the set of instructions, when executed by the processor, causing the processor to: determine, from the at least one sensed coded data portion, a sensed identity for each currency document; determine, from the sensed identity, a determined value for each currency document; and, count the currency documents using the determined values.

Optionally, the system is further includes a processor for use in a device for authenticating security documents, the security document having disposed thereon or therein coded data at least partially indicative of an identity of the security document and a signature, the signature being a digital signature of at least part of the identity, the processor being adapted to: receive indicating data from a sensor in the device, the sensor being responsive to sensing of the coded data to generate indicating data at least partially indicative of: the identity; and, at least part of the signature; determine, from the indicating data, a determined identity and at least one determined signature part; and, authenticate the security document using the determined identity and the at least one determined signature part.

Optionally, the system is further used for a method of counting currency documents, each currency document having disposed thereon or therein coded data including a plurality of coded data portions, each coded data portion being at least partially indicative of an identity of the currency document, the method including, in a sensing device: sensing at least one coded data portion for each currency document; generating, using the sensed coded data portion, indicating data at least partially indicative of the identity of each currency document; and, transferring the indicating data to a computer system, the computer system being responsive to the indicating data to: determine, using the indicating data, a determined identity for each currency document; determine, using each determined identity, a value for each currency document; and, count the currency documents using the determined values.

Optionally, the system is further used for a method for authenticating and evaluating a currency document, the currency document having disposed thereon or therein coded data including a plurality of coded data portions, the method including, in a sensing device: sensing at least one coded data portion; generating, using the sensed coded data portion, indicating data at least partially indicative of: an identity of the currency document; and at least part of a signature, the signature being a digital signature of at least part of the identity; and, transferring the indicating data to a computer system, the computer system being responsive to the indicating data to: determine, from the indicating data, a received identity, and a received signature part; authenticate the currency document using the received identity and the received signature part; and, in response to a successful authentication, determine, using the received identity, a value associated with the currency document.

Optionally, the system is further used for a security document including anti-copy protection, the security document having disposed thereon or therein coded data including a number of coded data portions, each coded data portion being indicative of an identity, the identity being uniquely indicative of the respective security document and being stored in a data store to allow for duplication of the security document to be determined.

Optionally, the security document includes anti-forgery protection, the security document having disposed thereon or therein coded data including a plurality of coded data portions, each coded data portion being indicative of: an identity of the currency document; and at least part of a signature, the signature being formed by encrypting at least part of the identity using a private key of public/private key pair, such that: valid security documents can only be created using the private key; and, validity of the security document can be confirmed using the corresponding public key.

Optionally, the system is further used for a method of recovering a stolen security document, the security document having disposed thereon or therein coded data including a number of coded data portions, each coded data portion being indicative of at least an identity of the security document, the method including in a computer system: receiving indicating data from a sensing device, the sensing device being responsive to sensing of the coded data to generate indicating data at least partially indicative of the identity; determining, using the indicating data, a determined identity; accessing, using the determined identity, transaction data stored in a data store, the transaction data being indicative of a security document status; determining, using the security document status, if the security document is stolen; and, in response to a positive determination, causing the security document to be recovered.

In another broad form the invention provides a system for recording a transaction relating to a security document, the security document having disposed thereon or therein coded data including a number of coded data portions, each coded data portion being indicative of at least an identity of the security document, the system including a sensing device for: sensing at least one coded data portion; determining, using the at least one sensed coded data portion, indicating data indicative of the identity of the security document; and, transferring the indicating data to a computer system, the computer system being responsive to the indicating data to update transaction data stored in a data store, transaction data being indicative of: the identity of the security document; and, the transaction.

In a ninth broad form the invention provides a method for monitoring transactions involving security documents, each security document having disposed thereon or therein coded data including a number of coded data portions, each coded data portion being indicative of at least an identity of the security document, the method including, in a computer system and following a transaction involving a security document: receiving indicating data from a sensing device, the sensing device being responsive to sensing of coded data to generate indicating data at least partially indicative of: the identity of the security document; and, the transaction; updating, using the received indicating data, transaction data stored in a data store, the transaction data being indicative of, for each of a number of security documents, performed transactions; comparing the transaction data to one or more predetermined patterns to thereby determine the presence or absence of a cash flow anomaly.

Optionally, the comparison is performed using at least one of:Data mining detection; and, Neural network detection. Optionally, each predetermined pattern is at least partially related to at least one of: a predetermined transaction value; a predetermined number of transactions performed in a predetermined timeframe; an identity of a particular party; a sequence of transactions related to one or more security documents; a cash flow demand forecast; and, a geographic trend.

Optionally, the computer system includes a display device, wherein the method includes displaying, using the display device, at least one of: the comparison data; and, the transaction data.

Optionally, the method includes generating, using the transaction data, at least one of: a cash flow demand forecast; and, a geographic trend.

Optionally, each coded data portion is further indicative of at least part of a signature, the signature being a digital signature of at least part of the identity, and wherein the method includes, in the computer system: determining, from the indicating data, a determined identity and at least one determined signature part; and, authenticating the security document using the determined identity and the at least one determined signature part.

Optionally, the signature is a digital signature of at least part of the identity and at least part of predetermined padding, the padding being at least one of: a predetermined number; and, a random number.

Optionally, the entire signature is encoded within a plurality of coded data portions and wherein the system includes the sensing device configured to sense a number of coded data portions to thereby determine the entire signature.

Optionally, the coded data includes a plurality of layouts, each layout defining the position of a plurality of first symbols encoding the identity, and a plurality of second symbols defining at least part of the signature.

Optionally, the coded data is substantially invisible to an unaided human.

Optionally, the coded data is printed on the surface using at least one of: an invisible ink; and, an infrared-absorptive ink.

Optionally, the coded data is provided substantially coincident with visible human-readable information.

Optionally at least one coded data portion encodes the entire signature.

Optionally the entire signature is formed from a plurality of signature parts, and wherein each coded data portion encodes a respective signature part.

Optionally, at least some of the coded data portions encode at least one of: a location of the respective coded data portion; a position of the respective coded data portion on the surface; a size of the coded data portions; a size of a signature; an identity of a signature part; and, units of indicated locations.

Optionally, the coded data includes at least one of: redundant data; data allowing error correction; Reed-Solomon data; and, Cyclic Redundancy Check (CRC) data.

Optionally, the digital signature includes at least one of: a random number associated with the identity; a keyed hash of at least the identity; a keyed hash of at least the identity produced using a private key, and verifiable using a corresponding public key; cipher-text produced by encrypting at least the identity; cipher-text produced by encrypting at least the identity and a random number; and, cipher-text produced using a private key, and verifiable using a corresponding public key; and, cipher-text produced using RSA encryption.

Optionally, the security document is at least one of: a currency note; a check; a credit or debit card; a redeemable ticket, voucher, or coupon; a lottery ticket or instant win ticket; and, an identity card or document, such as a driver's license or passport.

Optionally, the identity is indicative of at least one of: a currency note attribute including at least one of: currency; issue country; denomination; note side; printing works; and serial number; a check attribute including at least one of: currency; issuing institution; account number; serial number; expiry date; check value; and limit; a card attribute including at least one of: card type; issuing institution; account number; issue date; expiry date; and limit.

Optionally, the coded data is arranged in accordance with at least one layout having n-fold rotational symmetry, where n is at least two, the layout including n identical sub-layouts rotated 1/n revolutions apart about a centre of rotation, at least one sub-layout including rotation-indicating data that distinguishes that sub-layout from each other sub-layout.

Optionally, the coded data is arranged in accordance with at least one layout having n-fold rotational symmetry, where n is at least two, the layout encoding orientation-indicating data comprising a sequence of an integer multiple m of n symbols, where m is one or more, each encoded symbol being distributed at n locations about a centre of rotational symmetry of the layout such that decoding the symbols at each of the n orientations of the layout produces n representations of the orientation-indicating data, each representation comprising a different cyclic shift of the orientation-indicating data and being indicative of the degree of rotation of the layout.

Optionally, the method is further used for tracking a security document, the method including, in a computer system: receiving indicating data from a sensing device, the sensing device being responsive to sensing of the coded data to generate indicating data indicative of the identity of the product item; and, updating, using the received indicating data, tracking data stored in a data store, tracking data being indicative of: the identity of the product item; and, tracking information.

Optionally, the sensing device includes: a housing adapted to be held by a user in use; a radiation source for exposing at least one coded data portion; a sensor for sensing the at least one exposed coded data portion; and, a processor for determining, using the at least one sensed coded data portion, a sensed identity.

Optionally, the method is further used for determining a counterfeit security document, each coded data portion being further indicative of at least part of a signature, the signature being a digital signature of at least part of the identity, wherein the method further includes: in a sensing device: generating, using the sensed coded data portion, indicating data indicative of: the identity; and, at least one signature part; and, in a processor: determining, from the indicating data: a determined identity; and, at least one determined signature part; and, determining if the security document is a counterfeit document using the determined identity and the at least one determined signature part.

Optionally, the method is further used for determining a possible duplicated security document, wherein the method includes, in a computer system: receiving indicating data from a sensing device, the sensing device being responsive to sensing of the coded data to generate indicating data indicative of the identity of the security document; determining, from the indicating data, a determined identity; accessing, using the determined identity, tracking data indicative of: the identity of the security document; and, tracking information indicative of the location of the security document; and, determining, using the tracking information, if the security document is a possible duplicate.

Optionally, the method is used in a currency counter for counting currency documents, each currency document having disposed thereon or therein coded data including a number of coded data portions, each coded data portion being indicative of an identity of the currency document, the counter including: an input for receiving a number of currency documents to be counted; an output for providing counted currency documents; a feed mechanism for transporting currency documents from the input to the output along a feed path; a sensor for sensing at least one coded data portion for each currency document transported along the feed path; and, a processor for: determining, from the at least one sensed coded data portion, a sensed identity for each currency document; determining, from the sensed identity, a determined value for each currency document; and, counting the currency documents using the determined values.

Optionally, the security document having a security feature, wherein the method of providing the security document includes: creating the security document; determining an identity associated with the security document; generating a signature using the identity, the signature being a digital signature of at least part of the identity; generating coded data, the coded data including a number of coded data portions, each coded data portion being indicative of: the identity of the security document; and, at least part of the signature; and, printing the coded data on the security document.

Optionally, the security document being printed with a security feature, wherein the method of printing the security document includes: receiving the security document; receiving identity data, the identity data being at least partially indicative of an identity of the security document, the identity data being encrypted using a public key; determining the identity by decrypting the received identity data using a secret key associated with the public key; generating a signature using the determined identity, the signature being a digital signature of at least part of the identity; generating coded data at least partially indicative of: the identity of the security document; and, at least part of the signature; and, printing the coded data on the security document.

Optionally, the method is used in a system for recording a transaction relating to a security document, the system including a computer system for: receiving indicating data from a sensing device, the sensing device being responsive to sensing of the coded data to generate indicating data at least partially indicative of: the identity of the security document; and, the transaction; and, updating, using the received indicating data, transaction data stored in a data store, the transaction data being indicative of: the identity of the security document; and, the transaction.

Optionally, the method includes using a security document database, the database storing security document data including, for each of a number of security documents: identity data, the identity data being at least partially indicative of an identity of the security document; attribute data, the attribute data being at least partially indicative of one or more attributes of the security document; wherein, in use, the security document database allows a computer system to: receive, from a sensing device, indicating data at least partially indicative of at least one of: the identity; and one or more attributes; use the received indicating data and the security document data to perform an action associated with the security document.

Optionally, the method is further used for causing a computer system to monitor transactions involving security documents, the method being performed using a set of instructions, each security document having disposed thereon or therein coded data including a number of coded data portions, each coded data portion being indicative of at least an identity of the security document, the set of instructions, when executed by the computer system, causing the computer system to: receive indicating data from a sensing device, the sensing device being responsive to sensing of coded data to generate indicating data at least partially indicative of: the identity of the security document; and, the transaction; updating, using the received indicating data, transaction data stored in a data store, the transaction data being indicative of: the identity of the security document; and, the transaction.

Optionally, the method is further used for counting currency documents, the method being performed using a set of instructions, each currency document having disposed therein or thereon at least one coded data portion being indicative of at least an identity of the currency document, the currency counter having: an input for receiving a number of currency documents to be counted; an output for providing counted currency documents; a feed mechanism for transporting currency documents from the input to the output along a feed path; a sensor for sensing at least one coded data portion for each currency document transported along the feed path; and, a processor, the set of instructions, when executed by the processor, causing the processor to: determine, from the at least one sensed coded data portion, a sensed identity for each currency document; determine, from the sensed identity, a determined value for each currency document; and, count the currency documents using the determined values.

Optionally, the method is used in a processor for use in a device for authenticating security documents, the coded data further being at least partially indicative of a signature, the signature being a digital signature of at least part of the identity, the processor being adapted to: receive indicating data from a sensor in the device, the sensor being responsive to sensing of the coded data to generate indicating data at least partially indicative of: the identity; and, at least part of the signature; determine, from the indicating data, a determined identity and at least one determined signature part; and, authenticate the security document using the determined identity and the at least one determined signature part.

Optionally, the method is further used for counting currency documents, each currency document having disposed thereon or therein coded data including a plurality of coded data portions, each coded data portion being at least partially indicative of an identity of the currency document, the method including, in a sensing device: sensing at least one coded data portion for each currency document; generating, using the sensed coded data portion, indicating data at least partially indicative of the identity of each currency document; and, transferring the indicating data to a computer system, the computer system being responsive to the indicating data to: determine, using the indicating data, a determined identity for each currency document; determine, using each determined identity, a value for each currency document; and, count the currency documents using the determined values.

Optionally, the method further being used for authenticating and evaluating a currency document, the currency document having disposed thereon or therein coded data including a plurality of coded data portions, the method including, in a sensing device: sensing at least one coded data portion; generating, using the sensed coded data portion, indicating data at least partially indicative of: an identity of the currency document; and at least part of a signature, the signature being a digital signature of at least part of the identity; and, transferring the indicating data to a computer system, the computer system being responsive to the indicating data to: determine, from the indicating data, a received identity, and a received signature part; authenticate the currency document using the received identity and the received signature part; and, in response to a successful authentication, determine, using the received identity, a value associated with the currency document.

Optionally, the security document includes anti-copy protection, the identity being uniquely indicative of the respective security document and being stored in a data store to allow for duplication of the security document to be determined.

Optionally, the security document includes anti-forgery protection, each coded data portion being further indicative of at least part of a signature, the signature being formed by encrypting at least part of the identity using a private key of public/private key pair, such that: valid security documents can only be created using the private key; and, validity of the security document can be confirmed using the corresponding public key.

Optionally, the method is further used for recovering a stolen security document, the method including in a computer system: receiving indicating data from a sensing device, the sensing device being responsive to sensing of the coded data to generate indicating data at least partially indicative of the identity; determining, using the indicating data, a determined identity; accessing, using the determined identity, transaction data stored in a data store, the transaction data being indicative of a security document status; determining, using the security document status, if the security document is stolen; and, in response to a positive determination, causing the security document to be recovered.

In another broad form the invention provides a method for monitoring transactions involving security documents, each security document having disposed thereon or therein coded data including a number of coded data portions, each coded data portion being indicative of at least an identity of the security document, the method including, in a sensing device and following a transaction involving a security document: sensing at least one coded data portion; determining, using the at least one sensed coded data portion, indicating data indicative of the identity of the security document; and, transferring the indicating data to a computer system, the computer system being responsive to the indicating data to update tracking data stored in a data store, the transaction data being indicative of, for each of a number of security documents, performed transactions, and comparing the transaction data to one or more predetermined patterns to thereby determine the presence or absence of a cash flow anomaly.

In an tenth broad form the invention provides a security document database, the database storing security document data including, for each of a number of security documents: identity data, the identity data being at least partially indicative of an identity of the security document; attribute data, the attribute data being at least partially indicative of one or more attributes of the security document; wherein, in use, the security document database allows a computer system to: receive, from a sensing device, indicating data at least partially indicative of at least one of: the identity; and one or more attributes; use the received indicating data and the security document data to perform an action associated with the security document.

Optionally, the attribute data is at least partially indicative of a signature, the signature being a digital signature of the identity, and wherein the action includes the computer system authenticating the security document.

Optionally, the attribute data is at least partially indicative of a transaction status, and wherein the action includes allowing the computer system to perform at least one of: verifying the transaction status of the security document; and, updating the transaction status of the security document.

Optionally, the transaction status is at least partially indicative of whether the security document is at least one of: a copied security document; a stolen security document; and, a counterfeit security document.

Optionally, the database can be queried in order to determine the presence or absence of a cash flow anomaly.

Optionally, the database stores a key pair for each security document, the key pair being indexed in the database by the identity associated with the security document.

Optionally, the attribute data is at least partially indicative of at least one: a transaction history data representing transactions related to the security document including: a transaction type including at least one of: transaction details; identities of parties involved in the transaction; a transaction amount; a location of the transaction; and, a location of the sensing device; a currency note attribute including at least one of: currency; issue country; denomination; note side; printing works; and serial number; a check attribute including at least one of: currency; issuing institution; account number; serial number; expiry date; check value; and limit; a card attribute including at least one of: card type; issuing institution; account number; issue date; expiry date; and limit.

Optionally, each coded data portion is further indicative of at least part of a signature, the signature being a digital signature of at least part of the identity, and wherein the system is configured to: determine, from the indicating data, a determined identity and at least one determined signature part; and, authenticate the security document using the determined identity and the at least one determined signature part.

Optionally, the signature is a digital signature of at least part of the identity and at least part of predetermined padding, the padding being at least one of: a predetermined number; and, a random number.

Optionally, the entire signature is encoded within a plurality of coded data portions and wherein the system includes the sensing device configured to sense a number of coded data portions to thereby determine the entire signature.

Optionally, the coded data includes a plurality of layouts, each layout defining the position of a plurality of first symbols encoding the identity, and a plurality of second symbols defining at least part of the signature.

Optionally, the coded data is substantially invisible to an unaided human.

Optionally, the coded data is printed on the surface using at least one of: an invisible ink; and, an infrared-absorptive ink.

Optionally, the coded data is provided substantially coincident with visible human-readable information.

Optionally at least one coded data portion encodes the entire signature.

Optionally the entire signature is formed from a plurality of signature parts, and wherein each coded data portion encodes a respective signature part.

Optionally, at least some of the coded data portions encode at least one of: a location of the respective coded data portion; a position of the respective coded data portion on the surface; a size of the coded data portions; a size of a signature; an identity of a signature part; and, units of indicated locations.

Optionally, the coded data includes at least one of: redundant data; data allowing error correction; Reed-Solomon data; and, Cyclic Redundancy Check (CRC) data.

Optionally, the digital signature includes at least one of: a random number associated with the identity; a keyed hash of at least the identity; a keyed hash of at least the identity produced using a private key, and verifiable using a corresponding public key; cipher-text produced by encrypting at least the identity; cipher-text produced by encrypting at least the identity and a random number; and, cipher-text produced using a private key, and verifiable using a corresponding public key; and, cipher-text produced using RSA encryption.

Optionally, the security document is at least one of: a currency note; a check; a credit or debit card; a redeemable ticket, voucher, or coupon; a lottery ticket or instant win ticket; and, an identity card or document, such as a driver's license or passport.

Optionally, the coded data is arranged in accordance with at least one layout having n-fold rotational symmetry, where n is at least two, the layout including n identical sub-layouts rotated 1/n revolutions apart about a centre of rotation, at least one sub-layout including rotation-indicating data that distinguishes that sub-layout from each other sub-layout.

Optionally, the coded data is arranged in accordance with at least one layout having n-fold rotational symmetry, where n is at least two, the layout encoding orientation-indicating data comprising a sequence of an integer multiple m of n symbols, where m is one or more, each encoded symbol being distributed at n locations about a centre of rotational symmetry of the layout such that decoding the symbols at each of the n orientations of the layout produces n representations of the orientation-indicating data, each representation comprising a different cyclic shift of the orientation-indicating data and being indicative of the degree of rotation of the layout.

Optionally, the security document database is used in a method of tracking a security document, the security document having disposed thereon or therein coded data including a number of coded data portions, each coded data portion being indicative of an identity of the security document, the method including, in a computer system: receiving indicating data from a sensing device, the sensing device being responsive to sensing of the coded data to generate indicating data indicative of the identity of the product item; and, updating, using the received indicating data, tracking data stored in a data store, tracking data being indicative of: the identity of the product item; and, tracking information.

Optionally, the sensing device includes: a housing adapted to be held by a user in use; a radiation source for exposing at least one coded data portion; a sensor for sensing the at least one exposed coded data portion; and, a processor for determining, using the at least one sensed coded data portion, a sensed identity.

Optionally, the security document database is used in a method of determining a counterfeit security document, the security document having disposed thereon or therein coded data including a number of coded data portions, each coded data portion being indicative of: an identity of the security document; and, at least part of a signature, the signature being a digital signature of at least part of the identity; wherein the method includes: in a sensing device: sensing at least one coded data portion; and, generating, using the sensed coded data portion, indicating data indicative of: the identity; and, at least one signature part; in a processor: determining, from the indicating data: a determined identity; and, at least one determined signature part; determining if the security document is a counterfeit document using the determined identity and the at least one determined signature part.

Optionally, the security document database is used in a method of determining a possible duplicated security document, the security document having disposed thereon or therein coded data including a number of coded data portions, each coded data portion being indicative of at least an identity of the security document, and wherein the method includes, in a computer system: receiving indicating data from a sensing device, the sensing device being responsive to sensing of the coded data to generate indicating data indicative of the identity of the security document; determining, from the indicating data, a determined identity; accessing, using the determined identity, tracking data indicative of: the identity of the security document; and, tracking information indicative of the location of the security document; and, determining, using the tracking information, if the security document is a possible duplicate.

Optionally, the security document database is used by currency counter for counting currency documents, each currency document having disposed thereon or therein coded data including a number of coded data portions, each coded data portion being indicative of an identity of the currency document, the counter including: an input for receiving a number of currency documents to be counted; an output for providing counted currency documents; a feed mechanism for transporting currency documents from the input to the output along a feed path; a sensor for sensing at least one coded data portion for each currency document transported along the feed path; and, a processor for: determining, from the at least one sensed coded data portion, a sensed identity for each currency document; determining, from the sensed identity, a determined value for each currency document; and, counting the currency documents using the determined values.

Optionally, the security document database is used in a method of providing a security document having a security feature, the method including: creating the security document; determining an identity associated with the security document; generating a signature using the identity, the signature being a digital signature of at least part of the identity; generating coded data, the coded data including a number of coded data portions, each coded data portion being indicative of: the identity of the security document; and, at least part of the signature; and, printing the coded data on the security document.

Optionally, the security document database is used in a method of printing a security document having a security feature, the method including: receiving the security document; receiving identity data, the identity data being at least partially indicative of an identity of the security document, the identity data being encrypted using a public key; determining the identity by decrypting the received identity data using a secret key associated with the public key; generating a signature using the determined identity, the signature being a digital signature of at least part of the identity; generating coded data at least partially indicative of: the identity of the security document; and, at least part of the signature; and, printing the coded data on the security document.

Optionally, the security document database is used in a system for recording a transaction relating to a security document, the security document having disposed thereon or therein coded data including a number of coded data portions, each coded data portion being indicative of at least an identity of the security document, the system including a computer system for: receiving indicating data from a sensing device, the sensing device being responsive to sensing of the coded data to generate indicating data at least partially indicative of: the identity of the security document; and, the transaction; and, updating, using the received indicating data, transaction data stored in a data store, the transaction data being indicative of: the identity of the security document; and, the transaction.

Optionally, the security document database is used in a method for monitoring transactions involving security documents, each security document having disposed thereon or therein coded data including a number of coded data portions, each coded data portion being indicative of at least an identity of the security document, the method including, in a computer system and following a transaction involving a security document: receiving indicating data from a sensing device, the sensing device being responsive to sensing of coded data to generate indicating data at least partially indicative of: the identity of the security document; and, the transaction; updating, using the received indicating data, transaction data stored in a data store, the transaction data being indicative of, for each of a number of security documents, performed transactions; comparing the transaction data to one or more predetermined patterns to thereby determine the presence or absence of a cash flow anomaly.

Optionally, the security document database is used by set of instructions for causing a computer system to monitor transactions involving security documents, each security document having disposed thereon or therein coded data including a number of coded data portions, each coded data portion being indicative of at least an identity of the security document, the set of instructions, when executed by the computer system, causing the computer system to: receive indicating data from a sensing device, the sensing device being responsive to sensing of coded data to generate indicating data at least partially indicative of: the identity of the security document; and, the transaction; updating, using the received indicating data, transaction data stored in a data store, the transaction data being indicative of: the identity of the security document; and, the transaction.

Optionally, the security document database is used by a set of instructions for a currency counter, the currency counter being used for counting currency documents where each currency document having disposed therein or thereon at least one coded data portion being indicative of at least an identity of the currency document, the currency counter having: an input for receiving a number of currency documents to be counted; an output for providing counted currency documents; a feed mechanism for transporting currency documents from the input to the output along a feed path; a sensor for sensing at least one coded data portion for each currency document transported along the feed path; and, a processor, the set of instructions, when executed by the processor, causing the processor to: determine, from the at least one sensed coded data portion, a sensed identity for each currency document; determine, from the sensed identity, a determined value for each currency document; and, count the currency documents using the determined values.

Optionally, the security document database is used by a processor for use in a device for authenticating security documents, the security document having disposed thereon or therein coded data at least partially indicative of an identity of the security document and a signature, the signature being a digital signature of at least part of the identity, the processor being adapted to: receive indicating data from a sensor in the device, the sensor being responsive to sensing of the coded data to generate indicating data at least partially indicative of: the identity; and, at least part of the signature; determine, from the indicating data, a determined identity and at least one determined signature part; and, authenticate the security document using the determined identity and the at least one determined signature part.

Optionally, the security document database is used in a method of counting currency documents, each currency document having disposed thereon or therein coded data including a plurality of coded data portions, each coded data portion being at least partially indicative of an identity of the currency document, the method including, in a sensing device: sensing at least one coded data portion for each currency document; generating, using the sensed coded data portion, indicating data at least partially indicative of the identity of each currency document; and, transferring the indicating data to a computer system, the computer system being responsive to the indicating data to: determine, using the indicating data, a determined identity for each currency document; determine, using each determined identity, a value for each currency document; and, count the currency documents using the determined values.

Optionally, the security document database is used in a method for authenticating and evaluating a currency document, the currency document having disposed thereon or therein coded data including a plurality of coded data portions, the method including, in a sensing device: sensing at least one coded data portion; generating, using the sensed coded data portion, indicating data at least partially indicative of: an identity of the currency document; and at least part of a signature, the signature being a digital signature of at least part of the identity; and, transferring the indicating data to a computer system, the computer system being responsive to the indicating data to: determine, from the indicating data, a received identity, and a received signature part; authenticate the currency document using the received identity and the received signature part; and, in response to a successful authentication, determine, using the received identity, a value associated with the currency document.

Optionally, the security document includes anti-copy protection, the security document having disposed thereon or therein coded data including a number of coded data portions, each coded data portion being indicative of an identity, the identity being uniquely indicative of the respective security document and being stored in a data store to allow for duplication of the security document to be determined.

Optionally, the security document includes anti-forgery protection, the security document having disposed thereon or therein coded data including a plurality of coded data portions, each coded data portion being indicative of: an identity of the currency document; and at least part of a signature, the signature being formed by encrypting at least part of the identity using a private key of public/private key pair, such that: valid security documents can only be created using the private key; and, validity of the security document can be confirmed using the corresponding public key.

Optionally, the security document database is used in a method of recovering a stolen security document, the security document having disposed thereon or therein coded data including a number of coded data portions, each coded data portion being indicative of at least an identity of the security document, the method including in a computer system: receiving indicating data from a sensing device, the sensing device being responsive to sensing of the coded data to generate indicating data at least partially indicative of the identity; determining, using the indicating data, a determined identity; accessing, using the determined identity, transaction data stored in a data store, the transaction data being indicative of a security document status; determining, using the security document status, if the security document is stolen; and, in response to a positive determination, causing the security document to be recovered.

In a eleventh broad form the invention provides a set of instructions for causing a computer system to monitor transactions involving security documents, each security document having disposed thereon or therein coded data including a number of coded data portions, each coded data portion being indicative of at least an identity of the security document, the set of instructions, when executed by the computer system, causing the computer system to: receive indicating data from a sensing device, the sensing device being responsive to sensing of coded data to generate indicating data at least partially indicative of: the identity of the security document; and, the transaction; update, using the received indicating data, transaction data stored in a data store, the transaction data being indicative of: the identity of the security document; and, the transaction.

Optionally, the set of instructions causes the computer system to compare the transaction data to one or more predetermined patterns to thereby determine the presence or absence of a cash flow anomaly.

Optionally, the set of instructions causes comparison data to be output by the computer system, the comparison data being indicative of the results of the comparison.

Optionally, each predetermined pattern is at least partially related to at least one of: a predetermined transaction threshold; a predetermined number of transactions performed in a predetermined timeframe; an identity of a particular party; a sequence of transactions related to one or more security documents; a cash flow demand forecast; and, a geographic trend.

Optionally, the computer system includes a display device, wherein the set of instructions, when executed by the computer system, cause the computer system to display, using the display device, at least one of: the comparison data; and, the transaction data.

Optionally, the transaction data includes a transaction status indicative of whether the security document is at least one of: a copied security document; a stolen security document; and, a counterfeit security document.

Optionally, each coded data portion is further indicative of at least part of a signature, the signature being a digital signature of at least part of the identity, and wherein the set of instructions, when executed by the computer system, cause the computer system to: determine, from the indicating data, a determined identity and at least one determined signature part; and, authenticate the security document using the determined identity and the at least one determined signature part.

Optionally, the signature is a digital signature of at least part of the identity and at least part of predetermined padding, the padding being at least one of: a predetermined number; and, a random number.

Optionally, the entire signature is encoded within a plurality of coded data portions and wherein the system includes the sensing device configured to sense a number of coded data portions to thereby determine the entire signature.

Optionally, the coded data includes a plurality of layouts, each layout defining the position of a plurality of first symbols encoding the identity, and a plurality of second symbols defining at least part of the signature.

Optionally, the coded data is substantially invisible to an unaided human.

Optionally, the coded data is printed on the surface using at least one of: an invisible ink; and, an infrared-absorptive ink.

Optionally, the coded data is provided substantially coincident with visible human-readable information.

Optionally at least one coded data portion encodes the entire signature.

Optionally the entire signature is formed from a plurality of signature parts, and wherein each coded data portion encodes a respective signature part.

Optionally, at least some of the coded data portions encode at least one of: a location of the respective coded data portion; a position of the respective coded data portion on the surface; a size of the coded data portions; a size of a signature; an identity of a signature part; and, units of indicated locations.

Optionally, the coded data includes at least one of: redundant data; data allowing error correction; Reed-Solomon data; and, Cyclic Redundancy Check (CRC) data.

Optionally, the digital signature includes at least one of: a random number associated with the identity; a keyed hash of at least the identity; a keyed hash of at least the identity produced using a private key, and verifiable using a corresponding public key; cipher-text produced by encrypting at least the identity; cipher-text produced by encrypting at least the identity and a random number; and, cipher-text produced using a private key, and verifiable using a corresponding public key; and, cipher-text produced using RSA encryption.

Optionally, the security document is at least one of: a currency note; a check; a credit or debit card; a redeemable ticket, voucher, or coupon; a lottery ticket or instant win ticket; and, an identity card or document, such as a driver's license or passport.

Optionally, the identity is indicative of at least one of: a currency note attribute including at least one of: currency; issue country; denomination; note side; printing works; and serial number; a check attribute including at least one of: currency; issuing institution; account number; serial number; expiry date; check value; and limit; a card attribute including at least one of: card type; issuing institution; account number; issue date; expiry date; and limit.

Optionally, the coded data is arranged in accordance with at least one layout having n-fold rotational symmetry, where n is at least two, the layout including n identical sub-layouts rotated 1/n revolutions apart about a centre of rotation, at least one sub-layout including rotation-indicating data that distinguishes that sub-layout from each other sub-layout.

Optionally, the coded data is arranged in accordance with at least one layout having n-fold rotational symmetry, where n is at least two, the layout encoding orientation-indicating data comprising a sequence of an integer multiple m of n symbols, where m is one or more, each encoded symbol being distributed at n locations about a centre of rotational symmetry of the layout such that decoding the symbols at each of the n orientations of the layout produces n representations of the orientation-indicating data, each representation comprising a different cyclic shift of the orientation-indicating data and being indicative of the degree of rotation of the layout.

Optionally, the set of instructions, when executed in the computer system further performs a method of tracking the security document, the method including, in a computer system: receiving indicating data from a sensing device, the sensing device being responsive to sensing of the coded data to generate indicating data indicative of the identity of the product item; and, updating, using the received indicating data, tracking data stored in a data store, tracking data being indicative of: the identity of the security document; and, tracking information.

Optionally, the sensing device includes: a housing adapted to be held by a user in use; a radiation source for exposing at least one coded data portion; a sensor for sensing the at least one exposed coded data portion; and, a processor for determining, using the at least one sensed coded data portion, a sensed identity.

Optionally, the set of instructions, when executed in the computer system further performs a method of determining a counterfeit security document, the security document having disposed thereon or therein coded data including a number of coded data portions, each coded data portion being indicative of: an identity of the security document; and, at least part of a signature, the signature being a digital signature of at least part of the identity; wherein the method includes: in a sensing device: sensing at least one coded data portion; and, generating, using the sensed coded data portion, indicating data indicative of: the identity; and, at least one signature part; in a processor: determining, from the indicating data: a determined identity; and, at least one determined signature part; determining if the security document is a counterfeit document using the determined identity and the at least one determined signature part.

Optionally, the set of instructions, when executed in the computer system further performs a method of determining a possible duplicated security document, wherein the method includes, in a computer system: receiving indicating data from a sensing device, the sensing device being responsive to sensing of the coded data to generate indicating data indicative of the identity of the security document; determining, from the indicating data, a determined identity; accessing, using the determined identity, tracking data indicative of: the identity of the security document; and, tracking information indicative of the location of the security document; and, determining, using the tracking information, if the security document is a possible duplicate.

Optionally, the computer system is a currency counter and the security document is a currency document, and where the set of instructions, when executed in the currency counter, causes the currency counter to count currency documents, the counter including: an input for receiving a number of currency documents to be counted; an output for providing counted currency documents; a feed mechanism for transporting currency documents from the input to the output along a feed path; a sensor for sensing at least one coded data portion for each currency document transported along the feed path; and, a processor for: determining, from the at least one sensed coded data portion, a sensed identity for each currency document; determining, from the sensed identity, a determined value for each currency document; and, counting the currency documents using the determined values.

Optionally, the set of instructions, when executed in the computer system further performs a method of providing a security document having a security feature, the method including: creating the security document; determining an identity associated with the security document; generating a signature using the identity, the signature being a digital signature of at least part of the identity; generating coded data, the coded data including a number of coded data portions, each coded data portion being indicative of: the identity of the security document; and, at least part of the signature; and, printing the coded data on the security document.

Optionally, the set of instructions, when executed in the computer system further performs a method of printing the security document having a security feature, the method including: receiving the security document; receiving identity data, the identity data being at least partially indicative of an identity of the security document, the identity data being encrypted using a public key; determining the identity by decrypting the received identity data using a secret key associated with the public key; generating a signature using the determined identity, the signature being a digital signature of at least part of the identity; generating coded data at least partially indicative of: the identity of the security document; and, at least part of the signature; and, printing the coded data on the security document.

Optionally, the set of instructions, when executed in the computer system further records a transaction relating to the security document, the system including a computer system for: receiving indicating data from a sensing device, the sensing device being responsive to sensing of the coded data to generate indicating data at least partially indicative of: the identity of the security document; and, the transaction; and, updating, using the received indicating data, transaction data stored in a data store, the transaction data being indicative of: the identity of the security document; and, the transaction.

Optionally, the set of instructions, when executed in the computer system further performs a method for monitoring transactions involving the security document, the method including, in a computer system and following a transaction involving the security document: receiving indicating data from a sensing device, the sensing device being responsive to sensing of coded data to generate indicating data at least partially indicative of: the identity of the security document; and, the transaction; updating, using the received indicating data, transaction data stored in a data store, the transaction data being indicative of, for each of a number of security documents, performed transactions; comparing the transaction data to one or more predetermined patterns to thereby determine the presence or absence of a cash flow anomaly.

Optionally, the set of instructions, when executed in the computer system further operate as a security document database, the database storing security document data including, for each of a number of security documents: identity data, the identity data being at least partially indicative of an identity of the security document; attribute data, the attribute data being at least partially indicative of one or more attributes of the security document; wherein, in use, the security document database allows a computer system to: receive, from a sensing device, indicating data at least partially indicative of at least one of: the identity; and one or more attributes; use the received indicating data and the security document data to perform an action associated with the security document.

Optionally, the computer system is a currency counter and the security document is a currency document, and where the set of instructions, when executed in the currency counter cause the currency counter to count currency documents, the currency counter having: an input for receiving a number of currency documents to be counted; an output for providing counted currency documents; a feed mechanism for transporting currency documents from the input to the output along a feed path; a sensor for sensing at least one coded data portion for each currency document transported along the feed path; and, a processor, the set of instructions, when executed by the processor, causing the processor to: determine, from the at least one sensed coded data portion, a sensed identity for each currency document; determine, from the sensed identity, a determined value for each currency document; and, count the currency documents using the determined values.

Optionally, the set of instructions, when executed in a processor for use in a device for authenticating security documents, cause the processor to: receive indicating data from a sensor in the device, the sensor being responsive to sensing of the coded data to generate indicating data at least partially indicative of: the identity; and, at least part of the signature; determine, from the indicating data, a determined identity and at least one determined signature part; and, authenticate the security document using the determined identity and the at least one determined signature part.

Optionally, the security document is a currency document and where the set of instructions, when executed in the computer system further performs a method of counting currency documents, the method including, in a sensing device: sensing at least one coded data portion for each currency document; generating, using the sensed coded data portion, indicating data at least partially indicative of the identity of each currency document; and, transferring the indicating data to the computer system, the computer system being responsive to the indicating data to: determine, using the indicating data, a determined identity for each currency document; determine, using each determined identity, a value for each currency document; and, count the currency documents using the determined values.

Optionally, the security document is a currency document and where the set of instructions, when executed in the computer system further performs a method for authenticating and evaluating a currency document, the method including, in a sensing device: sensing at least one coded data portion; generating, using the sensed coded data portion, indicating data at least partially indicative of: an identity of the currency document; and at least part of a signature, the signature being a digital signature of at least part of the identity; and, transferring the indicating data to a computer system, the computer system being responsive to the indicating data to: determine, from the indicating data, a received identity, and a received signature part; authenticate the currency document using the received identity and the received signature part; and, in response to a successful authentication, determine, using the received identity, a value associated with the currency document.

Optionally, the security document includes anti-copy protection, the identity being uniquely indicative of the respective security document and being stored in a data store to allow for duplication of the security document to be determined.

Optionally, the security document includes anti-forgery protection, each coded data portion being further indicative of at least part of a signature, the signature being formed by encrypting at least part of the identity using a private key of public/private key pair, such that: valid security documents can only be created using the private key; and, validity of the security document can be confirmed using the corresponding public key.

Optionally, the set of instructions, when executed in the computer system further performs a method of recovering a stolen security document, the method including in a computer system: receiving indicating data from a sensing device, the sensing device being responsive to sensing of the coded data to generate indicating data at least partially indicative of the identity; determining, using the indicating data, a determined identity; accessing, using the determined identity, transaction data stored in a data store, the transaction data being indicative of a security document status; determining, using the security document status, if the security document is stolen; and, in response to a positive determination, causing the security document to be recovered.

In a twelfth broad form the invention provides a set of instructions for a currency counter, the currency counter being used for counting currency documents where each currency document having disposed therein or thereon at least one coded data portion being indicative of at least an identity of the currency document, the currency counter having: an input for receiving a number of currency documents to be counted; an output for providing counted currency documents; a feed mechanism for transporting currency documents from the input to the output along a feed path; a sensor for sensing at least one coded data portion for each currency document transported along the feed path; and, a processor, the set of instructions, when executed by the processor, causing the processor to: determine, from the at least one sensed coded data portion, a sensed identity for each currency document; determine, from the sensed identity, a determined value for each currency document; and, count the currency documents using the determined values.

Optionally, each coded data portion is further indicative of at least part of a signature, the signature being a digital signature of at least part of the identity, wherein the set of instructions cause the processor to cause authentication of the currency documents, using the sensed identity and the at least one sensed signature part.

Optionally, the authentication is performed by at least one of: the processor; and, a computer system, wherein the processor: generates indicating data at least partially indicative of: the identity; and, at least part of the signature; and, transfers the indicating data to the computer system.

Optionally, the indicating data is transmitted to the computer system at least one of: after the currency counter scans: each currency document; a predetermined number of currency documents; and, the currency documents provided in the input; and, periodically.

Optionally, the currency counter includes a display device, the executed set of instructions causing the processor to display, using the display device at least one of: results of an authentication; at least one currency document value; and, a count total.

Optionally, the currency counter includes a data store for storing at least one: a key for authenticating the currency documents; and, padding for determining the signature; where the processor performs authentication using data cached in the data store.

Optionally, the set of instructions, when executed by the processor, cause the processor to: for each currency document, generate indicating data further indicative of at least one of: the time the currency counter scanned the currency document; currency document attributes; and, the location of the currency counter when the currency document was scanned.

Optionally, the signature is a digital signature of at least part of the identity and at least part of predetermined padding, the padding being at least one of: a predetermined number; and, a random number.

Optionally, the entire signature is encoded within a plurality of coded data portions and wherein the system includes the sensing device configured to sense a number of coded data portions to thereby determine the entire signature.

Optionally, the coded data includes a plurality of layouts, each layout defining the position of a plurality of first symbols encoding the identity, and a plurality of second symbols defining at least part of the signature.

Optionally, the coded data is substantially invisible to an unaided human.

Optionally, the coded data is printed on the surface using at least one of: an invisible ink; and, an infrared-absorptive ink.

Optionally, the coded data is provided substantially coincident with visible human-readable information.

Optionally at least one coded data portion encodes the entire signature.

Optionally the entire signature is formed from a plurality of signature parts, and wherein each coded data portion encodes a respective signature part.

Optionally, at least some of the coded data portions encode at least one of: a location of the respective coded data portion; a position of the respective coded data portion on the surface; a size of the coded data portions; a size of a signature; an identity of a signature part; and, units of indicated locations.

Optionally, the coded data includes at least one of: redundant data; data allowing error correction; Reed-Solomon data; and, Cyclic Redundancy Check (CRC) data.

Optionally, the digital signature includes at least one of: a random number associated with the identity; a keyed hash of at least the identity; a keyed hash of at least the identity produced using a private key, and verifiable using a corresponding public key; cipher-text produced by encrypting at least the identity; cipher-text produced by encrypting at least the identity and a random number; and, cipher-text produced using a private key, and verifiable using a corresponding public key; and, cipher-text produced using RSA encryption.

Optionally, the currency document is at least one of: a currency note; a check; a credit or debit card; a redeemable ticket, voucher, or coupon; a lottery ticket or instant win ticket; and, an identity card or document, such as a driver's license or passport.

Optionally, the identity is indicative of at least one of: a currency note attribute including at least one of: currency; issue country; denomination; note side; printing works; and serial number; a check attribute including at least one of: currency; issuing institution; account number; serial number; expiry date; check value; and limit; a card attribute including at least one of: card type; issuing institution; account number; issue date; expiry date; and limit.

Optionally, the coded data is arranged in accordance with at least one layout having n-fold rotational symmetry, where n is at least two, the layout including n identical sub-layouts rotated 1/n revolutions apart about a centre of rotation, at least one sub-layout including rotation-indicating data that distinguishes that sub-layout from each other sub-layout.

Optionally, the coded data is arranged in accordance with at least one layout having n-fold rotational symmetry, where n is at least two, the layout encoding orientation-indicating data comprising a sequence of an integer multiple m of n symbols, where m is one or more, each encoded symbol being distributed at n locations about a centre of rotational symmetry of the layout such that decoding the symbols at each of the n orientations of the layout produces n representations of the orientation-indicating data, each representation comprising a different cyclic shift of the orientation-indicating data and being indicative of the degree of rotation of the layout.

Optionally, the set of instructions, when executed in the computer system further performs a method of tracking the currency document, the method including, in a computer system: receiving indicating data from a sensing device, the sensing device being responsive to sensing of the coded data to generate indicating data indicative of the identity of the product item; and, updating, using the received indicating data, tracking data stored in a data store, tracking data being indicative of: the identity of the currency document; and, tracking information.

Optionally, the sensing device includes: a housing adapted to be held by a user in use; a radiation source for exposing at least one coded data portion; a sensor for sensing the at least one exposed coded data portion; and, a processor for determining, using the at least one sensed coded data portion, a sensed identity.

Optionally, the set of instructions, when executed in the computer system further performs a method of determining a counterfeit currency document, the currency document having disposed thereon or therein coded data including a number of coded data portions, each coded data portion being indicative of: an identity of the currency document; and, at least part of a signature, the signature being a digital signature of at least part of the identity; wherein the method includes: in a sensing device: sensing at least one coded data portion; and, generating, using the sensed coded data portion, indicating data indicative of: the identity; and, at least one signature part; in a processor: determining, from the indicating data: a determined identity; and, at least one determined signature part; determining if the currency document is a counterfeit document using the determined identity and the at least one determined signature part.

Optionally, the set of instructions, when executed in the computer system further performs a method of determining a possible duplicated currency document, wherein the method includes, in a computer system: receiving indicating data from a sensing device, the sensing device being responsive to sensing of the coded data to generate indicating data indicative of the identity of the currency document; determining, from the indicating data, a determined identity; accessing, using the determined identity, tracking data indicative of: the identity of the currency document; and, tracking information indicative of the location of the currency document; and, determining, using the tracking information, if the currency document is a possible duplicate.

Optionally, the set of instructions, when executed in the computer system further performs a method of providing a currency document having a currency feature, the method including: creating the currency document; determining an identity associated with the currency document; generating a signature using the identity, the signature being a digital signature of at least part of the identity; generating coded data, the coded data including a number of coded data portions, each coded data portion being indicative of: the identity of the currency document; and, at least part of the signature; and, printing the coded data on the currency document.

Optionally, the set of instructions, when executed in the computer system further performs a method of printing the currency document having a currency feature, the method including: receiving the currency document; receiving identity data, the identity data being at least partially indicative of an identity of the currency document, the identity data being encrypted using a public key; determining the identity by decrypting the received identity data using a secret key associated with the public key; generating a signature using the determined identity, the signature being a digital signature of at least part of the identity; generating coded data at least partially indicative of: the identity of the currency document; and, at least part of the signature; and, printing the coded data on the currency document.

Optionally, the set of instructions, when executed in the computer system further records a transaction relating to the currency document, the system including a computer system for: receiving indicating data from a sensing device, the sensing device being responsive to sensing of the coded data to generate indicating data at least partially indicative of: the identity of the currency document; and, the transaction; and, updating, using the received indicating data, transaction data stored in a data store, the transaction data being indicative of: the identity of the currency document; and, the transaction.

Optionally, the set of instructions, when executed in the computer system further performs a method for monitoring transactions involving the currency document, the method including, in a computer system and following a transaction involving the currency document: receiving indicating data from a sensing device, the sensing device being responsive to sensing of coded data to generate indicating data at least partially indicative of: the identity of the currency document; and, the transaction; updating, using the received indicating data, transaction data stored in a data store, the transaction data being indicative of, for each of a number of currency documents, performed transactions; comparing the transaction data to one or more predetermined patterns to thereby determine the presence or absence of a cash flow anomaly.

Optionally, the set of instructions, when executed in the computer system further operate as a currency document database, the database storing currency document data including, for each of a number of currency documents: identity data, the identity data being at least partially indicative of an identity of the currency document; attribute data, the attribute data being at least partially indicative of one or more attributes of the currency document; wherein, in use, the currency document database allows a computer system to: receive, from a sensing device, indicating data at least partially indicative of at least one of: the identity; and one or more attributes; use the received indicating data and the currency document data to perform an action associated with the currency document.

Optionally, the set of instructions cause the processor to monitor transactions involving currency documents including: receiving indicating data from a sensing device, the sensing device being responsive to sensing of coded data to generate indicating data at least partially indicative of: the identity of the currency document; and, the transaction; updating, using the received indicating data, transaction data stored in a data store, the transaction data being indicative of: the identity of the currency document; and, the transaction.

Optionally, the set of instructions, when executed in a processor for use in a device for authenticating currency documents, cause the processor to: receive indicating data from a sensor in the device, the sensor being responsive to sensing of the coded data to generate indicating data at least partially indicative of: the identity; and, at least part of the signature; determine, from the indicating data, a determined identity and at least one determined signature part; and, authenticate the currency document using the determined identity and the at least one determined signature part.

Optionally, the currency document is a currency document and where the set of instructions, when executed in the computer system further performs a method of counting currency documents, the method including, in a sensing device: sensing at least one coded data portion for each currency document; generating, using the sensed coded data portion, indicating data at least partially indicative of the identity of each currency document; and, transferring the indicating data to the computer system, the computer system being responsive to the indicating data to: determine, using the indicating data, a determined identity for each currency document; determine, using each determined identity, a value for each currency document; and, count the currency documents using the determined values.

Optionally, the currency document is a currency document and where the set of instructions, when executed in the computer system further performs a method for authenticating and evaluating a currency document, the method including, in a sensing device: sensing at least one coded data portion; generating, using the sensed coded data portion, indicating data at least partially indicative of: an identity of the currency document; and at least part of a signature, the signature being a digital signature of at least part of the identity; and, transferring the indicating data to a computer system, the computer system being responsive to the indicating data to: determine, from the indicating data, a received identity, and a received signature part; authenticate the currency document using the received identity and the received signature part; and, in response to a successful authentication, determine, using the received identity, a value associated with the currency document.

Optionally, the currency document includes anti-copy protection, the identity being uniquely indicative of the respective currency document and being stored in a data store to allow for duplication of the currency document to be determined.

Optionally, the currency document includes anti-forgery protection, each coded data portion being fturther indicative of at least part of a signature, the signature being formed by encrypting at least part of the identity using a private key of public/private key pair, such that: valid currency documents can only be created using the private key; and, validity of the currency document can be confirmed using the corresponding public key.

Optionally, the set of instructions, when executed in the computer system further performs a method of recovering a stolen currency document, the method including in a computer system: receiving indicating data from a sensing device, the sensing device being responsive to sensing of the coded data to generate indicating data at least partially indicative of the identity; determining, using the indicating data, a determined identity; accessing, using the determined identity, transaction data stored in a data store, the transaction data being indicative of a currency document status; determining, using the currency document status, if the currency document is stolen; and, in response to a positive determination, causing the currency document to be recovered.

In a thirteenth broad form the invention provides a processor for use in a device for authenticating security documents, the security document having disposed thereon or therein coded data at least partially indicative of an identity of the security document and a signature, the signature being a digital signature of at least part of the identity, the processor being adapted to: receive indicating data from a sensor in the device, the sensor being responsive to sensing of the coded data to generate indicating data at least partially indicative of: the identity; and, at least part of the signature; determine, from the indicating data, a determined identity and at least one determined signature part; and, authenticate the security document using the determined identity and the at least one determined signature part.

Optionally, the processor: determines, using the determined identity and a secret key, a determined signature; compares the determined signature to the at least one determined signature part; and, authenticates the security document using the results of the comparison.

Optionally, the processor stores a number of secret keys in a data store.

Optionally, the device includes a display device coupled to the processor and where the processor causes the display device to display the results of the authentication.

Optionally, the processor includes an internal memory forming the data store, and where the processor and internal memory are provided as a monolithic chip.

Optionally, each coded data portion is further indicative of at least part of a signature, the signature being a digital signature of at least part of the identity, and wherein the processor: determines, from the indicating data, a determined identity and at least one determined signature part; and, authenticates the security document using the determined identity and the at least one determined signature part.

Optionally, the signature is a digital signature of at least part of the identity and at least part of predetermined padding, the padding being at least one of: a predetermined number; and, a random number.

Optionally, the entire signature is encoded within a plurality of coded data portions and wherein the system includes the sensing device configured to sense a number of coded data portions to thereby determine the entire signature.

Optionally, the coded data includes a plurality of layouts, each layout defining the position of a plurality of first symbols encoding the identity, and a plurality of second symbols defining at least part of the signature.

Optionally, the coded data is substantially invisible to an unaided human.

Optionally, the coded data is printed on the surface using at least one of: an invisible ink; and, an infrared-absorptive ink.

Optionally, the coded data is provided substantially coincident with visible human-readable information.

Optionally at least one coded data portion encodes the entire signature.

Optionally the entire signature is formed from a plurality of signature parts, and wherein each coded data portion encodes a respective signature part.

Optionally, at least some of the coded data portions encode at least one of: a location of the respective coded data portion; a position of the respective coded data portion on the surface; a size of the coded data portions; a size of a signature; an identity of a signature part; and, units of indicated locations.

Optionally, the coded data includes at least one of: redundant data; data allowing error correction; Reed-Solomon data; and, Cyclic Redundancy Check (CRC) data.

Optionally, the digital signature includes at least one of: a random number associated with the identity; a keyed hash of at least the identity; a keyed hash of at least the identity produced using a private key, and verifiable using a corresponding public key; cipher-text produced by encrypting at least the identity; cipher-text produced by encrypting at least the identity and a random number; and, cipher-text produced using a private key, and verifiable using a corresponding public key; and, cipher-text produced using RSA encryption.

Optionally, the security document is at least one of: a currency note; a check; a credit or debit card; a redeemable ticket, voucher, or coupon; a lottery ticket or instant win ticket; and, an identity card or document, such as a driver's license or passport.

Optionally, the identity is indicative of at least one of: a currency note attribute including at least one of: currency; issue country; denomination; note side; printing works; and serial number; a check attribute including at least one of: currency; issuing institution; account number; serial number; expiry date; check value; and limit; a card attribute including at least one of: card type; issuing institution; account number; issue date; expiry date; and limit.

Optionally, the coded data is arranged in accordance with at least one layout having n-fold rotational symmetry, where n is at least two, the layout including n identical sub-layouts rotated 1/n revolutions apart about a centre of rotation, at least one sub-layout including rotation-indicating data that distinguishes that sub-layout from each other sub-layout.

Optionally, the coded data is arranged in accordance with at least one layout having n-fold rotational symmetry, where n is at least two, the layout encoding orientation-indicating data comprising a sequence of an integer multiple m of n symbols, where m is one or more, each encoded symbol being distributed at n locations about a centre of rotational symmetry of the layout such that decoding the symbols at each of the n orientations of the layout produces n representations of the orientation-indicating data, each representation comprising a different cyclic shift of the orientation-indicating data and being indicative of the degree of rotation of the layout.

Optionally, the processor is used in at least one of the following devices: an automatic teller machine; a currency counter; a cash register; a hand held scanner; a vending machine; and, a mobile phone.

Optionally, the processor is further used in a method of tracking a security document, the method including, in the processor: receiving indicating data from a sensing device, the sensing device being responsive to sensing of the coded data to generate indicating data indicative of the identity of the product item; and, updating, using the received indicating data, tracking data stored in a data store, tracking data being indicative of: the identity of the security document; and, tracking information.

Optionally, the processor is used in a sensing device for use with a security document, the sensing device including: a housing adapted to be held by a user in use; a radiation source for exposing at least one coded data portion; a sensor for sensing the at least one exposed coded data portion; and, the processor for determining, using the at least one sensed coded data portion, a sensed identity.

Optionally, the processor is further used in a method of determining a counterfeit security document, wherein the method includes: in a sensing device: sensing at least one coded data portion; and, generating, using the sensed coded data portion, indicating data indicative of: the identity; and, at least one signature part; and, in the processor: determining if the security document is a counterfeit document using the determined identity and the at least one determined signature part.

Optionally, the processor is further used in a method of determining a possible duplicated security document, wherein the method includes, in a processor: receiving indicating data from a sensing device, the sensing device being responsive to sensing of the coded data to generate indicating data indicative of the identity of the security document; determining, from the indicating data, a determined identity; accessing, using the determined identity, tracking data indicative of: the identity of the security document; and, tracking information indicative of the location of the security document; and, determining, using the tracking information, if the security document is a possible duplicate.

Optionally, the processor is further used in a currency counter for counting currency documents, each currency document having disposed thereon or therein coded data including a number of coded data portions, each coded data portion being indicative of an identity of the currency document, the counter including: an input for receiving a number of currency documents to be counted; an output for providing counted currency documents; a feed mechanism for transporting currency documents from the input to the output along a feed path; a sensor for sensing at least one coded data portion for each currency document transported along the feed path; and, the processor for: determining, from the at least one sensed coded data portion, a sensed identity for each currency document; determining, from the sensed identity, a determined value for each currency document; and, counting the currency documents using the determined values.

Optionally, the processor is further used in a method of providing a security document having a security feature, the method including: creating the security document; determining an identity associated with the security document; generating a signature using the identity, the signature being a digital signature of at least part of the identity; generating coded data, the coded data including a number of coded data portions, each coded data portion being indicative of: the identity of the security document; and, at least part of the signature; and, printing the coded data on the security document.

Optionally, the processor is further used in a method of printing a security document having a security feature, the method including: receiving the security document; receiving identity data, the identity data being at least partially indicative of an identity of the security document, the identity data being encrypted using a public key; determining the identity by decrypting the received identity data using a secret key associated with the public key; generating a signature using the determined identity, the signature being a digital signature of at least part of the identity; generating coded data at least partially indicative of: the identity of the security document; and, at least part of the signature; and, printing the coded data on the security document.

Optionally, the processor is further used in a system for recording a transaction relating to a security document and where the processor is further used for: receiving indicating data from a sensing device, the sensing device being responsive to sensing of the coded data to generate indicating data at least partially indicative of: the identity of the security document; and, the transaction; and, updating, using the received indicating data, transaction data stored in a data store, the transaction data being indicative of: the identity of the security document; and, the transaction.

Optionally, the processor is further used in a method for monitoring transactions involving security documents, the method including, in the processor and following a transaction involving a security document: receiving indicating data from a sensing device, the sensing device being responsive to sensing of coded data to generate indicating data at least partially indicative of: the identity of the security document; and, the transaction; updating, using the received indicating data, transaction data stored in a data store, the transaction data being indicative of, for each of a number of security documents, performed transactions; comparing the transaction data to one or more predetermined patterns to thereby determine the presence or absence of a cash flow anomaly.

Optionally, the processor is further used to access a security document database, the database storing security document data including, for each of a number of security documents: identity data, the identity data being at least partially indicative of an identity of the security document; attribute data, the attribute data being at least partially indicative of one or more attributes of the security document; wherein, in use, the security document database allows the processor to: receive, from a sensing device, indicating data at least partially indicative of at least one of: the identity; and one or more attributes; use the received indicating data and the security document data to perform an action associated with the security document.

Optionally, the processor is further used to execute a set of instructions for monitoring transactions involving security documents, the set of instructions, when executed by the processor cause the processor to: receive indicating data from a sensing device, the sensing device being responsive to sensing of coded data to generate indicating data at least partially indicative of: the identity of the security document; and, the transaction; updating, using the received indicating data, transaction data stored in a data store, the transaction data being indicative of: the identity of the security document; and, the transaction.

Optionally, the processor is further used to execute a set of instructions for a currency counter, the currency counter being used for counting currency documents where each currency document having disposed therein or thereon at least one coded data portion being indicative of at least an identity of the currency document, the currency counter having: an input for receiving a number of currency documents to be counted; an output for providing counted currency documents; a feed mechanism for transporting currency documents from the input to the output along a feed path; a sensor for sensing at least one coded data portion for each currency document transported along the feed path; and, the processor, the set of instructions, when executed by the processor, causing the processor to: determine, from the at least one sensed coded data portion, a sensed identity for each currency document; determine, from the sensed identity, a determined value for each currency document; and, count the currency documents using the determined values.

Optionally, the processor is further used in a method of counting currency documents, each currency document having disposed thereon or therein coded data including a plurality of coded data portions, each coded data portion being at least partially indicative of an identity of the currency document, the method including, in a sensing device: sensing at least one coded data portion for each currency document; generating, using the sensed coded data portion, indicating data at least partially indicative of the identity of each currency document; and, transferring the indicating data to a computer system, the computer system being responsive to the indicating data to: determine, using the indicating data, a determined identity for each currency document; determine, using each determined identity, a value for each currency document; and, count the currency documents using the determined values.

Optionally, the processor is further used in a method for authenticating and evaluating a currency document, the currency document having disposed thereon or therein coded data including a plurality of coded data portions, the method including, in a sensing device: sensing at least one coded data portion; generating, using the sensed coded data portion, indicating data at least partially indicative of: an identity of the currency document; and at least part of a signature, the signature being a digital signature of at least part of the identity; and, transferring the indicating data to a computer system, the computer system being responsive to the indicating data to: determine, from the indicating data, a received identity, and a received signature part; authenticate the currency document using the received identity and the received signature part; and, in response to a successful authentication, determine, using the received identity, a value associated with the currency document.

Optionally, the security document includes anti-copy protection, the security document having disposed thereon or therein coded data including a number of coded data portions, each coded data portion being indicative of an identity, the identity being uniquely indicative of the respective security document and being stored in a data store to allow for duplication of the security document to be determined.

Optionally, the security document includes anti-forgery protection, the security document having disposed thereon or therein coded data including a plurality of coded data portions, each coded data portion being indicative of: an identity of the currency document; and at least part of a signature, the signature being formed by encrypting at least part of the identity using a private key of public/private key pair, such that: valid security documents can only be created using the private key; and, validity of the security document can be confirmed using the corresponding public key.

Optionally, the processor is further used in a method of recovering a stolen security document, the method including in a computer system: receiving indicating data from a sensing device, the sensing device being responsive to sensing of the coded data to generate indicating data at least partially indicative of the identity; determining, using the indicating data, a determined identity; accessing, using the determined identity, transaction data stored in a data store, the transaction data being indicative of a security document status; determining, using the security document status, if the security document is stolen; and, in response to a positive determination, causing the security document to be recovered.

In a fourteenth broad form the invention provides a method of counting currency documents, each currency document having disposed thereon or therein coded data including a plurality of coded data portions, each coded data portion being at least partially indicative of an identity of the currency document, the method including, in a sensing device: sensing at least one coded data portion for each currency document; generating, using the sensed coded data portion, indicating data at least partially indicative of the identity of each currency document; and, transferring the indicating data to a computer system, the computer system being responsive to the indicating data to: determine, using the indicating data, a determined identity for each currency document; determine, using each determined identity, a value for each currency document; and, count the currency documents using the determined values.

Optionally, the indicating data is further indicative of at least one of: a signature; a time the sensing device scanned the currency document; currency document attributes; and, a location of the sensing device when the currency document was sensed.

Optionally, the method includes transmitting the indicating data to the computer system at least one of: after the sensing device scans: each currency document; and, a predetermined number of currency documents; and, periodically.

Optionally, the sensing device includes an indicator, where the method includes causing the indicator to provide at least one of: an indication related to the success of sensing the at least one coded data portions; a count indicative of the number of sensed currency documents; the value of the sensed currency document; and, an incremental value of the sensed currency documents.

Optionally, the sensing device stores data indicative of at least one of an identity of the sensing device and an identity of a user, and wherein method includes the sensing device generating the indicating data using the stored data.

Optionally, each coded data portion is further indicative of at least part of a signature, the signature being a digital signature of at least part of the identity, and wherein the method includes: determining, from the indicating data, a determined identity and at least one determined signature part; and, authenticating the security document using the determined identity and the at least one determined signature part.

Optionally, the signature is a digital signature of at least part of the identity and at least part of predetermined padding, the padding being at least one of: a predetermined number; and, a random number.

Optionally, the entire signature is encoded within a plurality of coded data portions and wherein the method includes the sensing device sensing a number of coded data portions to thereby determine the entire signature.

Optionally, the coded data includes a plurality of layouts, each layout defining the position of a plurality of first symbols encoding the identity, and a plurality of second symbols defining at least part of the signature.

Optionally, the coded data is substantially invisible to an unaided human.

Optionally, the coded data is printed on the surface using at least one of: an invisible ink; and, an infrared-absorptive ink.

Optionally, the coded data is provided substantially coincident with visible human-readable information.

Optionally at least one coded data portion encodes the entire signature.

Optionally the entire signature is formed from a plurality of signature parts, and wherein each coded data portion encodes a respective signature part.

Optionally, at least some of the coded data portions encode at least one of: a location of the respective coded data portion; a position of the respective coded data portion on the surface; a size of the coded data portions; a size of a signature; an identity of a signature part; and, units of indicated locations.

Optionally, the coded data includes at least one of: redundant data; data allowing error correction; Reed-Solomon data; and, Cyclic Redundancy Check (CRC) data.

Optionally, the digital signature includes at least one of: a random number associated with the identity; a keyed hash of at least the identity; a keyed hash of at least the identity produced using a private key, and verifiable using a corresponding public key; cipher-text produced by encrypting at least the identity; cipher-text produced by encrypting at least the identity and a random number; and, cipher-text produced using a private key, and verifiable using a corresponding public key; and, cipher-text produced using RSA encryption.

Optionally, the security document is at least one of: a currency note; a check; a credit or debit card; a redeemable ticket, voucher, or coupon; a lottery ticket or instant win ticket; and, an identity card or document, such as a driver's license or passport.

Optionally, the identity is indicative of at least one of: a currency note attribute including at least one of: currency; issue country; denomination; note side; printing works; and serial number; a check attribute including at least one of: currency; issuing institution; account number; serial number; expiry date; check value; and limit; a card attribute including at least one of: card type; issuing institution; account number; issue date; expiry date; and limit.

Optionally, the coded data is arranged in accordance with at least one layout having n-fold rotational symmetry, where n is at least two, the layout including n identical sub-layouts rotated 1/n revolutions apart about a centre of rotation, at least one sub-layout including rotation-indicating data that distinguishes that sub-layout from each other sub-layout.

Optionally, the coded data is arranged in accordance with at least one layout having n-fold rotational symmetry, where n is at least two, the layout encoding orientation-indicating data comprising a sequence of an integer multiple m of n symbols, where m is one or more, each encoded symbol being distributed at n locations about a centre of rotational symmetry of the layout such that decoding the symbols at each of the n orientations of the layout produces n representations of the orientation-indicating data, each representation comprising a different cyclic shift of the orientation-indicating data and being indicative of the degree of rotation of the layout.

Optionally, the method is further used for tracking a security document, the method including, in a computer system: receiving indicating data from a sensing device, the sensing device being responsive to sensing of the coded data to generate indicating data indicative of the identity of the product item; and, updating, using the received indicating data, tracking data stored in a data store, tracking data being indicative of: the identity of the product item; and, tracking information.

Optionally, the sensing device includes: a housing adapted to be held by a user in use; a radiation source for exposing at least one coded data portion; a sensor for sensing the at least one exposed coded data portion; and, a processor for determining, using the at least one sensed coded data portion, a sensed identity.

Optionally, the method is further used for determining a counterfeit security document, each coded data portion being further indicative of at least part of a signature, the signature being a digital signature of at least part of the identity, wherein the method further includes: in a sensing device: generating, using the sensed coded data portion, indicating data indicative of: the identity; and, at least one signature part; and, in a processor: determining, from the indicating data: a determined identity; and, at least one determined signature part;

and, determining if the security document is a counterfeit document using the determined identity and the at least one determined signature part.

Optionally, the method is further used for determining a possible duplicated security document, wherein the method includes, in a computer system: receiving indicating data from a sensing device, the sensing device being responsive to sensing of the coded data to generate indicating data indicative of the identity of the security document; determining, from the indicating data, a determined identity; accessing, using the determined identity, tracking data indicative of: the identity of the security document; and, tracking information indicative of the location of the security document; and, determining, using the tracking information, if the security document is a possible duplicate.

Optionally, the method is used in a currency counter for counting currency documents, each currency document having disposed thereon or therein coded data including a number of coded data portions, each coded data portion being indicative of an identity of the currency document, the counter including: an input for receiving a number of currency documents to be counted; an output for providing counted currency documents; a feed mechanism for transporting currency documents from the input to the output along a feed path; a sensor for sensing at least one coded data portion for each currency document transported along the feed path; and, a processor for: determining, from the at least one sensed coded data portion, a sensed identity for each currency document; determining, from the sensed identity, a determined value for each currency document; and, counting the currency documents using the determined values.

Optionally, the security document having a security feature, wherein the method of providing the security document includes: creating the security document; determining an identity associated with the security document; generating a signature using the identity, the signature being a digital signature of at least part of the identity; generating coded data, the coded data including a number of coded data portions, each coded data portion being indicative of: the identity of the security document; and, at least part of the signature; and, printing the coded data on the security document.

Optionally, the security document being printed with a security feature, wherein the method of printing the security document includes: receiving the security document; receiving identity data, the identity data being at least partially indicative of an identity of the security document, the identity data being encrypted using a public key; determining the identity by decrypting the received identity data using a secret key associated with the public key; generating a signature using the determined identity, the signature being a digital signature of at least part of the identity; generating coded data at least partially indicative of: the identity of the security document; and, at least part of the signature; and, printing the coded data on the security document.

Optionally, the method is used in a system for recording a transaction relating to a security document, the system including a computer system for: receiving indicating data from a sensing device, the sensing device being responsive to sensing of the coded data to generate indicating data at least partially indicative of: the identity of the security document; and, the transaction; and, updating, using the received indicating data, transaction data stored in a data store, the transaction data being indicative of: the identity of the security document; and, the transaction.

Optionally, the method is further used for monitoring transactions involving security documents, the method including, in a computer system and following a transaction involving a security document: receiving indicating data from a sensing device, the sensing device being responsive to sensing of coded data to generate indicating data at least partially indicative of: the identity of the security document; and, the transaction; updating, using the received indicating data, transaction data stored in a data store, the transaction data being indicative of, for each of a number of security documents, performed transactions; comparing the transaction data to one or more predetermined patterns to thereby determine the presence or absence of a cash flow anomaly.

Optionally, the method includes using a security document database, the database storing security document data including, for each of a number of security documents: identity data, the identity data being at least partially indicative of an identity of the security document; attribute data, the attribute data being at least partially indicative of one or more attributes of the security document; wherein, in use, the security document database allows a computer system to: receive, from a sensing device, indicating data at least partially indicative of at least one of: the identity; and one or more attributes; use the received indicating data and the security document data to perform an action associated with the security document.

Optionally, the method is further used for causing a computer system to monitor transactions involving security documents, the method being performed using a set of instructions, each security document having disposed thereon or therein coded data including a number of coded data portions, each coded data portion being indicative of at least an identity of the security document, the set of instructions, when executed by the computer system, causing the computer system to: receive indicating data from a sensing device, the sensing device being responsive to sensing of coded data to generate indicating data at least partially indicative of: the identity of the security document; and, the transaction; updating, using the received indicating data, transaction data stored in a data store, the transaction data being indicative of: the identity of the security document; and, the transaction.

Optionally, the method is used in a processor for use in a device for authenticating security documents, the coded data further being at least partially indicative of a signature, the signature being a digital signature of at least part of the identity, the processor being adapted to: receive indicating data from a sensor in the device, the sensor being responsive to sensing of the coded data to generate indicating data at least partially indicative of: the identity; and, at least part of the signature; determine, from the indicating data, a determined identity and at least one determined signature part; and, authenticate the security document using the determined identity and the at least one determined signature part.

Optionally, the method is fturther used for counting currency documents, each currency document having disposed thereon or therein coded data including a plurality of coded data portions, each coded data portion being at least partially indicative of an identity of the currency document, the method including, in a sensing device: sensing at least one coded data portion for each currency document; generating, using the sensed coded data portion, indicating data at least partially indicative of the identity of each currency document; and, transferring the indicating data to a computer system, the computer system being responsive to the indicating data to: determine, using the indicating data, a determined identity for each currency document; determine, using each determined identity, a value for each currency document; and, count the currency documents using the determined values.

Optionally, the method further being used for authenticating and evaluating a currency document, the currency document having disposed thereon or therein coded data including a plurality of coded data portions, the method including, in a sensing device: sensing at least one coded data portion; generating, using the sensed coded data portion, indicating data at least partially indicative of: an identity of the currency document; and at least part of a signature, the signature being a digital signature of at least part of the identity; and, transferring the indicating data to a computer system, the computer system being responsive to the indicating data to: determine, from the indicating data, a received identity, and a received signature part; authenticate the currency document using the received identity and the received signature part; and, in response to a successful authentication, determine, using the received identity, a value associated with the currency document.

Optionally, the security document includes anti-copy protection, the identity being uniquely indicative of the respective security document and being stored in a data store to allow for duplication of the security document to be determined.

Optionally, the security document includes anti-forgery protection, each coded data portion being further indicative of at least part of a signature, the signature being formed by encrypting at least part of the identity using a private key of public/private key pair, such that: valid security documents can only be created using the private key; and, validity of the security document can be confirmed using the corresponding public key.

Optionally, the method is further used for recovering a stolen security document, the method including in a computer system: receiving indicating data from a sensing device, the sensing device being responsive to sensing of the coded data to generate indicating data at least partially indicative of the identity; determining, using the indicating data, a determined identity; accessing, using the determined identity, transaction data stored in a data store, the transaction data being indicative of a security document status; determining, using the security document status, if the security document is stolen; and, in response to a positive determination, causing the security document to be recovered.

In another broad form the invention provides a method of counting currency documents, each currency document having disposed thereon or therein coded data including a plurality of coded data portions, each coded data portion being at least partially indicative of an identity of the currency document, the method including, in a computer system: receiving indicating data from a sensing device, the sensing device adapted to sense at least one coded data portion for each currency document, and generate, using the sensed coded data portion, the indicating data at least partially indicative of the identity of each currency document; determining, using the indicating data, a determined identity for each currency document; determining, using each determined identity, a value for each currency document; and, counting the currency documents using the determined values.

In a fifteenth broad form the invention provides a method for authenticating and evaluating a currency document, the currency document having disposed thereon or therein coded data including a plurality of coded data portions, the method including, in a sensing device: sensing at least one coded data portion; generating, using the sensed coded data portion, indicating data at least partially indicative of: an identity of the currency document; and at least part of a signature, the signature being a digital signature of at least part of the identity; and, transferring the indicating data to a computer system, the computer system being responsive to the indicating data to: determine, from the indicating data, a received identity, and a received signature part; authenticate the currency document using the received identity and the received signature part; and, in response to a successful authentication, determine, using the received identity, a value associated with the currency document.

Optionally, the indicating data is further indicative of: a time the sensing device scanned the currency document; currency document attributes; and, a location of the sensing device when the currency document was sensed.

Optionally, the method includes transmitting the indicating data to the computer system at least one of: after the sensing device senses: each currency document; and, a predetermined number of currency documents; and, periodically.

Optionally, the sensing device includes an indicator, where the method includes causing the indicator to provide at least one of: an indication of the success of sensing the at least one coded data portion; an indication of an authenticity of the currency document; a count indicative of the number of sensed currency documents; the value of the sensed currency document; and, an incremental value of the sensed currency documents.

Optionally, the entire signature is encoded in a plurality of data portions and wherein the method includes causing the indicator to indicate if the entire signature can be determined from the sensed coded data portions.

Optionally, each coded data portion is further indicative of at least part of a signature, the signature being a digital signature of at least part of the identity, and wherein the method includes: determining, from the indicating data, a determined identity and at least one determined signature part; and, authenticating the security document using the determined identity and the at least one determined signature part.

Optionally, the signature is a digital signature of at least part of the identity and at least part of predetermined padding, the padding being at least one of: a predetermined number; and, a random number.

Optionally, the entire signature is encoded within a plurality of coded data portions and wherein the method includes the sensing device sensing a number of coded data portions to thereby determine the entire signature.

Optionally, the coded data includes a plurality of layouts, each layout defining the position of a plurality of first symbols encoding the identity, and a plurality of second symbols defining at least part of the signature.

Optionally, the coded data is substantially invisible to an unaided human.

Optionally, the coded data is printed on the surface using at least one of: an invisible ink; and, an infrared-absorptive ink.

Optionally, the coded data is provided substantially coincident with visible human-readable information.

Optionally at least one coded data portion encodes the entire signature.

Optionally the entire signature is formed from a plurality of signature parts, and wherein each coded data portion encodes a respective signature part.

Optionally, at least some of the coded data portions encode at least one of: a location of the respective coded data portion; a position of the respective coded data portion on the surface; a size of the coded data portions; a size of a signature; an identity of a signature part; and, units of indicated locations.

Optionally, the coded data includes at least one of: redundant data; data allowing error correction; Reed-Solomon data; and, Cyclic Redundancy Check (CRC) data.

Optionally, the digital signature includes at least one of: a random number associated with the identity; a keyed hash of at least the identity; a keyed hash of at least the identity produced using a private key, and verifiable using a corresponding public key; cipher-text produced by encrypting at least the identity; cipher-text produced by encrypting at least the identity and a random number; and, cipher-text produced using a private key, and verifiable using a corresponding public key; and, cipher-text produced using RSA encryption.

Optionally, the security document is at least one of: a currency note; a check; a credit or debit card; a redeemable ticket, voucher, or coupon; a lottery ticket or instant win ticket; and, an identity card or document, such as a driver's license or passport.

Optionally, the identity is indicative of at least one of: a currency note attribute including at least one of: currency; issue country; denomination; note side; printing works; and serial number; a check attribute including at least one of: currency; issuing institution; account number; serial number; expiry date; check value; and limit; a card attribute including at least one of: card type; issuing institution; account number; issue date; expiry date; and limit.

Optionally, the coded data is arranged in accordance with at least one layout having n-fold rotational symmetry, where n is at least two, the layout including n identical sub-layouts rotated 1/n revolutions apart about a centre of rotation, at least one sub-layout including rotation-indicating data that distinguishes that sub-layout from each other sub-layout.

Optionally, the coded data is arranged in accordance with at least one layout having n-fold rotational symmetry, where n is at least two, the layout encoding orientation-indicating data comprising a sequence of an integer multiple m of n symbols, where m is one or more, each encoded symbol being distributed at n locations about a centre of rotational symmetry of the layout such that decoding the symbols at each of the n orientations of the layout produces n representations of the orientation-indicating data, each representation comprising a different cyclic shift of the orientation-indicating data and being indicative of the degree of rotation of the layout.

Optionally, the method is further used for tracking a security document, the method including, in a computer system: receiving indicating data from a sensing device, the sensing device being responsive to sensing of the coded data to generate indicating data indicative of the identity of the product item; and, updating, using the received indicating data, tracking data stored in a data store, tracking data being indicative of: the identity of the product item; and, tracking information.

Optionally, the sensing device includes: a housing adapted to be held by a user in use; a radiation source for exposing at least one coded data portion; a sensor for sensing the at least one exposed coded data portion; and, a processor for determining, using the at least one sensed coded data portion, a sensed identity.

Optionally, the method is further used for determining a counterfeit security document, each coded data portion being further indicative of at least part of a signature, the signature being a digital signature of at least part of the identity, wherein the method further includes: in a sensing device: generating, using the sensed coded data portion, indicating data indicative of: the identity; and, at least one signature part; and, in a processor: determining, from the indicating data: a determined identity; and, at least one determined signature part; and, determining if the security document is a counterfeit document using the determined identity and the at least one determined signature part.

Optionally, the method is further used for determining a possible duplicated security document, wherein the method includes, in a computer system: receiving indicating data from a sensing device, the sensing device being responsive to sensing of the coded data to generate indicating data indicative of the identity of the security document; determining, from the indicating data, a determined identity; accessing, using the determined identity, tracking data indicative of: the identity of the security document; and, tracking information indicative of the location of the security document; and, determining, using the tracking information, if the security document is a possible duplicate.

Optionally, the method is used in a currency counter for counting currency documents, each currency document having disposed thereon or therein coded data including a number of coded data portions, each coded data portion being indicative of an identity of the currency document, the counter including: an input for receiving a number of currency documents to be counted; an output for providing counted currency documents; a feed mechanism for transporting currency documents from the input to the output along a feed path; a sensor for sensing at least one coded data portion for each currency document transported along the feed path; and, a processor for: determining, from the at least one sensed coded data portion, a sensed identity for each currency document; determining, from the sensed identity, a determined value for each currency document; and, counting the currency documents using the determined values.

Optionally, the security document having a security feature, wherein the method of providing the security document includes: creating the security document; determining an identity associated with the security document; generating a signature using the identity, the signature being a digital signature of at least part of the identity; generating coded data, the coded data including a number of coded data portions, each coded data portion being indicative of: the identity of the security document; and, at least part of the signature; and, printing the coded data on the security document.

Optionally, the security document being printed with a security feature, wherein the method of printing the security document includes: receiving the security document; receiving identity data, the identity data being at least partially indicative of an identity of the security document, the identity data being encrypted using a public key; determining the identity by decrypting the received identity data using a secret key associated with the public key; generating a signature using the determined identity, the signature being a digital signature of at least part of the identity; generating coded data at least partially indicative of: the identity of the security document; and, at least part of the signature; and, printing the coded data on the security document.

Optionally, the method is used in a system for recording a transaction relating to a security document, the system including a computer system for: receiving indicating data from a sensing device, the sensing device being responsive to sensing of the coded data to generate indicating data at least partially indicative of: the identity of the security document; and, the transaction; and, updating, using the received indicating data, transaction data stored in a data store, the transaction data being indicative of: the identity of the security document; and, the transaction.

Optionally, the method is further used for monitoring transactions involving security documents, the method including, in a computer system and following a transaction involving a security document: receiving indicating data from a sensing device, the sensing device being responsive to sensing of coded data to generate indicating data at least partially indicative of: the identity of the security document; and, the transaction; updating, using the received indicating data, transaction data stored in a data store, the transaction data being indicative of, for each of a number of security documents, performed transactions; comparing the transaction data to one or more predetermined patterns to thereby determine the presence or absence of a cash flow anomaly.

Optionally, the method includes using a security document database, the database storing security document data including, for each of a number of security documents: identity data, the identity data being at least partially indicative of an identity of the security document; attribute data, the attribute data being at least partially indicative of one or more attributes of the security document; wherein, in use, the security document database allows a computer system to: receive, from a sensing device, indicating data at least partially indicative of at least one of: the identity; and one or more attributes; use the received indicating data and the security document data to perform an action associated with the security document.

Optionally, the method is further used for causing a computer system to monitor transactions involving security documents, the method being performed using a set of instructions, each security document having disposed thereon or therein coded data including a number of coded data portions, each coded data portion being indicative of at least an identity of the security document, the set of instructions, when executed by the computer system, causing the computer system to: receive indicating data from a sensing device, the sensing device being responsive to sensing of coded data to generate indicating data at least partially indicative of: the identity of the security document; and, the transaction; updating, using the received indicating data, transaction data stored in a data store, the transaction data being indicative of: the identity of the security document; and, the transaction.

Optionally, the method is further used for counting currency documents, the method being performed using a set of instructions, each currency document having disposed therein or thereon at least one coded data portion being indicative of at least an identity of the currency document, the currency counter having: an input for receiving a number of currency documents to be counted; an output for providing counted currency documents; a feed mechanism for transporting currency documents from the input to the output along a feed path; a sensor for sensing at least one coded data portion for each currency document transported along the feed path; and, a processor, the set of instructions, when executed by the processor, causing the processor to: determine, from the at least one sensed coded data portion, a sensed identity for each currency document; determine, from the sensed identity, a determined value for each currency document; and, count the currency documents using the determined values.

Optionally, the method is used in a processor for use in a device for authenticating security documents, the coded data further being at least partially indicative of a signature, the signature being a digital signature of at least part of the identity, the processor being adapted to: receive indicating data from a sensor in the device, the sensor being responsive to sensing of the coded data to generate indicating data at least partially indicative of: the identity; and, at least part of the signature; determine, from the indicating data, a determined identity and at least one determined signature part; and, authenticate the security document using the determined identity and the at least one determined signature part.

Optionally, the method is further used for counting currency documents, each currency document having disposed thereon or therein coded data including a plurality of coded data portions, each coded data portion being at least partially indicative of an identity of the currency document, the method including, in a sensing device: sensing at least one coded data portion for each currency document; generating, using the sensed coded data portion, indicating data at least partially indicative of the identity of each currency document; and, transferring the indicating data to a computer system, the computer system being responsive to the indicating data to: determine, using the indicating data, a determined identity for each currency document; determine, using each determined identity, a value for each currency document; and, count the currency documents using the determined values.

Optionally, the security document includes anti-copy protection, the identity being uniquely indicative of the respective security document and being stored in a data store to allow for duplication of the security document to be determined.

Optionally, the security document includes anti-forgery protection, each coded data portion being further indicative of at least part of a signature, the signature being formed by encrypting at least part of the identity using a private key of public/private key pair, such that: valid security documents can only be created using the private key; and, validity of the security document can be confirmed using the corresponding public key.

Optionally, the method is further used for recovering a stolen security document, the method including in a computer system: receiving indicating data from a sensing device, the sensing device being responsive to sensing of the coded data to generate indicating data at least partially indicative of the identity; determining, using the indicating data, a determined identity; accessing, using the determined identity, transaction data stored in a data store, the transaction data being indicative of a security document status; determining, using the security document status, if the security document is stolen; and, in response to a positive determination, causing the security document to be recovered.

In another broad form the invention provides a method for authenticating and evaluating a currency document, the currency document having disposed thereon or therein coded data including a plurality of coded data portions, the method including, in a computer system: receiving indicating data from a sensing device, the sensing device being adapted to: sense at least one coded data portion; generate, using the sensed coded data portion, indicating data at least partially indicative of: an identity of the currency document; and at least part of a signature, the signature being a digital signature of at least part of the identity; determining, from the indicating data, a received identity, and a received signature part; authenticating the currency document using the received identity and the received signature part; and, in response to a successful authentication, determining, using the received identity, a value associated with the currency document.

In a sixteenth broad form the invention provides a security document including anti-copy protection, the security document having disposed thereon or therein coded data including a number of coded data portions, each coded data portion being indicative of an identity, the identity being uniquely indicative of the respective security document and being stored in a data store to allow for duplication of the security document to be determined.

Optionally, each coded data portion is further indicative of an identity corresponding to each part of a signature, the signature being a digital signature of at least part of the identity.

Optionally, the coded data can be sensed using a sensing device, the sensing device being responsive to sensing of the coded data to: generate indicating data at least partially indicative of: a sensed identity; and a sensed at least part of the signature; and, transfer the indicating data to a computer system to determine whether a duplication of the sensed security document has occurred.

Optionally, the signature is encoded using at least one of: a private key from a public/private key pair, and where the sensing device decodes the signature using the corresponding public key; a secret key, and where the sensing device decodes the signature using the same secret key; and, a public key from a public/private key pair, and where the sensing device decodes the signature using the corresponding private key.

Optionally, the sensed identity is compared to at least one of: location data indicative of where a security document having an identical identity has been sensed; and, time data indicative of when a security document having an identical identity has been sensed; in order to determine whether duplication of a security document has occurred.

Optionally, each coded data portion is further indicative of a position of the coded data on or in the security document.

Optionally, each coded data portion is further indicative of at least part of a signature, the signature being a digital signature of at least part of the identity, and wherein the sensing device determines, from the indicating data, a determined identity and at least one determined signature part, and where the computer system determines whether a duplication of the security document has occurred using the determined identity and the at least one determined signature part.

Optionally, the signature is a digital signature of at least part of the identity and at least part of predetermined padding, the padding being at least one of: a predetermined number; and, a random number.

Optionally, the entire signature is encoded within a plurality of coded data portions and wherein the sensing device is configured to sense a number of coded data portions to thereby determine the entire signature.

Optionally, the coded data includes a plurality of layouts, each layout defining the position of a plurality of first symbols encoding the identity, and a plurality of second symbols defining at least part of the signature.

Optionally, the coded data is substantially invisible to an unaided human.

Optionally, the coded data is printed on the surface using at least one of: an invisible ink; and, an infrared-absorptive ink.

Optionally, the coded data is provided substantially coincident with visible human-readable information.

Optionally at least one coded data portion encodes the entire signature.

Optionally the entire signature is formed from a plurality of signature parts, and wherein each coded data portion encodes a respective signature part.

Optionally, at least some of the coded data portions encode at least one of: a location of the respective coded data portion; a position of the respective coded data portion on the surface; a size of the coded data portions; a size of a signature; an identity of a signature part; and, units of indicated locations.

Optionally, the coded data includes at least one of: redundant data; data allowing error correction; Reed-Solomon data; and, Cyclic Redundancy Check (CRC) data.

Optionally, the digital signature includes at least one of: a random number associated with the identity; a keyed hash of at least the identity; a keyed hash of at least the identity produced using a private key, and verifiable using a corresponding public key; cipher-text produced by encrypting at least the identity; cipher-text produced by encrypting at least the identity and a random number; and, cipher-text produced using a private key, and verifiable using a corresponding public key; and, cipher-text produced using RSA encryption.

Optionally, the security document is at least one of: a currency note; a check; a credit or debit card; a redeemable ticket, voucher, or coupon; a lottery ticket or instant win ticket; and, an identity card or document, such as a driver's license or passport.

Optionally, the identity is indicative of at least one of: a currency note attribute including at least one of: currency; issue country; denomination; note side; printing works; and serial number; a check attribute including at least one of: currency; issuing institution; account number; serial number; expiry date; check value; and limit; a card attribute including at least one of: card type; issuing institution; account number; issue date; expiry date; and limit.

Optionally, the coded data is arranged in accordance with at least one layout having n-fold rotational symmetry, where n is at least two, the layout including n identical sub-layouts rotated 1/n revolutions apart about a centre of rotation, at least one sub-layout including rotation-indicating data that distinguishes that sub-layout from each other sub-layout.

Optionally, the coded data is arranged in accordance with at least one layout having n-fold rotational symmetry, where n is at least two, the layout encoding orientation-indicating data comprising a sequence of an integer multiple m of n symbols, where m is one or more, each encoded symbol being distributed at n locations about a centre of rotational symmetry of the layout such that decoding the symbols at each of the n orientations of the layout produces n representations of the orientation-indicating data, each representation comprising a different cyclic shift of the orientation-indicating data and being indicative of the degree of rotation of the layout.

Optionally, the security document is used in a method of tracking a security document, the method including, in a computer system: receiving indicating data from a sensing device, the sensing device being responsive to sensing of the coded data to generate indicating data indicative of the identity of the product item; and, updating, using the received indicating data, tracking data stored in a data store, tracking data being indicative of: the identity of the product item; and, tracking information.

Optionally, a sensing device is used for sensing the coded data disposed on or in the security document, the sensing device including: a housing adapted to be held by a user in use; a radiation source for exposing at least one coded data portion; a sensor for sensing the at least one exposed coded data portion; and, a processor for determining, using the at least one sensed coded data portion, a sensed identity.

Optionally, the security document is used in a method of determining a counterfeit security document, each coded data portion being further indicative of at least part of a signature, the signature being a digital signature of at least part of the identity, wherein the method includes: in a sensing device: sensing at least one coded data portion; and, generating, using the sensed coded data portion, indicating data indicative of: the identity; and, at least one signature part; in a processor: determining, from the indicating data: a determined identity; and, at least one determined signature part; determining if the security document is a counterfeit document using the determined identity and the at least one determined signature part.

Optionally, the security document is used in a method of determining a possible duplicated security document, wherein the method includes, in a computer system: receiving indicating data from a sensing device, the sensing device being responsive to sensing of the coded data to generate indicating data indicative of the identity of the security document; determining, from the indicating data, a determined identity; accessing, using the determined identity, tracking data indicative of: the identity of the security document; and, tracking information indicative of the location of the security document; and, determining, using the tracking information, if the security document is a possible duplicate.

Optionally, the security document is a currency document, and where a plurality of currency documents are counted using a currency counter, the counter including: an input for receiving a number of currency documents to be counted; an output for providing counted currency documents; a feed mechanism for transporting currency documents from the input to the output along a feed path; a sensor for sensing at least one coded data portion for each currency document transported along the feed path; and, a processor for: determining, from the at least one sensed coded data portion, a sensed identity for each currency document; determining, from the sensed identity, a determined value for each currency document; and, counting the currency documents using the determined values.

Optionally, the security document is used in a method of providing a security document having a security feature, the method including: creating the security document; determining an identity associated with the security document; generating a signature using the identity, the signature being a digital signature of at least part of the identity; generating coded data, the coded data including a number of coded data portions, each coded data portion being indicative of: the identity of the security document; and, at least part of the signature; and, printing the coded data on the security document.

Optionally, the security document is used in a method of printing a security document having a security feature, the method including: receiving the security document; receiving identity data, the identity data being at least partially indicative of an identity of the security document, the identity data being encrypted using a public key; determining the identity by decrypting the received identity data using a secret key associated with the public key; generating a signature using the determined identity, the signature being a digital signature of at least part of the identity; generating coded data at least partially indicative of: the identity of the security document; and, at least part of the signature; and, printing the coded data on the security document.

Optionally, the security document is used in a system for recording a transaction relating to a security document, the system including a computer system for: receiving indicating data from a sensing device, the sensing device being responsive to sensing of the coded data to generate indicating data at least partially indicative of: the identity of the security document; and, the transaction; and, updating, using the received indicating data, transaction data stored in a data store, the transaction data being indicative of: the identity of the security document; and, the transaction.

Optionally, the security document is used in a method for monitoring transactions involving security documents, the method including, in a computer system and following a transaction involving a security document: receiving indicating data from a sensing device, the sensing device being responsive to sensing of coded data to generate indicating data at least partially indicative of: the identity of the security document; and, the transaction; updating, using the received indicating data, transaction data stored in a data store, the transaction data being indicative of, for each of a number of security documents, performed transactions; comparing the transaction data to one or more predetermined patterns to thereby determine the presence or absence of a cash flow anomaly.

Optionally, the security document data relating to the security document is stored in a security document database, the security document data including, for each of a number of security documents: identity data, the identity data being at least partially indicative of an identity of the security document; attribute data, the attribute data being at least partially indicative of one or more attributes of the security document; wherein, in use, the security document database allows a computer system to: receive, from a sensing device, indicating data at least partially indicative of at least one of: the identity; and one or more attributes; use the received indicating data and the security document data to perform an action associated with the security document.

Optionally, the security document is used in a transaction and a set of instructions is used for causing a computer system to monitor the transaction, the set of instructions, when executed by the computer system, causing the computer system to: receive indicating data from a sensing device, the sensing device being responsive to sensing of coded data to generate indicating data at least partially indicative of: the identity of the security document; and, the transaction; updating, using the received indicating data, transaction data stored in a data store, the transaction data being indicative of: the identity of the security document; and, the transaction.

Optionally, the security document is a currency document, and a plurality of currency documents are counted using a currency counter executing a set of instructions, the currency counter having: an input for receiving a number of currency documents to be counted; an output for providing counted currency documents; a feed mechanism for transporting currency documents from the input to the output along a feed path; a sensor for sensing at least one coded data portion for each currency document transported along the feed path; and, a processor, the set of instructions, when executed by the processor, causing the processor to: determine, from the at least one sensed coded data portion, a sensed identity for each currency document; determine, from the sensed identity, a determined value for each currency document; and, count the currency documents using the determined values.

Optionally, the security document is authenticated using a processor for use in a device, the coded data being further at least partially indicative of a signature, the signature being a digital signature of at least part of the identity, the processor being adapted to: receive indicating data from a sensor in the device, the sensor being responsive to sensing of the coded data to generate indicating data at least partially indicative of: the identity; and, at least part of the signature; determine, from the indicating data, a determined identity and at least one determined signature part; and, authenticate the security document using the determined identity and the at least one determined signature part.

Optionally, the security document is a currency document and is used in a method of counting currency documents, the method including, in a sensing device: sensing at least one coded data portion for each currency document; generating, using the sensed coded data portion, indicating data at least partially indicative of the identity of each currency document; and, transferring the indicating data to a computer system, the computer system being responsive to the indicating data to: determine, using the indicating data, a determined identity for each currency document; determine, using each determined identity, a value for each currency document; and, count the currency documents using the determined values.

Optionally, the security document is a currency document and is used in a method for authenticating and evaluating the currency document, the method including, in a sensing device: sensing at least one coded data portion; generating, using the sensed coded data portion, indicating data at least partially indicative of: an identity of the currency document; and at least part of a signature, the signature being a digital signature of at least part of the identity; and, transferring the indicating data to a computer system, the computer system being responsive to the indicating data to: determine, from the indicating data, a received identity, and a received signature part; authenticate the currency document using the received identity and the received signature part; and, in response to a successful authentication, determine, using the received identity, a value associated with the currency document.

Optionally, the security document further includes anti-forgery protection, each coded data portion being indicative of at least part of a signature, the signature being formed by encrypting at least part of the identity using a private key of public/private key pair, such that: valid security documents can only be created using the private key; and, validity of the security document can be confirmed using the corresponding public key.

Optionally, the security document is used in a method of recovering a stolen security document, the method including in a computer system: receiving indicating data from a sensing device, the sensing device being responsive to sensing of the coded data to generate indicating data at least partially indicative of the identity; determining, using the indicating data, a determined identity; accessing, using the determined identity, transaction data stored in a data store, the transaction data being indicative of a security document status; determining, using the security document status, if the security document is stolen; and, in response to a positive determination, causing the security document to be recovered.

In a seventeenth broad form the invention provides a security document including anti-forgery protection, the security document having disposed thereon or therein coded data including a plurality of coded data portions, each coded data portion being indicative of: an identity of the security document; and at least part of a signature, the signature being formed by encrypting at least part of the identity using a private key of public/private key pair, such that: valid security documents can only be created using the private key; and, validity of the security document can be confirmed using the corresponding public key.

Optionally, the private key is associated with at least one of: a security document type; a value; a creator of the security document; a location that the security document was issued; and, a time when the document was created.

Optionally, the coded data on the security document is printed using a printer, wherein the printer includes the private key in order to encode the coded data.

Optionally, at least some of the coded data can be sensed using a sensing device, the sensing device being responsive to the sensing to: determine, using the sensed coded data, the signature; and, attempt to decode, using one of a number of public keys, the signature.

Optionally, the sensing device generates, using the sensed coded data portion, indicating data at least partially indicative of: the identity of the security document; and, the at least part of a signature.

Optionally, if the sensing device determines that none of the plurality of public keys decode the signature, the sensing device performs at least one of: a retrieval at least one additional public key on demand from a computer system; and, a determination that the security document is invalid.

Optionally, in order to confirm the validity of the security document, the sensing device performs at least one of: a comparison of the indicating data and stored data located in the sensing device's store; and a transfer of the indicating data to a computer system, wherein the computer system compares the indicating data to stored data located in the computer system.

Optionally, the signature is a digital signature of at least part of the identity and at least part of predetermined padding, the padding being at least one of: a predetermined number; and, a random number.

Optionally, the entire signature is encoded within a plurality of coded data portions and wherein the sensing device configured to sense a number of coded data portions to thereby determine the entire signature.

Optionally, the coded data includes a plurality of layouts, each layout defining the position of a plurality of first symbols encoding the identity, and a plurality of second symbols defining at least part of the signature.

Optionally, the coded data is substantially invisible to an unaided human.

Optionally, the coded data is printed on the surface using at least one of: an invisible ink; and, an infrared-absorptive ink.

Optionally, the coded data is provided substantially coincident with visible human-readable information.

Optionally at least one coded data portion encodes the entire signature.

Optionally the entire signature is formed from a plurality of signature parts, and wherein each coded data portion encodes a respective signature part.

Optionally, at least some of the coded data portions encode at least one of: a location of the respective coded data portion; a position of the respective coded data portion on the surface; a size of the coded data portions; a size of a signature; an identity of a signature part; and, units of indicated locations.

Optionally, the coded data includes at least one of: redundant data; data allowing error correction; Reed-Solomon data; and, Cyclic Redundancy Check (CRC) data.

Optionally, the digital signature includes at least one of: a random number associated with the identity; a keyed hash of at least the identity; a keyed hash of at least the identity produced using a private key, and verifiable using a corresponding public key; cipher-text produced by encrypting at least the identity; cipher-text produced by encrypting at least the identity and a random number; and, cipher-text produced using a private key, and verifiable using a corresponding public key; and, cipher-text produced using RSA encryption.

Optionally, the security document is at least one of: a currency note; a check; a credit or debit card; a redeemable ticket, voucher, or coupon; a lottery ticket or instant win ticket; and, an identity card or document, such as a driver's license or passport.

Optionally, the identity is indicative of at least one of: a currency note attribute including at least one of: currency; issue country; denomination; note side; printing works; and serial number; a check attribute including at least one of: currency; issuing institution; account number; serial number; expiry date; check value; and limit; a card attribute including at least one of: card type; issuing institution; account number; issue date; expiry date; and limit.

Optionally, the coded data is arranged in accordance with at least one layout having n-fold rotational symmetry, where n is at least two, the layout including n identical sub-layouts rotated 1/n revolutions apart about a centre of rotation, at least one sub-layout including rotation-indicating data that distinguishes that sub-layout from each other sub-layout.

Optionally, the coded data is arranged in accordance with at least one layout having n-fold rotational symmetry, where n is at least two, the layout encoding orientation-indicating data comprising a sequence of an integer multiple m of n symbols, where m is one or more, each encoded symbol being distributed at n locations about a centre of rotational symmetry of the layout such that decoding the symbols at each of the n orientations of the layout produces n representations of the orientation-indicating data, each representation comprising a different cyclic shift of the orientation-indicating data and being indicative of the degree of rotation of the layout.

Optionally, the security document is used in a method of tracking a security document, the method including, in a computer system: receiving indicating data from a sensing device, the sensing device being responsive to sensing of the coded data to generate indicating data indicative of the identity of the product item; and, updating, using the received indicating data, tracking data stored in a data store, tracking data being indicative of: the identity of the product item; and, tracking information.

Optionally, a sensing device is used for sensing the coded data disposed on or in the security document, the sensing device including: a housing adapted to be held by a user in use; a radiation source for exposing at least one coded data portion; a sensor for sensing the at least one exposed coded data portion; and, a processor for determining, using the at least one sensed coded data portion, a sensed identity.

Optionally, the security document is used in a method of determining a counterfeit security document, each coded data portion being further indicative of at least part of a signature, the signature being a digital signature of at least part of the identity, wherein the method includes: in a sensing device: sensing at least one coded data portion; and, generating, using the sensed coded data portion, indicating data indicative of: the identity; and, at least one signature part; in a processor: determining, from the indicating data: a determined identity; and, at least one determined signature part; determining if the security document is a counterfeit document using the determined identity and the at least one determined signature part.

Optionally, the security document is used in a method of determining a possible duplicated security document, wherein the method includes, in a computer system: receiving indicating data from a sensing device, the sensing device being responsive to sensing of the coded data to generate indicating data indicative of the identity of the security document; determining, from the indicating data, a determined identity; accessing, using the determined identity, tracking data indicative of: the identity of the security document; and, tracking information indicative of the location of the security document; and, determining, using the tracking information, if the security document is a possible duplicate.

Optionally, the security document is a currency document, and where a plurality of currency documents are counted using a currency counter, the counter including: an input for receiving a number of currency documents to be counted; an output for providing counted currency documents; a feed mechanism for transporting currency documents from the input to the output along a feed path; a sensor for sensing at least one coded data portion for each currency document transported along the feed path; and, a processor for: determining, from the at least one sensed coded data portion, a sensed identity for each currency document; determining, from the sensed identity, a determined value for each currency document; and, counting the currency documents using the determined values.

Optionally, the security document is used in a method of providing a security document having a security feature, the method including: creating the security document; determining an identity associated with the security document; generating a signature using the identity, the signature being a digital signature of at least part of the identity; generating coded data, the coded data including a number of coded data portions, each coded data portion being indicative of: the identity of the security document; and, at least part of the signature; and, printing the coded data on the security document.

Optionally, the security document is used in a method of printing a security document having a security feature, the method including: receiving the security document; receiving identity data, the identity data being at least partially indicative of an identity of the security document, the identity data being encrypted using a public key; determining the identity by decrypting the received identity data using a secret key associated with the public key; generating a signature using the determined identity, the signature being a digital signature of at least part of the identity; generating coded data at least partially indicative of: the identity of the security document; and, at least part of the signature; and, printing the coded data on the security document.

Optionally, the security document is used in a system for recording a transaction relating to a security document, the system including a computer system for: receiving indicating data from a sensing device, the sensing device being responsive to sensing of the coded data to generate indicating data at least partially indicative of: the identity of the security document; and, the transaction; and, updating, using the received indicating data, transaction data stored in a data store, the transaction data being indicative of: the identity of the security document; and, the transaction.

Optionally, the security document is used in a method for monitoring transactions involving security documents, the method including, in a computer system and following a transaction involving a security document: receiving indicating data from a sensing device, the sensing device being responsive to sensing of coded data to generate indicating data at least partially indicative of: the identity of the security document; and, the transaction; updating, using the received indicating data, transaction data stored in a data store, the transaction data being indicative of, for each of a number of security documents, performed transactions; comparing the transaction data to one or more predetermined patterns to thereby determine the presence or absence of a cash flow anomaly.

Optionally, the security document data relating to the security document is stored in a security document database, the security document data including, for each of a number of security documents: identity data, the identity data being at least partially indicative of an identity of the security document; attribute data, the attribute data being at least partially indicative of one or more attributes of the security document; wherein, in use, the security document database allows a computer system to: receive, from a sensing device, indicating data at least partially indicative of at least one of: the identity; and one or more attributes; use the received indicating data and the security document data to perform an action associated with the security document.

Optionally, the security document is used in a transaction and a set of instructions is used for causing a computer system to monitor the transaction, the set of instructions, when executed by the computer system, causing the computer system to: receive indicating data from a sensing device, the sensing device being responsive to sensing of coded data to generate indicating data at least partially indicative of: the identity of the security document; and, the transaction; updating, using the received indicating data, transaction data stored in a data store, the transaction data being indicative of: the identity of the security document; and, the transaction.

Optionally, the security document is a currency document, and a plurality of currency documents are counted using a currency counter executing a set of instructions, the currency counter having: an input for receiving a number of currency documents to be counted; an output for providing counted currency documents; a feed mechanism for transporting currency documents from the input to the output along a feed path; a sensor for sensing at least one coded data portion for each currency document transported along the feed path; and, a processor, the set of instructions, when executed by the processor, causing the processor to: determine, from the at least one sensed coded data portion, a sensed identity for each currency document; determine, from the sensed identity, a determined value for each currency document; and, count the currency documents using the determined values.

Optionally, the security document is authenticated using a processor for use in a device, the coded data being further at least partially indicative of a signature, the signature being a digital signature of at least part of the identity, the processor being adapted to: receive indicating data from a sensor in the device, the sensor being responsive to sensing of the coded data to generate indicating data at least partially indicative of: the identity; and, at least part of the signature; determine, from the indicating data, a determined identity and at least one determined signature part; and, authenticate the security document using the determined identity and the at least one determined signature part.

Optionally, the security document is a currency document and is used in a method of counting currency documents, the method including, in a sensing device: sensing at least one coded data portion for each currency document; generating, using the sensed coded data portion, indicating data at least partially indicative of the identity of each currency document; and, transferring the indicating data to a computer system, the computer system being responsive to the indicating data to: determine, using the indicating data, a determined identity for each currency document; determine, using each determined identity, a value for each currency document; and, count the currency documents using the determined values.

Optionally, the security document is a currency document and is used in a method for authenticating and evaluating the currency document, the method including, in a sensing device: sensing at least one coded data portion; generating, using the sensed coded data portion, indicating data at least partially indicative of: an identity of the currency document; and at least part of a signature, the signature being a digital signature of at least part of the identity; and, transferring the indicating data to a computer system, the computer system being responsive to the indicating data to: determine, from the indicating data, a received identity, and a received signature part; authenticate the currency document using the received identity and the received signature part; and, in response to a successful authentication, determine, using the received identity, a value associated with the currency document.

Optionally, the security document further includes anti-copy protection, the identity being uniquely indicative of the respective security document and being stored in a data store to allow for duplication of the security document to be determined.

Optionally, the security document is used in a method of recovering a stolen security document, the method including in a computer system: receiving indicating data from a sensing device, the sensing device being responsive to sensing of the coded data to generate indicating data at least partially indicative of the identity; determining, using the indicating data, a determined identity; accessing, using the determined identity, transaction data stored in a data store, the transaction data being indicative of a security document status; determining, using the security document status, if the security document is stolen; and, in response to a positive determination, causing the security document to be recovered.

In a eighteenth broad form the invention provides a method of recovering a stolen security document, the security document having disposed thereon or therein coded data including a number of coded data portions, each coded data portion being indicative of at least an identity of the security document, the method including in a computer system: receiving indicating data from a sensing device, the sensing device being responsive to sensing of the coded data to generate indicating data at least partially indicative of the identity; determining, using the indicating data, a determined identity; accessing, using the determined identity, transaction data stored in a data store, the transaction data being indicative of a security document status; determining, using the security document status, if the security document is stolen; and, in response to a positive determination, causing the security document to be recovered.

Optionally, the method includes, in the computer system, recording in the data store, the security document status as being stolen, in response to when the security document is stolen.

Optionally, the method includes, in the computer system, updating in the data store, the security document status as being recovered in response to a successful recovery of the security document.

Optionally, the computer system includes a display device, wherein the method includes displaying, using the display device, recovery data for use in recovering the stolen security document.

Optionally, each coded data portion further encodes a signature, wherein the signature is a digital signature of at least part of the identity, the method including: receiving indicating data at least partially indicative of: an identity of the currency document; and at least part of the signature; and, determining, using the indicating data, the determined identity.

Optionally, the indicating data is further indicative of a location of the sensing device and where the method includes causing the security document to be recovered in relation to the determined location.

Optionally, the signature is a digital signature of at least part of the identity and at least part of predetermined padding, the padding being at least one of: a predetermined number; and, a random number.

Optionally, the entire signature is encoded within a plurality of coded data portions and wherein the method includes the sensing device sensing a number of coded data portions to thereby determine the entire signature.

Optionally, the coded data includes a plurality of layouts, each layout defining the position of a plurality of first symbols encoding the identity, and a plurality of second symbols defining at least part of the signature.

Optionally, the coded data is substantially invisible to an unaided human.

Optionally, the coded data is printed on the surface using at least one of: an invisible ink; and, an infrared-absorptive ink.

Optionally, the coded data is provided substantially coincident with visible human-readable information.

Optionally at least one coded data portion encodes the entire signature.

Optionally the entire signature is formed from a plurality of signature parts, and wherein each coded data portion encodes a respective signature part.

Optionally, at least some of the coded data portions encode at least one of: a location of the respective coded data portion; a position of the respective coded data portion on the surface; a size of the coded data portions; a size of a signature; an identity of a signature part; and, units of indicated locations.

Optionally, the coded data includes at least one of: redundant data; data allowing error correction; Reed-Solomon data; and, Cyclic Redundancy Check (CRC) data.

Optionally, the digital signature includes at least one of: a random number associated with the identity; a keyed hash of at least the identity; a keyed hash of at least the identity produced using a private key, and verifiable using a corresponding public key; cipher-text produced by encrypting at least the identity; cipher-text produced by encrypting at least the identity and a random number; and, cipher-text produced using a private key, and verifiable using a corresponding public key; and, cipher-text produced using RSA encryption.

Optionally, the security document is at least one of: a currency note; a check; a credit or debit card; a redeemable ticket, voucher, or coupon; a lottery ticket or instant win ticket; and, an identity card or document, such as a driver's license or passport.

Optionally, the identity is indicative of at least one of: a currency note attribute including at least one of: currency; issue country; denomination; note side; printing works; and serial number; a check attribute including at least one of: currency; issuing institution; account number; serial number; expiry date; check value; and limit; a card attribute including at least one of: card type; issuing institution; account number; issue date; expiry date; and limit.

Optionally, the coded data is arranged in accordance with at least one layout having n-fold rotational symmetry, where n is at least two, the layout including n identical sub-layouts rotated 1/n revolutions apart about a centre of rotation, at least one sub-layout including rotation-indicating data that distinguishes that sub-layout from each other sub-layout.

Optionally, the coded data is arranged in accordance with at least one layout having n-fold rotational symmetry, where n is at least two, the layout encoding orientation-indicating data comprising a sequence of an integer multiple m of n symbols, where m is one or more, each encoded symbol being distributed at n locations about a centre of rotational symmetry of the layout such that decoding the symbols at each of the n orientations of the layout produces n representations of the orientation-indicating data, each representation comprising a different cyclic shift of the orientation-indicating data and being indicative of the degree of rotation of the layout.

Optionally, the method is further used for tracking a security document, the method including, in a computer system: receiving indicating data from a sensing device, the sensing device being responsive to sensing of the coded data to generate indicating data indicative of the identity of the product item; and, updating, using the received indicating data, tracking data stored in a data store, tracking data being indicative of: the identity of the product item; and, tracking information.

Optionally, the sensing device includes: a housing adapted to be held by a user in use; a radiation source for exposing at least one coded data portion; a sensor for sensing the at least one exposed coded data portion; and, a processor for determining, using the at least one sensed coded data portion, a sensed identity.

Optionally, the method is further used for determining a counterfeit security document, each coded data portion being further indicative of at least part of a signature, the signature being a digital signature of at least part of the identity, wherein the method further includes: in a sensing device: generating, using the sensed coded data portion, indicating data indicative of: the identity; and, at least one signature part; and, in a processor: determining, from the indicating data: a determined identity; and, at least one determined signature part; and, determining if the security document is a counterfeit document using the determined identity and the at least one determined signature part.

Optionally, the method is further used for determining a possible duplicated security document, wherein the method includes, in a computer system: receiving indicating data from a sensing device, the sensing device being responsive to sensing of the coded data to generate indicating data indicative of the identity of the security document; determining, from the indicating data, a determined identity; accessing, using the determined identity, tracking data indicative of: the identity of the security document; and, tracking information indicative of the location of the security document; and, determining, using the tracking information, if the security document is a possible duplicate.

Optionally, the method is used in a currency counter for counting currency documents, each currency document having disposed thereon or therein coded data including a number of coded data portions, each coded data portion being indicative of an identity of the currency document, the counter including: an input for receiving a number of currency documents to be counted; an output for providing counted currency documents; a feed mechanism for transporting currency documents from the input to the output along a feed path; a sensor for sensing at least one coded data portion for each currency document transported along the feed path; and, a processor for: determining, from the at least one sensed coded data portion, a sensed identity for each currency document; determining, from the sensed identity, a determined value for each currency document; and, counting the currency documents using the determined values.

Optionally, the security document having a security feature, wherein the method of providing the security document includes: creating the security document; determining an identity associated with the security document; generating a signature using the identity, the signature being a digital signature of at least part of the identity; generating coded data, the coded data including a number of coded data portions, each coded data portion being indicative of: the identity of the security document; and, at least part of the signature; and, printing the coded data on the security document.

Optionally, the security document being printed with a security feature, wherein the method of printing the security document includes: receiving the security document; receiving identity data, the identity data being at least partially indicative of an identity of the security document, the identity data being encrypted using a public key; determining the identity by decrypting the received identity data using a secret key associated with the public key; generating a signature using the determined identity, the signature being a digital signature of at least part of the identity; generating coded data at least partially indicative of: the identity of the security document; and, at least part of the signature; and, printing the coded data on the security document.

Optionally, the method is used in a system for recording a transaction relating to a security document, the system including a computer system for: receiving indicating data from a sensing device, the sensing device being responsive to sensing of the coded data to generate indicating data at least partially indicative of: the identity of the security document; and, the transaction; and, updating, using the received indicating data, transaction data stored in a data store, the transaction data being indicative of: the identity of the security document; and, the transaction.

Optionally, the method is further used for monitoring transactions involving security documents, the method including, in a computer system and following a transaction involving a security document: receiving indicating data from a sensing device, the sensing device being responsive to sensing of coded data to generate indicating data at least partially indicative of: the identity of the security document; and, the transaction; updating, using the received indicating data, transaction data stored in a data store, the transaction data being indicative of, for each of a number of security documents, performed transactions; comparing the transaction data to one or more predetermined patterns to thereby determine the presence or absence of a cash flow anomaly.

Optionally, the method includes using a security document database, the database storing security document data including, for each of a number of security documents: identity data, the identity data being at least partially indicative of an identity of the security document; attribute data, the attribute data being at least partially indicative of one or more attributes of the security document; wherein, in use, the security document database allows a computer system to: receive, from a sensing device, indicating data at least partially indicative of at least one of: the identity; and one or more attributes; use the received indicating data and the security document data to perform an action associated with the security document.

Optionally, the method is further used for causing a computer system to monitor transactions involving security documents, the method being performed using a set of instructions, each security document having disposed thereon or therein coded data including a number of coded data portions, each coded data portion being indicative of at least an identity of the security document, the set of instructions, when executed by the computer system, causing the computer system to: receive indicating data from a sensing device, the sensing device being responsive to sensing of coded data to generate indicating data at least partially indicative of: the identity of the security document; and, the transaction; updating, using the received indicating data, transaction data stored in a data store, the transaction data being indicative of: the identity of the security document; and, the transaction.

Optionally, the method is further used for counting currency documents, the method being performed using a set of instructions, each currency document having disposed therein or thereon at least one coded data portion being indicative of at least an identity of the currency document, the currency counter having: an input for receiving a number of currency documents to be counted; an output for providing counted currency documents; a feed mechanism for transporting currency documents from the input to the output along a feed path; a sensor for sensing at least one coded data portion for each currency document transported along the feed path; and, a processor, the set of instructions, when executed by the processor, causing the processor to: determine, from the at least one sensed coded data portion, a sensed identity for each currency document; determine, from the sensed identity, a determined value for each currency document; and, count the currency documents using the determined values.

Optionally, the method is used in a processor for use in a device for authenticating security documents, the coded data further being at least partially indicative of a signature, the signature being a digital signature of at least part of the identity, the processor being adapted to: receive indicating data from a sensor in the device, the sensor being responsive to sensing of the coded data to generate indicating data at least partially indicative of: the identity; and, at least part of the signature; determine, from the indicating data, a determined identity and at least one determined signature part; and, authenticate the security document using the determined identity and the at least one determined signature part.

Optionally, the method is further used for counting currency documents, each currency document having disposed thereon or therein coded data including a plurality of coded data portions, each coded data portion being at least partially indicative of an identity of the currency document, the method including, in a sensing device: sensing at least one coded data portion for each currency document; generating, using the sensed coded data portion, indicating data at least partially indicative of the identity of each currency document; and, transferring the indicating data to a computer system, the computer system being responsive to the indicating data to: determine, using the indicating data, a determined identity for each currency document; determine, using each determined identity, a value for each currency document; and, count the currency documents using the determined values.

Optionally, the method further being used for authenticating and evaluating a currency document, the currency document having disposed thereon or therein coded data including a plurality of coded data portions, the method including, in a sensing device: sensing at least one coded data portion; generating, using the sensed coded data portion, indicating data at least partially indicative of: an identity of the currency document; and at least part of a signature, the signature being a digital signature of at least part of the identity; and, transferring the indicating data to a computer system, the computer system being responsive to the indicating data to: determine, from the indicating data, a received identity, and a received signature part; authenticate the currency document using the received identity and the received signature part; and, in response to a successful authentication, determine, using the received identity, a value associated with the currency document.

Optionally, the security document includes anti-copy protection, the identity being uniquely indicative of the respective security document and being stored in a data store to allow for duplication of the security document to be determined.

Optionally, the security document includes anti-forgery protection, each coded data portion being further indicative of at least part of a signature, the signature being formed by encrypting at least part of the identity using a private key of public/private key pair, such that: valid security documents can only be created using the private key; and, validity of the security document can be confirmed using the corresponding public key.

In another broad form the invention provides a method of recovering a stolen security document, the security document having disposed thereon or therein coded data including a number of coded data portions, each coded data portion being indicative of at least an identity of the security document, the method including in a sensing device: sensing at least some of the coded data portions; generating indicating data at least partially indicative of the identity; transferring the indicating data to a computer system, the computer system being responsive to indicating data to: determine, using the indicating data, a determined identity; access, using the determined identity, transaction data stored in a data store, the transaction data being indicative of a security document status; determine, using the security document status, if the security document is stolen; and, in response to a positive determination, cause the security document to be recovered.

In a nineteenth broad form the present invention provides a method of verifying an object, wherein the method includes, in a computer system: receiving a verification request, the request being at least partially indicative of: an identity of the object; at least one signature fragment, the signature being a digital signature of at least part of the identity; determining, using the verification request, a determined identity; determining, using the determined identity, and from a database, at least one criterion relating to verification; and, comparing the received verification request to the at least one criterion; and causing the object to be verified if the at least one criterion is satisfied.

Optionally the at least one criterion relates to a limit on at least one of: a number of received verification requests; a rate of received verification requests; and, timing of received verification requests.

Optionally the limit is defined in respect of at least one of: the identity of the object; the signature; the signature fragment; a verification request source; and, the object.

Optionally the limit is proportional to a size of the signature fragment.

Optionally the method includes, in the computer system: determining, using the verification request: a request history indicative of a number of previously received verification requests; and, a corresponding limit; determining, using the verification request and the request history, a request number; and, causing the object to be verified if the request number does not exceed the corresponding limit.

Optionally the method includes, in the computer system, and in response to a verification request, updating the request history.

Optionally the request history is indicative of the timing of the received verification request.

Optionally the request history is associated with: the identity of the object; the signature; the signature fragment; a verification request source; and, the object.

Optionally the method includes, in the computer system, verifying the object by authenticating the object using the identity of the object and the at least one signature fragment.

Optionally the verification request is at least partially indicative of an identity of the signature fragment.

Optionally the object is associated with a surface having disposed thereon or therein coded data including a number of coded data portions, each coded data portion being indicative of at least the identity and a signature fragment, and wherein, in response to sensing of at least one coded data portion, a sensing device generates the verification request.

Optionally the verification request is at least partially indicative of an identity of the signature fragment, the fragment identity being based on at least one of: a number encoded within the at least one sensed coded data portion; and, a position of the at least one sensed coded data portion on the surface.

Optionally the method includes, in the computer system, only comparing the received verification request to the at least one criterion after a failed verification.

Optionally the method includes, in a computer system: receiving a verification request, the request being at least partially indicative of: an identity of the object; a concatenation of: a signature fragment, the signature fragment being a digital signature of at least part of the identity; and a random signature; determining, using the verification request, a determined identity; determining, using the concatenation, the signature fragment; and, verifying the object using the determined identity and the signature fragment.

Optionally the method includes, in the computer system: determining, using the determined identity, a key; generating, using the determined identity and the key, a generated signature; comparing the generated signature to the concatenation to thereby identify and authenticate the signature fragment.

In another broad form the present invention provides coded data for disposal on or in a surface, the coded data including a number of coded data portions, each coded data portion encoding: an identity; and, a fragment of a signature, the signature being a digital signature of at least part of the identity; and a random signature.

In another broad form the present invention provides coded data for disposal on or in a surface, the coded data including a number of coded data portions, each coded data portion being at least partially indicative of: an identity; at least fragment of a signature, the signature being a digital signature of at least part of the identity; and, a position of the coded data on the surface.

Optionally each coded data portion is at least partially indicative of a data portion identity, the data portion identity being unique for each coded data portion, the data portion identity being indicative of the position.

Optionally the coded data is disposed on or in the surface using a layout, the layout being indicative of, for each data portion identity, the position of the corresponding coded data portion.

Optionally the signature is generated using RSA encryption.

BRIEF DESCRIPTION OF THE DRAWINGS

An example of the present invention will now be described with reference to the accompanying drawings, in which.

DETAILED DESCRIPTION OF THE DRAWINGS

The Netpage surface coding consists of a dense planar tiling of tags. Each tag encodes its own location in the plane. Each tag also encodes, in conjunction with adjacent tags, an identifier of the region containing the tag. In the Netpage system, the region typically corresponds to the entire extent of the tagged surface, such as one side of a sheet of paper.

Hyperlabel is the adaptation of the Netpage tags for use in unique item identification for a wide variety of applications, including security document protection, object tracking, pharmaceutical security, supermarket automation, interactive product labels, web-browsing from printed surfaces, paper based email, and many others.

Using Memjet™ digital printing technology (which is the subject of a number of pending U.S. patent applications including U.S. Ser. No. 10/407,212), Hyperlabel tags are printed over substantially an entire surface, such as a security document, bank note, or pharmaceutical packaging, using infrared (IR) ink. By printing the tags in infrared-absorptive ink on any substrate which is infrared-reflective, the near-infrared wavelengths, and hence the tags are invisible to the human eye but are easily sensed by a solid-state image sensor with an appropriate filter. This allows machine readable information to be encoded over a large portion of the note or other surface, with no visible effect on the original note text or graphics thereon. A scanning laser or image sensor can read the tags on any part of the surface to performs associated actions, such as validating each individual note or item.

Figure 1:
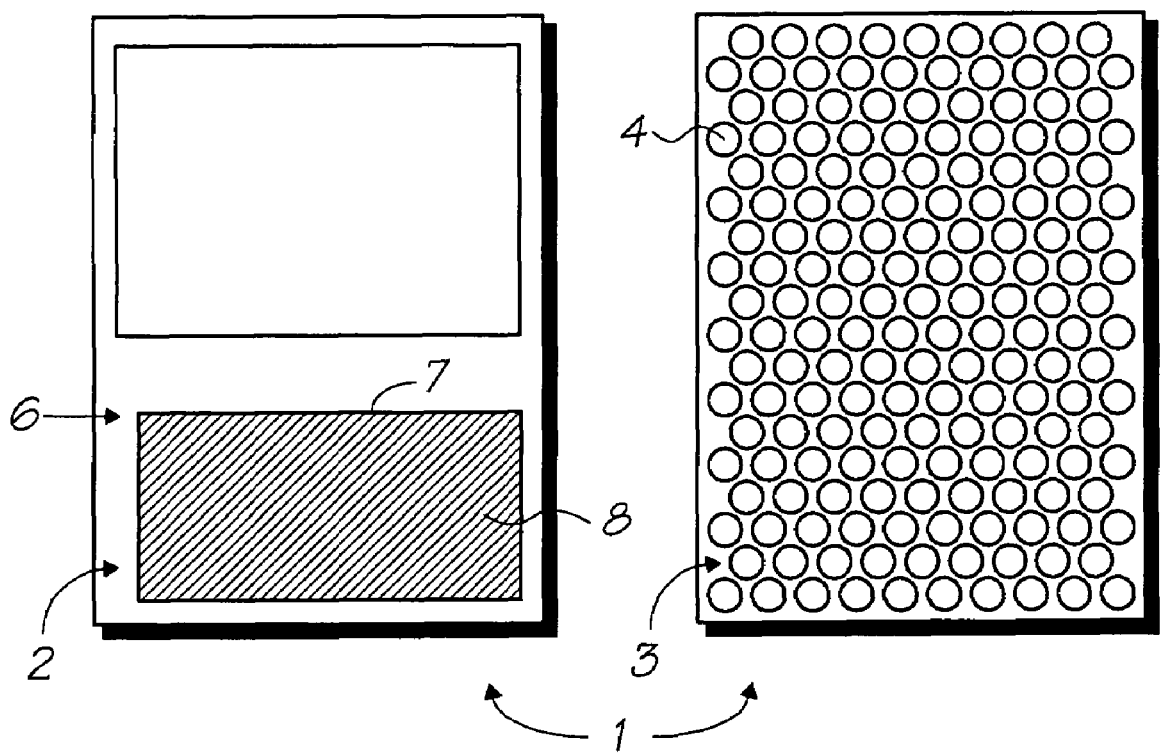
FIG. 1 is an example of a document including Hyperlabel encoding.

An example of such a hyperlabel encoded document, is shown in FIG. 1. In this example, the hyperlabel document consists of graphic data 2 printed using visible ink, and coded data 3 formed from hyperlabel tags 4. The document includes an interactive element 6 defined by a zone 7 which corresponds to the spatial extent of a corresponding graphic 8. In use, the tags encode tag data including an ID. By sensing at least one tag, and determining and interpreting the encoded ID using an appropriate system, this allows the associated actions to be performed.

In one example, a tag map is used to define a layout of the tags on the hyperlabel document based on the ID encoded within the tag data. The ID can also be used to reference a document description which describes the individual elements of the hyperlabel document, and in particular describes the type and spatial extent (zone) of interactive elements, such as a button or text field. Thus, in this example, the element 6 has a zone 7 which corresponds to the spatial extent of a corresponding graphic 8. This allows a computer system to interpret interactions with the hyperlabel document.

In position indicating techniques, the ID encoded within the tag data of each tag allows the exact position of the tag on the hyperlabel document to be determined from the tag map. The position can then be used to determine whether the sensed tag is positioned in a zone of an interactive element from the document description.

In object indicating techniques, the ID encoded within the tag data allows the presence of the tag in a region of the document to be determined from the tag map (the relative position of the tag within the region may also be indicated). In this case, the document description can be used to determine whether the region corresponds to the zone of an interactive element.

Figure 2:
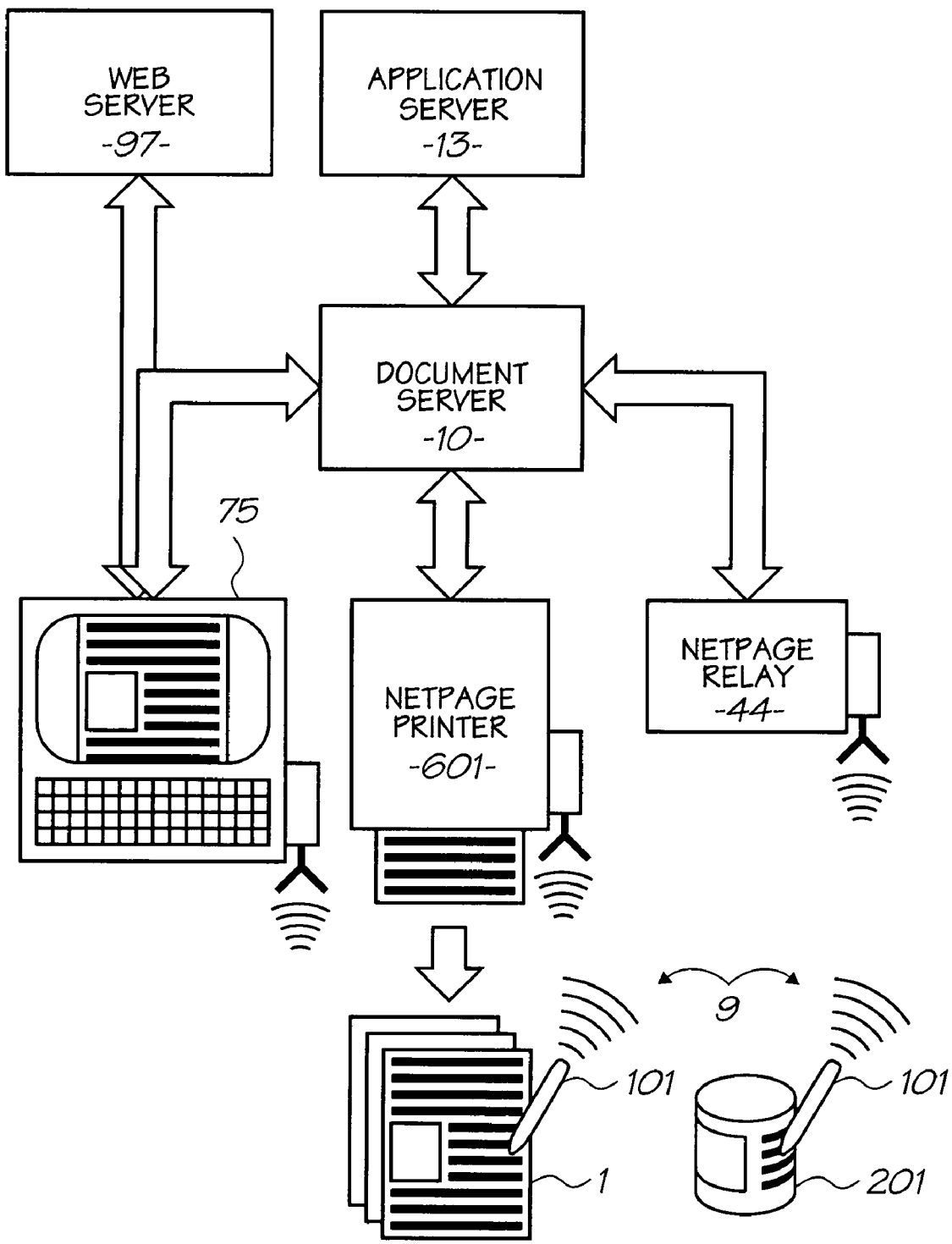
FIG. 2 is an example of a system for interacting with the Hyperlabel document of FIG. 1.
Figure 3:
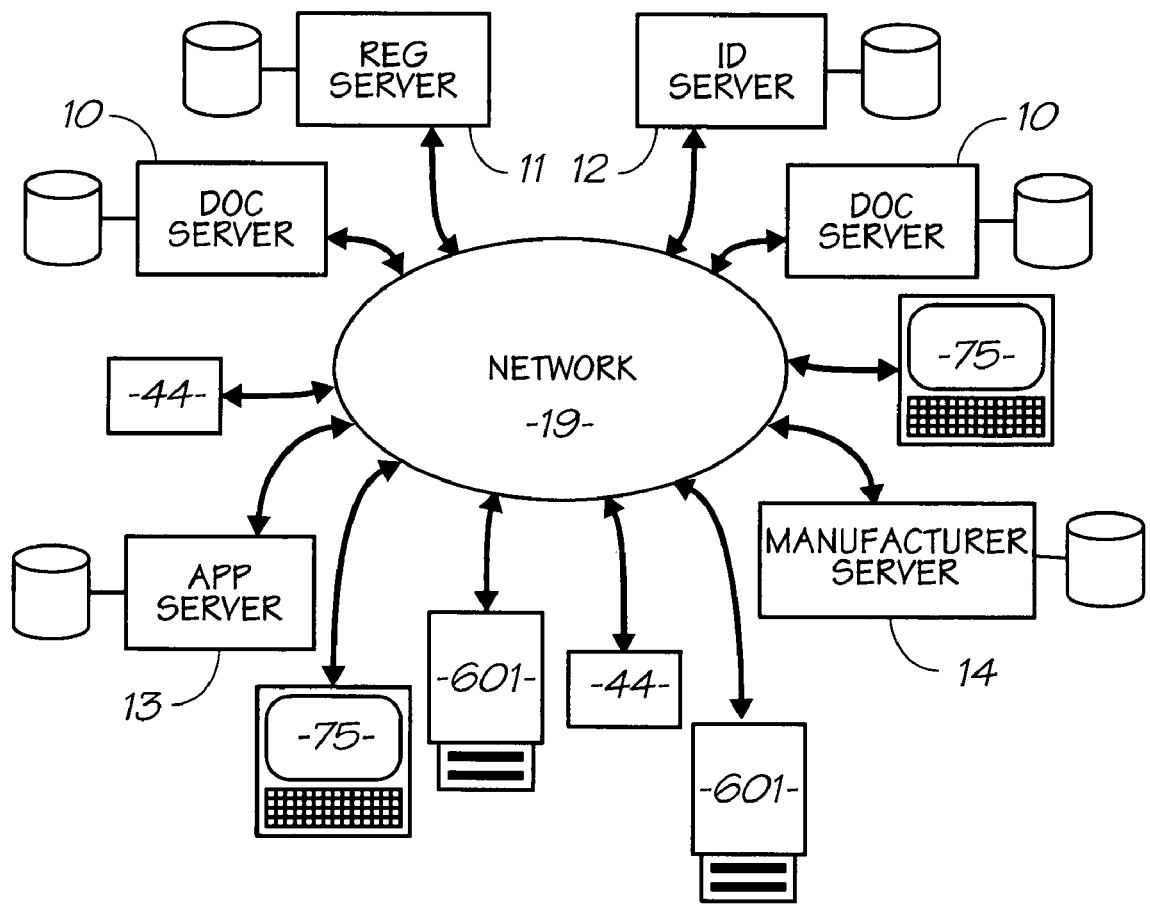
FIG. 3 is a further example of system for interacting with the Hyperlabel document of FIG. 1.

An example of this process will now be described with reference to FIGS. 2 and 3 which show how a sensing device in the form of a netpage or hyperlabel pen 101, which interacts with the coded data on a printed hyperlabel document 1, such as a security document, label, product packaging or the like.

The hyperlabel pen 101 senses a tag using an area image sensor and detects tag data. The hyperlabel pen 101 uses the sensed coded data to generate interaction data which is transmitted via a short-range radio link 9 to a relay 44, which may form part of a computer 75 or a printer 601. The relay sends the interaction data, via a network 19, to a document server 10, which uses the ID to access the document description, and interpret the interaction. In appropriate circumstances, the document server sends a corresponding message to an application server 13, which can then perform a corresponding action.

In an alternative embodiment, the PC, Web terminal, netpage printer or relay device may communicate directly with local or remote application software, including a local or remote Web server. Relatedly, output is not limited to being printed by the netpage printer. It can also be displayed on the PC or Web terminal, and further interaction can be screen-based rather than paper-based, or a mixture of the two.

Typically hyperlabel pen users register with a registration server 11, which associates the user with an identifier stored in the respective hyperlabel pen. By providing the sensing device identifier as part of the interaction data, this allows users to be identified, allowing transactions or the like to be performed.

Hyperlabel documents are generated by having an ID server generate an ID which is transferred to the document server 10. The document server 10 determines a document description and then records an association between the document description and the ID, to allow subsequent retrieval of the document description using the ID.

The ID is then used to generate the tag data, as will be described in more detail below, before the document is printed by the hyperlabel printer 601, using the page description and the tag map.

Each tag is represented by a pattern which contains two kinds of elements. The first kind of element is a target. Targets allow a tag to be located in an image of a coded surface, and allow the perspective distortion of the tag to be inferred. The second kind of element is a macrodot. Each macrodot encodes the value of a bit by its presence or absence.

The pattern is represented on the coded surface in such a way as to allow it to be acquired by an optical imaging system, and in particular by an optical system with a narrowband response in the near-infrared. The pattern is typically printed onto the surface using a narrowband near-infrared ink.

In the Hyperlabel system the region typically corresponds to the surface of an entire product item, or to a security document, and the region ID corresponds to the unique item ID. For clarity in the following discussion we refer to items and item IDs (or simply IDs), with the understanding that the item ID corresponds to the region ID.

The surface coding is designed so that an acquisition field of view large enough to guarantee acquisition of an entire tag is large enough to guarantee acquisition of the ID of the region containing the tag. Acquisition of the tag itself guarantees acquisition of the tag's two-dimensional position within the region, as well as other tag-specific data. The surface coding therefore allows a sensing device to acquire a region ID and a tag position during a purely local interaction with a coded surface, e.g. during a "click" or tap on a coded surface with a pen.

A wide range of different tag structures can be used, and some examples will now be described.

FIRST EXAMPLE TAG STRUCTURE

Figure 4:
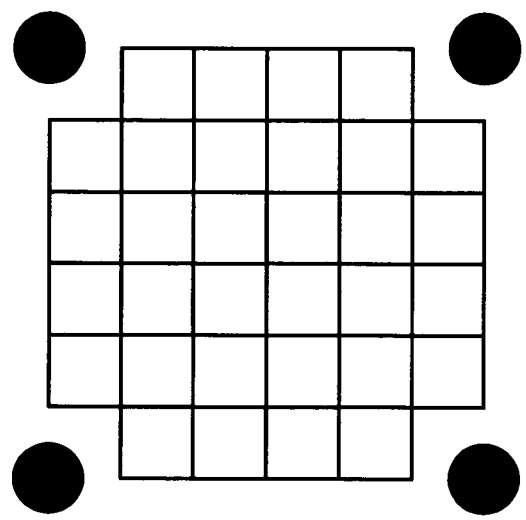
FIG. 4. is a first example of a tag structure.

FIG. 4 shows the structure of a complete tag. Each of the four black circles is a target. The tag, and the overall pattern, has four-fold rotational symmetry at the physical level.

Each square region represents a symbol, and each symbol represents four bits of information.

Figure 5:
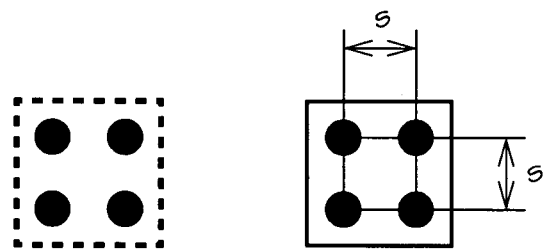
FIG. 5. is an example of a symbol unit cell for the tag structure of FIG. 4.

FIG. 5 shows the structure of a symbol. It contains four macrodots, each of which represents the value of one bit by its presence (one) or absence (zero).

The macrodot spacing is specified by the parameter s throughout this document. It has a nominal value of 143 µm, based on 9 dots printed at a pitch of 1600 dots per inch. However, it is allowed to vary by ±10% according to the capabilities of the device used to produce the pattern.

Figure 6:
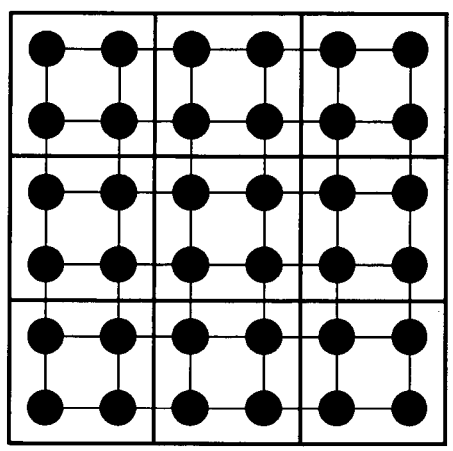
FIG. 6. is an example of an array of the symbol unit cells of FIG. 5.

FIG. 6 shows an array of nine adjacent symbols. The macrodot spacing is uniform both within and between symbols.

Figure 7:
FIG. 7. is an example of symbol bit ordering in the unit cells of FIG. 5.

FIG. 7 shows the ordering of the bits within a symbol. Bit zero is the least significant within a symbol; bit three is the most significant. Note that this ordering is relative to the orientation of the symbol. The orientation of a particular symbol within the tag is indicated by the orientation of the label of the symbol in the tag diagrams. In general, the orientation of all symbols within a particular segment of the tag have the same orientation, consistent with the bottom of the symbol being closest to the centre of the tag.

Figure 8:
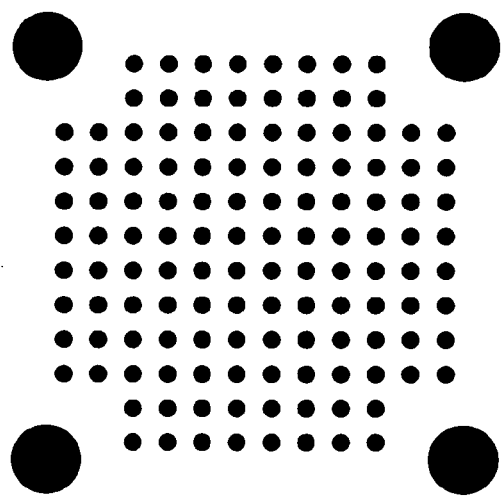
FIG. 8. is an example of the tag structure of FIG. 4 with every bit set.

Only the macrodots are part of the representation of a symbol in the pattern. The square outline of a symbol is used in this document to more clearly elucidate the structure of a tag. FIG. 8, by way of illustration, shows the actual pattern of a tag with every bit set. Note that, in practice, every bit of a tag can never be set.

A macrodot is nominally circular with a nominal diameter of (5/9)s. However, it is allowed to vary in size by ±10% according to the capabilities of the device used to produce the pattern.

A target is nominally circular with a nominal diameter of (17/9)s. However, it is allowed to vary in size by ±10% according to the capabilities of the device used to produce the pattern.

The tag pattern is allowed to vary in scale by up to ±10% according to the capabilities of the device used to produce the pattern. Any deviation from the nominal scale is recorded in the tag data to allow accurate generation of position samples.

Each symbol shown in the tag structure in FIG. 4 has a unique label. Each label consists an alphabetic prefix and a numeric suffix.

Tag Group

Figure 9:
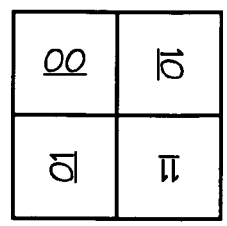
FIG. 9. is an example of tag types within a tag group for the tag structure of FIG. 4.

Tags are arranged into tag groups. Each tag group contains four tags arranged in a square. Each tag therefore has one of four possible tag types according to its location within the tag group square. The tag types are labelled 00, 10, 01 and 11, as shown in FIG. 9.

Each tag in the tag group is rotated as shown in the figure, i.e. tag type 00 is rotated 0 degrees, tag type 10 is rotated 90 degrees, tag type 11 is rotated 180 degrees, and tag type 01 is rotated 270 degrees.

Figures 10, 11:
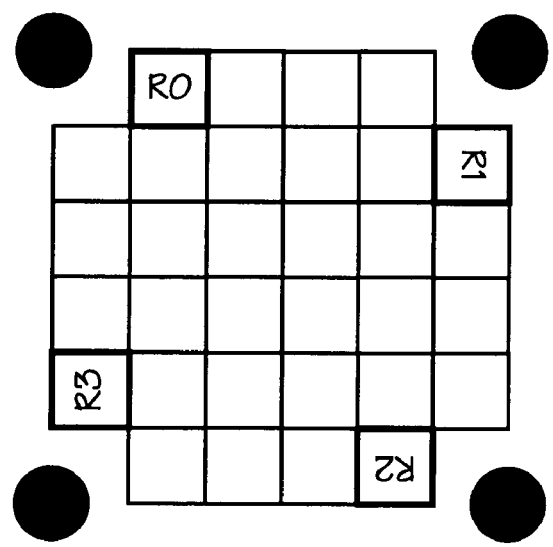
FIG. 10. is an example of continuous tiling of the tag groups of FIG. 9.
FIG. 11. is an example of the orientation-indicating cyclic position codeword R for the tag group of FIG. 4.

FIG. 10 shows how tag groups are repeated in a continuous tiling of tags. The tiling guarantees the any set of four adjacent tags contains one tag of each type.

Orientation-Indicating Cyckic Posistion Code

The tag contains a $2^4$-ary (4, 1) cyclic position codeword which can be decoded at any of the four possible orientations of the tag to determine the actual orientation of the tag. Symbols which are part of the cyclic position codeword have a prefix of "R" and are numbered 0 to 3 in order of increasing significance.

The cyclic position codeword is $(0, 7, 9, E_{16})$. Note that it only uses four distinct symbol values, even though a four-bit symbol has sixteen possible values. During decoding, any unused symbol value should, if detected, be treated as an erasure. To maximise the probability of low-weight bit error patterns causing erasures rather than symbol errors, the symbol values are chosen to be as evenly spaced on the hypercube as possible.

The minimum distance of the cyclic position code is 4, hence its error-correcting capacity is one symbol in the presence of up to one erasure, and no symbols in the presence of two or more erasures.

The layout of the orientation-indicating cyclic position codeword is shown in FIG. 11.

Local Codewords

The tag locally contains one complete codeword which is used to encode information unique to the tag. The codeword is of a punctured $2^4$-ary (13, 7) Reed-Solomon code. The tag therefore encodes up to 28 bits of information unique to the tag.

Figure 12:
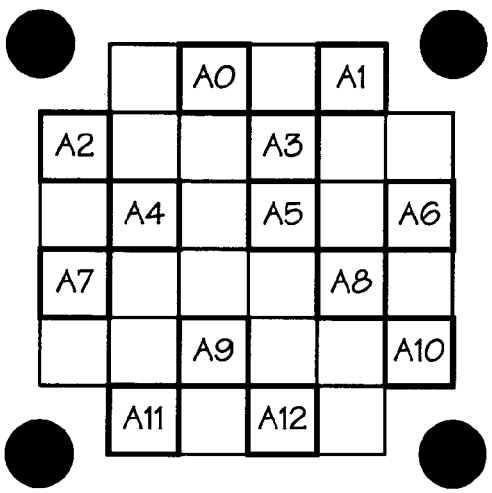
FIG. 12. is an example of a local codeword A for the tag group of FIG. 4.

The layout of the local codeword is shown in FIG. 12.

Distributed Codewords

The tag also contains fragments of four codewords which are distributed across the four adjacent tags in a tag group and which are used to encode information common to a set of contiguous tags. Each codeword is of a $2^4$-ary (15, 11) Reed-Solomon code. Any four adjacent tags therefore together encode up to 176 bits of information common to a set of contiguous tags.

The layout of the four complete codewords, distributed across the four adjacent tags in a tag group, is shown in FIG.

Figure 13:
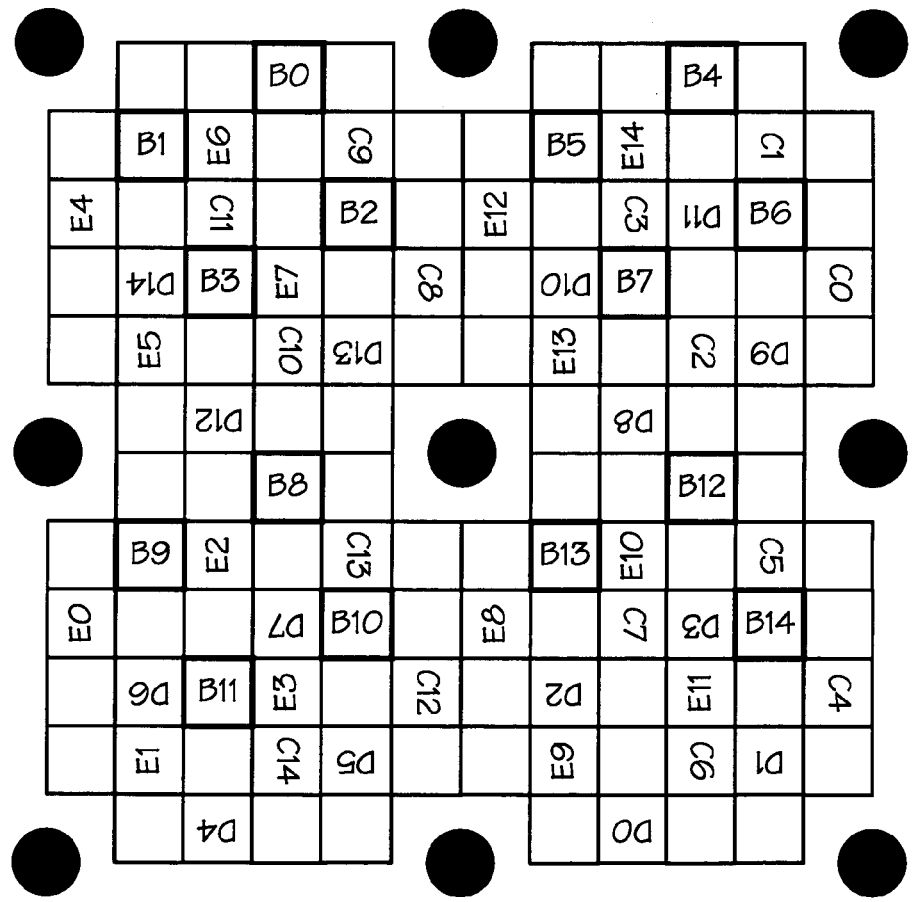
FIG. 13. is an example of distributed codewords B, C, D and E, for the tag group of FIG. 4.

13. The order of the four tags in the tag group in FIG. 13 is the order of the four tags in FIG. 9.

Figures 14, 15:
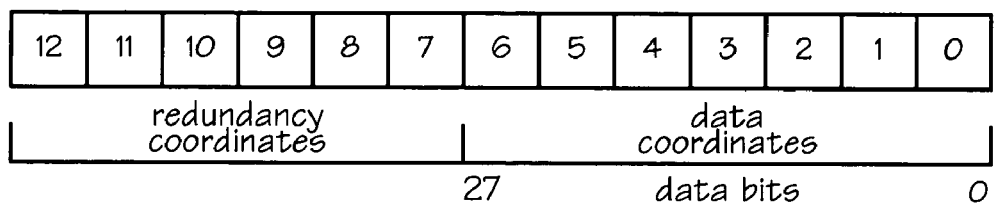
FIG. 14. is an example of a layout of complete tag group.
FIG. 15. is an example of a code word for the tag group of FIG. 4.

FIG. 14 shows the layout of a complete tag group.

Reed-Solomon Encoding

Local Codeword

The local codeword is encoded using a punctured $2^4$-ary (13, 7) Reed-Solomon code. The code encodes 28 data bits (i.e. seven symbols) and 24 redundancy bits (i.e. six symbols) in each codeword. Its error-detecting capacity is six symbols. Its error-correcting capacity is three symbols.

As shown in FIG. 15, codeword coordinates are indexed in coefficient order, and the data bit ordering follows the codeword bit ordering.

The code is a $2^4$-ary (15, 7) Reed-Solomon code with two redundancy coordinates removed. The removed coordinates are the most significant redundancy coordinates.

The code has the following primitive polynominal:

$$p(x)=x^4+x+1 \quad (EQ\ 1)$$

The code has the following generator polynominal:

$$g(x)=(x+\alpha)(x+\alpha^2)\ldots(x+\alpha^8) \quad (EQ\ 2)$$

Distributed Codewords

The distributed codewords are encoded using a $2^4$-ary (15, 11) Reed-Solomon code. The code encodes 44 data bits (i.e. eleven symbols) and 16 redundancy bits (i.e. four symbols) in each codeword. Its error-detecting capacity is four symbols. Its error-correcting capacity is two symbols.

Codeword coordinates are indexed in coefficient order, and the data bit ordering follows the codeword bit ordering.

The code has the same primitive polynominal as the local codeword code.

The code has the following generator polynominal:

$$g(x)=(x+\alpha)(x+\alpha^2)\ldots(x+\alpha^4) \quad (EQ\ 3)$$

Tag Coordinate Space

The tag coordinate space has two orthogonal axes labelled x and y respectively. When the positive x axis points to the right then the positive y axis points down.

The surface coding does not specify the location of the tag coordinate space origin on a particular tagged surface, nor the orientation of the tag coordinate space with respect to the surface. This information is application-specific. For example, if the tagged surface is a sheet of paper, then the application which prints the tags onto the paper may record the actual offset and orientation, and these can be used to normalise any digital ink subsequently captured in conjunction with the surface.

The position encoded in a tag is defined in units of tags. By convention, the position is taken to be the position of the centre of the target closest to the origin.

Tag Information Content

Field Definitions

Table 1 defines the information fields embedded in the surface coding. Table 2 defines how these fields map to codewords.

TABLE 1

Field definitions

| field | width (bits) | description |
|---|---|---|
| per tag | | |
| x coordinate | 9 or 13 | The unsigned x coordinate of the tag allows maximum coordinate values of approximately 0.9 m and 14 m respectively. |
| y coordinate | 9 or 13 | The unsigned y coordinate of the tag allows maximum coordinate values of approximately 0.9 m and 14 m respectively |
| active area flag | 1 | b'1' indicates whether the area (the diameter of the area ntered on the tag, is nominally 5 times the diagonal size of the tag) immediately surrounding the tag intersects an active area |
| data fragment flag | 1 | A flag indicating whether a data fragment is present (see next field). b'1' indicates the presence of a data fragment. If the data fragment is present then the width of the x and y coordinate fields is 9. If it is absent then the width is 13. |
| data fragment | 0 or 8 | A fragment of an embedded data stream. |
| per tag group (i.e. per region) | | |
| encoding format | 8 | The format of the encoding. 0: the present encoding Other values are reserved. |
| region flags | 8 | Flags controlling the interpretation of region data. 0: region ID is an EPC 1: region has signature 2: region has embedded data 3: embedded data is signature Other bits are reserved and must be zero. |
| tag size ID | 8 | The ID of the tag size. 0: the present tag size the nominal tag size is 1.7145 mm, based on 1600 dpi, 9 dots per macrodot, and 12 macrodots per tag Other values are reserved. |

TABLE 1-continued

Field definitions

| field | width (bits) | description |
|---|---|---|
| region ID | 96 | The ID of the region containing the tags. |
| signature | 36 | The signature of the region. |
| high-order coordinate width (w) | 4 | The width of the high-order part of the x and y coordinates of the tag. |
| high-order x coordinate | 0 to 15 | High-order part of the x coordinate of the tag expands the maximum coordinate values to approximately 2.4 km and 38 km respectively |
| high-order y coordinate | 0 to 15 | High-order part of the y coordinate of the tag expands the maximum coordinate values to approximately 2.4 km and 38 km respectively. |
| CRC | 16 | A CRC of tag group data. |

An active area is an area within which any captured input should be immediately forwarded to the corresponding hyperlabel server for interpretation. This also allows the hyperlabel server to signal to the user that the input has had an immediate effect. Since the server has access to precise region definitions, any active area indication in the surface coding can be imprecise so long as it is inclusive.

The width of the high-order coordinate fields, if non-zero, reduces the width of the signature field by a corresponding number of bits. Full coordinates are computed by prepending each high-order coordinate field to its corresponding coordinate field.

TABLE 2

Mapping of fields to codewords

| codeword | codeword bits | field | width | field bits |
|---|---|---|---|---|
| A | 12:0 | x coordinate | 13 | all |
|  | 12:9 | data fragment | 4 | 3:0 |
|  | 25:13 | y coordinate | 13 | all |
|  | 25:22 | data fragment | 4 | 7:4 |
|  | 26 | active area flag | 1 | all |
|  | 27 | data fragment flag | 1 | all |
| B | 7:0 | encoding format | 8 | all |
|  | 15:8 | region flags | 8 | all |
|  | 23:16 | tag size ID | 8 | all |
|  | 39:24 | CRC | 16 | all |
|  | 43:40 | high-order coordinate width (w) | 4 | 3:0 |
| C | 35:0 | signature | 36 | all |
|  | (35 − w):(36 − 2w) | high-order x coordinate | w | all |
|  | 35:(36 − w) | high-order y coordinate | w | all |
|  | 43:36 | region ID | 8 | 7:0 |
| D | 43:0 | region ID | 44 | 51:8 |
| E | 43:0 | region ID | 44 | 95:52 |

Embedded Data

If the "region has embedded data" flag in the region flags is set then the surface coding contains embedded data. The data is encoded in multiple contiguous tags' data fragments, and is replicated in the surface coding as many times as it will fit.

The embedded data is encoded in such a way that a random and partial scan of the surface coding containing the embedded data can be sufficient to retrieve the entire data. The scanning system reassembles the data from retrieved fragments, and reports to the user when sufficient fragments have been retrieved without error.

As shown in Table 3, a 200-bit data block encodes 160 bits of data. The block data is encoded in the data fragments of a contiguous group of 25 tags arranged in a 5×5 square. A tag belongs to a block whose integer coordinate is the tag's coordinate divided by 5. Within each block the data is arranged into tags with increasing x coordinate within increasing y coordinate.

A data fragment may be missing from a block where an active area map is present. However, the missing data fragment is likely to be recoverable from another copy of the block.

Data of arbitrary size is encoded into a superblock consisting of a contiguous set of blocks arranged in a rectangle. The size of the superblock is encoded in each block. A block belongs to a superblock whose integer coordinate is the block's coordinate divided by the superblock size. Within each superblock the data is arranged into blocks with increasing x coordinate within increasing y coordinate.

The superblock is replicated in the surface coding as many times as it will fit, including partially along the edges of the surface coding.

The data encoded in the superblock may include more precise type information, more precise size information, and more extensive error detection and/or correction data.

TABLE 3

Embedded data block

| field | width | description |
|---|---|---|
| data type | 8 | The type of the data in the superblock. Values include: 0: type is controlled by region flags 1: MIME Other values are TBA. |
| superblock width | 8 | The width of the superblock, in blocks. |
| superblock height | 8 | The height of the superblock, in blocks. |
| data | 160 | The block data. |
| CRC | 16 | A CRC of the block data. |
| total | 200 | |

It will be appreciated that any form of embedded data may be used, including for example, text, image, audio, video data, such as product information, application data, contact data, business card data, and directory data.

Region Signatures

If the "region has signature" flag in the region flags is set then the signature field contains a signature with a maximum width of 36 bits. The signature is typically a random number associated with the region ID in a secure database. The signature is ideally generated using a truly random process, such as a quantum process, or by distilling randomness from random events.

In an online environment the signature can be validated, in conjunction with the region ID, by querying a server with access to the secure database.

If the "region has embedded data" and "embedded data is signature" flags in the region flags are set then the surface coding contains a 160-bit cryptographic signature of the region ID. The signature is encoded in a one-block superblock.

In an online environment any number of signature fragments can be used, in conjunction with the region ID and optionally the random signature, to validate the signature by querying a server with knowledge of the full signature or the corresponding private key.

In an offline (or online) environment the entire signature can be recovered by reading multiple tags, and can then be validated using the corresponding public signature key.

Signature verification is discussed in more detail below.

MIME Data

If the embedded data type is "MIME" then the superblock contains Multipurpose Internet Mail Extensions (MIME) data according to RFC 2045 (Freed, N., and N. Borenstein, "Multipurpose Internet Mail Extensions (MIME)—Part One: Format of Internet Message Bodies", RFC 2045, November 1996), RFC 2046 (Freed, N., and N. Borenstein, "Multipurpose Internet Mail Extensions (MIME)—Part Two: Media Types", RFC 2046, November 1996 ) and related RFCs. The MIME data consists of a header followed by a body. The header is encoded as a variable-length text string preceded by an 8-bit string length. The body is encoded as a variable-length type-specific octet stream preceded by a 16-bit size in big-endian format.

The basic top-level media types described in RFC 2046 include text, image, audio, video and application.

RFC 2425 (Howes, T., M. Smith and F. Dawson, "A MIME Content-Type for Directory Information", RFC 2045, September 1998) and RFC 2426 (Dawson, F., and T. Howes, "vCard MIME Directory Profile", RFC 2046, September 1998) describe a text subtype for directory information suitable, for example, for encoding contact information which might appear on a business card.

Encoding and Printing Considerations

The Print Engine Controller (PEC) (which is the subject of a number of pending US patent applications, including: Ser. Nos. 09/575,108; 10/727,162; 09/575,110; 09/607,985; U.S. Pat. Nos. 6,398,332; 6,394,573; 6,622,923) supports the encoding of two fixed (per-page) $2^4$-ary (15,7) Reed-Solomon codewords and four variable (per-tag) $2^4$-ary (15,7) Reed-Solomon codewords, although other numbers of codewords can be used for different schemes.

Furthermore, PEC supports the rendering of tags via a rectangular unit cell whose layout is constant (per page) but whose variable codeword data may vary from one unit cell to the next. PEC does not allow unit cells to overlap in the direction of page movement.

A unit cell compatible with PEC contains a single tag group consisting of four tags. The tag group contains a single A codeword unique to the tag group but replicated four times within the tag group, and four unique B codewords. These can be encoded using five of PEC's six supported variable codewords. The tag group also contains eight fixed C and D codewords. One of these can be encoded using the remaining one of PEC's variable codewords, two more can be encoded using PEC's two fixed codewords, and the remaining five can be encoded and pre-rendered into the Tag Format Structure (TFS) supplied to PEC.

PEC imposes a limit of 32 unique bit addresses per TFS row. The contents of the unit cell respect this limit. PEC also imposes a limit of 384 on the width of the TFS. The contents of the unit cell respect this limit.

Note that for a reasonable page size, the number of variable coordinate bits in the A codeword is modest, making encoding via a lookup table tractable. Encoding of the B codeword via a lookup table may also be possible. Note that since a Reed-Solomon code is systematic, only the redundancy data needs to appear in the lookup table.

Imaging and Decoding Considerations

The minimum imaging field of view required to guarantee acquisition of an entire tag has a diameter of 39.6 s, i.e.

$$(2\times(12+2))\sqrt{2}s$$

allowing for arbitrary alignment between the surface coding and the field of view. Given a macrodot spacing of 143 μm, this gives a required field of view of 5.7 mm.

Table 4 gives pitch ranges achievable for the present surface coding for different sampling rates, assuming an image sensor size of 128 pixels.

TABLE 4

Pitch ranges achievable for present surface coding for different sampling rates, computed using Optimize Hyperlabel Optics; dot pitch = 1600 dpi, macrodot pitch = 9 dots, viewing distance = 30 mm, nib-to-FOV separation = 1 mm, image sensor size = 128 pixels

| sampling rate | pitch range |
|---|---|
| 2 | −40 to +49 |
| 2.5 | −27 to +36 |
| 3 | −10 to +18 |

For the surface coding above, the decoding sequence is as follows:
  locate targets of complete tag
  infer perspective transform from targets
  sample cyclic position code
  decode cyclic position code
  determine orientation from cyclic position code
  sample and decode local Reed-Solomon codeword
  determine tag x-y location
  infer 3D tag transform from oriented targets
  determine nib x-y location from tag x-y location and 3D transform
  determine active area status of nib location with reference to active area map
  generate local feedback based on nib active area status
  determine tag type
  sample distributed Reed-Solomon codewords (modulo window alignment, with reference to tag type)
  decode distributed Reed-Solomon codewords
  verify tag group data CRC
  on decode error flag bad region ID sample
  determine encoding type, and reject unknown encoding
  determine region flags
  determine region ID
  encode region ID, nib x-y location, nib active area status in digital ink
  route digital ink based on region flags Region ID decoding need not occur at the same rate as position decoding and decoding of a codeword can be avoided if the codeword is found to be identical to an already-known good codeword.

If the high-order coordinate width is non-zero, then special care must be taken on boundaries between tags where the low-order x or y coordinate wraps, otherwise codeword errors may be introduced. If wrapping is detected from the low-order x or y coordinate (i.e. it contains all zero bits or all one bits), then the corresponding high-order coordinate can be adjusted before codeword decoding. In the absence of genuine symbol errors in the high-order coordinate, this will prevent the inadvertent introduction of codeword errors.

Alternative Tag Arrangements

It will be appreciated that a range of different tag layouts and tag structures can be utilised.

Figures 16, 17:
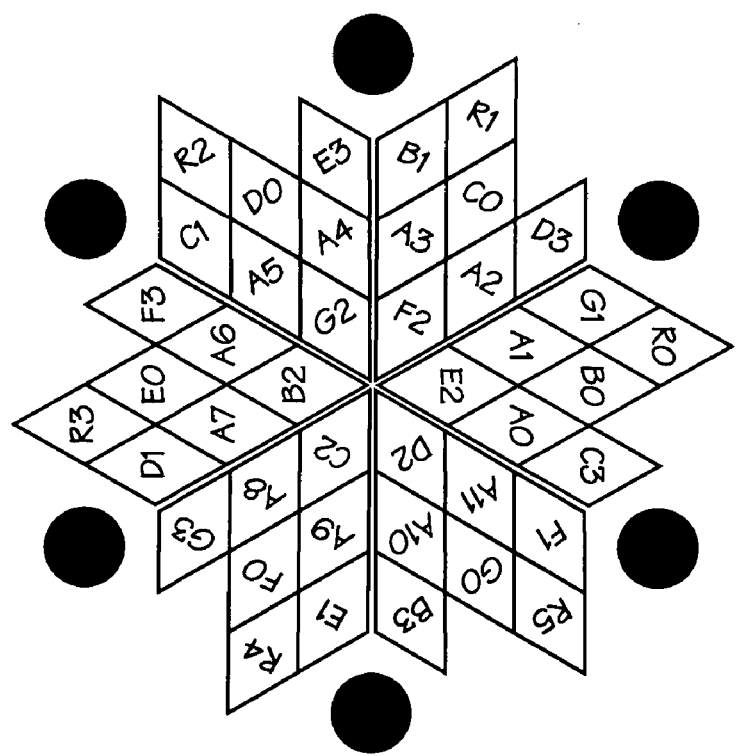
FIG. 16. is an example of an alternative tag group for the tag structure of FIG. 4.
FIG. 17. is a second example of a tag structure.
Figure 18:
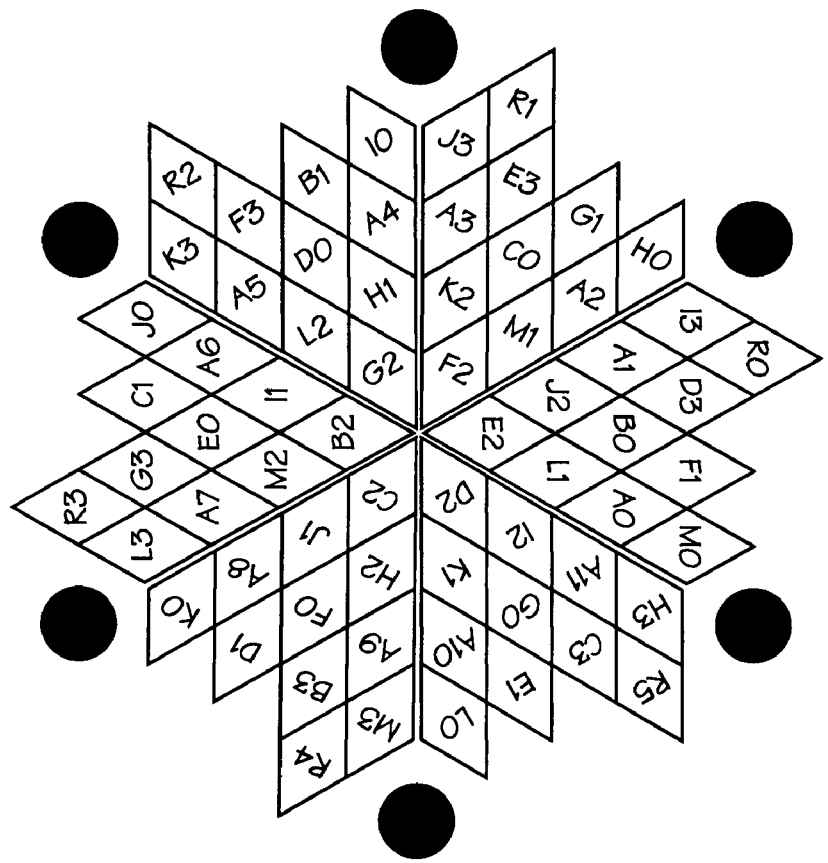
FIG. 18. is a third example of a tag structure.

For example, the tag group shown in FIG. 9 can be replaced with the tag group shown in FIG. 16, in which the tags are not rotated relative to each other. FIG. 17 shows an arrangement that utilises a six-fold rotational symmetry at the physical level, with each diamond shape representing a respective symbol. FIG. 18 shows a version of the tag in which the tag is expanded to increase its data capacity by adding additional bands of symbols about its circumference.

The use of these alternative tag structures, including associated encoding considerations, is described shown in more detail in the copending patent application Ser. Nos. 10/409,864, 10/309,358, 10/410,484, and Ser. No. 10/786,631 the contents of which is incorporated herein by cross reference.

Security Discussion

As described above, authentication relies on verifying the correspondence between data and a signature of that data. The greater the difficulty in forging a signature, the greater the trustworthiness of signature-based authentication.

The item ID is unique and therefore provides a basis for a signature. If online authentication access is assumed, then the signature may simply be a random number associated with the item ID in an authentication database accessible to the trusted online authenticator. The random number may be generated by any suitable method, such as via a deterministic (pseudo-random) algorithm, or via a stochastic physical process. A keyed hash or encrypted hash may be preferable to a random number since it requires no additional space in the authentication database. However, a random signature of the same length as a keyed signature is more secure than the keyed signature since it is not susceptible to key attacks. Equivalently, a shorter random signature confers the same security as a longer keyed signature.

In the limit case no signature is actually required, since the mere presence of the item ID in the database indicates authenticity. However, the use of a signature limits a forger to forging items he has actually sighted.

To prevent forgery of a signature for an unsighted ID, the signature must be large enough to make exhaustive search via repeated accesses to the online authenticator intractable. If the signature is generated using a key rather than randomly, then its length must also be large enough to prevent the forger from deducing the key from known ID-signature pairs. Signatures of a few hundred bits are considered secure, whether generated using private or secret keys.

While it may be practical to include a reasonably secure random signature in a tag (or local tag group), particularly if the length of the ID is reduced to provide more space for the signature, it may be impractical to include a secure ID-derived signature in a tag. To support a secure ID-derived signature, we can instead distribute fragments of the signature across multiple tags. If each fragment can be verified in isolation against the ID, then the goal of supporting authentication without increasing the sensing device field of view is achieved. The security of the signature can still derive from the full length of the signature rather than from the length of a fragment, since a forger cannot predict which fragment a user will randomly choose to verify. A trusted authenticator can always perform fragment verification since they have access to the key and/or the full stored signature, so fragment verification is always possible when online access to a trusted authenticator is available.

Fragment verification requires that we prevent brute force attacks on individual fragments, otherwise a forger can determine the entire signature by attacking each fragment in turn. A brute force attack can be prevented by throttling the authenticator on a per-ID basis. However, if fragments are short, then extreme throttling is required. As an alternative to throttling the authenticator, the authenticator can instead enforce a limit on the number of verification requests it is willing to respond to for a given fragment number. Even if the limit is made quite small, it is unlikely that a normal user will exhaust it for a given fragment, since there will be many fragments available and the actual fragment chosen by the user can vary. Even a limit of one can be practical. More generally, the limit should be proportional to the size of the fragment, i.e. the smaller the fragment the smaller the limit. Thus the experience of the user would be somewhat invariant of fragment size. Both throttling and enforcing fragment verification limits imply serialisation of requests to the authenticator. Enforcing fragment verification limits further requires the authenticator to maintain a per-fragment count of satisfied verification requests.

A brute force attack can also be prevented by concatenating the fragment with a random signature encoded in the tag. While the random signature can be thought of as protecting the fragment, the fragment can also be thought of as simply increasing the length of the random signature and hence increasing its security.

Fragment verification may be made more secure by requiring the verification of a minimum number of fragments simultaneously.

Fragment verification requires fragment identification. Fragments may be explicitly numbered, or may more economically be identified by the two-dimensional coordinate of their tag, modulo the repetition of the signature across a continuous tiling of tags.

The limited length of the ID itself introduces a further vulnerability. Ideally it should be at least a few hundred bits. In the Netpage surface coding scheme it is 96 bits or less. To overcome this the ID may be padded. For this to be effective the padding must be variable, i.e. it must vary from one ID to the next. Ideally the padding is simply a random number, and must then be stored in the authentication database indexed by ID. If the padding is deterministically generated from the ID then it is worthless.

Offline authentication of secret-key signatures requires the use of a trusted offline authentication device. The QA chip (which is the subject of a number of pending US patent applications, including Ser. Nos. 09/112,763; 09/112,762; 09/112,737; 09/112,761; 09/113,223) provides the basis for such a device, although of limited capacity. The QA chip can be programmed to verify a signature using a secret key securely held in its internal memory. In this scenario, however, it is impractical to support per-ID padding, and it is impractical even to support more than a very few secret keys. Furthermore, a QA chip programmed in this manner is susceptible to a chosen-message attack. These constraints limit the applicability of a QA-chip-based trusted offline authentication device to niche applications.

In general, despite the claimed security of any particular trusted offline authentication device, creators of secure items are likely to be reluctant to entrust their secret signature keys to such devices, and this is again likely to limit the applicability of such devices to niche applications.

By contrast, offline authentication of public-key signatures (i.e. generated using the corresponding private keys) is highly practical. An offline authentication device utilising public keys can trivially hold any number of public keys, and may be designed to retrieve additional public keys on demand, via a transient online connection, when it encounters an ID for which it knows it has no corresponding public signature key. Untrusted offline authentication is likely to be attractive to most creators of secure items, since they are able to retain exclusive control of their private signature keys.

A disadvantage of offline authentication of a public-key signature is that the entire signature must be acquired from the coding, violating our desire to support authentication with a minimal field of view. A corresponding advantage of offline authentication of a public-key signature is that access to the ID padding is no longer required, since decryption of the signature using the public signature key generates both the ID and its padding, and the padding can then be ignored. A forger can not take advantage of the fact that the padding is ignored during offline authentication, since the padding is not ignored during online authentication.

Acquisition of an entire distributed signature is not particularly onerous. Any random or linear swipe of a hand-held sensing device across a coded surface allows it to quickly acquire all of the fragments of the signature. The sensing device can easily be programmed to signal the user when it has acquired a full set of fragments and has completed authentication. A scanning laser can also easily acquire all of the fragments of the signature. Both kinds of devices may be programmed to only perform authentication when the tags indicate the presence of a signature.

Note that a public-key signature may be authenticated online via any of its fragments in the same way as any signature, whether generated randomly or using a secret key. The trusted online authenticator may generate the signature on demand using the private key and ID padding, or may store the signature explicitly in the authentication database. The latter approach obviates the need to store the ID padding.

Note also that signature-based authentication may be used in place of fragment-based authentication even when online access to a trusted authenticator is available.

Table 5 provides a summary of which signature schemes are workable in light of the foregoing discussion.

TABLE 5

Summary of workable signature schemes

| encoding in tags | acquisition from tags | signature generation | online authentication | offline authentication |
|---|---|---|---|---|
| Local | full | random | ok | Impractical to store per ID information |
|  |  | secret key | Signature too short to be secure | Undesirable to store secret keys |
|  |  | private key | Signature too short to be secure |  |
| Distributed | fragment(s) | random | ok | impractical[b] |
|  |  | secret key | ok | impractical[c] |
|  |  | private key | ok | impractical[b] |
|  | full | random | ok | impractical[b] |
|  |  | secret key | ok | impractical[c] |
|  |  | private key | ok | ok |

Security Specifications

Figure 19:
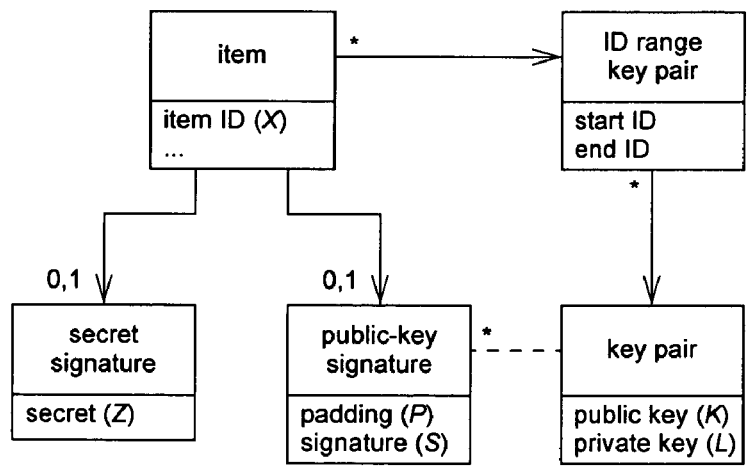
FIG. 19 is an example of an item signature object model.

FIG. 19 shows an example item signature object model.

An item has an ID (X) and other details (not shown). It optionally has a secret signature (Z). It also optionally has a public-key signature. The public-key signature records the signature (S) explicitly, and/or records the padding (P) used in conjunction with the ID to generate the signature. The public-key signature has an associated public-private key pair (K, L). The key pair is associated with a one or more ranges of item IDs.

Typically issuers of security documents and pharmaceuticals will utilise a range of IDs to identify a range of documents or the like. Following this, the issuer will then use these details to generate respective IDs for each item, or document to be marked.

Authentication of the product can then be performed online or offline by sensing the tag data encoded within the tag, and performing the authentication using a number of different mechanisms depending on the situation.

Examples of the processes involved will now be described for public and private key encryption respectively.

Authentication Based on Public-Key Signature
 Setup per ID range:
 generate public-private signature key pair (K, L)
 store key pair (K, L) indexed by ID range
 Setup per ID:
 generate ID padding (P)
 retrieve private signature key (L) by ID (X)
 generate signature (S) by encrypting ID (X) and padding (P) using private key (L):
  $S \leftarrow E_L(X, P)$
 store signature (S) in database indexed by ID (X) (and/or store padding (P))
 encode ID (X) in all tag groups
 encode signature (S) across multiple tags in repeated fashion
 Online fragment-based authentication (user):
 acquire ID (X) from tags
 acquire position $(x, y)_i$ and signature fragment $(T_i)$ from tag
 generate fragment number (i) from position $(x, y)_i$:
  $i \leftarrow F[(x, y)_i]$
 look up trusted authenticator by ID (X)
 transmit ID (X), fragment $(S_i)$ and fragment number (i) to trusted authenticator
 Online fragment-based authentication (trusted authenticator):
 receive ID (X), fragment $(S_i)$ and fragment number (i) from user
 retrieve signature (S) from database by ID (X) (or regenerate signature)
 compare received fragment $(T_i)$ with corresponding fragment of signature $(S_i)$
 report authentication result to user
 Offline signature-based authentication (user):
 acquire ID from tags (X)
 acquire positions $(x, y)_i$ and signature fragments $(T_i)$ from tag
 generate fragment numbers (i) from positions $(x, y)_i$:
  $i \leftarrow F[(x,y)_i]$
  $S \leftarrow S_0 | S_1 | \ldots | S_{n-1}$.

generate signature (S) from (n) fragments:
retrieve public signature key (K) by ID (X)
decrypt signature (S) using public key (K) to obtain ID (X')
   and padding (P'):
   $X'|P' \leftarrow D_K(S)$
compare acquired ID (X) with decrypted ID (X')
report authentication result to user Authentication Based on Select-Key Signature
   Setup per ID:
   generate secret (Z)
   store secret (Z) in database indexed by ID (X)
   encode ID (X) and secret (Z) in all tag groups
   Online secret-based authentication (user):
   acquire ID (X) from tags
   acquire secret (Z') from tags
   look up trusted authenticator by ID
   transmit ID (X) and secret (Z') to trusted authenticator
   Online secret-based authentication (trusted authenticator):
   receive ID (X) and secret (Z') from user
   retrieve secret (Z) from database by ID (X)
   compared received secret (Z') with secret (Z)
   report authentication result to user
   As discussed earlier, secret-based authentication may be used in conjunction with fragment-based authentication.

Cryptographic Algorithms

When the public-key signature is authenticated offline, the user's authentication device typically does not have access to the padding used when the signature was originally generated. The signature verification step must therefore decrypt the signature to allow the authentication device to compare the ID in the signature with the ID acquired from the tags. This precludes the use of algorithms which don't perform the signature verification step by decrypting the signature, such as the standard Digital Signature Algorithm U.S. Department of Commerce/National Institute of Standards and Technology, Digital Signature Standard (DSS), FIPS 186-2, 27 Jan. 2000.

RSA encryption is described in:
Rivest, R. L., A. Shamir, and L. Adleman, "A Method for Obtaining Digital Signatures and Public-Key Cryptosystems", Communications of the ACM, Vol. 21, No. 2, February 1978, pp. 120-126
Rivest, R. L., A. Shamir, and L. M. Adleman, "Cryptographic communications system and method", U.S. Pat. No. 4,405,829, issued 20 Sep. 1983
RSA Laboratories, PKCS #1 v2.0: RSA Encryption Standard, Oct. 1, 1998

RSA provides a suitable public-key digital signature algorithm that decrypts the signature. RSA provides the basis for the ANSI X9.31 digital signature standard American National Standards Institute, ANSI X9.31-1998, Digital Signatures Using Reversible Public Key Cryptography for the Financial Services Industry (rDSA), Sep. 8, 1998. If no padding is used, then any public-key signature algorithm can be used.

In the hyperlabel surface coding scheme the ID is 96 bits long or less. It is padded to 160 bits prior to being signed.

The padding is ideally generated using a truly random process, such as a quantum process [14,15], or by distilling randomness from random events Schneier, B., Applied Cryptography, Second Edition, John Wiley & Sons 1996.

In the hyperlabel surface coding scheme the random signature, or secret, is 36 bits long or less. It is also ideally generated using a truly random process.

Security Tagging and Tracking

Currency, checks and other monetary documents can be tagged in order to detect currency counterfeiting and counter money laundering activities. The Hyperlabel tagged currency can be validated, and tracked through the monetary system. Hyperlabel tagged products such as pharmaceuticals can be tagged allowing items to be validated and tracked through the distribution and retail system.

A number of examples of the concepts of Hyperlabel security tagging and tracking referring specifically to bank notes and pharmaceuticals, however Hyperlabel tagging can equally be used to securely tag and track other products, for example, traveller's checks, demand deposits, passports, chemicals etc.

Hyperlabel tagging, with the Netpage system, provides a mechanism for securely validating and tracking objects.

Hyperlabel tags on the surface of an object uniquely identify the object. Each Hyperlabel tag contains information including the object's unique ID, and the tag's location on the Hyperlabel tagged surface. A Hyperlabel tag also contains a signature fragment which can be used to authenticate the object. A scanning laser or image sensor can read the tags on any part of the object to identify the object, validate the object, and allow tracking of the object.

Currency Tagging

An example of the protection of security documents will now be described with reference to the specific protection of currency, such as bank notes, although it will be appreciated that the techniques may be applied to any security document.

Currency may be tagged with Hyperlabels in order to detect counterfeiting and allow tracking of currency movement. Hyperlabel tags can be printed over the entire bank note surface or can be printed in a smaller region of the note. Hyperlabel tagging can be used in addition to other security features such as holograms, foil strips, colour-shifting inks etc. A scanning laser or image sensor can read the tags on any part of the note to validate each individual note.

Figure 20:
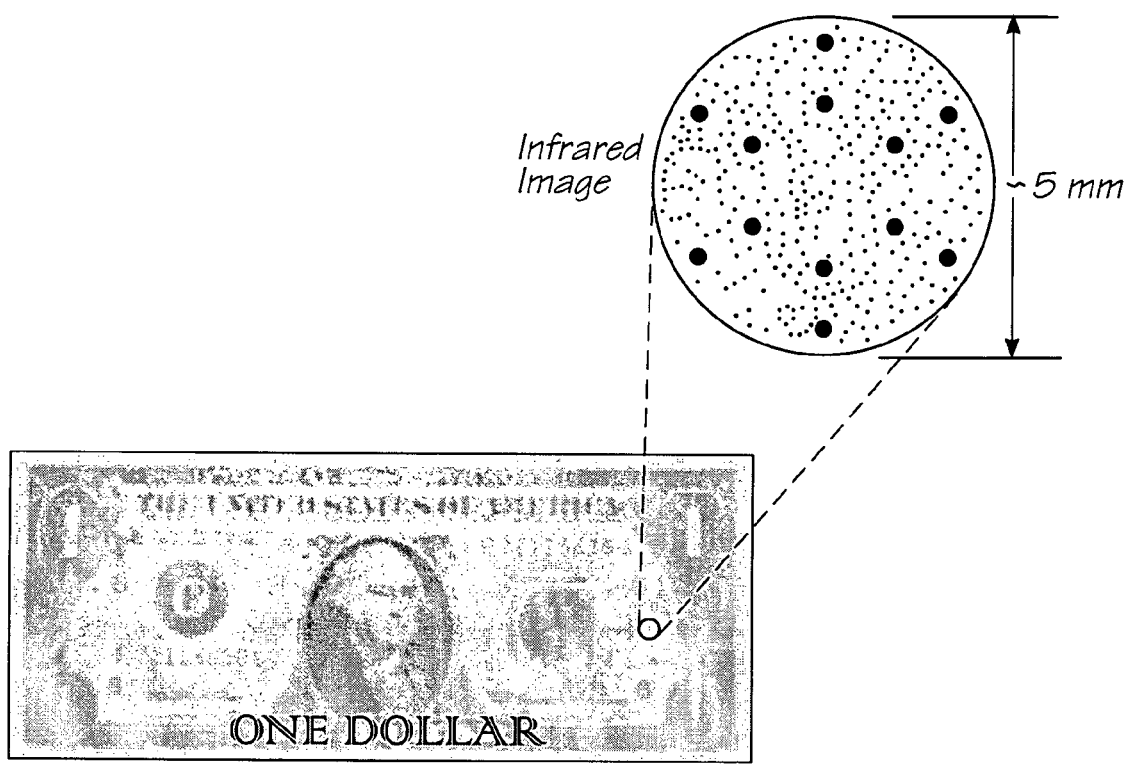
FIG. 20 is an example of Hyperlabel tags applied to a currency note.

In this example, each hexagonal Hyperlabel currency tag is around 2.5 mm across, and incorporates a variety of data in the form of printed dots of infrared ink. An example of a tag included on a bank note is shown in FIG. 20.

A Hyperlabel currency tag identifies the note currency, issue country, and note denomination. It also identifies the note's serial number, the note side (i.e. front or back), and it may contain other information (for example, the exact printing works where the note was printed). There are two note IDs for each physical bank note—one for each side of the note.

The tag may also include:
   Alignment marks (these are the larger dots in the image above)
   A code indicating that the tag is a currency tag, as opposed to a commercial Hyperlabel or Hyperlabel tag
   A horizontal position code, specifying where the tag is along the note
   A vertical position code, specifying where the tag is across the note
   A cryptographic signature
   Error detection and correction bits Each tag is unique. That is, of all tags ever to be printed on any note or other document, no two valid tags will ever be the same. The tags are designed to be easily read with low cost scanners that can be built into a variety of validation devices.

Hyperlabel currency tags can be read by any Hyperlabel scanner. These scanners can be incorporated into a variety of devices to facilitate authentication and tracking, as will be described in more detail below.

Tracking

For the purpose of tracking and item validation the manufacturer, or other central authority, maintains a database which tracks the location and status of all currency. This can also be used in authentication of currency.

Each time a note is scanned its location is recorded. This location information can be collected in a central database allowing analysis and identification of abnormal money movements and detection of counterfeit notes. This allows the creation of highly accurate intelligence about criminal activity and the real-time detection of the location of stolen or counterfeit notes at many locations within the monetary system. For example, in the case of sophisticated forgeries where Hyperlabel dot patterns are exactly duplicated, there will be multiple copies of exactly forged notes (at a minimum, the original and the forgery). If multiple identical notes appear in different places at the same time, all but one of the notes must be a forgery. All can then be treated as suspect.

Thus, when a transaction is performed using currency, the general process is as follows:
- a transaction is agreed
- currency is provided relating to the transaction
- the currency is scanned using an appropriate sensing device
- the sensing device sense at least one tag and generates predetermined data
- the predetermined data is transferred to a central government database In this regard, the following predetermined data is automatically sent from the scanners to the central government currency database:
- The serial number of the note
- The denomination of the note
- Note validity data
- The serial number of the scanner
- The time and date of the scan
- The physical location of the scanner at the time the scan was taken (for fixed scanners this is automatic, and for mobile scanners the physical location is determined using a GPS tracker)
- The network location of the scanner
- The identity of the person making reportable cash transactions Thus, Hyperlabel technology makes it possible to build databases containing the serial number and history of all notes issued, and it allows them to be tracked through the monetary system. The data collected can be used to build up cash flow maps based on the validation data received, and its presence will provide a powerful tool for law enforcement agencies to combat theft, money laundering and counterfeiting in the global economy.

With each note being tracked over its lifetime, from when it is first printed, until it is destroyed. Calculations show that this database will need to store in excess of 50 GBytes per day to track all US Dollar movements. Similar storage is also required for the Euro. This is well within the capabilities of modern database systems.

There are also a large number of transactions involved—several hundred million per day. These are within the capability of conventional distributed transaction processing systems. However, the Hyperlabel currency system can be implemented at substantially lower cost by using new generation database systems that perform transactions in semiconductor memory, instead of disk drives. These transactions can then be continually streamed to disk as a background 'backup' task. Such systems are likely to be sufficiently mature by the time that a Hyperlabel based currency tracking system comes on-line that they will be a viable choice.

As well as basic tracking and validation functions, the database system may have the following additional features:
- Indication of abnormal money movement patterns within the system (e.g. large cash payments made at different locations within the system by persons of interest)
- The provision of cash flow demand forecasts
- Data mining features that could be used to detect and prosecute counterfeiters and money launderers
- Neural network based fraud detection
- Geographic trends identification Thus, the central database maintains up-to-date information on valid object IDs, an object ID hotlist (for all suspect object IDs), and a list of public keys corresponding to object IDs. The central server also maintains an object scanning history to track an object's movements. Each time an object is scanned, its timestamped location is recorded. If known, the details of the object owner may also be recorded. This information may be known particularly in the case of large financial transactions e.g. a large cash withdrawal from a bank. This object scanning history data can be used to detect illegal product movements, for example, the illegal import of currency. It can also be used to detect abnormal or suspicious product movements which may be indicative of product counterfeiting.

If an object is known to be stolen it can be immediately added to an object ID hotlist on the central server. This hotlist is automatically distributed to (or becomes accessible to) all on-line scanners, and will be downloaded to all off-line scanners on their next update. In this way the stolen status is automatically and rapidly disseminated to a huge number of outlets. Similarly, if an object is in any other way suspect it can be added to the hotlist so that its status is flagged to the person scanning the object.

An on-line scanner has instant access to the central server to allow checking of each object ID at the time of scanning. The object scanning history is also updated at the central server at the time the object is scanned.

An off-line scanner stores object status data internally to allow validation of a scanned object. The object status data includes valid ID range lists, an object ID hotlist, a public key list, and an object scanning history. Each time an object is scanned the details are recorded in the object scanning history. The object status data is downloaded from the central server, and the object scanning history is uploaded to the central server, each time the scanner connects.

A mobile scanner's location can be provided to the application by the scanner, if it is GPS-equipped. Alternatively the scanner's location can be provided by the network through which it communicates.

For example, if the hand-held scanner uses the mobile phone network, the scanner's location can be provided by the mobile phone network provider. There are a number of location technologies available. One is Assisted Global Positioning System (A-GPS). This requires a GPS-equipped handset, which receives positioning signals from GPS satellites. The phone network knows the approximate location of the handset (in this case the handset is also the scanner) from the nearest cell site. Based on this, the network tells the handset which GPS satellites to use in its position calculations. Another technology, which does not require the device to be GPS-equipped, is Uplink Time Difference of Arrival (U-TDOA). This determines the location of a wireless handset, using a form of triangulation, by comparing the time it takes a wireless handset's signal to reach several Location Measurement Units (LMUs) installed at the network's cell sites. The handset location is then calculated based on the differences in arrival times of the three (or more) signals.

Authentication

Each object ID has a signature. Limited space within the Hyperlabel tag structure makes it impractical to include a full cryptographic signature in a tag so signature fragments are distributed across multiple tags. A smaller random signature, or secret, can be included in a tag.

To avoid any vulnerability due to the limited length of the object ID, the object ID is padded, ideally with a random number. The padding is stored in an authentication database indexed by object ID. The authentication database may be managed by the manufacturer, or it may be managed by a third-party trusted authenticator.

Each Hyperlabel tag contains a signature fragment and each fragment (or a subset of fragments) can be verified, in isolation, against the object ID. The security of the signature still derives from the full length of the signature rather than from the length of the fragment, since a forger cannot predict which fragment a user will randomly choose to verify.

Fragment verification requires fragment identification. Fragments may be explicitly numbered, or may by identified by the two-dimensional coordinate of their tag, modulo the repetition of the signature across continuous tiling of tags.

Note that a trusted authenticator can always perform fragment verification, so fragment verification is always possible when on-line access to a trusted authenticator is available.

Establishing Authentication Database

Prior to allocating a new range of IDs, some setup tasks are required to establish the authentication database.

For each range of IDs a public-private signature key pair is generated and the key pair is stored in the authentication database, indexed by ID range.

For each object ID in the range the following setup is required:
   generate ID padding and store in authentication database, indexed by object ID
   retrieve private signature key by object ID
   generate signature by encrypting object ID and padding, using private key
   store signature in authentication database indexed by object ID, and/or store the padding, since the signature can be re-generated using the ID, padding and private key
   encode the signature across multiple tags in repeated fashion This data is required for the Hyperlabel tags therefore the authentication database must be established prior to, or at the time of, printing of the Hyperlabels.

Figure 21:
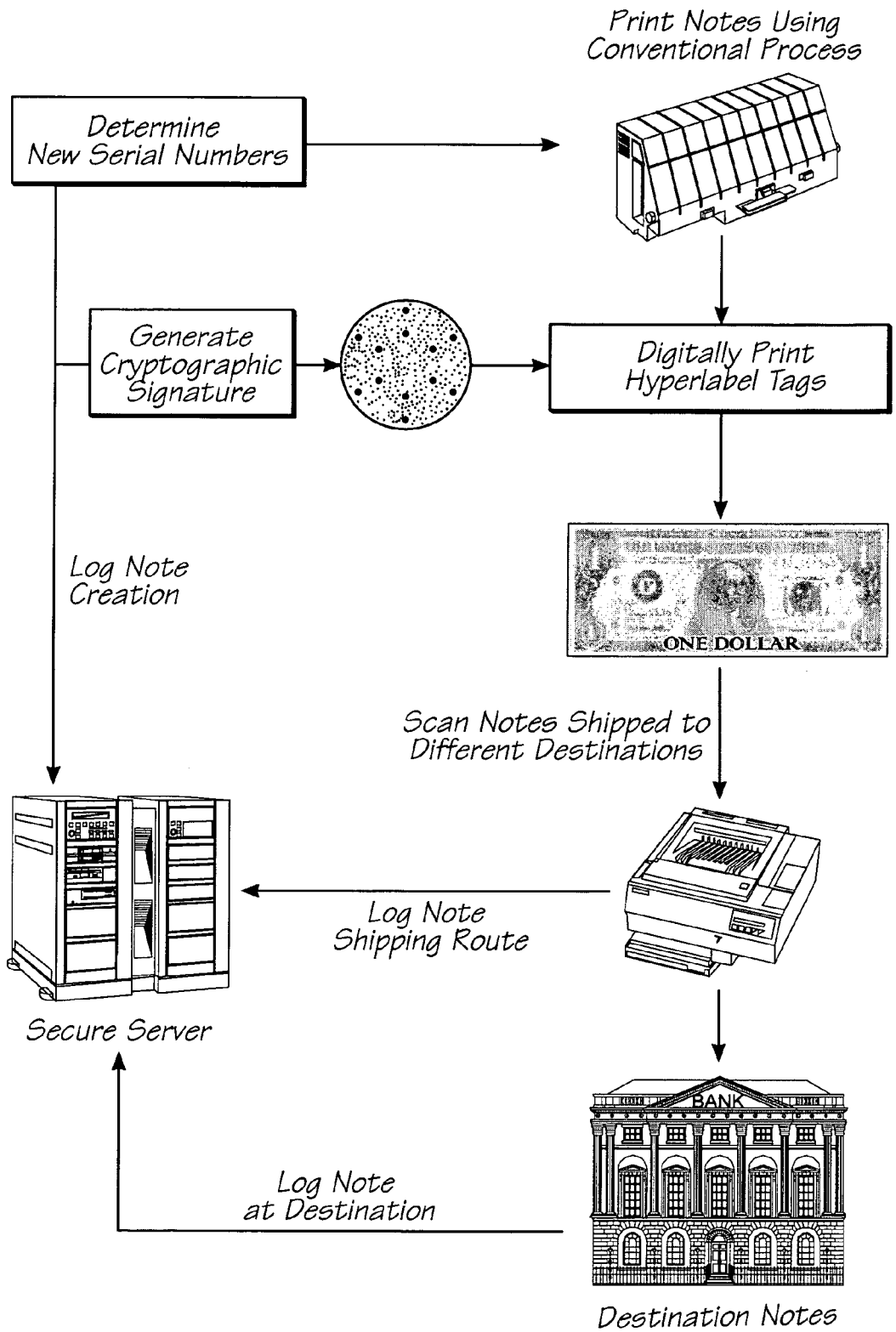
FIG. 21 is an example of a note creation and distribution process.

Security issues are discussed in more detail above.,

FIG. 21 summarises note printing and distribution of notes with Hyperlabel tags. Notes are also logged in the database whenever they are scanned in circulation, and also when they are destroyed.

While the technology to print commercial Hyperlabel tags will be commercially available, only the authorized currency printing bureaus of a government will be able to print the codes corresponding to that government's currency. These codes are protected by 2048 bit RSA cryptography embedded within the integrated circuits (chips) embedded in the Memjet™ printers used to print Hyperlabel tags. This is a highly secure form of asymmetric cryptography, using private and public keys. The private keys relating to any particular currency would be kept only by authorised national security agencies.

Off-Line Public-Key-Based Authentication

An off-line authentication device utilises public-key signatures. The authentication device holds a number of public keys. The device may, optionally, retrieve additional public keys on demand, via a transient on-line connection when it encounters an object ID for which it has no corresponding public key signature.

For off-line authentication, the entire signature is needed. The authentication device is swiped over the Hyperlabel tagged surface and a number of tags are read. From this, the object ID is acquired, as well as a number of signature fragments and their positions. The signature is then generated from these signature fragments. The public key is looked up, from the scanning device using the object ID. The signature is then decrypted using the public key, to give an object ID and padding. If the object ID obtained from the signature matches the object ID in the Hyperlabel tag then the object is considered authentic.

The off-line authentication method can also be used on-line, with the trusted authenticator playing the role of authenticator.

On-Line Public-Key-Based Authentication

An on-line authentication device uses a trusted authenticator to verify the authenticity of an object. For on-line authentication a single tag can be all that is required to perform authentication. The authentication device scans the object and acquires one or more tags. From this, the object ID is acquired, as well as at least one signature fragment and its position. The fragment number is generated from the fragment position. The appropriate trusted authenticator is looked up by the object ID. The object ID, signature fragment, and fragment number are sent to the trusted authenticator.

The trusted authenticator receives the data and retrieves the signature from the authentication database by object ID. This signature is compared with the supplied fragment, and the authentication result is reported to the user.

On-Line Secret-Based Authentication

Alternatively or additionally, if a random signature or secret is included in each tag (or tag group), then this can be verified with reference to a copy of the secret accessible to a trusted authenticator. Database setup then includes allocating a secret for each object, and storing it in the authentication database, indexed by object ID.

The authentication device scans the object and acquires one or more tags. From this, the object ID is acquired, as well as the secret. The appropriate trusted authenticator is looked up by the object ID. The object ID and secret are sent to the trusted authenticator.

The trusted authenticator receives the data and retrieves the secret from the authentication database by object ID. This secret is compared with the supplied secret, and the authentication result is reported to the user.

Secret-based authentication can be used in conjunction with on-line fragment-based authentication is discussed in more detail above.

Product Scanning Interactions

Figure 22:
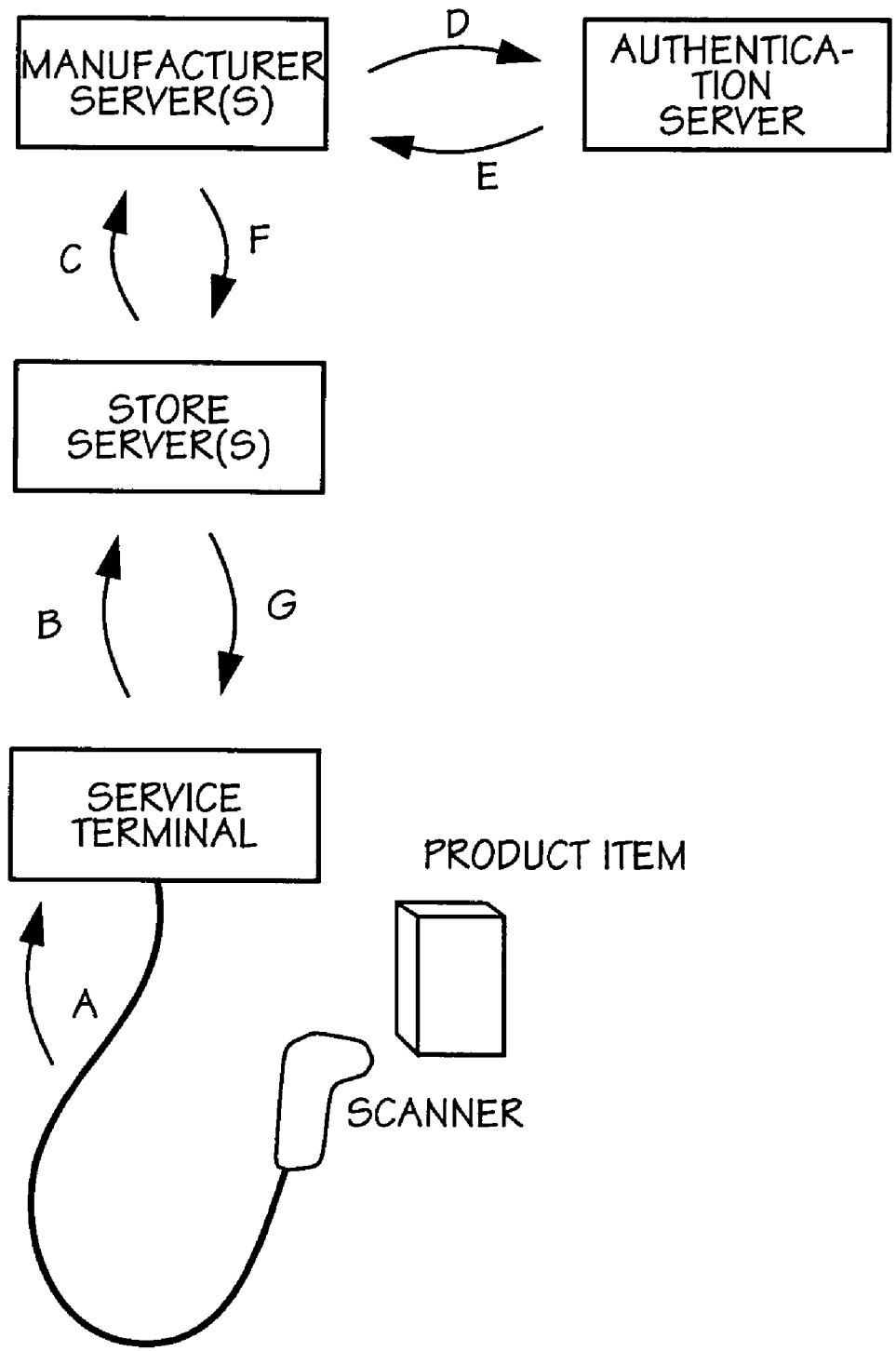
FIG. 22. is an example of Scanning at Retailer interactions.

Product Scanning at a retailer is illustrated in FIG. 22. When a store operator scans a Hyperlabel tagged product the tag data is sent to the service terminal (A). The service terminal sends the transaction data to the store server (B). The store server sends this data, along with the retailer details, to the manufacturer server (C). The Hyperlabel server knows which manufacturer server to send the message to from the object ID. On receipt of the input, the manufacturer server authenticates the object, if the manufacturer is the trusted authenticator. Alternatively the manufacturer server passes the data on to the authentication server to verify the object ID and signature (D). The authentication server sends the authentication result back to the manufacturer server (E). The manufacturer server checks the status of the object ID (against its valid ID lists and hotlist), and sends the response to the store server (F), which in turn send the result back the store service terminal (G). The store server could also communicate with the relevant authentication server directly.

Figure 23:
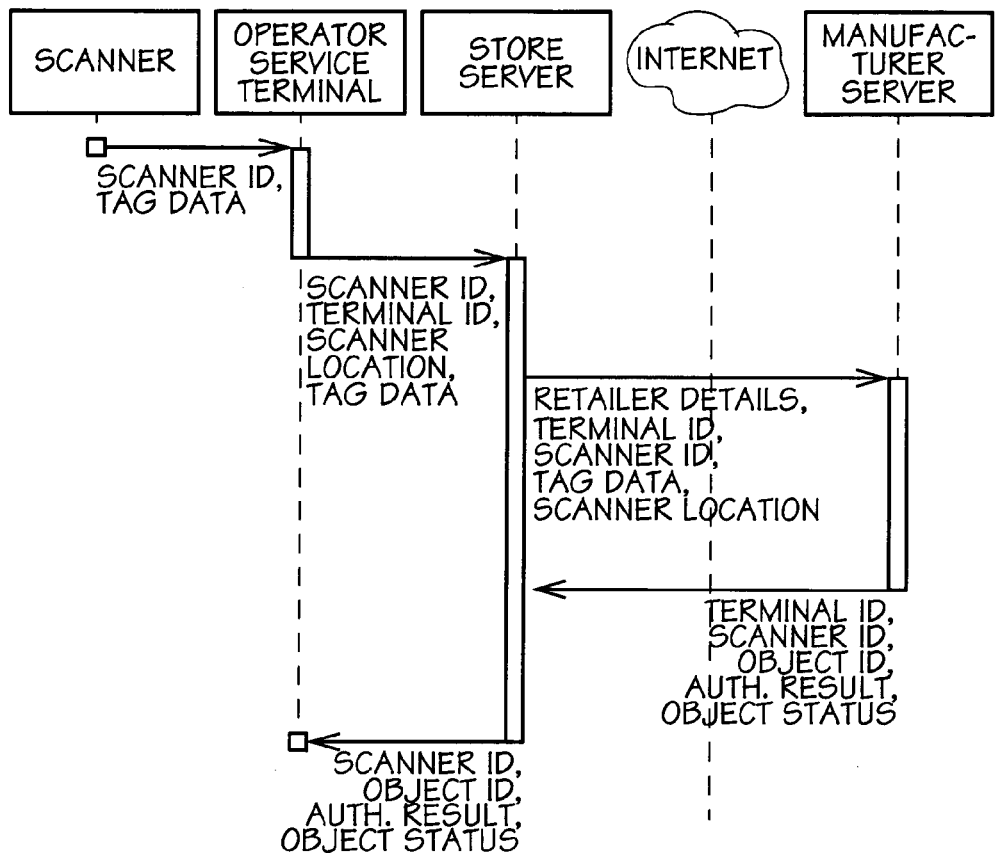
FIG. 23. is an example of Online Scanning interaction detail.

The interaction detail for on-line product scanning at a retailer is shown in FIG. 23. The store operator scans the Hyperlabel tagged product. The scanner sends the scanner ID and tag data to the service terminal. The service terminal sends this data along with the terminal ID and scanner location to the store server. The store server then sends the request on to the manufacturer server, which performs authentication (either itself or via a third party authentication server) and determines the object status. The response is then sent back to the store server, and on to the operator service terminal.

Figure 24:
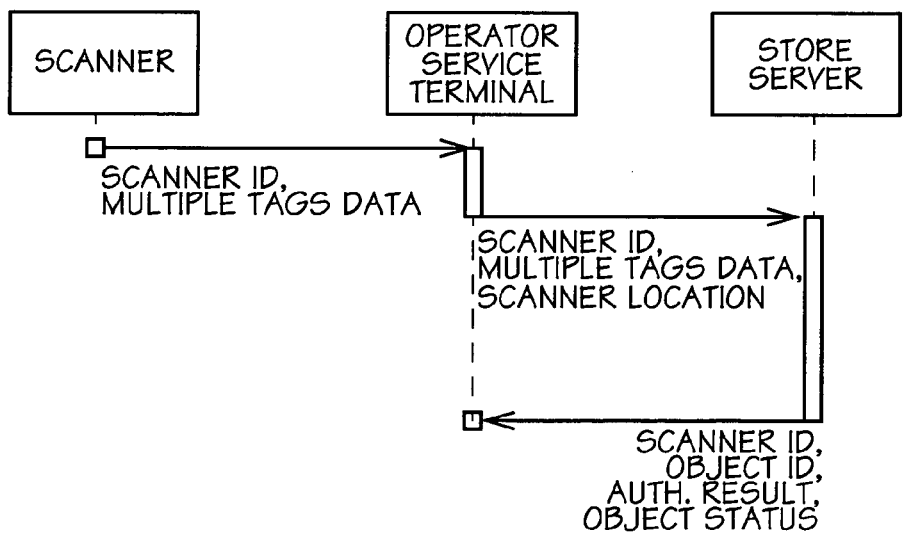
FIG. 24. is an example of Offline Scanning interaction details.

The interaction detail for off-line product scanning at a retailer is shown in FIG. 24. The store operator scans the Hyperlabel tagged product. The scanner sends the scanner ID and tag data from multiple tags to the service terminal. The service terminal sends this data, along with the terminal ID and scanner location, to the store server. The store server then performs off-line authentication, as described in Section 3.4.2, and determines the object status through its cached hotlist, valid object ID lists, and public key list. The store server records the scan details in its internal object scanning history. The response is then sent back to the operator service terminal.

An alternative for off-line product scanner occurs where the scanner is a hand-held, stand-alone scanner. In this case the cached authentication data is stored within the scanner itself, and the scanner performs the validation internally. The object scanning history is also cached within the scanner. Periodically the scanner connects to the central database, uploads it's object scanning history, and downloads the latest public key list, object ID hotlist and valid ID range list. This connection may be automatic (and invisible to the user), or may be initiated by the user, for example, when the scanner is placed in a docking station/charger.

Figure 25:
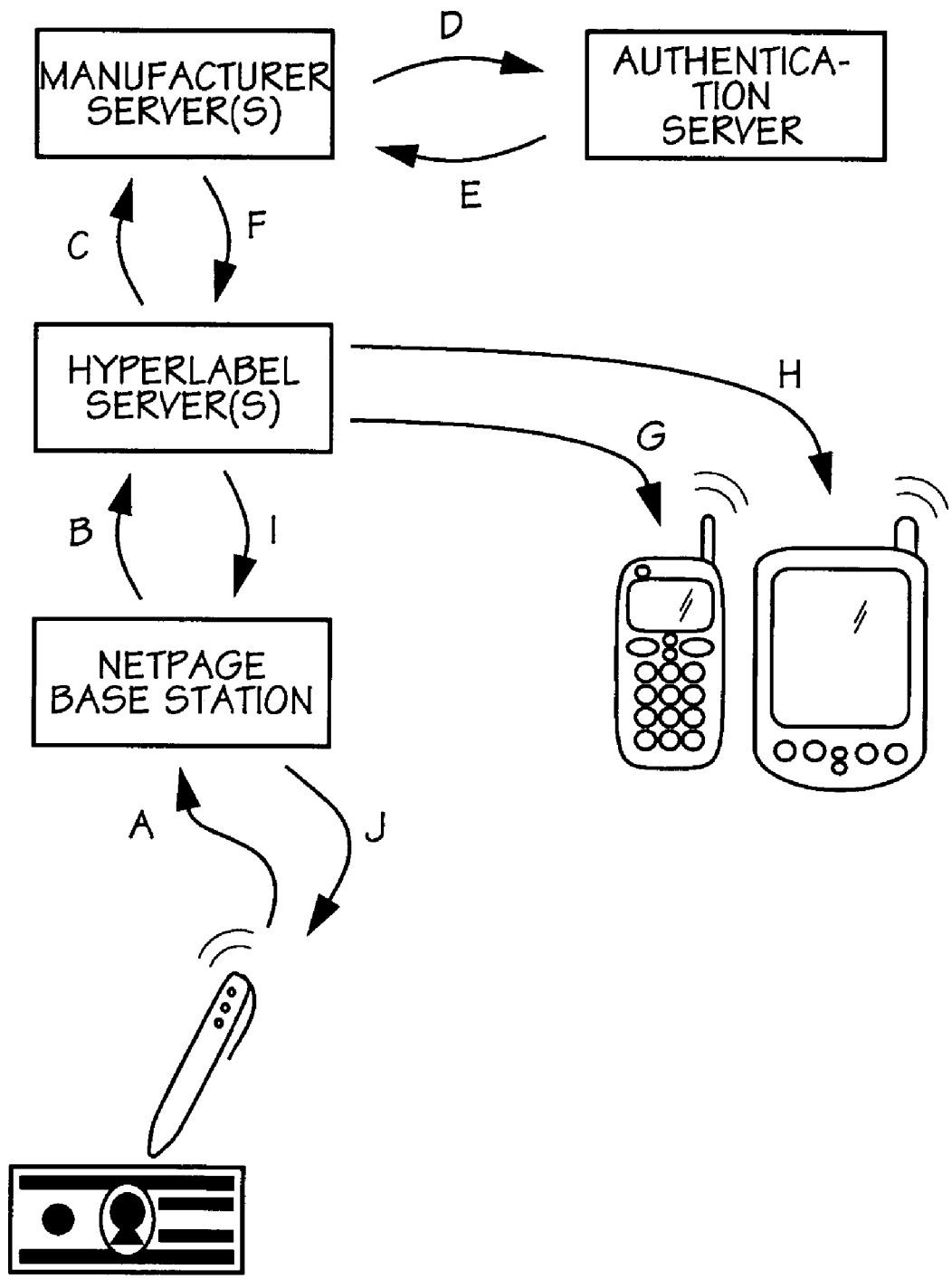
FIG. 25. is an example of netpage Pen Scanning interactions.

Product scanning with a Netpage pen is illustrated in FIG. 25. When a user scans a Hyperlabel tagged item with their Netpage pen, the input is sent to the Netpage System, from the user's Netpage pen, in the usual way (A). To scan a product rather than interact with it, the pen can be placed in a special mode. This is typically a one-shot mode, and can be initiated by tapping on a <scan> button printed on a Netpage. Alternatively, the pen can have a user-operable button, which, when held down during a tap or swipe, tells the pen to treat the interaction as a product scan rather than a normal interaction. The tag data is transmitted from the pen to the user's Netpage base station. The Netpage base station may be the user's mobile phone or PDA, or it may be some other Netpage device, such as a PC. The input is relayed to the Hyperlabel server (B) and then on to manufacturer server (C) in the usual way. On receipt of the input, the manufacturer server authenticates the object if the manufacturer is the trusted authenticator. Alternatively the manufacturer server passes the data on to the authentication server to verify the object ID and signature (D). The authentication server sends the authentication result back to the manufacturer server (E). The manufacturer server checks the status of the object ID (against its valid ID lists and hotlist), and sends the response to the Hyperlabel server (G). The Hyperlabel server, as part of the Netpage system, can know the identity and devices of the user. The Hyperlabel server will relay the manufacturer server's response to the user's phone (G) or Web browsing device (H) as appropriate. If the user's Netpage pen has LEDs then the Hyperlabel server can send a command to the user's pen to light the appropriate LED(s) (I,J).

Figure 26:
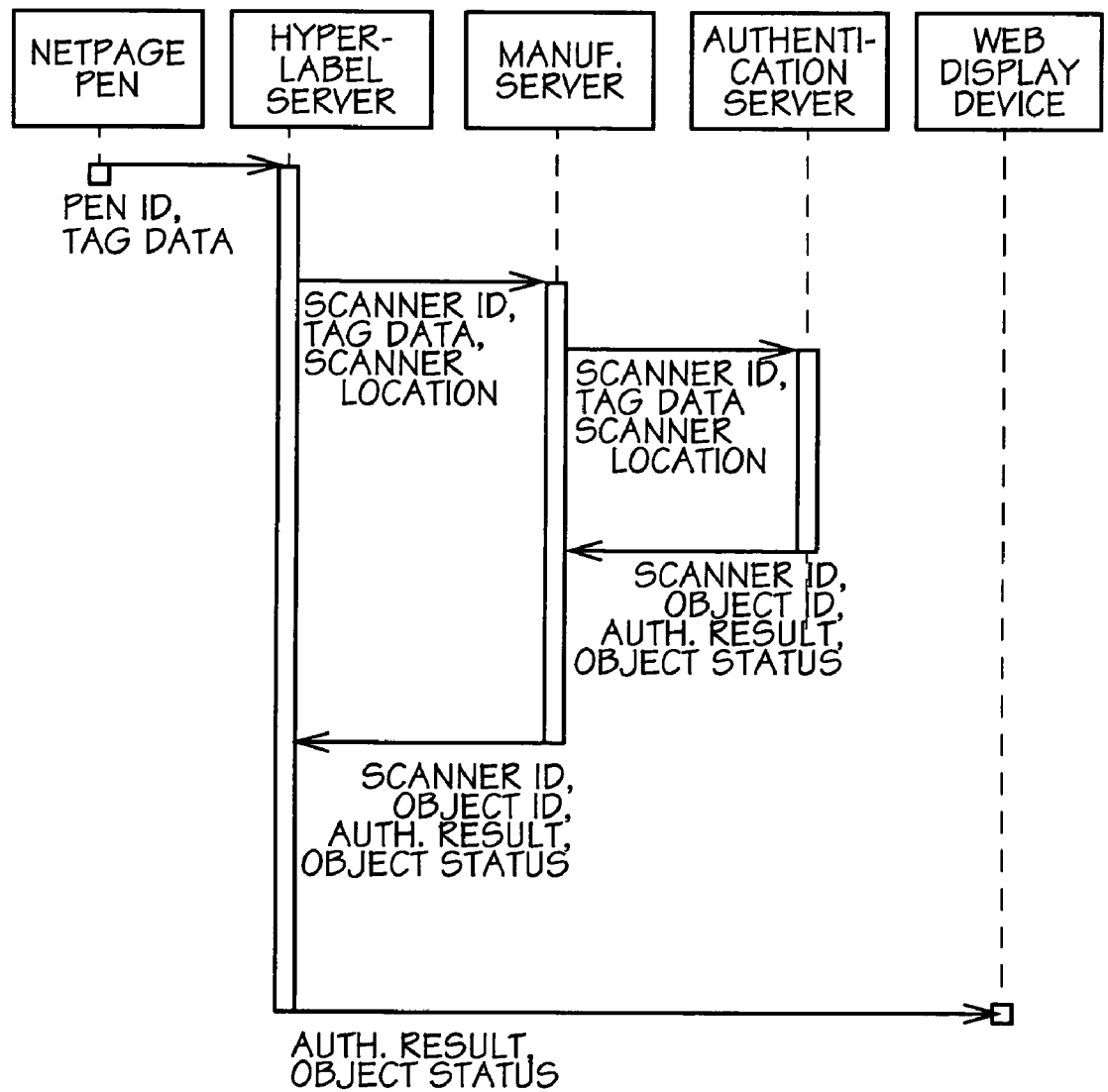
FIG. 26. is an example of netpage Pen Scanning interaction details.

The interaction detail for scanning with a Netpage pen is shown in FIG. 26. The Netpage pen clicks on the Hyperlabel tagged product. The Netpage pen sends the pen id, the product's tag data and the pen's location to the Hyperlabel server. If the pen ID is not already associated with a scanner, the Hyperlabel server may create a new scanner record for the pen, or may use the pen ID as a scanner ID. The Hyperlabel server sends the scanner ID, tag data, and scanner location (if known) to the manufacturer server, which performs authentication (either itself or via a third party authentication server) and determines the object status. The response is then sent back to the Hyperlabel server, and on to the user's default Web browsing device.

Security Tagging and Tracking Object Model

Figure 36:
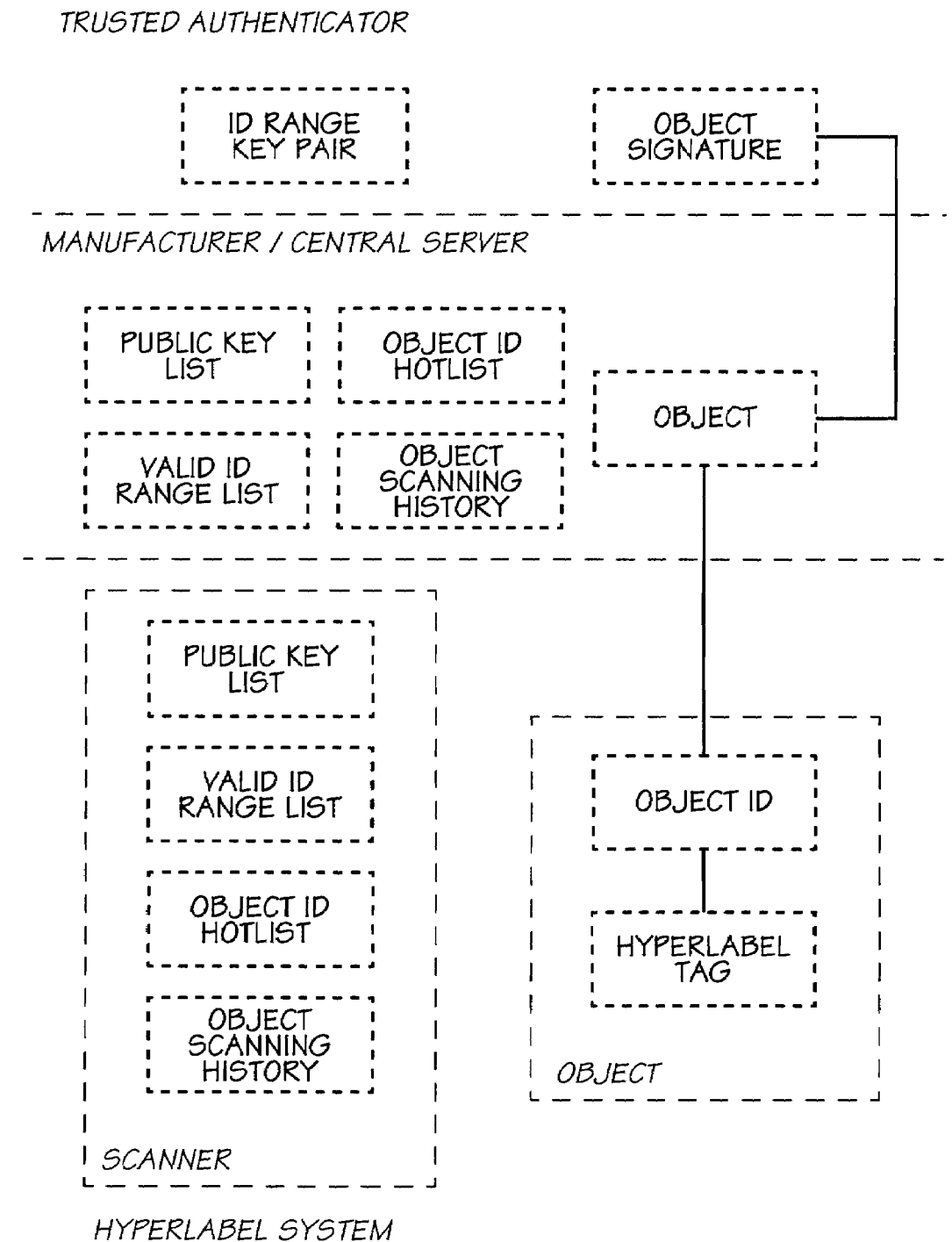
FIG. 36. is an example of Tagging and Tracking Object Management.

The Security Tagging and Tracking object model revolves around Hyperlabel tags, object IDs, and signatures. FIG. 36 illustrates the management and organisation of these objects.

Figure 27:
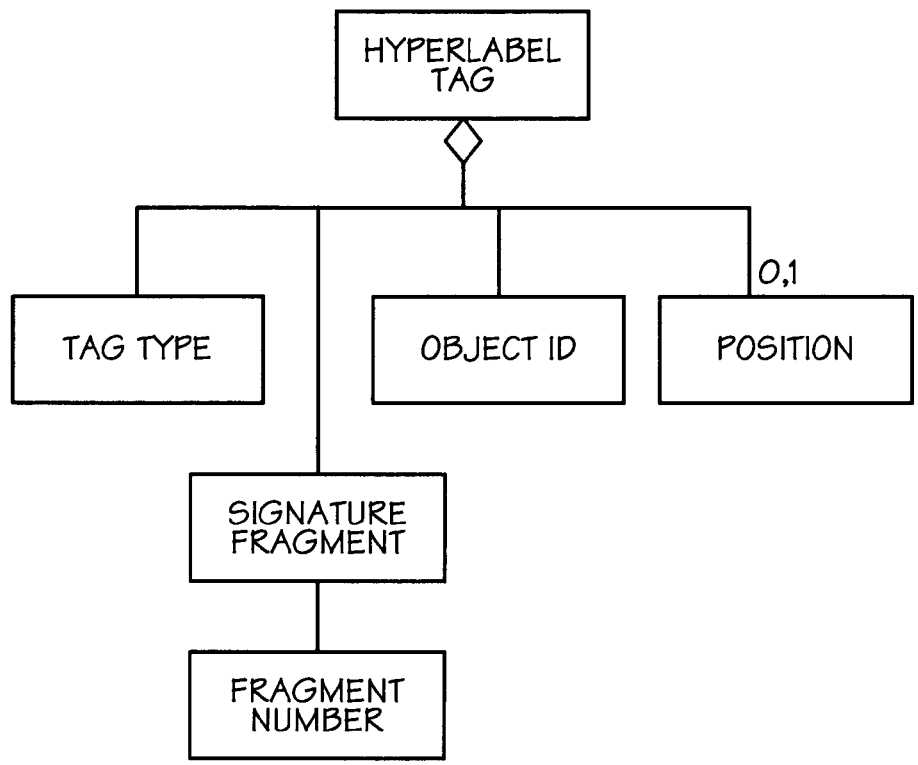
FIG. 27. is an example of a Hyperlabel tag class diagram.

As shown in FIG. 27, a Hyperlabel tag comprises a tag type, object ID, two-dimensional position and a signature fragment. The tag type indicates whether this is a tag on a common object, or whether the tag is on a special type of object such as a currency note or a pharmaceutical product. A signature fragment has an optional fragment number which identifies the fragment's place within the full signature.

Figure 28:
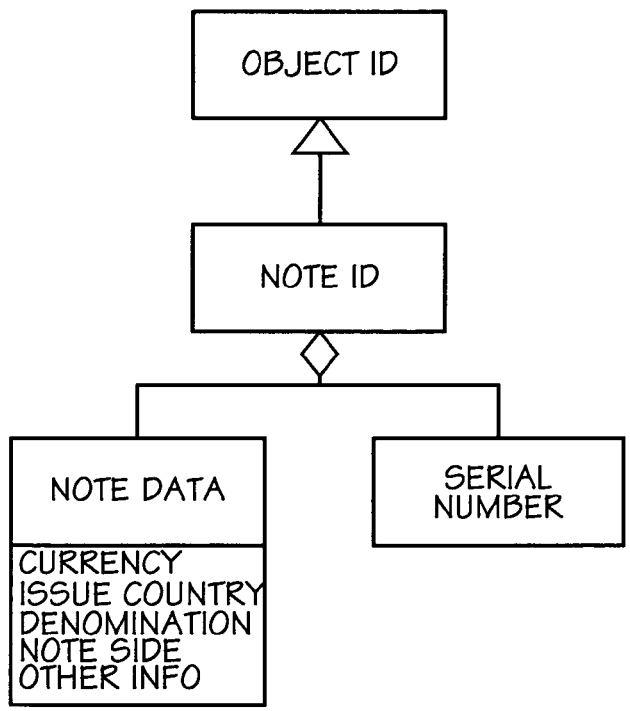
FIG. 28. is an example of a note ID class diagram

Currency notes are identified by a note ID. The note ID comprises note data and a serial number. The note data identifies the type of currency, the country of issue, the note denomination, the note side (front or back) and other currency-specific information. There are two note IDs for each physical bank note—one for each side of the printed note. The Note ID class diagram is shown in FIG. 28.

Figure 29:
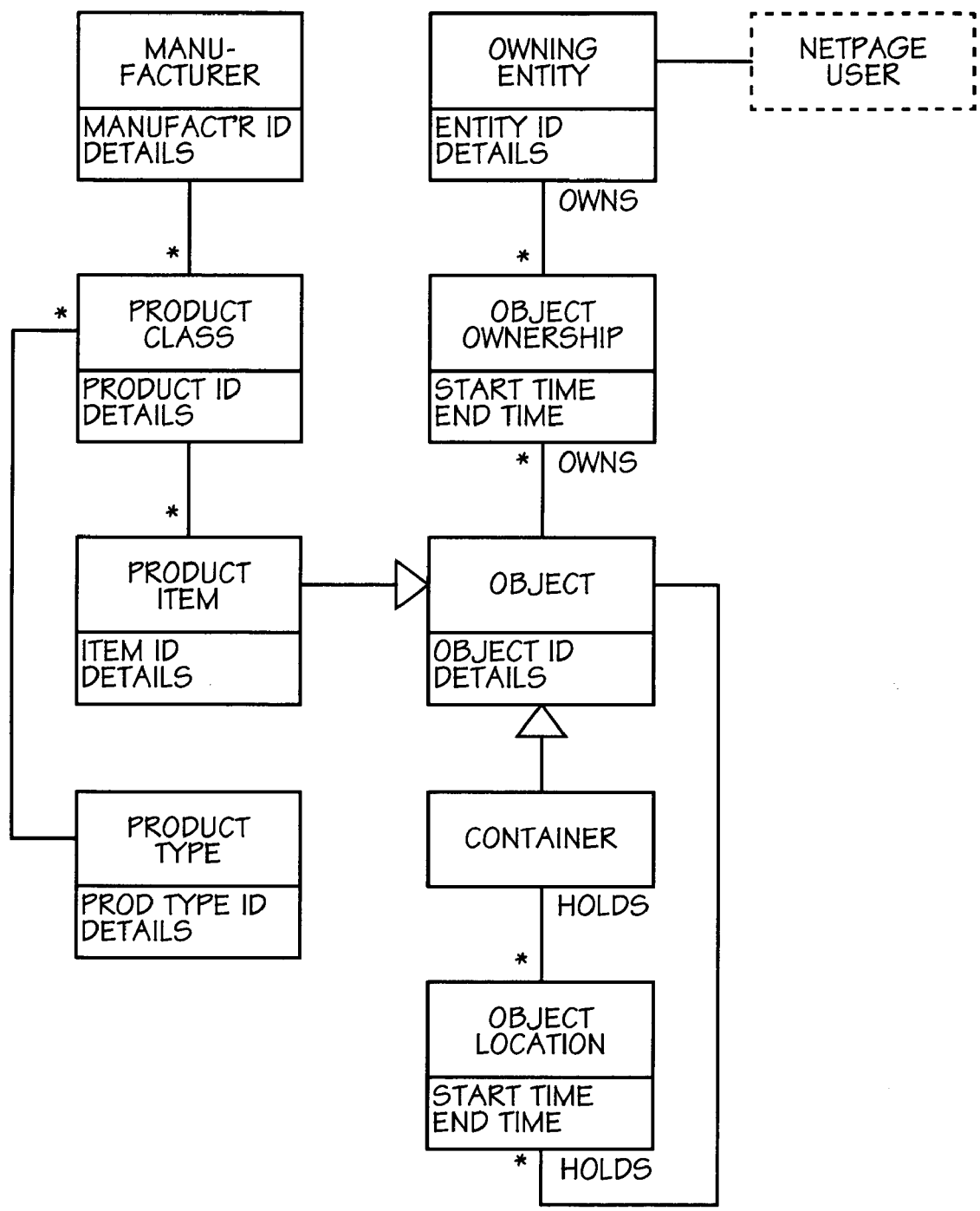
FIG. 29. is an example of an Object Description, ownership and aggregation class diagram.

Object Description, ownership and aggregation class diagram is shown in FIG. 29. This is described in more detail above.

Figure 30:
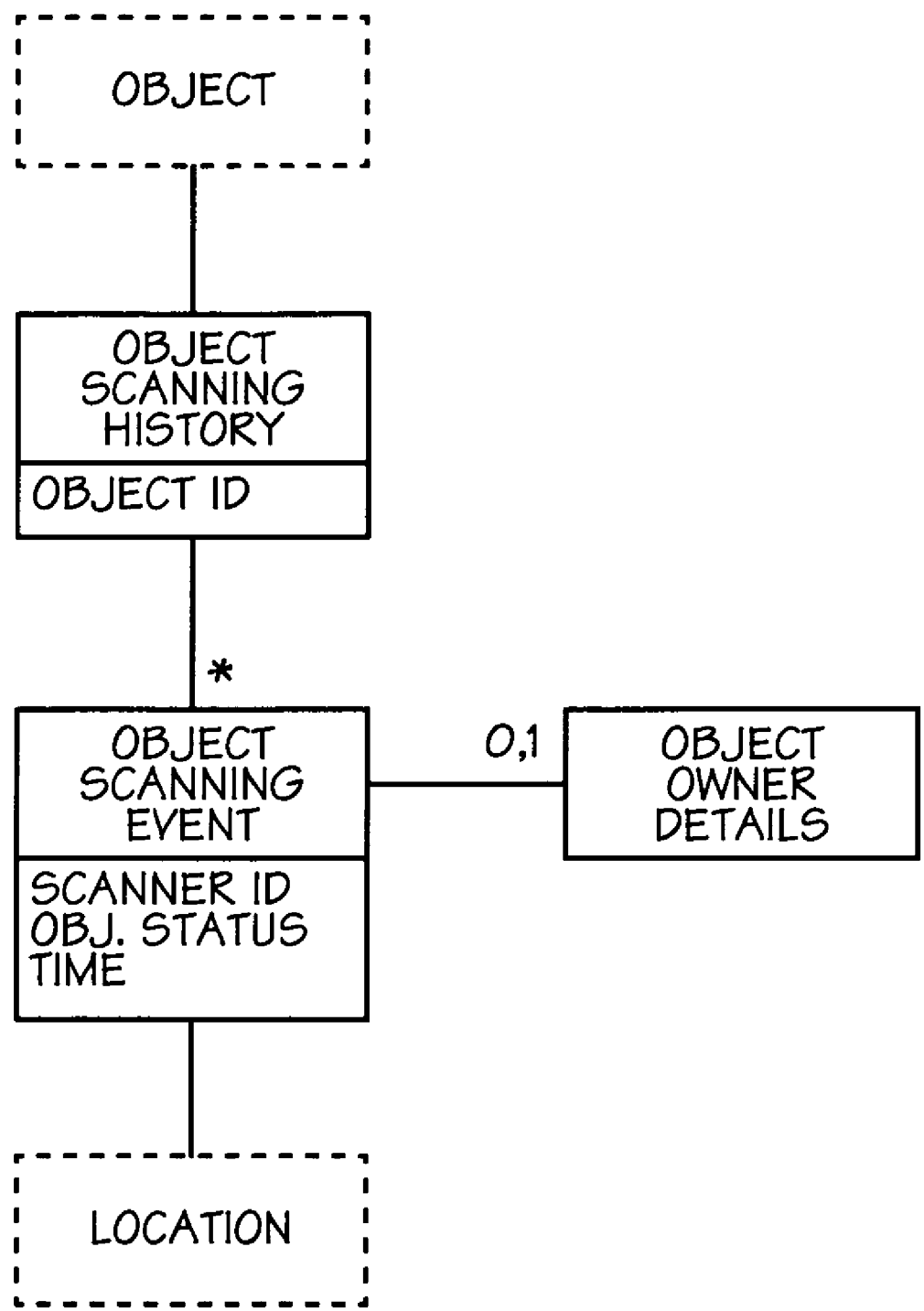
FIG. 30. is an example of an Object Scanning History class diagram.

The Object Scanning History class diagram is shown in FIG. 30. An object has an object scanning history, recording each time the scanner scans an object. Each object scanned event comprises the scanner ID, the date and time of the scan, and the object status at the time of the scan, and the location of the scanner at the time the object was scanned. The object status may be valid, stolen, counterfeit suspected, etc. If known, the object owner details may also be recorded.

Figure 31:
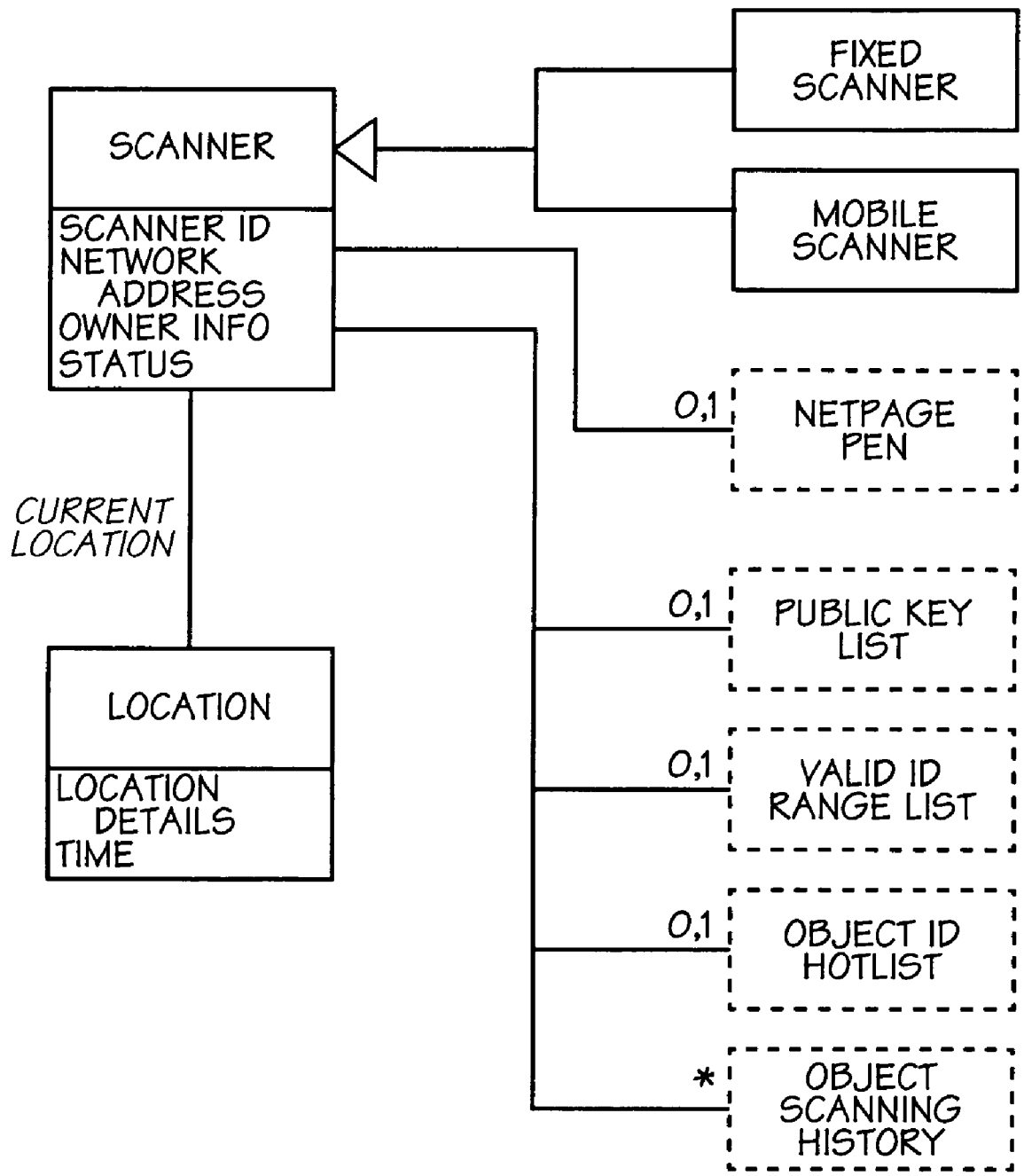
FIG. 31. is an example of scanner class disgram.

A scanner has a unique scanner ID, a network address, owner information and a status (e.g. on-line, off-line). A scanner is either a mobile scanner, whose location may vary, or a fixed scanner, whose location is known and constant. A scanner has a current location, comprising the location details and a timestamp. A scanner may be a Netpage pen, in which case it will be associated with a Netpage Pen record. If a scanner in off-line, it will keep an object scanning history, and will optionally store a public key list, a valid ID range list and an object ID hotlist. The scanner class diagram is shown in FIG. 31.

Figure 32:
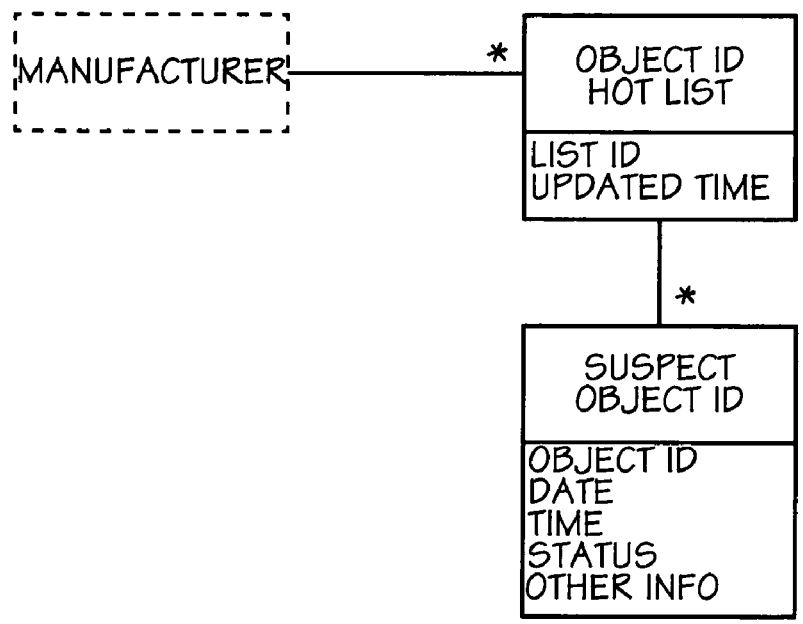
FIG. 32. is an example of an object ID hot list diagram.

The manufacturer, or other central authority, maintains a number of Object ID Hot Lists, each with a unique list ID, and the time the list was last updated. Each hot list comprises a list of suspect object IDs, comprising the object ID, date, time, status (suspected counterfeit, stolen, etc.) and other information. The Object ID Hot List class diagram is shown in FIG. 32.

Figure 33:
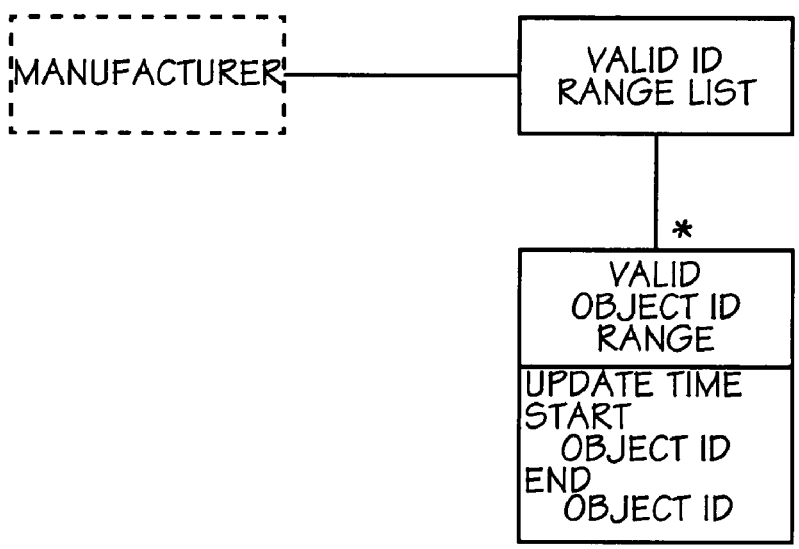
FIG. 33. is an example of a valid ID range class diagram.

The manufacturer, or other central authority, maintains a list of valid ID ranges. Each valid object ID range entry in the list comprises the start object ID and end object ID (the valid ID range) and the time the entry was updated. The Valid ID Range List class diagram is shown in FIG. 33.

Figure 34:
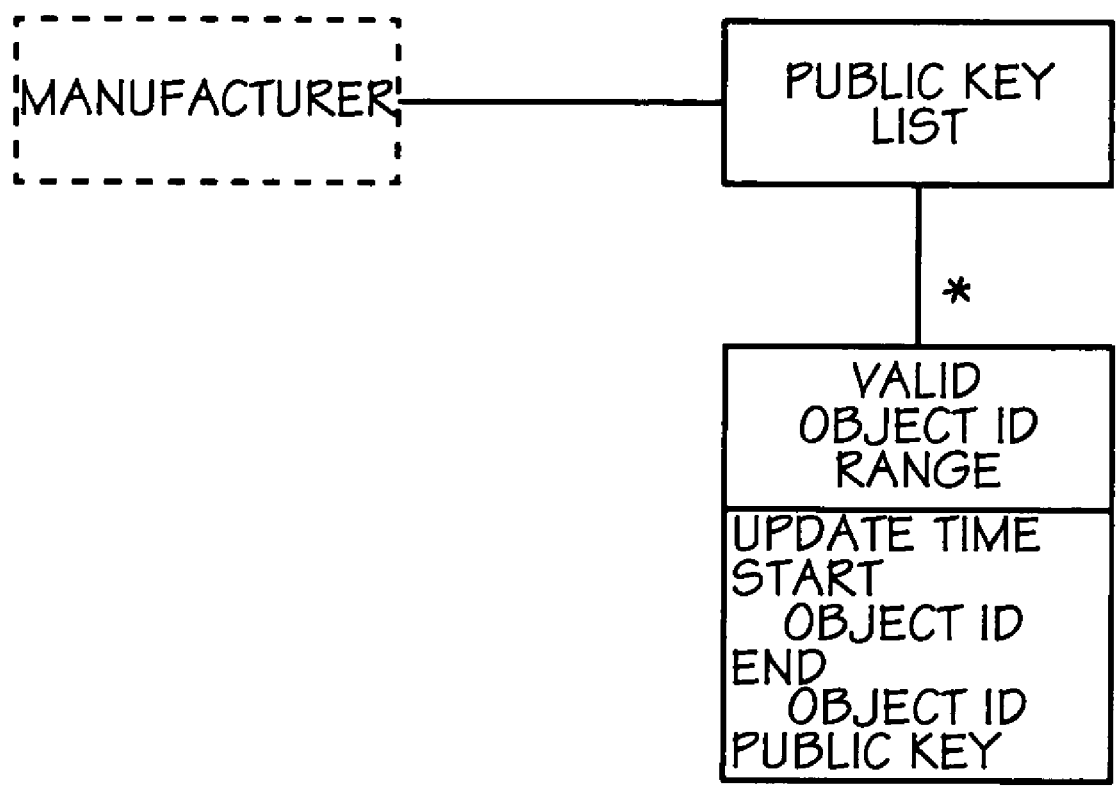
FIG. 34. is an example of Public Key List class diagram.

The manufacturer, or other central authority, maintains a public key list. The public key list consists of a number of entries identifying the public key for a range of Object IDs. Each valid object ID range entry comprises the update time for the entry, the start object ID for the range, the end object ID for the range, and the public key applicable to each object ID in the given range. The Public Key List class diagram is shown in FIG. 34.

Figure 35:
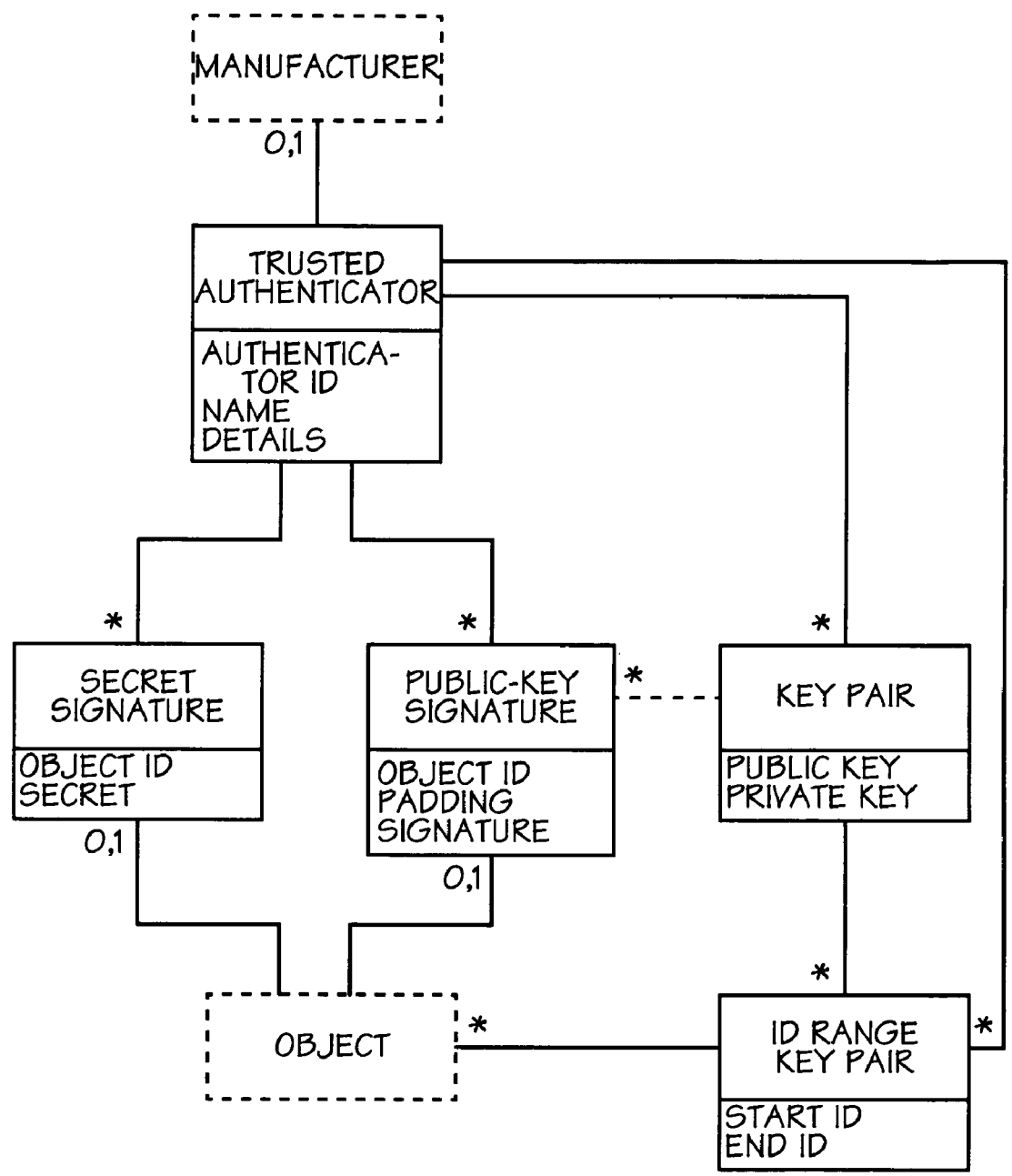
FIG. 35. is an example of a Trusted Authenticator class diagram.

Object authentication may be performed by the manufacturer, or by a third-party trusted authenticator. A trusted authenticator has an authenticator ID, name and details. A trusted authenticator holds a list of public-private key pairs, each associated with one or more ID ranges. This is a list of object ID ranges (identified by the start and end ID) and the corresponding public/private signature key pair. A trusted authenticator also holds a list of secret signatures, and a list of public-key signatures. Each public-key signature identifies the actual signature and/or the padding used to generate the signature. Each secret signature and public-key signature is associated by object ID with a unique object. The Trusted Authenticator class diagram is shown in FIG. 35.

Security Document Scanners

Hyperlabel scanners can be built into a variety of devices. Scanners may be fixed or mobile. A fixed scanner has a permanent, known location. A mobile scanner has no fixed location. A scanner may be on-line, i.e. have immediate access to the central database, or it may be off-line.

Hyperlabel scanners can determine both the validity and the value of currency. Their determination of a note's validity is more definite and more secure than current methods, and can be implemented at lower cost.

Scanners may be specific to a particular product application, such as a currency counter, or may be a generic Hyperlabel scanner. Hyperlabel scanners may be embedded in other multi-function devices, for example, a mobile phone or PDA. Such scanners are multi-purpose since they can also be used to scan Hyperlabel tagged consumer goods and printed materials. A small hand-held scanner may also be used to scan and validate currency. When a scanner scans a note it notifies the currency server of the note details, the current date and time, and the scanner location (if known). Optionally the scanner may also send the identity of the person making the cash transaction, if known. This information would be available in respect of bank transactions, currency exchanges and large cash transactions.

Accordingly, hyperlabel currency tags can be read using many types of device, including:
Currency counters
Automated teller machines
Cash registers
POS checkouts
Mobile phone with inbuilt scanner
Hyperlabel pens
Vending machines The Hyperlabel technology used in these devices can be implemented in a wide range of applications. As a result, the development and deployment costs can be shared by the key stakeholders. Of the seven types of scanner listed, only the currency counters and vending machines are specific to currency. The other five are also used for scanning consumer goods and printed materials.

Hyperlabel scanners built into a variety of products will include the following features, currently under development at Silverbrook Research.

An infrared image sensor to read the Hyperlabel tags that uniquely identify each note.

A 32 bit RISC processor with 20 megabits of secure code space signed using 2048 bit RSA cryptography.

A highly secure processor with cryptographic and physical security features for verifying the cryptographic signature on Hyperlabel tags (under development at Silverbrook Research).

Infrared optics, including filters tuned to the Hyperlabel ink infrared spectrum.

A real-time clock to verify the time of each transaction reported.

Software to decode the Hyperlabel tags, record the details of each scan, to validate each note scanned, and to facilitate automatic and secure communications with an online database.

Communications systems to create secure network connections to the central currency verification database.

Various of the Hyperlabel scanners described below are also planned to include the following units:

An inbuilt display and data entry mechanism to indicate to the operator the amount of money counted, notes that are suspected of being counterfeit, and the identity of the person requesting reportable cash transactions.

A cache of the serial numbers of all known counterfeit and stolen notes.

Other spectral filters tuned to the secure currency ink spectrum (which differs from the commercially available Hyperlabel ink).

A GPS tracker to verify the location of the currency counter at the time of use.

Currency Counters

Figure 37:
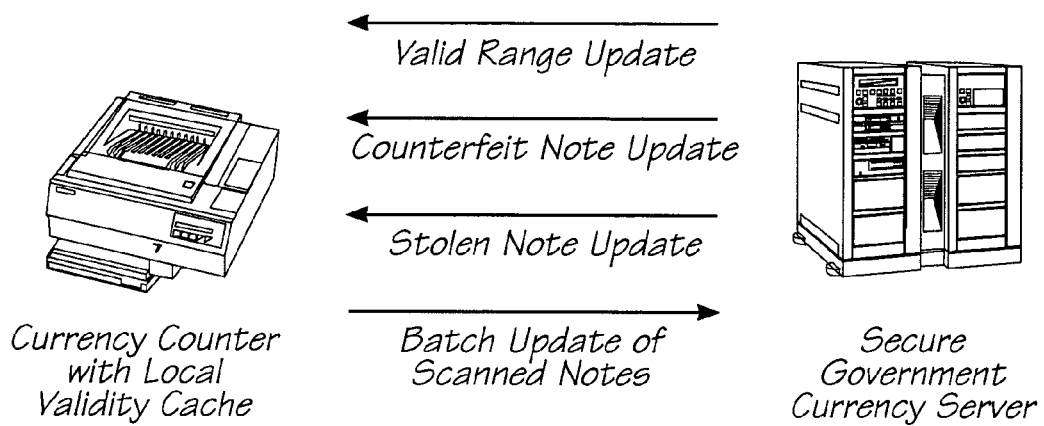
FIG. 37. is an example of use of a currency counter.

A Hyperlabel currency counter with an inbuilt infrared scanner can be used to automatically scan, validate, and log each note in the central currency database as it is counted. An example of the implementation of this is shown in FIG. 37.

These units could replace existing currency counting machines now in use in banks, in foreign exchange offices, in bill payment agencies accepting cash payments, and in immigration offices at international airports.

As a currency scanner has no other obvious application other than currency. It does not need to communicate with any database other than the government currency database. A currency scanner may operate at high speed, requiring excess dataline bandwidth and transaction processing. To overcome this, the banknote validity data can be locally cached, and updated whenever it changes. Information on scanned notes is sent periodically in an encrypted form. Although the banknote location updates may be sent periodically security and timeliness for detection are not compromised. This is because data on any counterfeit or stolen notes could be sent immediately. The time of the scan is locally determined and accurately included in the data packet, and the list of counterfeit and stolen notes is updated as soon as the information is available.

Automated Teller Machines

An Automatic Teller Machine (ATM) is a relatively simple case, as it is typically not used for depositing cash, only dispensing it. Accordingly, they are not required to validate the notes. Notes can be validated and logged using a currency counter when they are placed into the ATM.

ATMs can be equipped with Hyperlabel scanners, which register notes as they are loaded into, as well as taken out of, the ATM. As well as providing currency tracking features, this will also reduce theft of, and from, ATMs. This is because the money taken from the ATM will be tracked, and as soon as the theft is reported, the money will be recorded in the central database as stolen.

Figure 38:
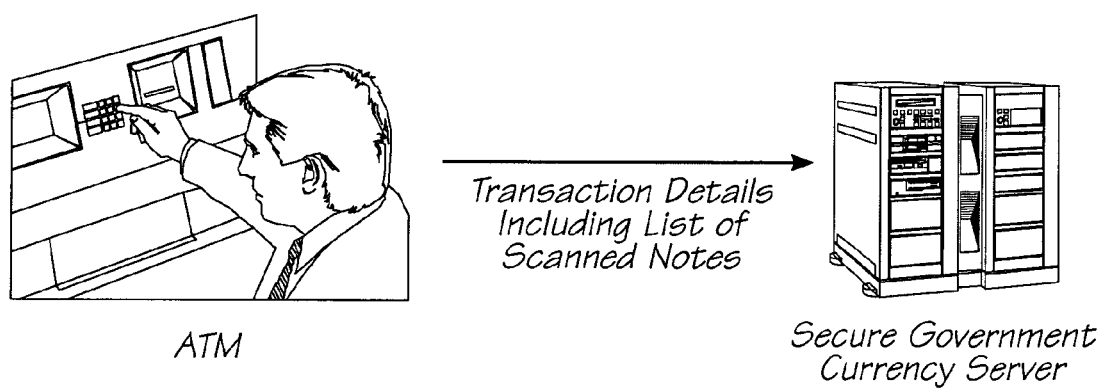
FIG. 38. is an example of use of an automatic teller machine.

Thus, as shown in FIG. 38, the ATM can track the details of the account from which the funds were withdrawn. This allows the particular notes dispensed to be logged as stolen if the real account holder notifies the bank of fraudulent transactions involving lost or stolen cards.

Cash Registers

Cash registers can have an add-on or built-in currency scanner for a small additional cost per unit. The notes are scanned as they are put into, or taken out of, the cash drawer. This also aids verification that the correct amount of money has been tendered, and the correct change given.

Tracking currency in and out of cash registers can enhance the safety of shop attendants. Once criminals become aware that stolen cash will be immediately recorded as stolen, then the incidence of theft should be significantly reduced.

Figure 39:
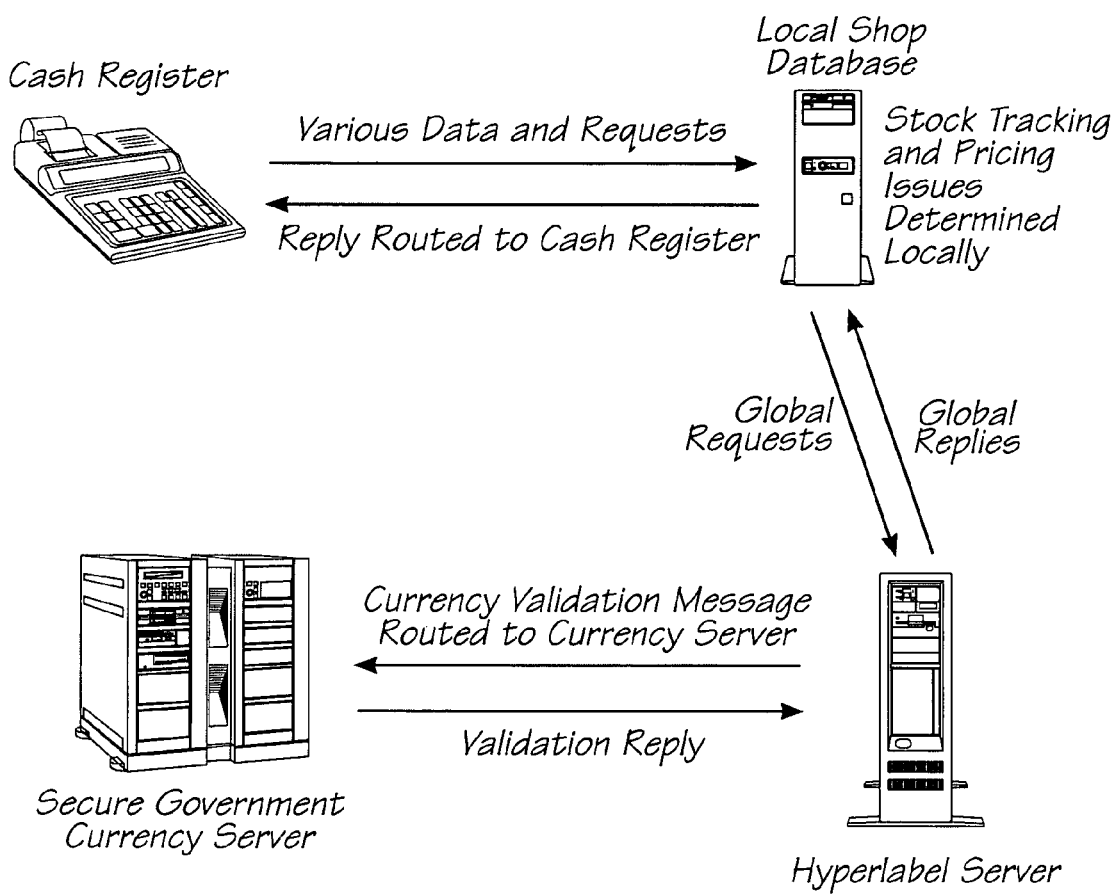
FIG. 39. is an example of use of a cash register.

As shown in FIG. 39, this is typically achieved by having the cash register communicate with a secure currency server, via a Hyperlabel server and a local shop database. Thus, the cash register can transfer information regarding transactions to the local database, which determines if local verification is sufficient, or if global validation or the like is required. Thus, for example, offline authentication may be used for transactions below a certain threshold required for In this latter case, a request for verification or the like can be routed to the Hyperlabel server, which will then determine an associated secure currency, and route the request accordingly, allowing the secure currency server to perform authentication using the online Hyperlabel Supermarket Checkout One of the major applications of Hyperlabel is in consumer packaged goods, where it has the potential of being the 'next generation bar code' allowing automatic tracking of individual grocery items. This application requires automatic supermarket checkouts that scan products for Hyperlabels. These checkouts will be able to read currency Hyperlabel tags. This allows the currency to be tracked, but also simplifies payment, as the amount of money tendered is simply determined by passing it through the Hyperlabel scan field.

Figure 40:
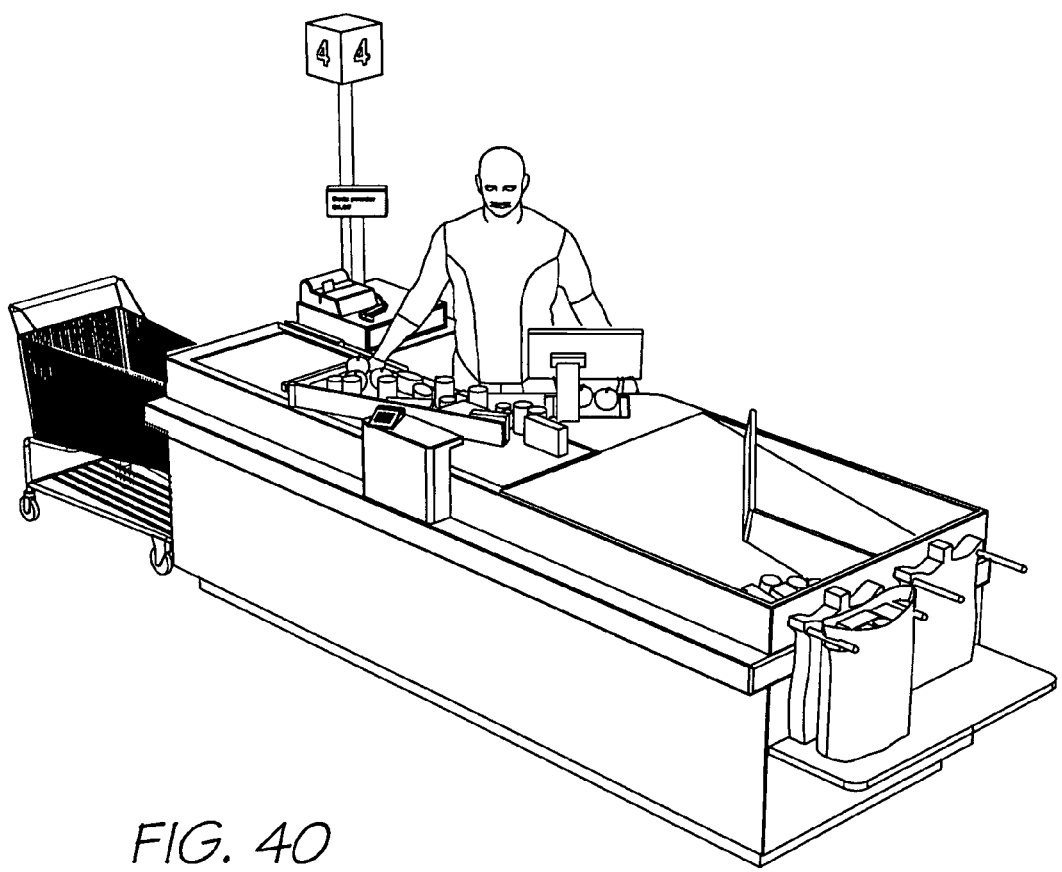
FIG. 40. is an example of a Hyperlabel supermarket checkout.

An example of a hyperlabel supermarket checkout is shown in FIG. 40, with examples being described in more detail in our copending application number [cross ref any application describing hyperlabel checkout], the contents of which is incorporated herein by cross reference.

Mobile Phone with Inbuilt Scanner

A mobile phone that has an inbuilt infrared scanner to scan and validate each note can be used in a range of locations where money counting is not a normal function. It is also used for other inventory management and validity checking applications, such as pharmaceutical security, forensic investigations, policing trademark infringement, and stocktaking, and is intended for wide distribution.

Tracking currency in and out of cash registers can enhance the safety of shop attendants as criminal activity should be affected by the realization that all notes taken from a cash register will be immediately registered as stolen, and that the criminal will run the risk of being caught just by using that cash in everyday transactions or by holding the cash.

Handheld Validity Scanner

Figure 41:
FIG. 41. is an example of a handheld validity scanner.

Handheld Hyperlabel validity scanners may also be used where currency counters are not required or suitable. These devices are expected to be significantly more common than currency counters, as they have multiple uses, and will be much cheaper. An example of a handheld validity scanner is shown in FIG. 41, and described in more detail in copending application number [cross ref any application describing validity scanner], the contents of which is incorporated herein by cross reference.

Figure 42:
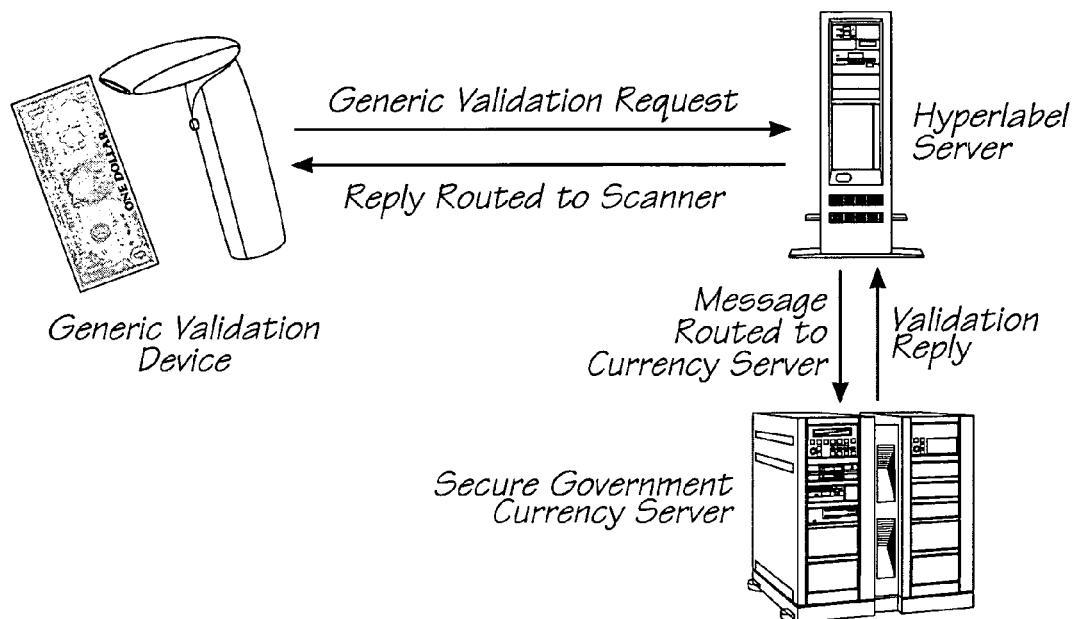
FIG. 42. is an example of use of a handheld validity scanner.

An example of communications used in implementing a second example of a handheld scanner is shown in FIG. 42.

The validity scanner has multiple uses, including pharmaceutical security, brand-name security, stocktaking, forensic investigations, and policing. As it is not a dedicated currency device. It does not communicate directly with the government currency server as otherwise, large numbers of non-currency related messages would need to be routed through that server. Instead, it communicates directly with commercial Hyperlabel servers, and any currency related validation requests are passed on to the government server. To reduce the transaction load on the government server, note related information can be cached at the Hyperlabel server, much as they are cached in the currency counters.

The link to the database would typically be relayed over a radio link to allow local mobility. The radio link can be WiFi, GPRS, 3G mobile, Bluetooth, or other IP link, as appropriate. Internet transactions are secured using encrypted packets.

Hyperlabel Pen

The Hyperlabel pen is a miniature low cost scanner for consumer and business use. It uses an infrared image sensor, instead of a laser scanner, and scans a Hyperlabel tag whenever it is clicked against a surface.

Details of Hyperlabel pens are described for example in copending patent application number [cross ref any application describing pen], the contents of which are incorporated herein by cross reference.

These pens are intended for high volume consumer use, with intended distribution exceeding 100 million units. While its primary application is a wide range of 'interactive paper' and computer peripheral uses, it also allows consumers to verify Hyperlabel tags printed on currency, pharmaceuticals, and other objects. The Hyperlabel network will be managed by dedicated Hyperlabel servers, and any currency scans from Hyperlabel pens will be routed through these servers to a single logical connection to the Currency Servers. Because the costs are borne elsewhere, a huge number of currency validation and logging points can be added to the network at negligible incremental cost.

Figure 43:
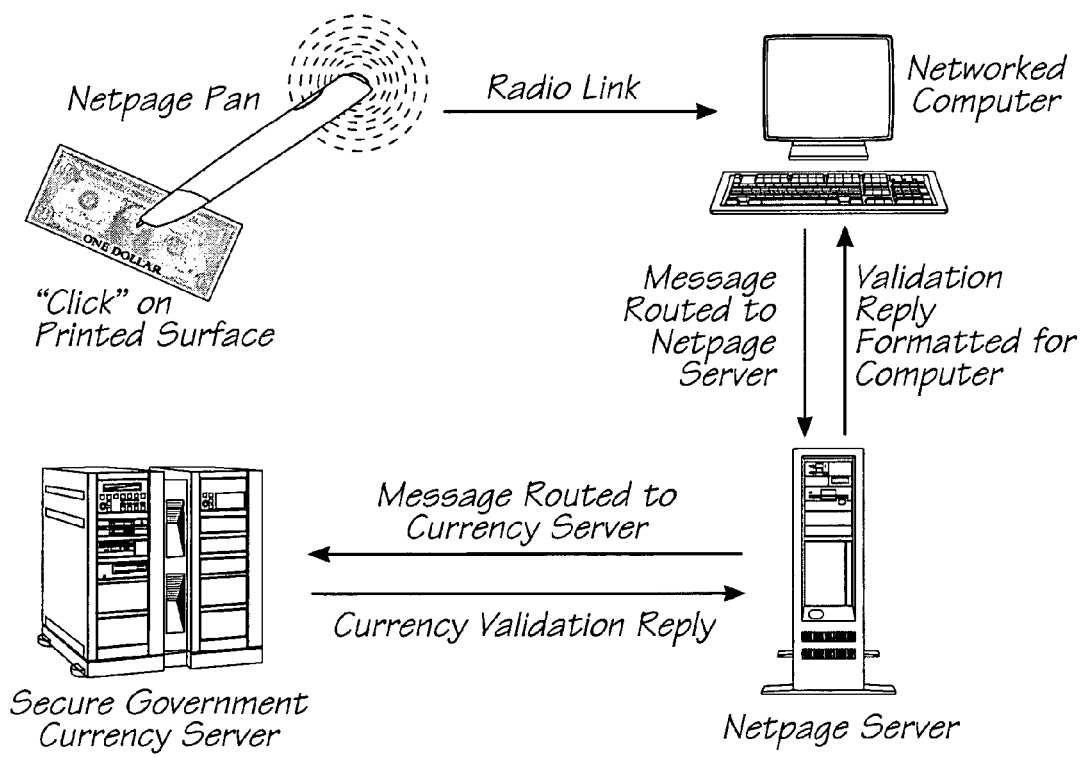
FIG. 43. is an example of use of a sensing pen.

The pens do not have a display device, and are intended to be used in conjunction with a device with a display capability and a network connection, as shown in FIG. 43. As validation is a secondary function of the pens, they do not communicate directly with the currency database, and instead transfer requests via a relay device. Only a small fraction of pen hits (much less than 1%) are expected to be related to currency validation. The pens communicate by radio (typically Bluetooth) to the relay, which may be a computer, a mobile phone, a printer, or other computing device.

This relay device communicates, in turn, with the Hyperlabel server. If the Hyperlabel server determines that the pen has clicked on a currency tag, the click is interpreted as a validation query, which is then forwarded to the appropriate currency server. The currency server logs the identity and the network location of the pen that clicked on the note, as well as other data such as the note serial number, the time and the date. The physical location of the pen is typically unknown, as Hyperlabel pens usually do not include a GPS tracker. The currency server passes the validation message back to the Hyperlabel server, which formats the message for the display device that relayed the message from the pen.

Vending Machine

Figure 44:
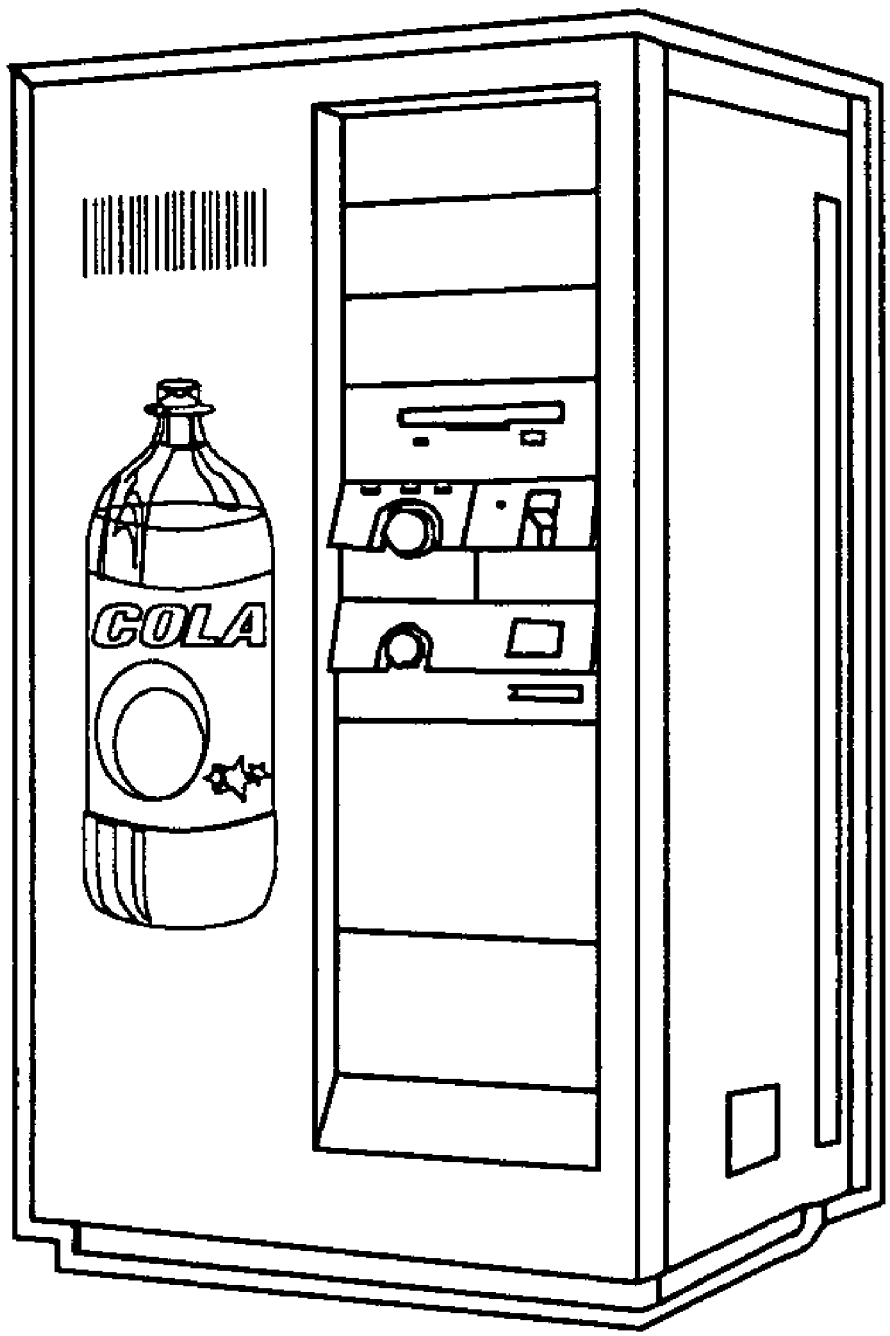
FIG. 44 is an example of a vending machine.

For a small additional cost, Hyperlabel scanners can also be added to vending machines to securely determine both the validity and the value of a note, as shown in. FIG. 44. They also reduce the risk of currency theft from the vending machine. Vending machines are somewhat complimentary to ATMs—they accept notes, but do not dispense them.

Hyperlabel scanners send data to a remote secure server for storage and interpretation. A direct wireless or wired link can be established between the server and a scanner for communication. Alternatively, the scanners can communicate with the secure server indirectly through a companion device such as a point of sale (POS) terminal, a mobile phone, or computer. The database can be updated by scanners operating online in real-time, or periodically using batch file downloads. High speed scanners can cache lists of counterfeit and stolen notes locally, to reduce network traffic.

The validation messages can go directly to the currency server, or via the server of the company which owns and operates the vending machine. The vending machine can be configured to automatically reject any stolen or counterfeit notes. It is possible to display the status of the note (i.e. stolen or counterfeit) on most vending machines, and it is possible that this would act as a further crime deterrent—for even a humble vending machine can conspicuously identify dubious currency. It should only report this when the certainty is 100%. On lower certainties, it can simply reject the note without stating why, as is the current practice for vending machines.

Security Features

Hyperlabel currency security features include:

Notes can be tracked whenever they are scanned—at banks, supermarket checkouts, vending machines, cash registers, and low cost home scanners.

The unique range of currency tag numbers can be printed only by the government printing agency.

Currency IR ink with unique spectral properties, can be made available only to government printing agencies.

Note serial number printed in tag must match printed serial number.

Tags are printed all over both sides of the note.

Tags vary across the note—a forger must match the thousands of tags printed on any note.

Additional proprietary security features not disclosed in this document.

The ability to determine both the validity and the value of currency.

Security Requirements

For a low risk currency anti-forgery system, it is only necessary to make it uneconomic. That is, all that is required is that the cost of forging a note exceeds the face value of the note, taking into consideration likely advances in technology. A good system should also make it easy to detect and track counterfeiters and money launderers. The Hyperlabel system offers a practical solution that meets these objectives.

Table 6 outlines various levels of counterfeiting skill, and the corresponding ability of the Hyperlabel system to detect counterfeit currency.

TABLE 6

| Counterfeit level | Counterfeiter characteristic | Note characteristic | Scanner reports probability of counterfeit |
|---|---|---|---|
| Photocopy | Casual forger | No Hyperlabel tags | 100% certainty |
| Hyperlabel printer | Home forger, using computers and printers | Hyperlabel tags are present, but they are not valid currency codes. | 100% certainty |
| Sophisticated - computer systems expert | Skilful forger who creates a computer system to generate a sequence of Hyperlabel tags | Tag serial number does not match cryptographic signature in tag | 100% certainty |
| Sophisticated | No access to special ink | Hyperlabel currency tags printed with commercial Hyperlabel IR ink instead of secure currency IR ink | 100% certainty using currency counters. Some scanner types (e.g. Hyperlabel pens) do not detect the special ink |
| High level forgery | Highly skilled forger who copies a tag from a note, and replicates it across the note using illegally obtained secure IR ink | Hyperlabel tags do not vary correctly over the note | 100% certainty |
| Perfect forgery | Conventional, highly skilled forger who meticulously copies every dot on the whole note, and prints them with illegally obtained secure IR ink | 100,000 copies of an existing note that are perfect in all respects, including ink and all-over pattern of valid tags. All 100,000 notes have the same serial number | 99.999% certainty on any note, as the 100,000 forgeries cannot be distinguished from the original valid note. The forgeries are easily detected by humans due to repeating serial numbers. |
| Perfect forgery (with different serial | Conventional, highly skilled forger who perfectly copies every dot on the whole note, then | 100,000 copies of an existing note that are perfect in all respects, but 100,000 notes all | 100% certainty (with aid of operator verification of printed serial number) |

TABLE 6-continued

| Counterfeit level | Counterfeiter characteristic | Note characteristic | Scanner reports probability of counterfeit |
|---|---|---|---|
| numbers) | ensures that the printed serial numbers increment. | have different serial numbers | |
| Large scale effort (uneconomic) | A massive effort, where many notes are collected, and each note is individually analysed and duplicated. | No more than one copy of any existing note is printed, but that copy is perfect in all respects. The forgers analyse and copy one note at a time. | 50% certainty on any one note - as the single forgery cannot be distinguished from the original. However, a pattern of duplications would be evident if more than one forged note was passed at a time. |

Benefits of a Hyperlabel Security Document System

Theft

Hyperlabel scanners report the locations of banknotes to a central secure database. Repositories of cash—banks, ATMs, cash registers, armored trucks, personal safes—that are equipped with Hyperlabel scanners have records of all of the serial numbers of the notes that should be in the repository. Whenever cash is stolen from such a repository, the central database operator can be notified, and the notes carrying the serial numbers will rapidly be registered as stolen. As the records are kept in a remote secure location (i.e. the central database), the records will not be stolen along with the cash.

The stolen status is rapidly and automatically disseminated to a huge number of outlets as varied as financial institutions and retailers. Each of those outlets will be able to rapidly, accurately and automatically identify stolen notes as part of their standard cash-handling procedures.

The stolen status is also rapidly and automatically disseminated to relevant agencies such as Customs, Immigration and Police, Hence law enforcement officers will be armed with mobile scanners that can accurately and immediately ascertain the status of suspect notes.

Once the stolen cash is used anywhere there is a Hyperlabel scanner, the cash will be identified as stolen. This places the thief in high danger of being caught. It would thus be very difficult for a thief to dispose of any significant amount of stolen cash.

Hyperlabel scanners can assist in the reduction of theft in many situations, including:

Bank and armored truck robbery: all notes would be immediately 'marked as stolen' as soon as the thieves left the scene of the crime.

Retail shops: late night shops, such as 7-eleven and gas stations—are notoriously victims of small scale armed and unarmed robberies. The reduction of this kind of theft should make these occupations substantially safer.

For similar reasons, ATMs, personal and company safes, vending machines, would all become significantly more secure.

Drug Dealing

Indirectly, this could also limit the activities of drug dealers. At the street level, many notes used to pay for drugs may be registered as stolen. As the number of these stolen notes accumulates, the cash flow pattern will be identified as suspicious. Therefore, drug dealers would want to be able to verify that any money paid to them was not stolen or counterfeit.

Ironically, drug dealers will not be able to use Hyperlabel scanners to verify the status of cash they are paid with, without also running the risk of being caught. If a drug dealer was frequently verifying large amounts of cash, where a large percentage of that cash was stolen, they could be investigated for money laundering.

Counterfeiting

As well as assisting in the apprehension of criminals, the collection of this data also allows the detection of sophisticated forgeries where the Hyperlabel dot patterns are exactly duplicated. This is because there will be multiple copies of exactly forged notes—at least the original and the forgery. For example, if multiple identical notes appear in different places at the same time, all but one of those notes must be a forgery. This applies even if the note is an absolutely perfect forgery, as no two Hyperlabel tags should ever be the same. An heuristic determines whether the appearance of a particular note in different places in quick succession is feasible. If successive appearances of a note are determined to be infeasible, the presence of a forgery is indicated.

Money Counting

Because the hyperlabel tags encode the denomination of currency, this allows money to be counted solely on the basis of hyperlabel detection. This avoids the need for the detection and interpretation of a visible numeral, which typically requires complex image processing to be performed, especially if the quality of the note is degraded due to extensive use.

It will be appreciated that in addition to this, as the denomination is repeated substantially over the entire currency, this ensures that the currency value can be determined even if a large portion of the note is damaged.

Money Laundering

As discussed in the background, there are two claim stages in money laundering, namely placement and wiring and integration.

It will be appreciated that by providing for tracking of each individual note utilising the Hyperlabel system described above, this makes it extremely difficult for placement to be carried out, primarily as each individual note can be tracked throughout its life. Accordingly, large amounts of currency suddenly entering into the circulation will be easily detectable primarily as there will be a break in the history of the note.

Thus, the system can utilise Patent detection algorithms to identify when large volumes of currency either exit or enter into circulation thereby identifying potential sources of money laundering. In addition to this however currency in which has a certain times been owned by certain individuals can also be tracked. This allows Patents within an individual's accounts usage to be determined which also helps identify money laundering.

Meeting Regulatory Requirements

It will be appreciated that by providing a database which can be used to track all currency, this allows banks to ensure regulatory requirements are satisfied. To even further aid with this, rules can be defined which represent the regulatory requirements. In this instance, when a transaction is to be performed, the transaction can be compared to the predetermined rules to determine if the transaction is allowable. This will effectively prevent unallowable transactions occurring thereby ensuring that the banks meet the regulatory requirements.

Cross Boarder Controls

In order to provide for cross boarder control, it is merely necessary to continuously monitor the location of currency documents. If currency documents on subsequent transactions are provided in different locations this indicates that the currency has been physically moved thereby allowing cross boarder currency movements to be determined.

Security Document Transfer

It will be appreciated that as the security document can be represented wholly electronically, by use of the identity and correspondence signature, it is possible to electronically transfer security documents. In this instance, specialised transfer machines can be provided which operate to destroy a currency document upon receipt. The document can be converted to an electronic form by identifying the corresponding document layout and tag map used to place the coded data thereon. This information can then be transferred to a corresponding machine in another location allowing the security document to be reproduced. Thus, the security document may transferred to one location to another location in an electronic form by ensuring that only one security document is produced this prevents document duplication whilst allowing secure transfer.

Advantages of a Hyperlabel Security Document System

The proposed Hyperlabel solution can be implemented to bring many advantages. Some of these include:
  Unobtrusive to the public
  Follows existing cash handling processes
  Reduces reliance on paper trails
  Provides a strong deterrent for accepting counterfeit currency
  Provides a strong deterrent for laundering large amounts of cash
  Efficient way to share resources across national and international agencies
  Improves confidence in the financial system
  Limits the possibility of inexplicable changes in money demand
  Reduces risk to integrity of financial institutions
  Helps banks implement and automate due diligence methods for cash transactions
  There are several major advantages of Hyperlabel currency tags over other existing forms of note validation such as RFID, including:
  Hyperlabel tags are invisible, so they do not affect note design or graphics.
  Hyperlabel tags can be implemented at very low cost—the tags are just ink and are printed while the notes are still in roll form, directly after the visible inks are printed.
  Hyperlabel tagged currency is extremely difficult to forge.
  Hyperlabel tags are printed over the entire note surface in a highly redundant and fault tolerant manner.
  Hyperlabel tags are very unlikely to become unreadable due to note damage.
  Hyperlabel tags can be scanned using a variety of scanners.
  Currency location and reportable cash transaction data are automatically collected.
  Hyperlabels support omnidirectional reading, they can protect privacy, they can be produced for a low cost, and the ability of the scanners to read the tags is independent of packaging, contents, or environmental conditions.

One of the most effective methods to reduce the counterfeit risks considered above, is the introduction of a new form of currency incorporating a machine readable code, and the means to validate notes at key points where cash transactions occur. Counterfeit notes could then be detected at banks, currency exchanges, airports, retailers and bill payment service providers accepting cash payments. That is, the goal would be to identify and reject counterfeit notes before they enter the monetary system.

Counterfeit notes can vary in quality—depending on the level of skill of the counterfeiter and the choice of technology. Hyperlabel provides security against the full range of efforts—from casual forgery on a color photocopier, through to multi-million dollar efforts by professional criminals.

By implementing a Hyperlabel system, it becomes possible to monitor and forecast national and international cash flow changes, as well as provide alerts for any abnormal patterns that could lead to unwanted macroeconomic outcomes.

An automated Hyperlabel system aids with the record keeping, and provides the basis for additional ways to identify 'suspicious activities' involving cash that can occur.

In comparison, Hyperlabel tags can be produced at a low cost. They can be printed all over the surface of a note (redundancy) and they are easy to read. The IR ink 'tags' will not be damaged by folding, washing, physical impact or electrostatic shock, and cannot be torn out of the note. They can be used and read in the presence of radiopaque materials. They support omnidirectional reading, as well as very low cost proximity readers. Hyperlabel tags cannot be read while in the wallets of citizens, so do not present a threat of covert scanning providing information to criminals. This should make Hyperlabel tagged currency acceptable to privacy advocates concerned about the ability to read notes without the knowledge of the owner. They also meet current and anticipated regulations and guidelines for national and international agencies. An overview of the key components of a Hyperlabel system needed to achieve these objectives is provided in the next section.

Socioeconomic Consequences

Although there are significant advantages in implementing a Hyperlabel solution, there are also socioeconomic consequences that need to be noted.

Of primary concern is the consequence of Hyperlabel becoming a pervasive counterfeit detection and cash flow tracking system. This could effectively and materially hamper the activities of organized crime and terrorists relying on counterfeiting or laundering cash and it could prove to be disruptive as criminals find alternative methods to support their activities.

In this context, further questions ought to be considered before proceeding with implementation. Some of these include:

Will crime move to less regulated and less developed nations causing further decline in their socioeconomic status?

Will electronic crime become more sophisticated?

How will Hyperlabel alter the structure of criminal and terrorist networks?

The cash economy is often used by small businesses as a form of tax evasion—what, if anything, will replace this once cash becomes traceable?

RELATED APPLICATIONS

The Hyperlabel infrastructure can also be used to validate and track other 'secure documents' where the value of the document is based upon what it represents, rather than what it contains. Some examples are:

Government checks
Bank issued checks
Bearer bonds
Stock certificates
Lottery tickets
Event tickets
Passports
Medical certificates
Postage stamps
Food stamps The Hyperlabel infrastructure is also shared with other applications, such as grocery tracking and interactive documents.

We claim:

1. A method of counting the value of a plurality of currency documents, each currency document having disposed thereon or therein coded data including a plurality or coded data portions, each coded data portion being at least partially indicative of an identity of the currency document, the method including, in a sensing device:

sensing at least one coded data portion for each currency document;

determining a scanning time at which the sensing device sensed the coded data portion of each currency document;

determining, from the sensed coded data portion and determined scanning time, a unique identity of each currency document;

determining, using each determined identity, a value for each currency document; and, counting the value of the currency documents using the determined values.

2. A method according to claim 1, further including determining:

a signature;
currency document attributes; and,
a location of the sensing device when the currency document was sensed.

3. A method according to claim 2, further comprising the a step of determining a validity of the currency document from the determined location, the determined time, and the sensed coded portion, and wherein the step of counting the value of the currency documents counts only currency document that are determined to be valid.

4. A method according to claim 1, wherein the sensing device includes an indicator, where the method includes causing the indicator to provide at least one of:

an indication related to the success of sensing the at least one coded data portions;

a count indicative of the number of sensed currency documents;

the value of the sensed currency document; and,
an incremental value of the sensed currency documents.

5. A method according to claim 1, wherein the sensing device stores data indicative of at least one of an identity of the sensing device and an identity of a user.

6. A method according to claim 1, wherein each coded data portion is further indicative of at least part of a signature, the signature being a digital signature of at least part of the identity, and wherein the method includes:

determining a determined identity and at least one determined signature part; and, authenticating the security document using the determined identity and the at least one determined signature part.

7. A method according to claim 6, wherein the signature is a digital signature of at least part of the identity and at least part of predetermined padding, the padding being at least one of:

a predetermined number; and,
a random number.

8. A method according to claim 6, wherein the entire signature is encoded within a plurality of coded data portions and wherein the method includes the sensing device sensing a number of coded data portions to thereby determine the entire signature.

9. A method according to claim 6, wherein the coded data includes a plurality of layouts, each layout defining the position of a plurality of first symbols encoding the identity, and a plurality of second symbols defining at least part of the signature.

10. A method according to claim 6, wherein the digital signature includes at least one of:

a random number associated with the identity;
a keyed hash of at least the identity;
a keyed hash of at least the identity produced using a private key, and verifiable using a corresponding public key;
cipher-text produced by encrypting at least the identity;
cipher-text produced by encrypting at least the identity and a random number;
cipher-text produced using a private key, and verifiable using a corresponding public Key; and,
cipher-text produced using RSA encryption.

11. A method according to claim 1, wherein the coded data is at least one of:

substantially invisible to an unaided human;
printed on the surface using at least one of:
an invisible ink; and,
an infrared-absorptive ink;
provided substantially coincident with visible human-readable information.

12. A method according to claim 1, wherein at least one coded data portion encodes the entire signature.

13. A method according to claim 12, wherein the entire signature is formed from a plurality of signature parts, and wherein each coded data portion encodes a respective signature part.

14. A method according to claim 1, wherein at least some of the coded data portions encode at least one of:

a location of the respective coded data portion;
a position of the respective coded data portion on the surface;
a size of the coded data portions;
a size of a signature;
an identity of a signature part; and,
units of indicated locations.

15. A method according to claim 1, wherein the coded data includes at least one of:
- redundant data;
- data allowing error correction;
- Reed-Solomon data; and,
- Cyclic Redundancy Check (CRC) data.

16. A method according to claim 1, wherein the security document is at least one of:
- a currency note;
- a check;
- a credit or debit card;
- a redeemable ticket, voucher, or coupon;
- a lottery ticket or instant win ticket; and,
- an identity card or document, such as a driver's license or passport.

17. A method according to claim 1, wherein the identity is indicative of at least one of:
- a currency note attribute including at least one of:
  - currency;
  - issue country;
  - denomination;
  - note side;
  - printing works; and
  - serial number;
- a check attribute including at least one of:
  - currency;
  - issuing institution;
  - account number;
  - serial number:
  - expiry date;
  - check value; and
  - limit:
- a card attribute including at least one of:
  - card type;
  - issuing institution;
  - account number;
  - issue date;
  - expiry date; and
  - limit.

18. A method according to claim 1, wherein the coded data is arranged in accordance with at least one layout having n-fold rotational symmetry, where n is at least two, the layout including n identical sub-layouts rotated l/n revolutions apart about a centre of rotation, at least one sub-layout including rotation-indicating data that distinguishes that sub-layout from each other sub-layout.

19. A method according to claim 1, wherein the coded data is arranged in accordance with at least one layout having n-fold rotational symmetry, where n is at least two, the layout encoding orientation-indicating data comprising a sequence of an integer multiple m of n symbols, where m is one or more, each encoded symbol being distributed at n locations about a centre of rotational symmetry of the layout such that decoding the symbols at each of the n orientations of the layout produces n representations of the orientation-indicating data, each representation comprising a different cyclic shift of the orientation-indicating data and being indicative of the degree of rotation of the layout.

* * * * *